(12) United States Patent
Greenstein

(10) Patent No.: US 7,895,050 B2
(45) Date of Patent: Feb. 22, 2011

(54) PACKAGING AND DISTRIBUTING SERVICE ELEMENTS

(75) Inventor: Paul G. Greenstein, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 12/233,077

(22) Filed: Sep. 18, 2008

(65) Prior Publication Data

US 2009/0012832 A1    Jan. 8, 2009

Related U.S. Application Data

(63) Continuation of application No. 10/121,914, filed on Apr. 12, 2002, now Pat. No. 7,562,022.

(51) Int. Cl.
*G06Q 99/00* (2006.01)
(52) U.S. Cl. ...................................................... 705/1.1
(58) Field of Classification Search ................... 705/1.1
See application file for complete search history.

(56) References Cited

U.S. PATENT DOCUMENTS

| | | |
|---|---|---|
| 5,471,636 A | 11/1995 | Hauck |
| 5,574,837 A | 11/1996 | Clark et al. |
| 5,646,676 A | 7/1997 | Dewkett et al. |
| 5,699,507 A | 12/1997 | Goodnow et al. |
| 5,819,092 A | 10/1998 | Ferguson et al. |
| 5,884,079 A | 3/1999 | Furusawa |
| 5,909,581 A | 6/1999 | Park |
| 5,917,485 A | 6/1999 | Spellman et al. |
| 5,933,600 A | 8/1999 | Shieh et al. |
| 5,949,411 A | 9/1999 | Doerr et al. |
| 5,966,540 A | 10/1999 | Lister et al. |
| 5,970,252 A | 10/1999 | Buxton et al. |
| 6,064,813 A | 5/2000 | Sitbon et al. |
| 6,108,703 A | 8/2000 | Leighton et al. |

(Continued)

FOREIGN PATENT DOCUMENTS

JP        09212353 A      8/1997

(Continued)

OTHER PUBLICATIONS

Everett, Cath, "HP uses espeak to reposition itself as an Internet company," Newswire, May 19, 1999.

(Continued)

*Primary Examiner*—Jonathan Ouellette
(74) *Attorney, Agent, or Firm*—Anna L. Linne, Esq.; Kevin P. Radigan, Esq.; Heslin Rothenberg Farley & Mesiti P.C.

(57) ABSTRACT

A service element is defined and represented by a data structure. It includes one or more components and/or one or more other service elements. A service element providing a complete function is a service offering. Management of service elements and/or service offerings is facilitated by a Service Development Tool. In different aspects, the management includes various tasks associated with creating, modifying and deleting service elements, establishing relationships, error checking and optimization. In a further aspect, service elements are packaged and distributed to enable customers to deliver the service elements. Additionally, the hosting of software packages is facilitated.

6 Claims, 102 Drawing Sheets

U.S. PATENT DOCUMENTS

| | | | |
|---|---|---|---|
| 6,128,624 | A | 10/2000 | Papierniak et al. |
| 6,151,601 | A | 11/2000 | Papierniak et al. |
| 6,195,794 | B1 | 2/2001 | Buxton |
| 6,209,125 | B1 | 3/2001 | Hamilton et al. |
| 6,219,654 | B1 | 4/2001 | Ruffin |
| 6,226,618 | B1 | 5/2001 | Downs et al. |
| 6,247,020 | B1 | 6/2001 | Minard |
| 6,249,769 | B1 | 6/2001 | Ruffin et al. |
| 6,269,473 | B1 | 7/2001 | Freed et al. |
| 6,289,513 | B1 | 9/2001 | Bentwich |
| 6,427,230 | B1 | 7/2002 | Goiffon et al. |
| 6,460,052 | B1 | 10/2002 | Thomas et al. |
| 6,536,037 | B1 | 3/2003 | Guheen et al. |
| 6,567,729 | B2 | 5/2003 | Betters et al. |
| 6,629,135 | B1 | 9/2003 | Ross et al. |
| 6,662,357 | B1 | 12/2003 | Bowman-Amuah |
| 6,778,651 | B1 | 8/2004 | Jost et al. |
| 6,785,805 | B1 | 8/2004 | House et al. |
| 6,859,921 | B2 | 2/2005 | Connor et al. |
| 6,915,253 | B1 | 7/2005 | Chapman |
| 6,934,749 | B1 | 8/2005 | Black et al. |
| 6,993,743 | B2 | 1/2006 | Crupi et al. |
| 7,047,518 | B2 | 5/2006 | Little et al. |
| 7,058,588 | B2 | 6/2006 | Young et al. |
| 7,058,924 | B2 | 6/2006 | Greenstein |
| 7,117,162 | B1 | 10/2006 | Seal et al. |
| 7,149,734 | B2 | 12/2006 | Carlson et al. |
| 7,152,224 | B1 | 12/2006 | Kaler et al. |
| 7,188,335 | B1 | 3/2007 | Darr et al. |
| 7,194,682 | B2 | 3/2007 | Warrington |
| 7,302,400 | B2 | 11/2007 | Greenstein |
| 7,320,400 | B2 | 1/2008 | Manzardo |
| 7,366,678 | B2 | 4/2008 | Greenstein et al. |
| 7,440,902 | B2 | 10/2008 | Greenstein et al. |
| 7,533,026 | B2 | 5/2009 | Greenstein et al. |
| 7,562,022 | B2 | 7/2009 | Greenstein |
| 7,617,118 | B2 | 11/2009 | Greenstein et al. |
| 7,739,112 | B2 | 6/2010 | Greenstein et al. |
| 7,788,122 | B2 | 8/2010 | Greenstein |
| 2001/0047402 | A1 | 11/2001 | Saimi et al. |
| 2002/0054170 | A1 | 5/2002 | Rush et al. |
| 2002/0198773 | A1 | 12/2002 | Belluomini et al. |
| 2003/0018511 | A1 | 1/2003 | Bicknell et al. |
| 2003/0033162 | A1 | 2/2003 | Houssiaux et al. |
| 2003/0046282 | A1 | 3/2003 | Carlson et al. |
| 2003/0172145 | A1 | 9/2003 | Nguyen |
| 2004/0024812 | A1 | 2/2004 | Park et al. |
| 2007/0282627 | A1 | 12/2007 | Greenstein et al. |
| 2008/0154631 | A1 | 6/2008 | Greenstein et al. |

FOREIGN PATENT DOCUMENTS

| | | |
|---|---|---|
| JP | 09292985 A | 11/1997 |

OTHER PUBLICATIONS

Yonda, Marge. "No GIOGO Allowed" Modern Office Technology. Sep. 1985. vol. 30, pp. 126-128.
Office Action for U.S. Letters Patent No. 7,533,026 B2 (U.S. Appl. No. 10/121,307), dated May 22, 2006.
Office Action for U.S. Letters Patent No. 7,533,026 B2 (U.S. Appl. No. 10/121,307), dated Oct. 27, 2006.
Office Action for U.S. Letters Patent No. 7,533,026 B2 (U.S. Appl. No. 10/121,307), dated May 4, 2007.
Office Action for U.S. Letters Patent No. 7,533,026 B2 (U.S. Appl. No. 10/121,307), dated Oct. 31, 2007.
Office Action for U.S. Letters Patent No. 7,533,026 B2 (U.S. Appl. No. 10/121,307), dated Apr. 15, 2008.
Office Action for U.S. Letters Patent No. 7,739,112 B2 (U.S. Appl. No. 10/262,984), dated Jan. 9, 2008.
Office Action for U.S. Letters Patent No. 7,739,112 B2 (U.S. Appl. No. 10/262,984), dated Jul. 9, 2008.
Office Action for U.S. Letters Patent No. 7,739,112 B2 (U.S. Appl. No. 10/262,984), dated Oct. 20, 2008.
Office Action for U.S. Letters Patent No. 7,739,112 B2 (U.S. Appl. No. 10/262,984), dated Apr. 24, 2009.
Office Action for U.S. Letters Patent No. 7,739,112 B2 (U.S. Appl. No. 10/262,984), dated Aug. 4, 2009.
Office Action for U.S. Patent Publication No. 2007/0282627 Al (U.S. Appl. No. 11/841,153), dated Sep. 1, 2010.
Office Action for U.S. Letters Patent No. 7,440,902 B2 (U.S. Appl. No. 10/121,290), dated May 15, 2006.
Office Action for U.S. Letters Patent No. 7,440,902 B2 (U.S. Appl. No. 10/121,290), dated Oct. 27, 2006.
Office Action for U.S. Letters Patent No. 7,440,902 B2 (U.S. Appl. No. 10/121,190), dated May 4, 2007.
Office Action for U.S. Letters Patent No. 7,562,022 B2 (U.S. Appl. No. 10/121,914), dated May 4, 2006.
Office Action for U.S. Letters Patent No. 7,562,022 B2 (U.S. Appl. No. 10/121,914), dated Oct. 18, 2006.
Office Action for U.S. Letters Patent No. 7,562,022 B2 (U.S. Appl. No. 10/121,914), dated May 4, 2007.
Office Action for U.S. Letters Patent No. 7,562,022 B2 (U.S. Appl. No. 10/121,914), dated Nov. 1, 2007.
Office Action for U.S. Letters Patent No. 7,562,022 B2 (U.S. Appl. No. 10/121,914), dated Apr. 16, 2008.
Office Action for U.S. Letters Patent No. 7,366,678 B2 (U.S. Appl. No. 10/121,285), dated Mar. 8, 2007.
Office Action for U.S. Letters Patent No. 7,058,924 B2 (U.S. Appl. No. 10/121,075), dated Dec. 22, 2004.
Office Action for U.S. Letters Patent No. 7,058,924 B2 (U.S. Appl. No. 10/121,075), dated Jul. 18, 2005.
Office Action for U.S. Letters Patent No. 7,302,400 B2 (U.S. Appl. No. 10/121,311), dated Oct. 16, 2006.
Office Action for U.S. Letters Patent No. 7,302,400 B2 (U.S. Appl. No. 10/121,311), dated Mar. 28, 2007.
Office Action for U.S. Letters Patent No. 7,788,122 B2 (U.S. Appl. No. 11/867,904), dated Jan. 15, 2010.
"HP's E-Speak Opens Up E-Services to All", Asia Computer Weekly (Jun. 14, 1999).
Yonda, Marge, "No GIOGO Allowed", Modern Office Technology, vol. 30, pp. 126-128 (Sep. 1985).
Bjorksten et al., "Enterprise Software: The Front and Back Office: Overview and Emerging Trends", University of Texas at Austin, Graduate School of Business (May 1999).
Caldiera et al., "Identifying and Qualifying Reusable Software Components", IEEE, Computer, pp. 61-70 (Feb. 1991).
Basili et al., "Support for Comprehensive Reuse", Software Engineering Journal, pp. 303-316 (Sep. 1991).
Poulin et al., "The Business Case for Software Reuse", IBM Systems Journal, vol. 32, No. 4, pp. 567-594 (1993).
Frakes et al., "Software Reuse: Metrics and Models", ACM Computing Surveys, vol. 28, No. 2, pp. 415-435 (Jun. 1996).
Crooks, Mike, "Capitalizing on Component Reuse", Component Strategies, vol. 2, No. 1, pp. 41-43, 50 (Jul. 1999).
Erlikh, Len, "Leveraging Legacy System Dollars for E-Business", IEEE, IT Professional, vol. 2, No. 3, pp. 17-23 (May/Jun. 2000).
Hoch et al., "Secrets of Software Success", McKinsey & Company, ISBN: 1-57851-105-4 (2000).
Goodyear et al., "Netcentric and Client/Server Computing", Andersen Consulting, CRC Press, LLC, ISBN: 0-8493-9967-X (1999).
McCloy, Andrew, "Marketing High-Tech Services", Boston Business Journal, vol. 17, No. 2 (1997).
Baker, Jeff, "Productizing Services is a Team Effort for Resellers", Computer Reseller News, No. 835 (Mar. 29, 1999).
Bauer, D., "A Reusable Part Center", IBM Systems Journal, vol. 32, No. 4, pp. 620-624 (1993).
"Rational Software e-Development Accelerators", PR Newswire (Aug. 28, 2000).
Taft, D., "Building Out Components", CRN, Issue 933 (Feb. 19, 2001).
"Blueprint Technologies Expands Offerings to Include Reusable Assent Mining Portal", PR Newswire (Jul. 24, 2001).

"Aonix Extends Select Component Factor Software Reuse Success", Business Wire (Sep. 28, 2001).

Sconyers, E.B., "Characterizing Software Specifications for Domain-Specific Reuse", The University of Texas at Arlington, AAT 1348620 (1992).

Lubars, M.D., "Reusing Designs for Rapid Application Development", IEEE ICC'91 pp. 1515-1519 (1991).

Ning, J.Q., "Component-Based Software Engineering (CBSE)", IEEE, pp. 34-43 (1997).

Dewan et al., "Workflow Optimization Through Task Redesign in Business Information Processes", IEEE (1998).

Keller et al., "Design Components" Towards Software Composition at the Design Level, IEEE, pp. 302,311 (1998).

Sprott, D., "Componentizing the Enterprise Application Packages", Communications of the ACM, vol. 42, No. 4, pp. 63-68 (Apr. 2000).

Nelson, A., "Maximize Your Resources: Don't Duplicate, Integrate", GanttHead.com (Apr. 9, 2001).

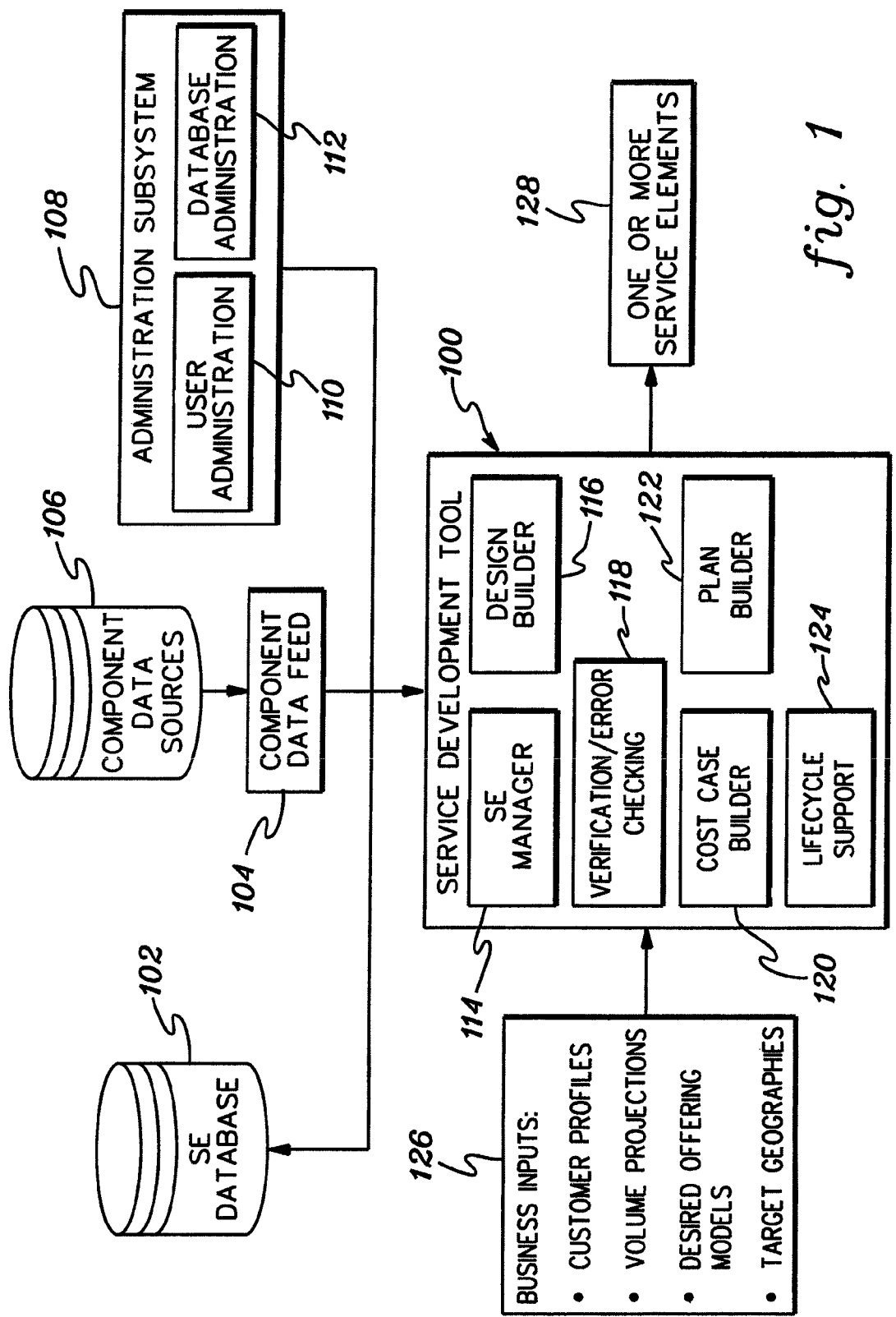

PACKAGING AND DISTRIBUTING SERVICE ELEMENTS

CROSS-REFERENCE TO RELATED APPLICATIONS

This application is a continuation of U.S. patent application Ser. No. 10/121,914, filed Apr. 12, 2002, and entitled "Packaging and Distributing Service Elements", by Paul G. Greenstein, which was published on Oct. 16, 2003 as U.S. Patent Publication No. US 2003/0195757 A1, and assigned to the same assignee as this application, and which is hereby incorporated herein by reference in its entirety.

This application contains subject matter which is related to the subject matter of the following applications and patents, each of which is assigned to the same assignee as this application, and hereby incorporated herein by reference in its entirety:

"A Service Development Tool and Capabilities for Facilitating Management of Service Elements", Greenstein et al., Ser. No. 10/121,290, filed Apr. 12, 2002, and published on Oct. 16, 2003 as U.S. Patent Publication No. US 2003/0195755 A1;

"Facilitating Management of Service Elements Usable in Providing Information Technology Service Offerings", Greenstein et al., Ser. No. 10/121,307, filed Apr. 12, 2002, and published on Oct. 6, 2003 as U.S. Patent Publication No. 2003/0195756 A1;

"Facilitating Error Checking of Service Elements", Greenstein et al., U.S. Pat. No. 7,366,678, issued Apr. 29, 2008;

"Facilitating Hosting of Applications", Paul G. Greenstein, U.S. Pat. No. 7,058,924, issued Jun. 6, 2006; and "Optimizing Management of Service Elements", Paul G. Greenstein, U.S. Pat. No. 7,302,400, issued Nov. 27, 2007.

TECHNICAL FIELD

This invention relates, in general, to the ability to provide services, and in particular, to facilitating the management of service elements usable in providing information technology (IT) service offerings, which represent the services to be provided.

BACKGROUND OF THE INVENTION

Services are provided in various ways. For example, services are provided in-house by a service provider or by a company itself, or are outsourced to a requesting customer. With the latter, a customer, such as a company, requests that a particular service be provided to the company. For instance, the company may request consulting services. With such a request, the company specifies the number of desired hours of labor and/or other requirements.

In order to purchase the number of hours of labor and/or other requirements, one or more service elements representing the requirements are created by the service provider and purchased by the company. This defines for the company what is being provided and at what cost.

Although service elements are used today in the providing of services, there still exists a need for a capability to enhance the definition of service elements. Further, there exists a need for a capability that enables service elements to be represented in a manner that facilitates management of the service elements. A further need exists for a capability that facilitates management of service elements.

SUMMARY OF THE INVENTION

The shortcomings of the prior art are overcome and additional advantages are provided through the provision of a method of providing service elements. The method includes, for instance, packaging at least a portion of one or more service elements into a package usable in delivering a service; and distributing the package to enable a customer to deliver the service.

System and computer program products corresponding to the above-summarized methods are also described and claimed herein.

Advantageously, service elements may be packaged and then distributed to enable customers to deliver the service elements. The packaging can include the design of a service element and/or implementation of a service element. Further, the distribution can be provided to an intermediary, who then provides the package to the customer.

In one embodiment, a tool, such as a service development tool, includes logic that enables the exporting of all or a part of a service element from a database, and stores it on a storage medium, or otherwise, provides it to a distribution medium, such as the Internet or other medium that facilitates distribution. Further, in one aspect, the tool is implemented within a computing environment, such as a UNIX or Windows 2000 environment. However, in other embodiments, it can be implemented in other environments.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1 depicts one example of an overview of a Service Development Tool used in accordance with an aspect of the present invention;

BEST MODE FOR CARRYING OUT THE INVENTION

Figure 2A:
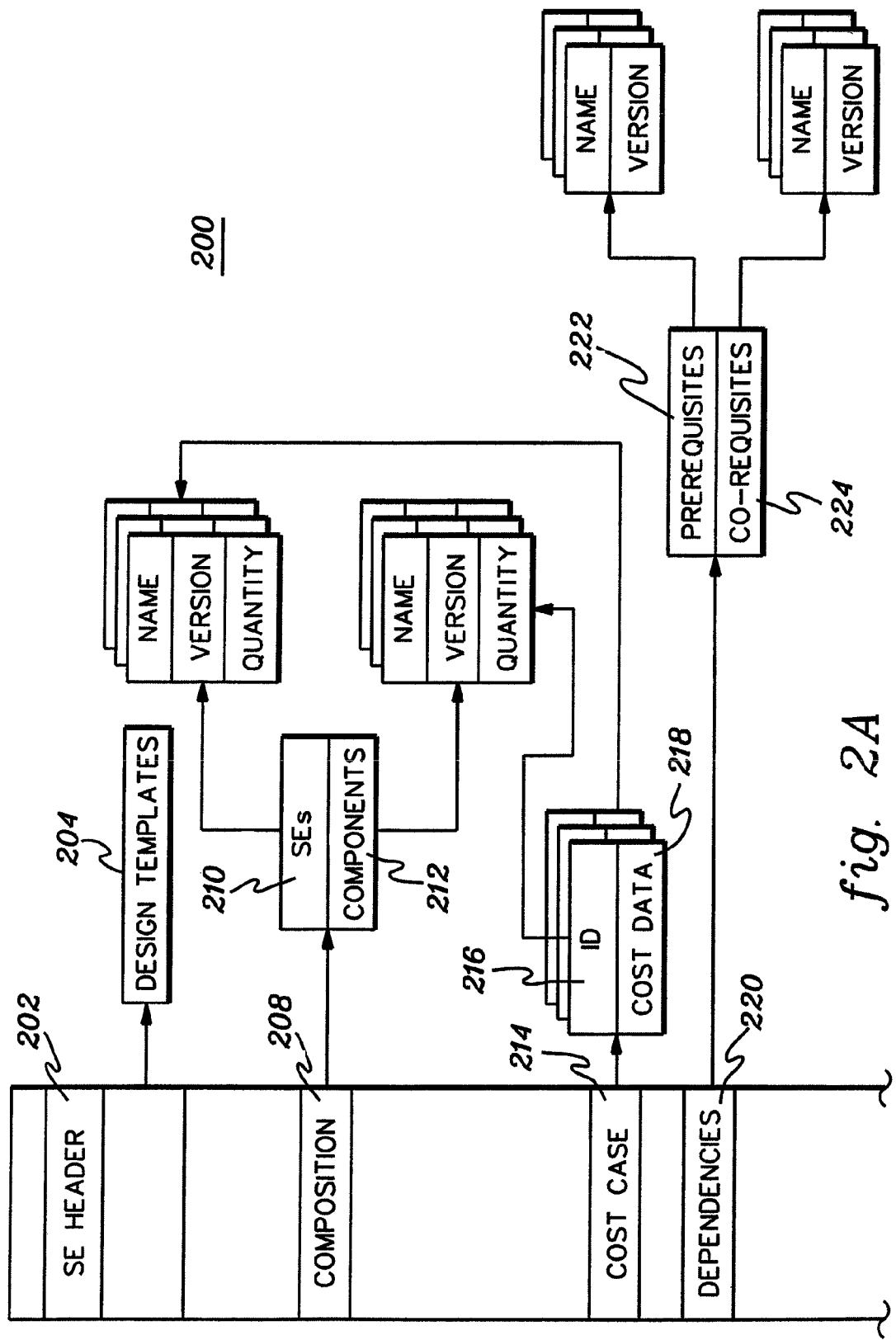
FIGS. 2a-2g depict one example of a data structure used to represent a service element, in accordance with an aspect of the present invention.
Figure 2B:
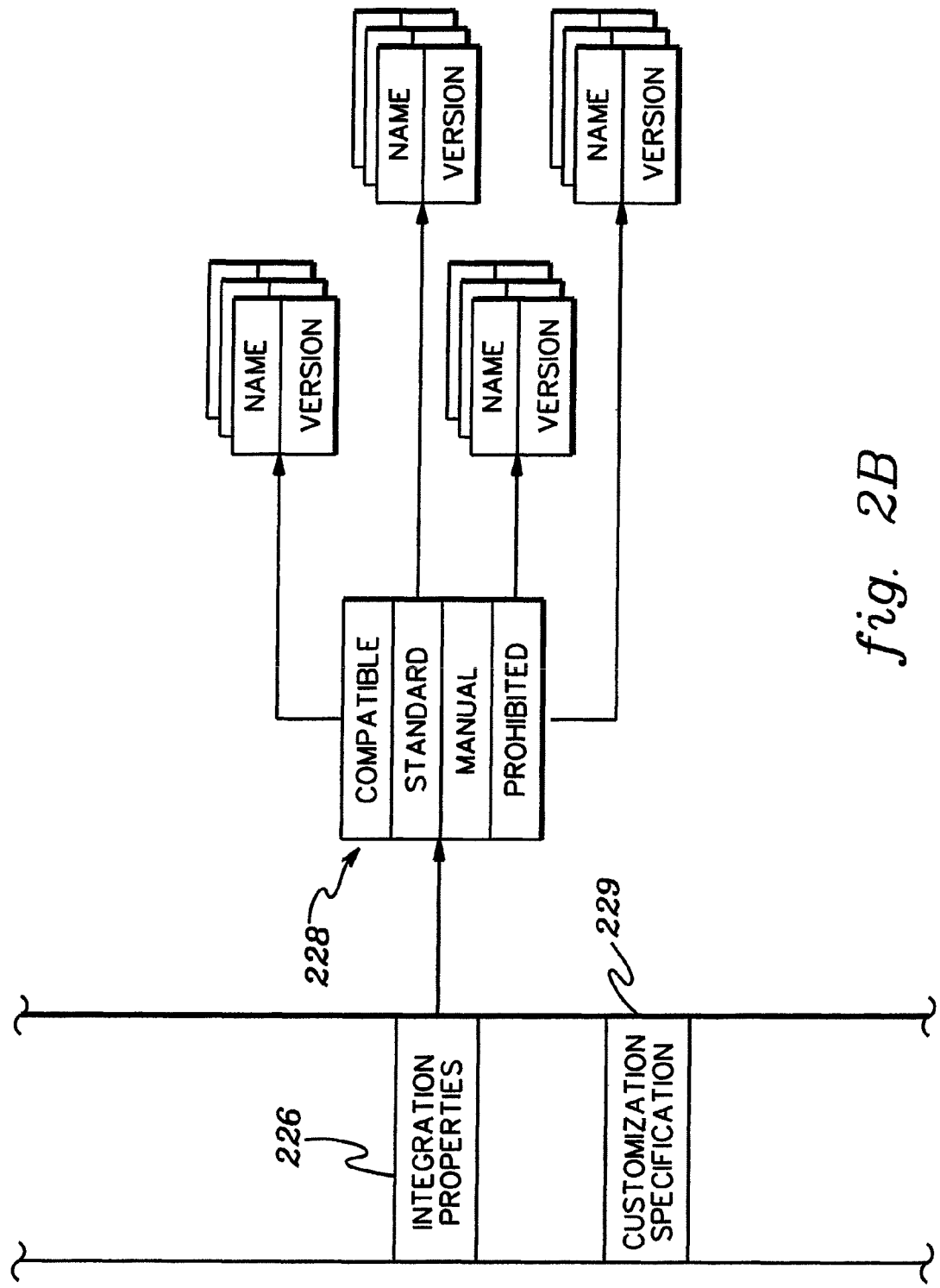
Figure 2C:
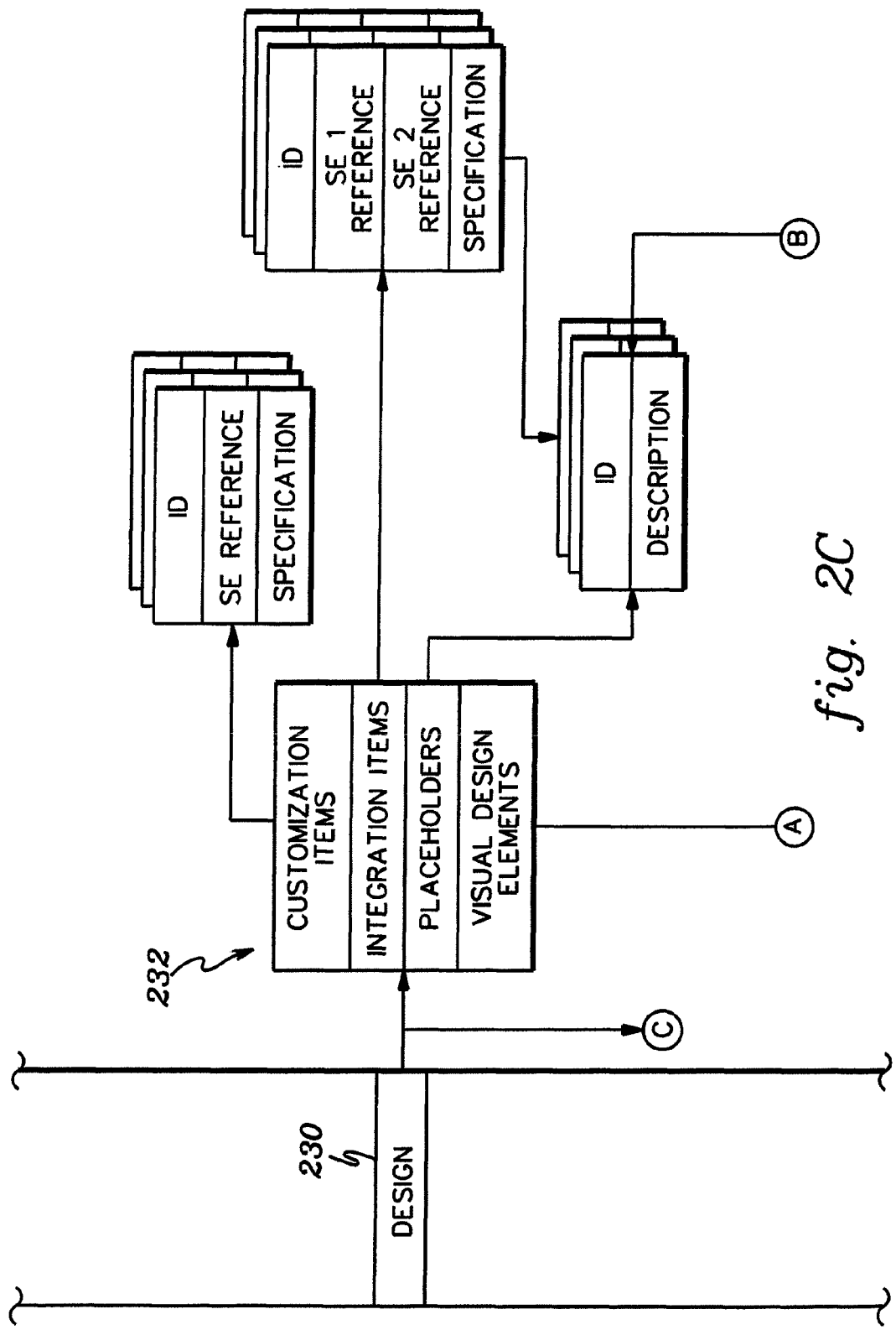
Figure 2D:
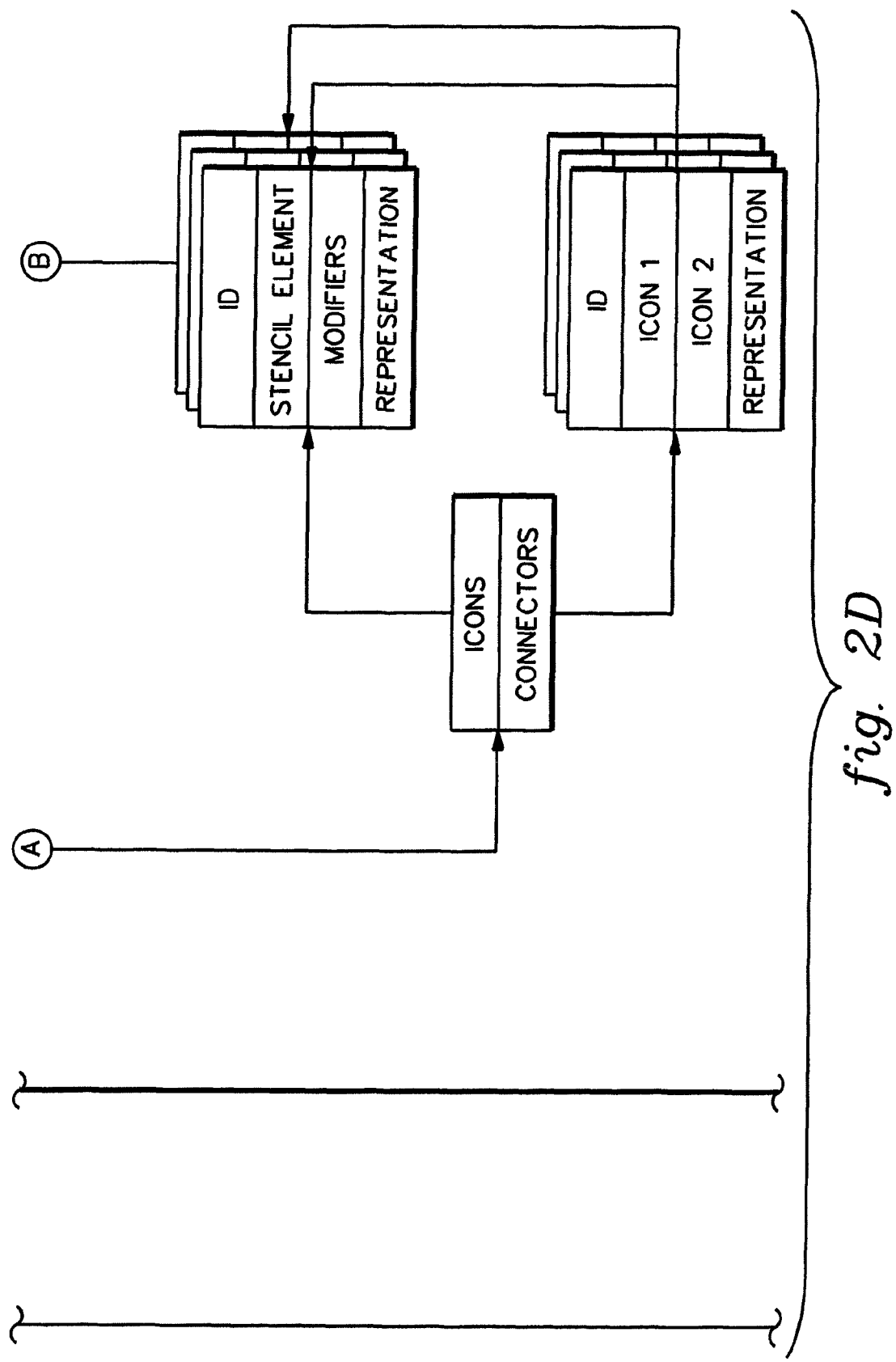

In accordance with one or more aspects of the present invention, one or more capabilities are provided for facilitating the management of service elements. In one embodiment, aspects of the management are facilitated by a tool, referred to herein as a Service Development Tool (SDT). The Service Development Tool enables certain management aspects to be automated.

Prior to describing various aspects of the present invention, a number of terms are described, including, for instance, the following:

Direct business function: A function performed by software in direct support of a business process—e.g., procurement, billing, group communications, broadcasting of business information to users, etc.

Indirect business function: A function performed in support of direct business function(s)—e.g., network protection (firewall), backup/restore, disaster recovery, dump, networking, operating system, software messaging, etc.

Application: A software package running on top of hardware, operating system, network, and middleware, embodying or providing one or more direct business function(s).

Infrastructure: A collection of indirect business functions supporting direct business functions.

Asset: A software and/or service package intended for direct or indirect use by customers.

Custom asset: An asset usable by a single customer or a small group of customers.

Generic asset: An asset usable by all or a large number of customers (often with customization applied for each customer or a group of customers).

Development: A process of creating an asset.

Customization: A process of adjusting a generic asset for needs of a particular customer or a small group of customers.

Component: A service (time, e.g., labor) or material (e.g., hardware, software, connectivity, etc.) that could be used to construct other entities, but for which a customer is typically not billed separately.

Service element (SE): A discrete entity for which a customer may be billed and/or which represents an in-house or outsourced service. A service element includes one or more components and/or one or more other service elements. A service element may be an intermediate building block to a service offering or may be the service offering, itself.

A service element is classified based on a number of parameters. One example of various parameters used for classification are included in the following table:

| Parameter | Classification | Description |
| --- | --- | --- |
| Reusability | Standard | Usable for multiple customers without modification (save customization) |
| | Custom | Specific to a single customer |
| Complexity | Primitive | Built from components; does not contain other SEs |
| | Composite | Includes other SEs; may directly include components |
| | Bundle | Includes other SEs; does not directly include components |
| Sharing | Dedicated | Designed to be used by a single customer in a single instance |
| | Shareable | Designed to be used by one or more customers in a single instance |
| Functionality | Facility | |
| | Network | |
| | Server | |
| | Storage & backup | |
| | Security | |
| | Monitoring | |
| | Performance | |
| | Support | |
| | Professional | |
| | Application | |
| Geography | Global | Designed for use in multiple geographies |
| | Regional | Designed for use in a single geography or region |

-continued

| Parameter | Classification | Description |
|---|---|---|
| Functional completeness | Offering | Complete function, not requiring additional SEs to operate; associated with a business model |
| | Capability | Partial function; usually a building block for offerings or custom implementations |
| | Feature | Additional optional functionality to enhance an offering or a capability |
| Customization | Standard | No customization permitted |
| | Parametric | Limited degree of customization is permitted, based on a finite combination of parameters associated with SE; no programmable customization is permitted |
| | Programmable | Subsumes parametric; programmable customization is permitted |

A service element has one or more properties. Various properties of a service element include, for instance:

| Property | Description |
|---|---|
| Name | SE name (unique across SEs) |
| Description | Description of the SE function |
| Version | SE version identifier |
| Creation date | Date of creation of the first version of the SE |
| Modification date | Date of last modification of the SE |
| Withdrawal date | Date of SE deletion (if deleted) |
| Change history | A list of versions and specification of changes made to a SE |
| SE under development flag | Indicates whether SE is under development |
| Technical owner | Name and contact information for the technical person (development) responsible for the SE lifecycle |
| Business owner | Name and contact information for the manager responsible for the SE |
| Functional prerequisites | List of other SEs required for this SE to function |
| Composition | List of service elements and/or components included in this SE, including quantity specification for each |
| Features | List of feature SEs that can be optionally added to this SE |
| Upgrade | List of SEs that may provide similar function in the case of withdrawal of this SE |
| Integration | List of SEs that are designed to and may be optionally integrated with this SE |
| Pricing | Pricing & rules (e.g., volume discounts, units and prices for shared elements, etc.) |
| Cost matrix | Combined cost of SE time and materials |
| Development documentation | Functional specification, design, test plan, and any other pertinent technical documents |
| Legal documentation | Contracts, license agreements, and any other pertinent legal documents |
| Deployment plan | Specification of SE deployment |
| Delivery documentation | Specification of delivery procedures associated with this SE |
| Augmentation permitted flag | Indicates whether augmentation of a design template is permitted |
| Integration Properties | |
| Compatible | List of SEs this SE is compatible with |
| Standard | List of SEs this SE integrates with by parametric integration |
| Manual (default) | List of SEs this SE integrates with by programmable integration |
| Prohibited | List of SEs with which the SE is mutually exclusive |

A service element may be bundled with one or more other service elements. In one example, SE bundling may be accomplished in any of the following ways (including their combinations):

1. New SE includes other SEs;
2. New SE pre- or co-reqs other SEs and requires no special integration with them (i.e., they are designed to work together); and
3. New SE pre- or co-reqs other SEs and integration is required to make them work together.

Service offering (or offering): A service element providing a complete function. In one example, the service offering is associated with a business model and the billing, bill presentment, and collection mechanisms, supporting the associated business model. A service element that is a service offering may include other service elements, but does not require other service elements that are not included in the service element.

Hosted service offering: A service offering based on a company's, such as International Business Machines Corporation, or a customer's infrastructure, operated under the company's control.

Application hosted service offering: A hosted offering including at least one application. In one embodiment, application hosted service offerings are classified based on the following parameters: type of client; horizontal topology—position of boundaries between the company infrastructure and customer infrastructure; vertical topology—one to one or one to many relative to the number of application instances versus customers, or discrete versus shared; and business model.

Hosted service offerings and application hosted service offerings are described in more detail further below.

In accordance with an aspect of the present invention, the management of service elements, as well as the management of service offerings, are facilitated by a tool, referred to as a Service Development Tool (SDT). Aspects of this tool are described below.

Service Development Tool Overview

The Service Development Tool minimizes the efforts required to design, implement, and document solutions. While it is ultimately targeted to the production of a final solution or product, it further provides an offering team with staged solutions and documentation. This allows the team to view incremental stages of a project and to take action with respect to such stages, such as procuring incremental funding or make changes, as desired.

One embodiment of a functional overview of a Service Development Tool is depicted in FIG. 1. Input to a Service Development Tool 100 are, for instance, logical collections of data, such as:

A Service Element (SE) database 102, including one or more packaged service elements and/or one or more templates; and A component data feed 104, providing component information from one or more disparate component information sources 106.

Moreover, the Service Development Tool is administered by an administration subsystem 108, which includes, for instance, a user administration unit 110 and a database administration unit 112. The administration functions include, for example, user administration and access control functionality, allowing the administrator to assign access roles to system users. The roles include, for example: developer, reviewer, offering manager, project manager, tester, and delivery personnel. Depending on the role, different functions can be performed by a user.

The SDT includes a variety of functional units, such as, for instance:

Service element manager 114, providing the ability to manage (e.g., construct—create and develop, delete, upgrade, track dependencies, provide reports, such as cross-references, provide search functions, release to production, etc.) service elements;

Design builder 116, providing the ability to produce graphical configuration diagrams;

Verification/error checking functionality 118, providing the ability to verify SE consistency/completeness, dependencies or relationships and business case;

Cost case builder 120, providing the ability to generate service element cost cases;

Plan builder 122, providing the ability to generate project plans, and to define development budgets; and Lifecycle support 124, providing the ability to track changes to dependencies, and, if appropriate, propagate changes through chains of dependencies among disparate SEs. Also, it informs about a deletion of an SE/component and may recommend creating a new SE or finding a replacement component, if one of the containing SE/components becomes unavailable.

The above functions can be used piecemeal or jointly, permitting creation of parts (e.g., service elements, offering templates) or whole service offerings. A set of initial business assumptions 126 is entered, including, for instance, customer profiles, customer volume projections, desired offering model(s), target geographies, etc. (As used herein, a customer includes an in-house customer and/or an outsourced customer.) Subsequent activities performed by a user include entering/selecting information, while interacting with the appropriate aspects of the tool. For example:

Selection of the appropriate template(s);

Creation of the technical design diagram(s), enumerating and identifying hardware elements and assumptions about them;

Selection of standard SEs required to package the offering;

Creation of new SEs; and

Identification of required standard documents to be produced; etc.

The above set of activities are performed to construct (e.g., create and develop) one or more service elements 128. As one example, the activities are performed as an iterative process, until a complete offering with satisfactory operational and cost characteristics over time is defined, including, for instance:

Technical design;

Cost case(s);

Development plan; and

Delivery documentation.

Further details regarding the structure and management of service elements, as well as the management of service offerings, are described below.

In one aspect of the present invention, a service element is represented by a data structure, such as the data structure depicted in FIGS. 2*a*-2*g*. The data structure includes, for instance, a comprehensive set of information to manage (e.g., construct, delete and/or deploy) a service element.

Figure 2E:
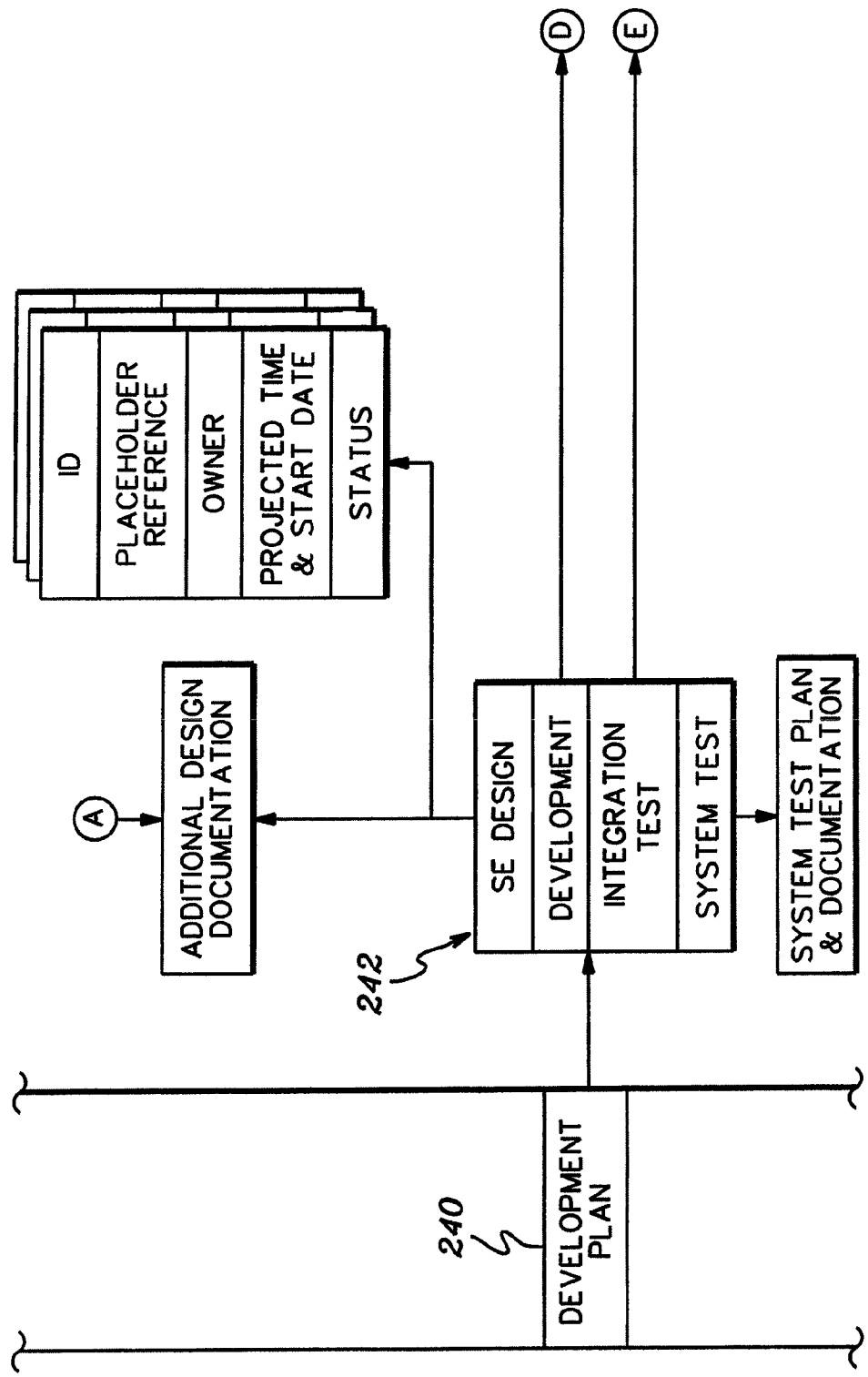
Figure 2F:
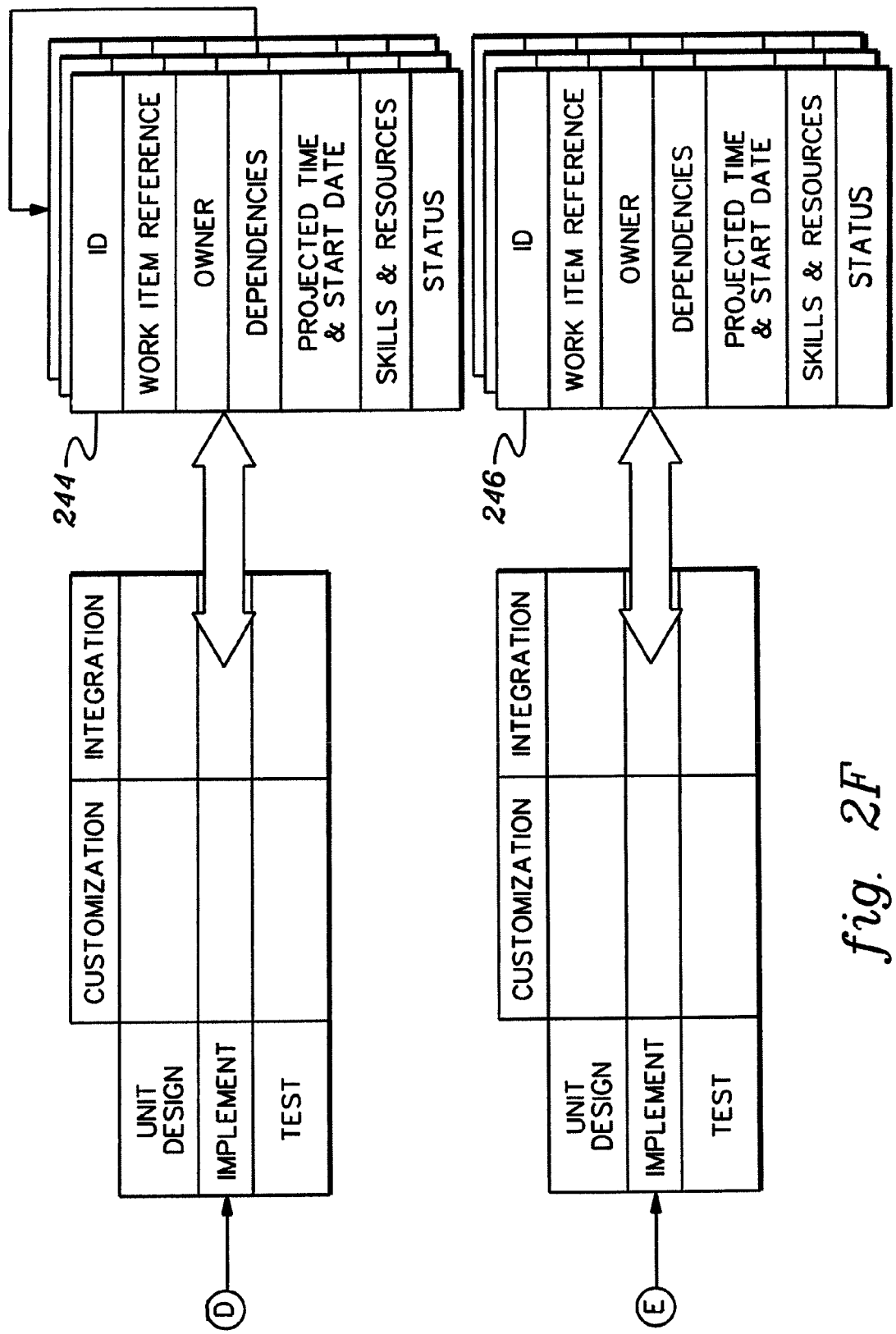

As one example, a data structure 200 includes, for instance:

A. A service element header 202 (FIG. 2*a*) used to identify and store various information relating to the service element. For example, service element header 202 includes one or more tables that identify characteristics of the service element (e.g., properties);

B. A reference to zero or more design templates 204 usable in designing the service element;

C. Service element composition 208, which includes the composition of the service element. In one example, the composition includes one or more service elements 210 and/or one or more components 212. As shown, each service element or component includes a name, a version, and at least one quantity;

D. A cost case 214, which includes cost data 218 and an identifier 216 associated with the cost data. The cost case is coupled to the composition;

E. Zero or more dependencies 220, which identify relationships of the service element. A dependency may be indicated, for instance, as a prerequisite 222 or a co-requisite 224, and each requisite is identified by a name and a version;

F. Integration properties 226 (FIG. 2*b*), which identify various integration properties 228 of a service element, including, for instance, compatible, standard, manual and prohibited. Each property is identified by a name and a version;

G. Customization specification 229, which includes one or more customization specifications of the service element;

H. Design 230 (FIG. 2*c*), which identifies various design items 232 of the service element, including, for instance, customization items, integration items, placeholders, and visual design elements. In one example, each customization item is identified by an id and has a SE reference and a specification. Each integration item is identified by an id and has two SE references and a specification. An integration item (as well as a customization item) may refer to a placeholder. Each placeholder is identified by an id and has a description. The visual design elements (see FIG. 2*d*) are represented as collection of a set of icons and a set of connectors. Icons are represented as a collection of data structures, including an id, reference to the stencil element corresponding to this icon, modifiers (e.g., color change, etc.), and an icon representation (size, location, etc.). Connectors are represented as a collection of data structures, including an id, references to the first and the second icons a connector connects, and a representation (e.g., line color). The design also has additional design documentation (FIG. 2*e*).

I. Development plan 240 (FIG. 2*e*) is a plan associated with the service element. It includes a number of phases 242, including, for instance, the design of the service element, development, integration test and system test. The SE design phase of the development plan is coupled to the additional design documentation of the design. Further, it is identified by an id and includes one or more placeholder references, an identified owner, a projected time and start date and status. Development includes (FIG. 2*f*) various sub-phases including, for instance, a unit design, implementation and test for both customization and integration. Each sub-phase is represented as a collection of tasks 244, and each task is identified by an id, and includes a work item reference, an owner, one or more dependencies, a projected time and start date, skills and resources, and status. Similarly, the integration test phase includes various sub-phases including, for instance, design, implementation and test for both customization and integration. Each sub-phase is also represented as a collection of tasks 246, and each task is identified by an id, and includes a work item reference, an owner, one or more dependencies, a projected time and start date, skills and resources, and status. The system test phase (FIG. 2*c*) further includes a system test plan and documentation.

J. Deployment plan 250 (FIG. 2*g*) includes various phases 252, including, for instance, provisioning, installation, customization, integration and checkout, and each phase includes one or more tasks, each having an id, work item reference, dependencies and projected time.

Various sections of the data structure may also include other information.

The above-described data structure is used to hold information regarding a service element, and the information within the data structure is used to further manage the service element, as described herein. In one embodiment, the logic associated with managing a service element is facilitated by using the Service Development Tool. Various management aspects are described below.

One such management aspect is creating the service element, and one embodiment of the logic associated with creating a service element is described with reference to FIGS. 3a-3c. As one example, the logic of FIGS. 3a-3c is implemented within the SE manager of the SDT.

Figure 3A:
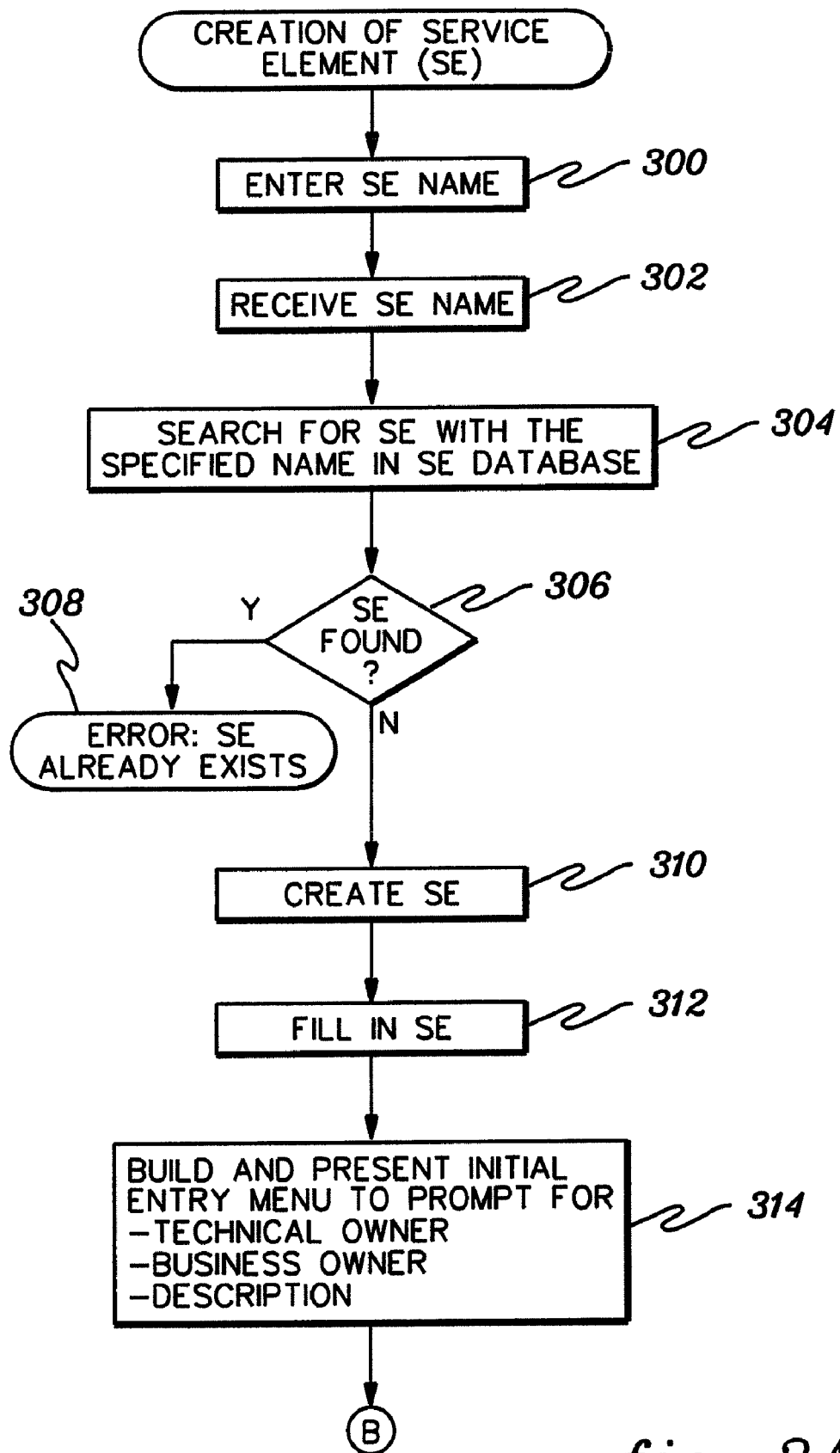
FIGS. 3a-3c depict one embodiment of the logic associated with creating a service element, in accordance with an aspect of the present invention.
Figure 3B:
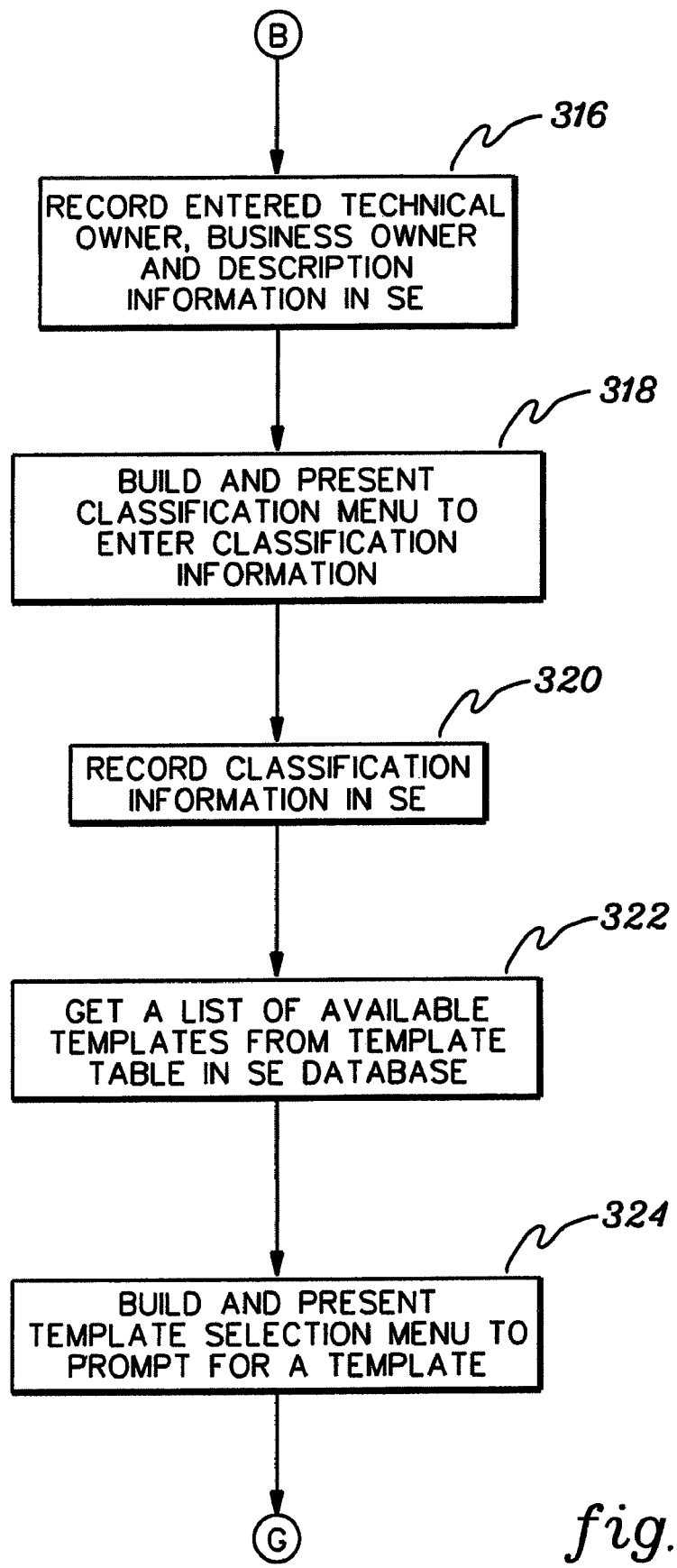
Figure 3C:
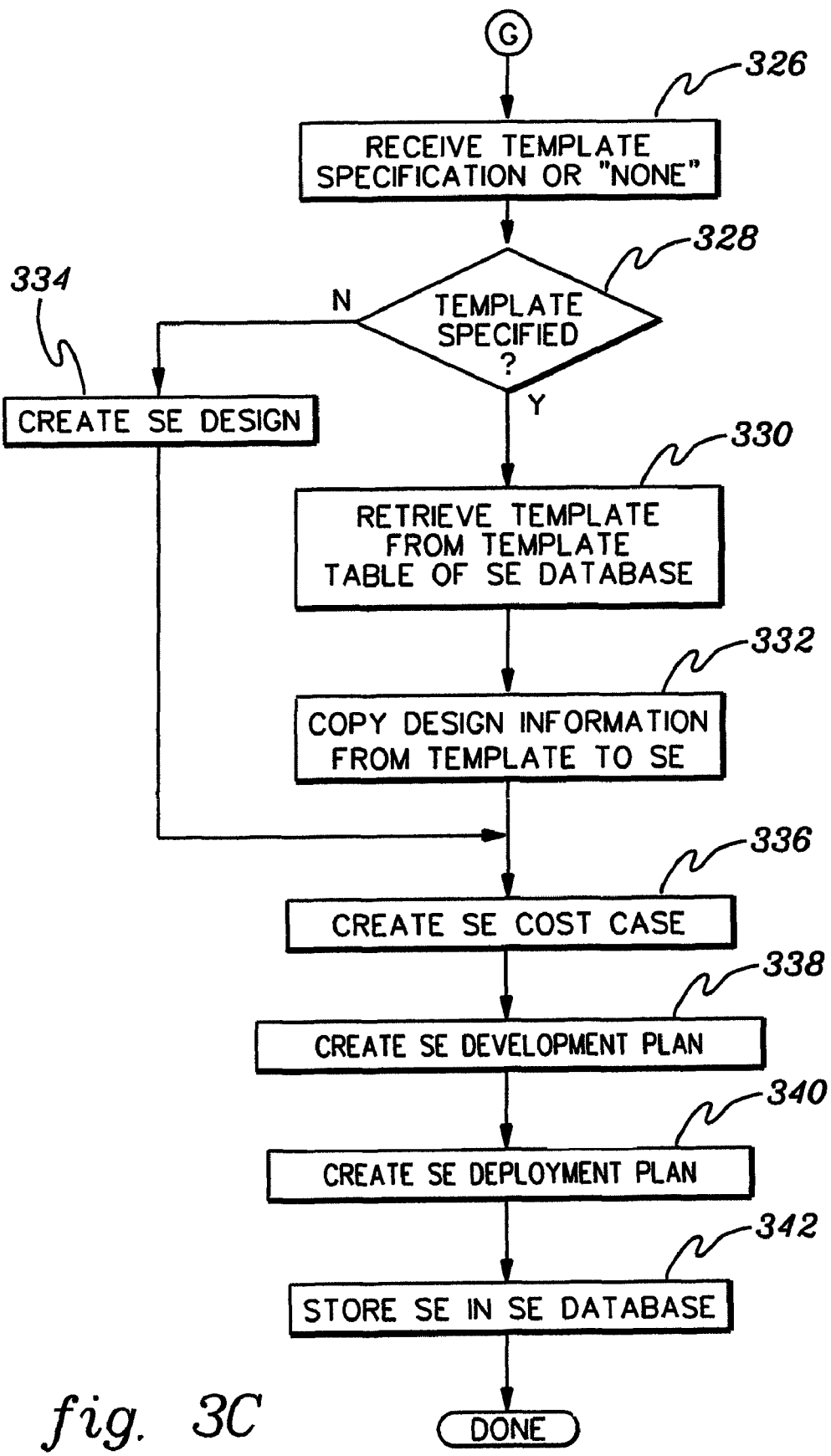

Referring to FIG. 3a, a user initiates SE creation by employing, for instance, a SE creation user interface (UI) function to specify a SE name, STEP 300 (FIG. 3a). The new SE name is read, STEP 302, and the SE database is searched for a SE with the specified name, STEP 304. If a SE with the specified name is found, INQUIRY 306, the entered name is not unique, and thus, an error is indicated and processing terminates, STEP 308. Otherwise, the specified new SE name is unique, and thus, a new SE is created (e.g., allocated in memory), STEP 310. Thereafter, the specified name is assigned to the new SE, the creation date is filled in, the last modification date, which is set equal to the creation date, is filled in, the withdrawal date and change history are set to null, the SE status is indicated as "under development", and a SE version is indicated as "initial", STEP 312.

Subsequently, an initial entry menu for this SE is built and presented to the user, who can now enter various information, such as technical owner, business owner, and SE description, STEP 314. This information is then recorded in the newly created SE, STEP 316 (FIG. 3b).

Thereafter, a classification menu is built and presented to the user, such that the user can enter the SE classification information, STEP 318. The classification information is read and recorded in the newly created SE, STEP 320.

Next, a list of available design templates is retrieved from the template table of the SE database, STEP 322, and formatted as a selection menu with an option of selecting "none", STEP 324. The user is presented with the template selection menu and can select a template or specify "none" (no template is desired). The process then receives the user template specification or "none", STEP 326 (FIG. 3c). If the user has selected a template, INQUIRY 328, the specified template is retrieved from the template table of the SE database, STEP 330, and template design information is copied from the template into the newly created SE, STEP 332. Otherwise, an empty SE design is created, STEP 334. That is, memory is allocated for the design section of the SE data structure, and it is initialized to null.

Next, creation of SE cost case, development plan, and deployment plan sections of the data structure are initiated, STEPS 336-340. (Creation of these sections is described further below.) The newly created SE is then stored in the SE database, STEP 342.

Once a service element is created, it can be developed. Service element development is performed using a variety of tools, based on the nature of development activities—e.g., SE header is edited using a structured editor, which, depending on the field, permits free-form text entry or provides a selection of permitted values to choose from; SE design is modified using the SE design tool described below, etc. Whenever an actual modification of a SE under development is in progress, the user performing the modification gains sole access to the target SE, and all other users are prevented from making any changes until the modification session completes (by either discarding the changes or by storing a changed SE in the SE database). When the desired modifications to a service element are completed, the SE may be released to production. One embodiment of the logic associated with SE development and the process of releasing a SE to production is described with reference to FIGS. 4a-4b. In one example, the logic of FIGS. 4a-4b is implemented within the SE manager.

Figure 4A:
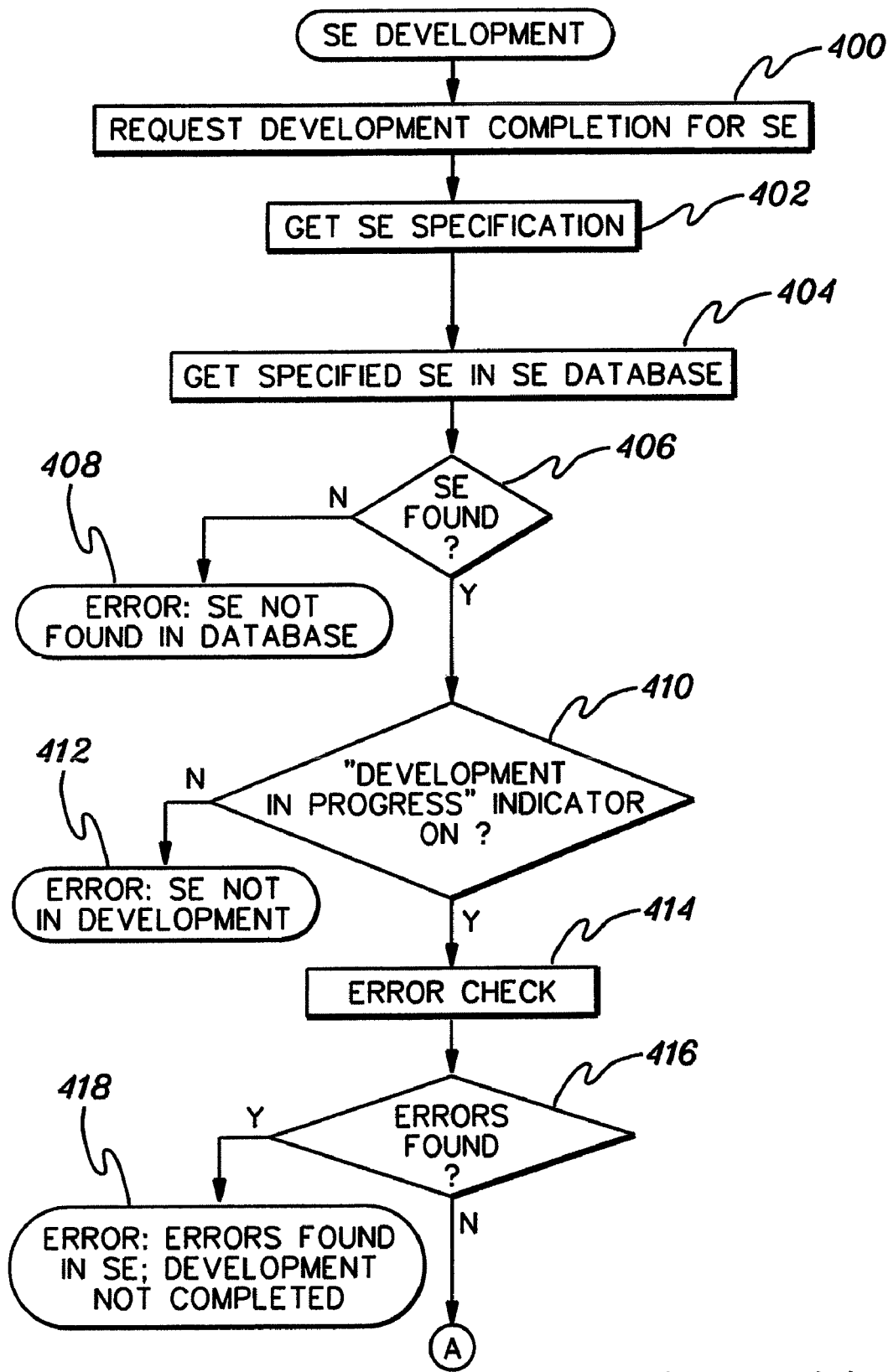
FIGS. 4a-4b depict one embodiment of the logic associated with completing development of a created service element, in accordance with an aspect of the present invention.
Figure 4B:
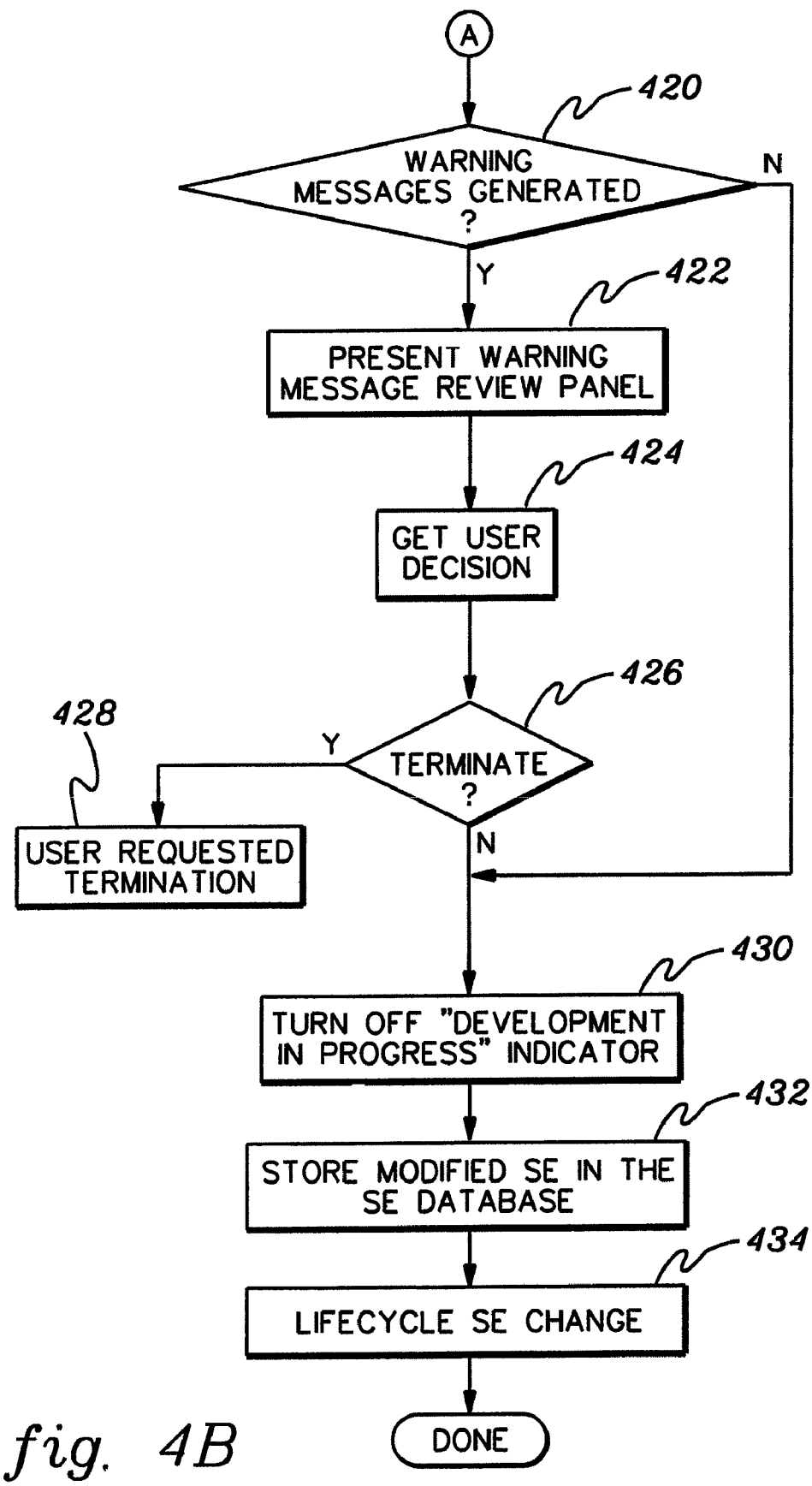

Referring to FIG. 4a, initially, the user invokes a SE development completion panel to request development completion for the specified SE, STEP 400. The process obtains the specified SE name, STEP 402, and attempts to retrieve the specified SE from the SE database, STEP 404. If the specified SE is not found in the SE database, INQUIRY 406, processing terminates with an error, STEP 408. However, should the specified SE be found in the database, but does not have a "development in progress" indicator set, INQUIRY 410, processing terminates with an error indicating the SE is not in development, STEP 412. Otherwise, an error check, including dependency verification, is performed to ensure the specified SE is ready to be released to production, as described below, STEP 414. Further details regarding dependency verification are described below.

If, during the error check, errors are found, INQUIRY 416, processing terminates with an error, STEP 418. Otherwise, a determination is made as to whether warning messages were issued by the error check process, INQUIRY 420 (FIG. 4b). If warning messages were generated, a warning message review panel is presented to the user, and the user is given an option to terminate the process or override warning messages, STEP 422.

The user makes the decision and enters it into the process. The process obtains the user decision, STEP 424. If the user's decision is to terminate, then the process complies by terminating, STEP 428. However, if processing is to continue or if warning messages were not generated, then the SE "development in progress" indicator is turned off, STEP 430, and the updated SE is stored in the SE database, STEP 432. Additionally, a lifecycle SE change process is executed to ensure that any changes in this SE are appropriately reflected in any SEs that depend on this SE, as described below, STEP 434.

As described above, it is desirous to perform dependency verification during SE development, especially since different developers are likely to be responsible for different SEs. Further, during other processing, dependency verification may also be performed. Thus, further details associated with dependency verification are described herein.

For certain fields, it is desirous to verify cross-SE dependencies, either unidirectional or bi-directional. A case of one SE including another SE in its composition is an example of a unidirectional dependency. A case of two SEs co-requiring one another (i.e., the first SE depends on the second, while the second SE depends on the first) is an example of a bi-directional dependency. The following are example dependencies:

1. SE A includes SE B as a part of its composition—this is a unidirectional dependency;
    a. SE A includes component B as a part of its composition—this is a unidirectional dependency on a component;
2. SE A and SE B are mutually dependent (i.e., are to be present together at deployment)—this is a bi-directional dependency.

Although SEs may have dependencies on components, in one embodiment, components may not have dependencies, and thus, dependencies on components are unidirectional.

In addition to uni-directional or bi-directional, dependencies may be classified as actual (i.e., dependency on an already existing SE) or pending (i.e., dependency on a SE not yet created). Unresolved pending dependencies would not, in this embodiment, prevent the SE from completing development (in anticipation of future creation of additional SEs this one is dependent on). However, even though a SE may be fully developed, its deployment (described below) would not proceed until the dependencies are resolved. Thus, SE dependencies are also verified as a part of the deployment process initiation for each SE.

Dependencies are a special case of relationships. In one embodiment, no additional classification of relationships is provided; instead, all relationships are dependencies. Thus, as used herein, the terms "dependency" and "relationship" are interchangeable. However, one skilled in the art will appreciate that more detailed specifications of SE relationships may be possible, and that additional types of relationships besides dependencies may exist. For example, other classifications could include inclusion, integration, coexistence, or mutual exclusion.

One embodiment of the logic associated with SE dependency verification is described with reference to FIGS. 5a-5b. As one example, this logic is implemented within verification/error checking 118 of the SDT.

Figure 5A:
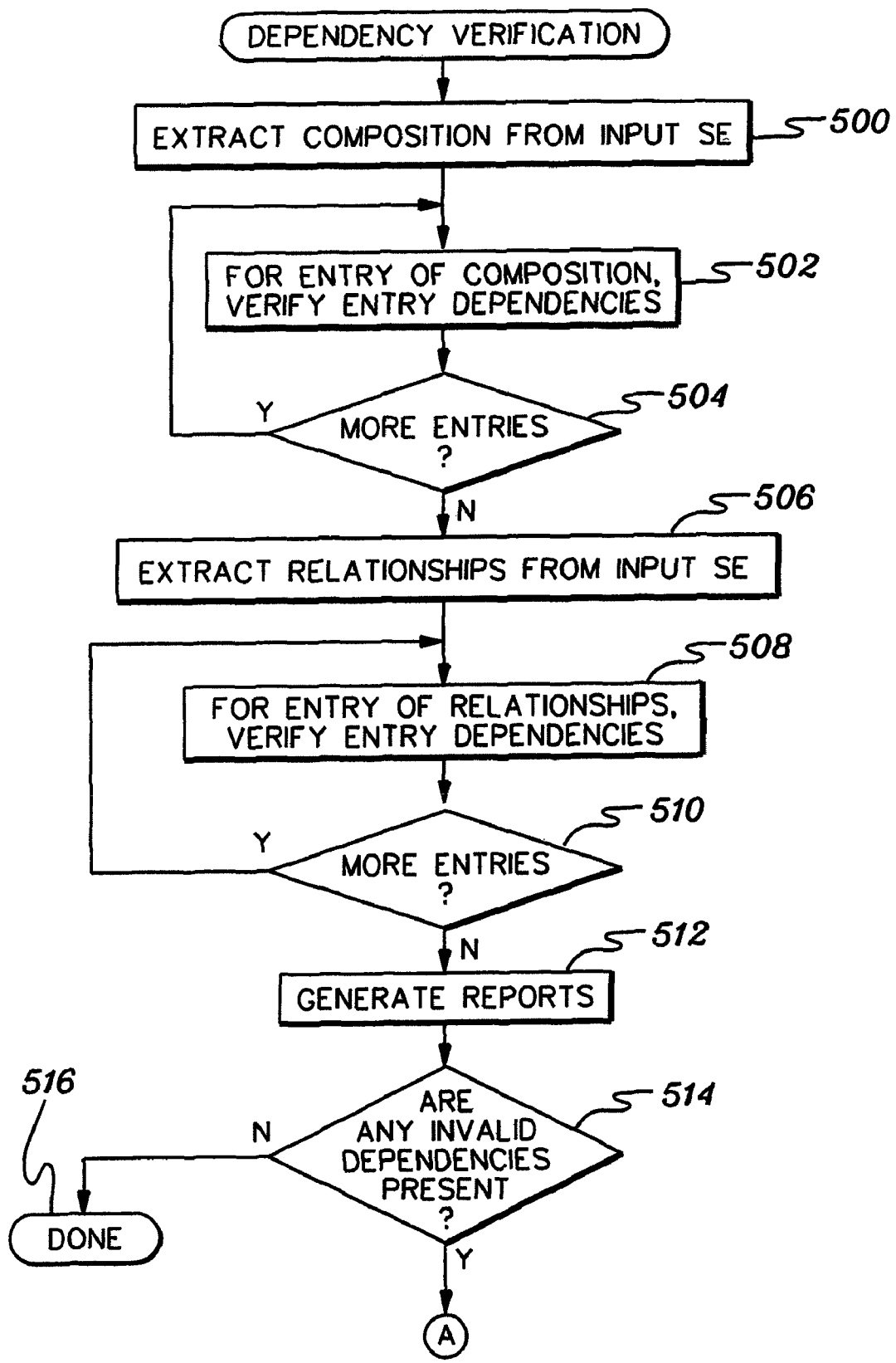
FIGS. 5a-5b depict one embodiment of the logic associated with an overview of verifying dependencies of a service element, in accordance with an aspect of the present invention.
Figure 5B:
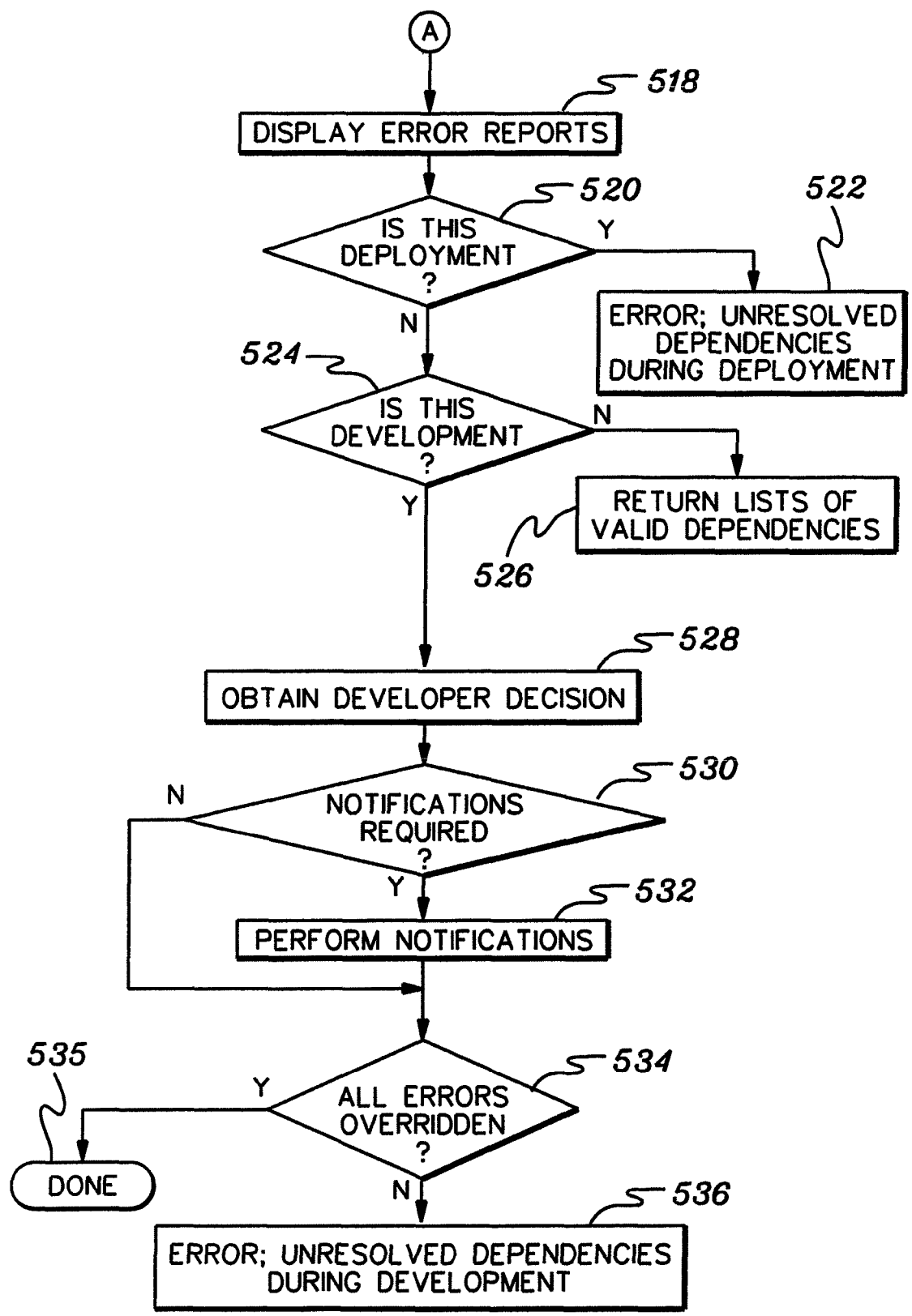

Referring to FIG. 5a, initially, a SE, for which dependency verification is to be performed, is input to the process, and extracted therefrom is its composition, STEP 500. Next, an entry of the SE composition is selected, and dependencies for that entry are verified, as described with reference to FIGS. 6a-6c, STEP 502. Then, a determination is made as to whether there are more entries in the composition to be processed, INQUIRY 504. If more entries are present, then the next entry is processed, STEP 502. Otherwise, after the composition entries are processed, relationships are extracted from the input SE, STEP 506.

An entry of the relationships is selected, and dependencies of that entry are verified, as described below with reference to FIGS. 6a-6c, STEP 508. Thereafter, a determination is made as to whether there are more entries in the relationships to be processed, INQUIRY 510. If more entries are present, then the next entry is processed, STEP 508. Otherwise, processing of the relationships is complete.

Subsequently, dependency reports are generated, STEP 512. These reports include, for instance:
  Valid dependencies on components;
  Valid dependencies on SEs;
  Invalid dependencies on components;
  Invalid unidirectional dependencies on SEs; and
  Invalid bi-directional dependencies on SEs.

Next, a check of invalid dependencies is made. If no invalid dependencies are present, INQUIRY 514, processing completes, STEP 516. Otherwise, the generated error report(s) are displayed on the error report display, STEP 518 (FIG. 5b).

Thereafter, a determination is made as to whether this is a part of deployment processing, INQUIRY 520. If this is a part of deployment dependency verification, then processing terminates with an error indicating unresolved dependencies during deployment, STEP 522. Otherwise, if this is not a part of deployment dependency verification, then a further determination is made as to whether this is invoked as a part of a SE development processing, INQUIRY 524. If not, processing terminates with returning a list of valid dependencies, STEP 526. In particular, if dependency verification is not invoked as a part of deployment or development, then it is invoked for SE deletion. Thus, relevant information is included in the list of valid dependencies.

Returning to INQUIRY 524, if this is a part of development dependency verification, then the developer is given an option to override unresolved dependencies, and optionally to indicate whether notification(s) to the owner(s) of SE(s) with unresolved dependencies is to be issued. The developer's decisions are obtained, STEP 528, and if the developer has requested any notifications to be issued, INQUIRY 530, then notifications are issued, STEP 532. Thereafter, or if notifications are not desired, then a determination is made as to whether errors are to be overridden, INQUIRY 534. If the developer has chosen to override the errors, processing completes, STEP 535. Otherwise, processing completes with an error indicating unresolved dependencies during development, STEP 536.

Further details regarding dependency verification are described with reference to FIGS. 6a-6c. In particular, one embodiment of the logic associated with determining the dependency of a single relationship entry of a SE is described with reference to FIGS. 6a-6c. In one example, this logic is implemented within verification/error checking 118.

Figure 6A:
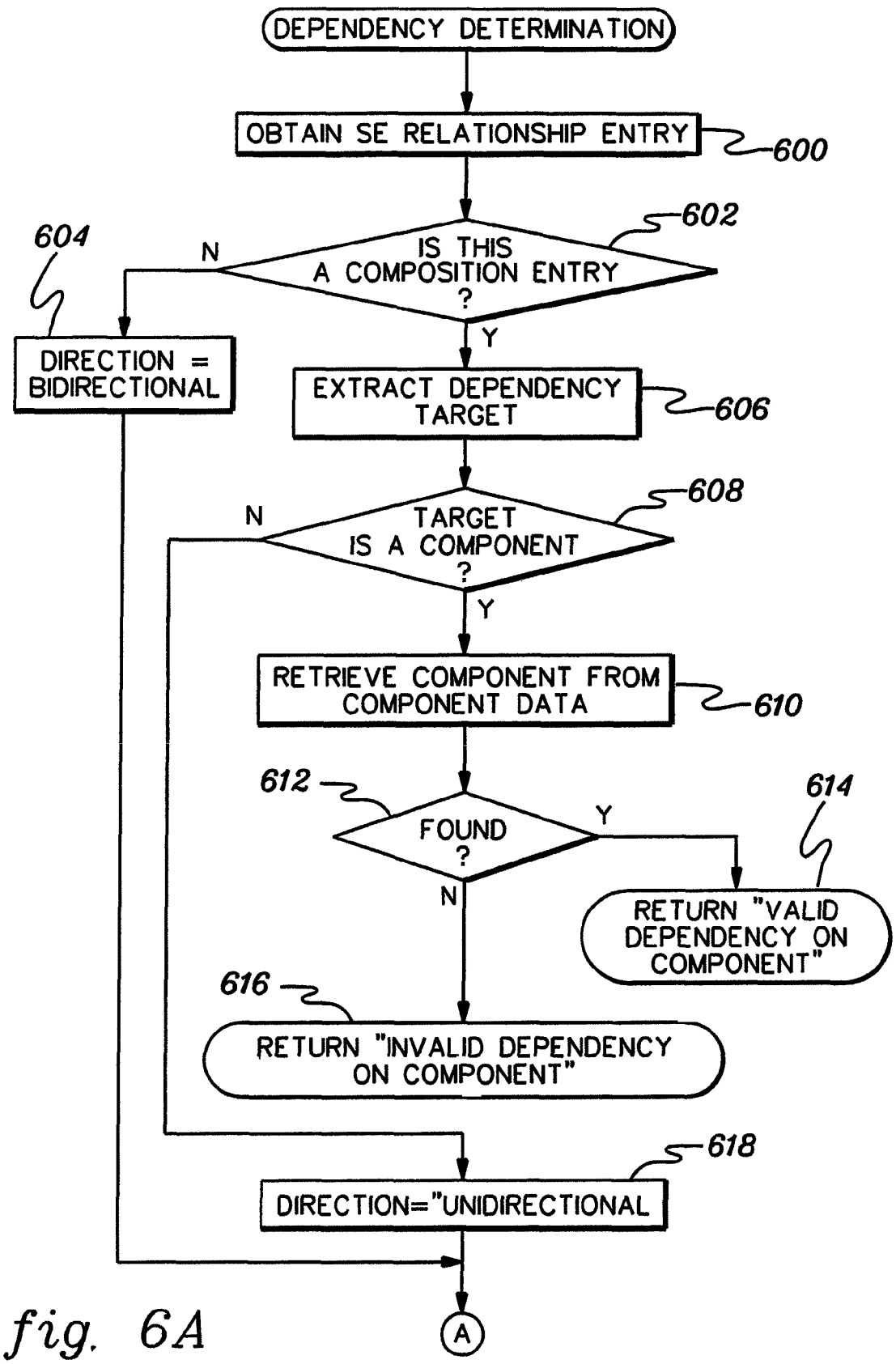
FIGS. 6a-6c depict one embodiment of the logic associated with verifying the dependencies of an entry of a service element, in accordance with an aspect of the present invention.
Figure 6B:
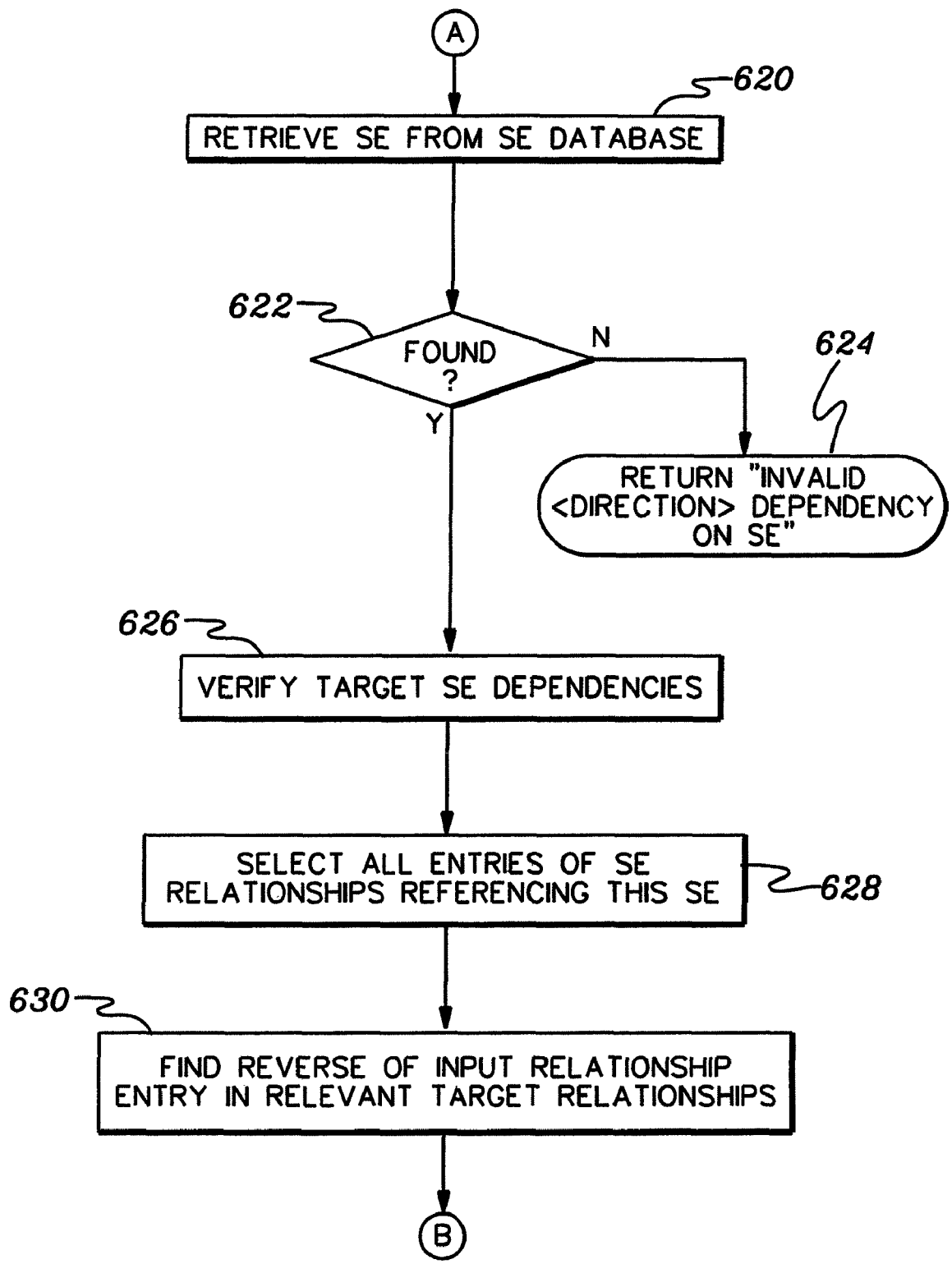
Figure 6C:
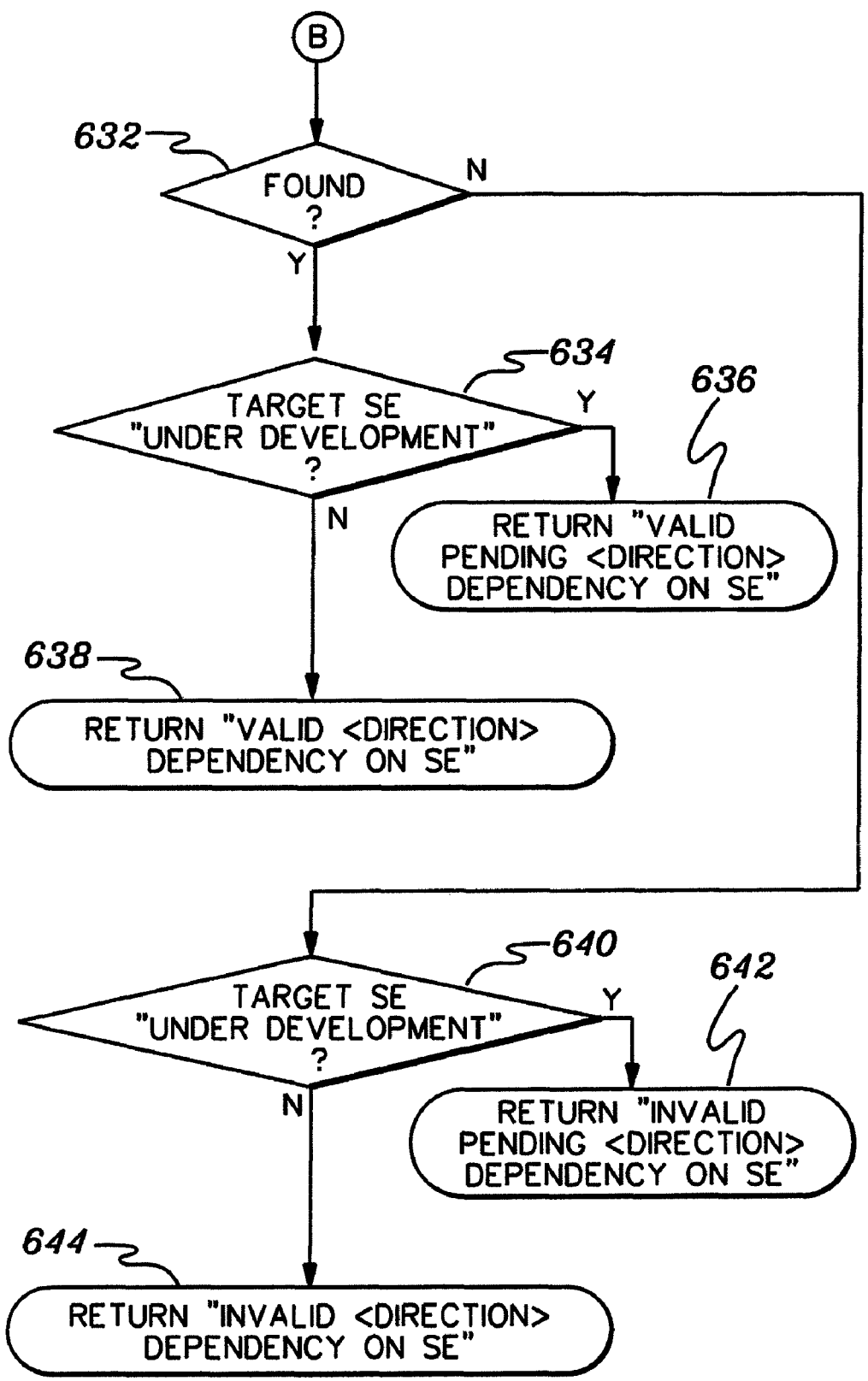

Referring to FIG. 6a, initially, a relationship entry is obtained from the dependency section of the service element, STEP 600. Then, a determination is made as to whether the obtained entry is a composition entry, INQUIRY 602. If this is not a composition entry (i.e., an explicit relationship), then <direction> string is set to "bi-directional" for later use, STEP 604. However, if this is a composition entry, then the dependency target is extracted from the composition entry, STEP 606.

Next, a determination is made as to whether the extracted target is a component, INQUIRY 608. If the dependency target is a component, then an attempt is made to retrieve the target component from the component data feed, STEP 610. If the component is found in the component data feed, INQUIRY 612, processing terminates and returns "valid dependency on component", STEP 614. Otherwise, processing terminates, and returns "invalid dependency on component", STEP 616.

Returning to INQUIRY 608, if the relationship target is not a component (i.e., it is a SE), <direction> string is set to "unidirectional", STEP 618. After setting the direction to unidirectional, STEP 618, or bi-directional, STEP 604, the relationship target is now understood to be a SE, and an attempt is made to retrieve the target SE from the SE database, STEP 620 (FIG. 6b). If the attempt to retrieve the target SE is unsuccessful, INQUIRY 622, processing terminates and returns "invalid <direction> dependency on SE", STEP 624. Otherwise, target SE relationships are verified (i.e., retrieved), STEP 626. This is a recursive process, which invokes the logic of FIGS. 5a-5b and FIGS. 6a-6c. That logic produces a list of relationships, and processing continues with extracting relevant entries of target SE relationships from the list of target SE relationships, STEP 628. Relevancy is determined by detecting references to "this SE" (i.e., the SE for which dependency verification is now being performed). Then, an attempt is performed to find the reverse of the input relationship entry in the list of relevant relationships of the target SE, STEP 630. The determination of "the reverse" of the input relationship is dependent on specific semantic context of the relationship definitions, as is known in the art. For example, if SE A includes SE B, the reverse relationship would be for SE B to indicate usage by SE A; similarly, if SE A integrates with SE B, the reverse would be for SE B to integrate with SE A.

If the attempt to find the reverse of the input relationship entry in the list of relevant relationships of the target SE is successful, INQUIRY 632 (FIG. 6c), a determination is made as to whether the target SE status is "under development", INQUIRY 634. If the target SE is under development (i.e., its content may change unpredictably), processing terminates and returns "valid pending <direction> dependency on SE", STEP 636. Otherwise, processing terminates and returns "valid <direction> dependency on SE", STEP 638.

Returning to INQUIRY 632, if the attempt to find the reverse of the input relationship entry in the list of relevant relationships of the target SE is unsuccessful, then a determination is still made as to whether the target SE is under development, INQUIRY 640. If the target SE is under development, processing terminates and returns "invalid pending <direction> dependency on SE", STEP 642. Otherwise, processing terminates and returns "invalid <direction> dependency on SE", STEP 644.

Verification of Ability of SE to Integrate

Another relationship between SEs is the ability of SEs to integrate. There are various types of integrations, as depicted in the table below:

| Type | Description |
| --- | --- |
| Compatible | Capable of integration without any special efforts |
| Standard | Capable of integration by parametrizing |
| Manual | Capable of integration by programming or adding additional integration components |
| Prohibited | Incapable of integration |

Further, it will be understood by one skilled in the art that the variety of different gradations of ability to integrate may be different or broader in some implementations.

One embodiment of the logic associated with determining whether two SEs integrate and returning the type of integration relationship between these SEs is described with reference to FIGS. 7a-7b. In one example, the logic of FIGS. 7a-7b is implemented within SE manager.

Figure 7A:
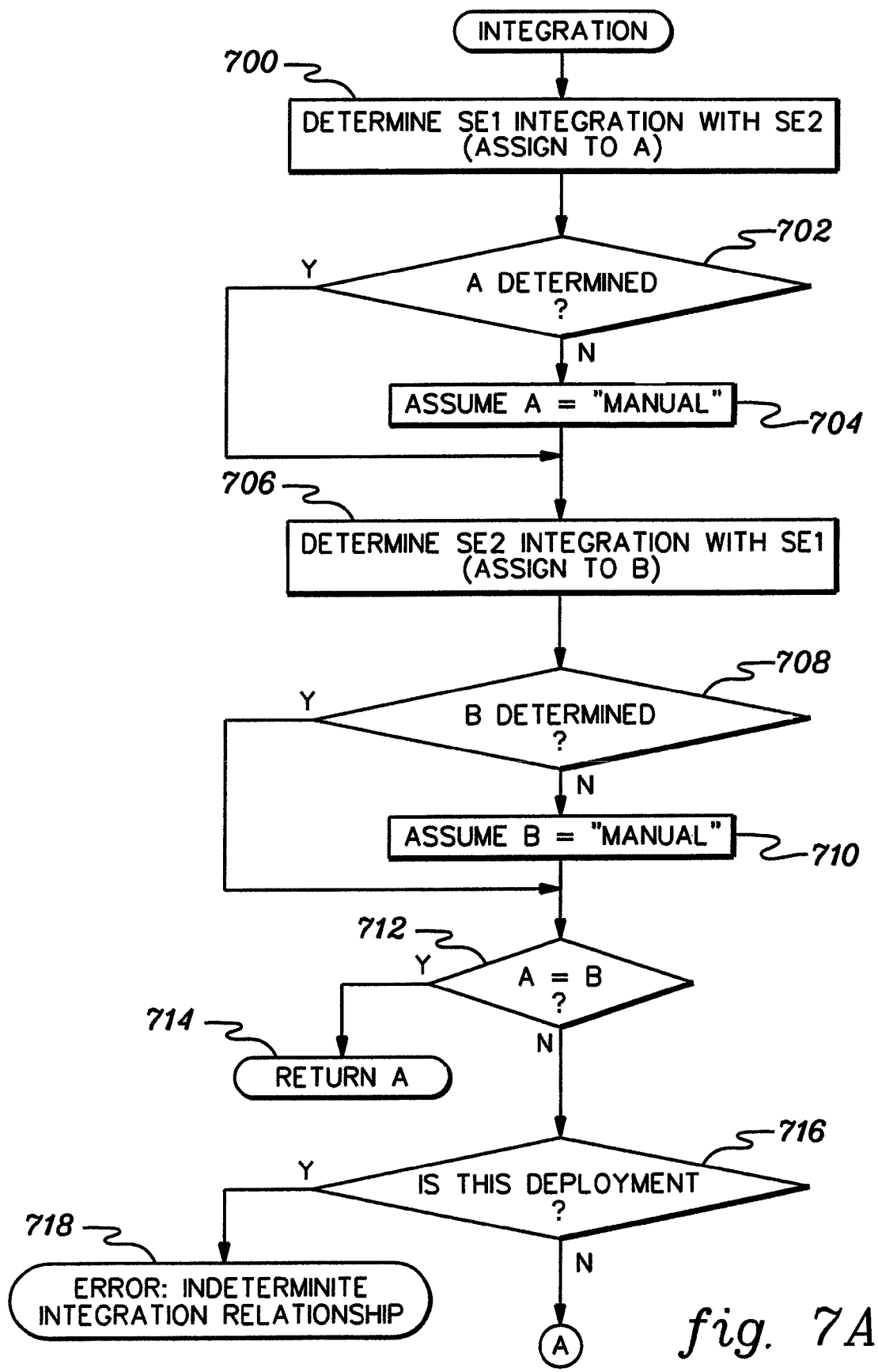
FIGS. 7a-7b depict one embodiment of the logic associated with determining integration between multiple service elements, in accordance with an aspect of the present invention.
Figure 7B:
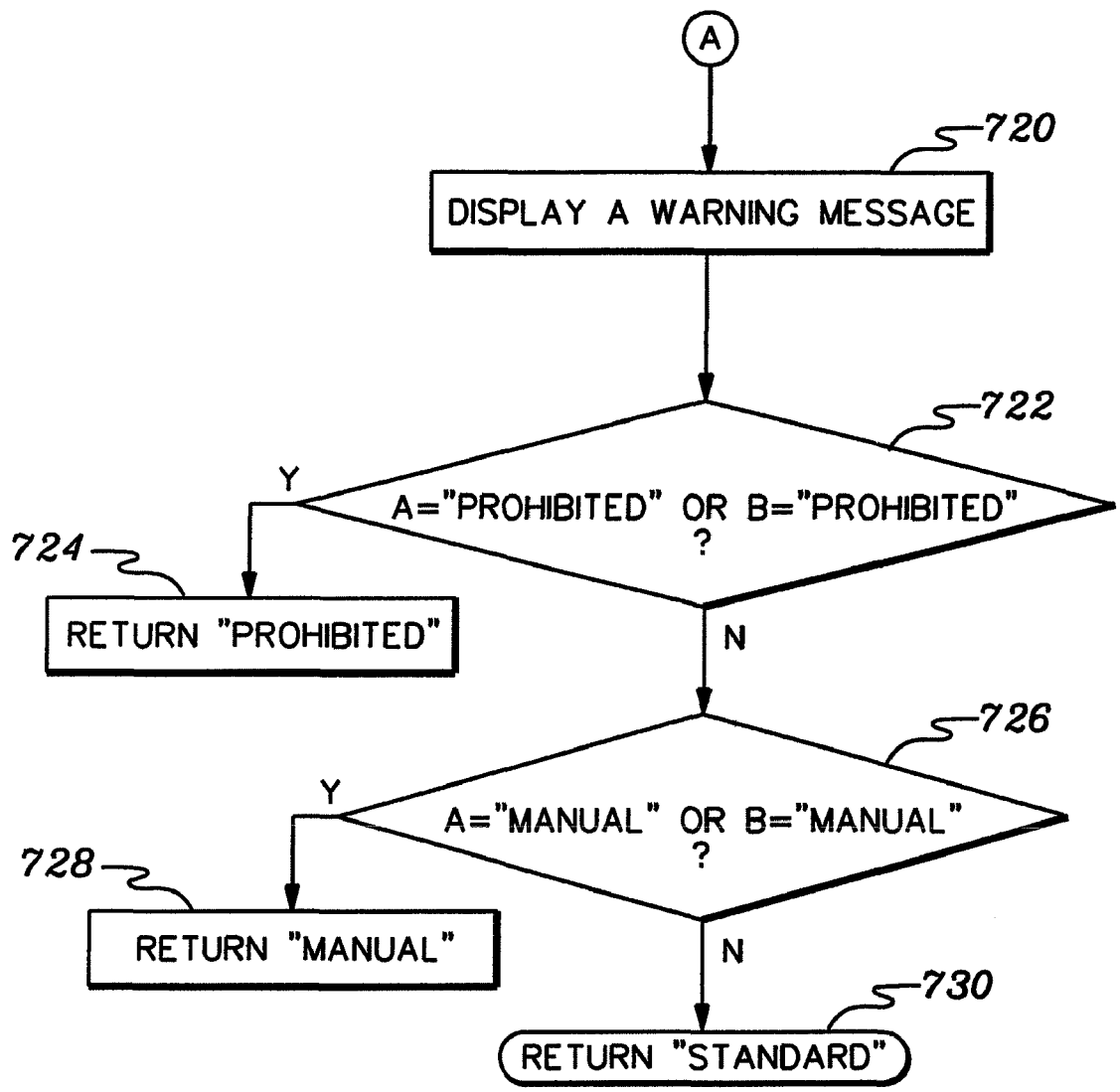

Referring to FIG. 7a, initially, The process considers SE1 and determines whether SE1 integrates with SE2 (assigned to variable A), STEP 700. If SE1 does not explicitly mention SE2 in its lists of SEs it integrates with, INQUIRY 702, A is assigned the default value of "manual", STEP 704. Thereafter, or if SE1 does explicitly mention SE2, the process considers SE2. For example, a determination is made as to whether SE2 integrates with SE1 (assigned to variable B), STEP 706. If SE2 does not explicitly mention SE1 in its lists of SEs it integrates with, INQUIRY 708, then B is assigned the default value of "manual", STEP 710.

Thereafter, or if SE2 does explicitly mention SE1, a check is made of A and B, INQUIRY 712. If A and B are identical (i.e., information contained in SE1 and SE2 is consistent), then the process completes, returning the value of A, STEP 714. However, if A and B are different, an inconsistency between their values may be indicative of an error or incomplete development. Thus, a determination is made as to whether this is a part of deployment, INQUIRY 716. If this processing is performed as a part of deployment activities, then the inconsistency is assumed to be a development defect and process terminates with an error, STEP 718. Otherwise, this is part of development processing, and a warning message is issued, STEP 720 (FIG. 7b).

Subsequently, a determination is made of the value to be returned. For instance, if either A or B is "prohibited", INQUIRY 722, processing completes and returns a value of "prohibited", STEP 724. Otherwise, if either A or B is "manual", INQUIRY 726, processing completes and returns a value of "manual", STEP 728. If neither A or B is prohibited nor manual, the process returns a value of "standard", STEP 730.

Deleting a SE

In addition to creating and developing a service element, including verifying its dependencies and integration, a service element may be deleted. One embodiment of the logic associated with deleting a service element, in accordance with an aspect of the present invention, is described with reference to FIGS. 8a-8c. In one example, the logic of FIGS. 8a-8c is implemented within SE manager.

Figure 8A:
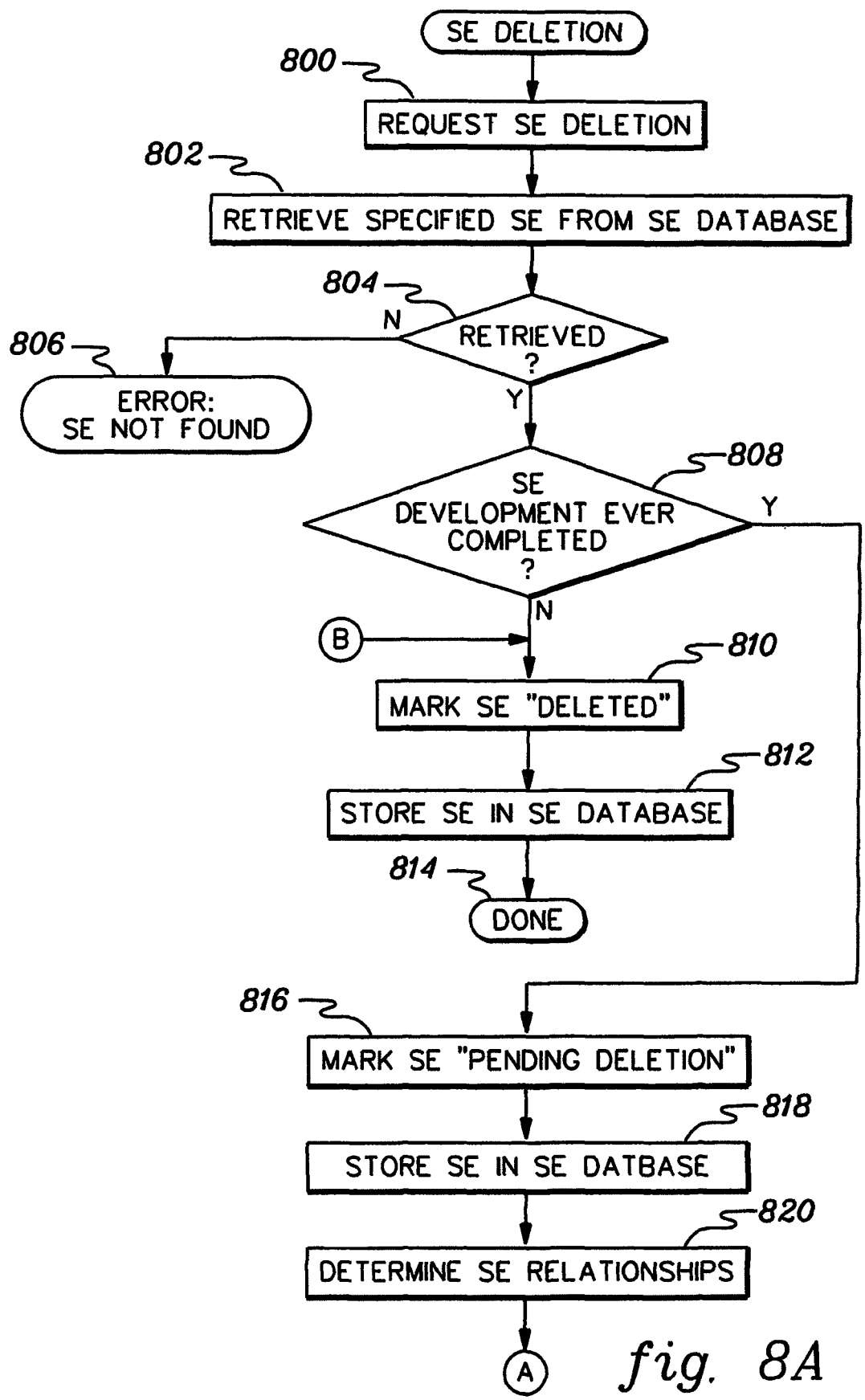
FIGS. 8a-8c depict one embodiment of the logic associated with deleting a service element, in accordance with an aspect of the present invention.
Figure 8B:
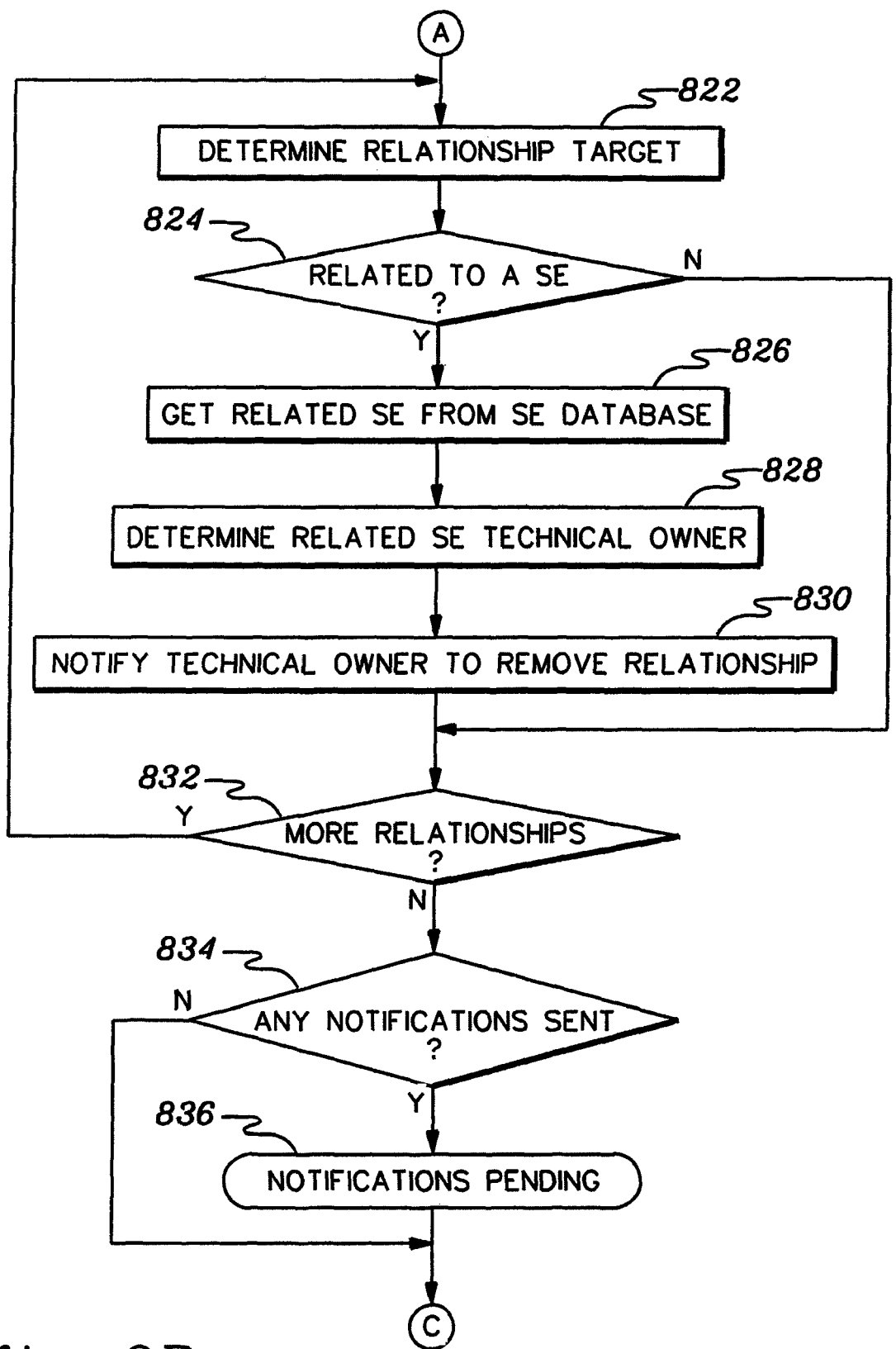
Figure 8C:
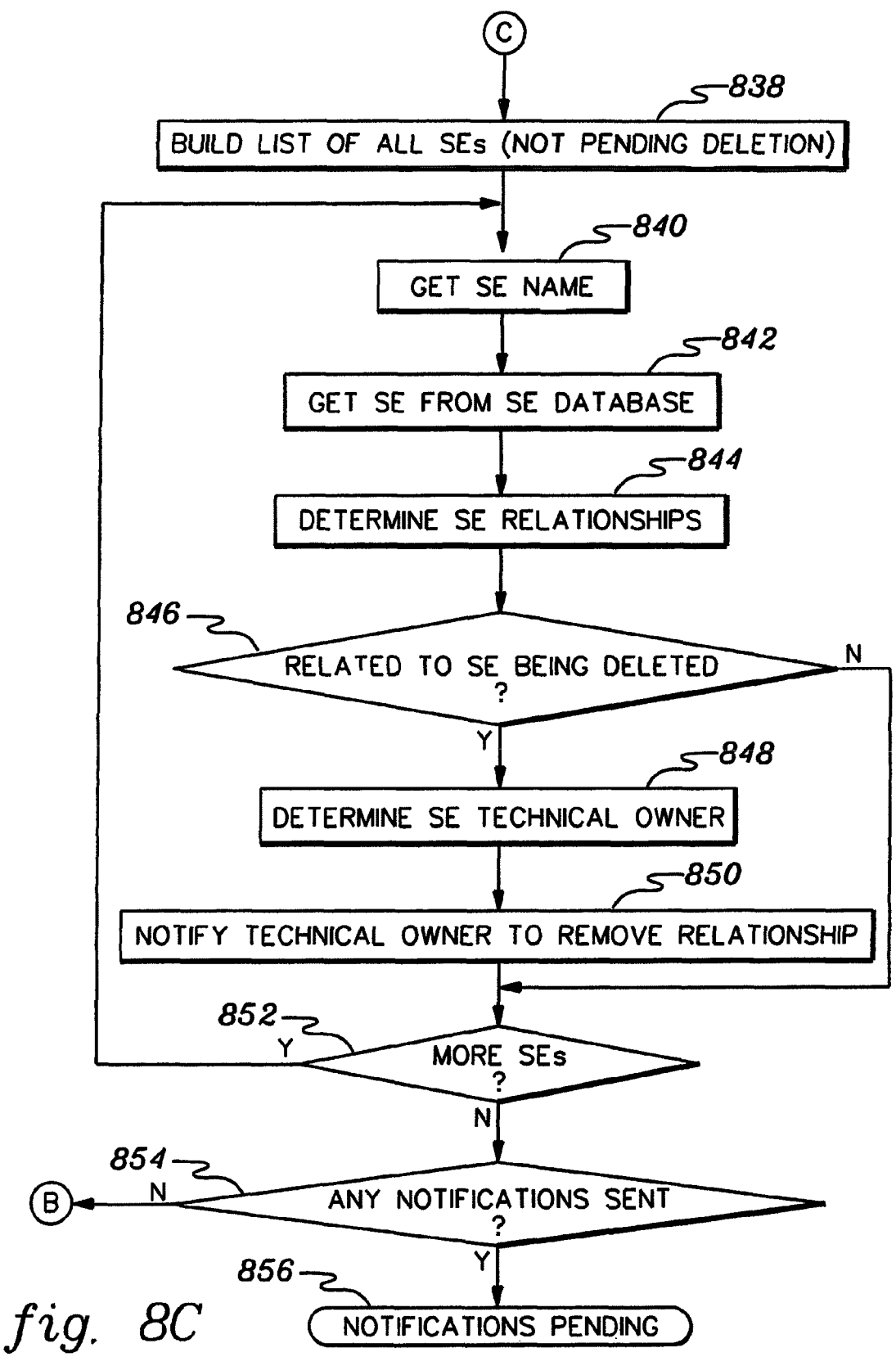

Referring to FIG. 8a, initially, a request for deletion of a SE is provided by employing, for instance, a user interface of the SE system, STEP 800. When the SE name for deletion is received, an attempt is made to retrieve the specified SE from the SE database, STEP 802. If the SE was not retrieved successfully, INQUIRY 804, processing terminates with an error, STEP 806. Otherwise, a check is performed to determine if the target SE has ever completed development (i.e., this is not the first version and "under development" indicator is not set), INQUIRY 808. If development for this SE was never completed (i.e., no other SE may have an actual dependency on the target SE), the SE is marked "deleted", STEP 810, stored in the SE database, STEP 812, and processing completes (SE has been deleted), STEP 814.

However, returning to INQUIRY 808, if target SE development was completed at least once, the target SE is marked "pending deletion", STEP 816, and the SE is stored in the SE database, STEP 818. This prevents any new relationships to this SE, including dependencies on it, from being created.

Thereafter, a list of one or more relationships of the SE is determined, as described above with reference to FIGS. 6a-6c, STEP 820. Then, a target relationship is selected from the list of relationships, STEP 822 (FIG. 8b). If the target is a SE (rather than a component), INQUIRY 824, then the related SE is retrieved from the SE database, STEP 826. Additionally, its technical owner is determined, STEP 828, and a notification is sent to the technical owner to eliminate the relationship with the target SE, STEP 830. Subsequently, or if the target is not related to a SE, a determination is made as to whether there are more relationships to be processed, INQUIRY 832. If there are more relationships in the list, the next one is processed.

After processing the relationships, a determination is made as to whether any notifications were sent, INQUIRY 834. If any notifications were sent as a result of the above processing, processing terminates indicating that notifications are pending, STEP 836. Processing then is to be restarted at some later time to verify that the notified SE technical owner(s) have made the appropriate changes and eliminated relationships of their SE(s) to the target SE pending deletion.

However, if no notifications were sent as a result of the above processing, the next verification of deletion safety for the target SE is performed. For example, a list of the SEs in the SE database, not pending deletion, is built, STEP 838 (FIG. 8c). Then, a SE name is retrieved from the built list, STEP 840, and the named SE is retrieved from the SE database, STEP 842. Relationships of this SE are then determined, STEP 844, and each relationship target for this SE is examined. If any of the targets is equal to the target SE pending deletion, INQUIRY 846, then the current SE technical owner is determined, STEP 848, and notified to eliminate any relationships with the target SE pending deletion, STEP 850.

Thereafter, or if the target is not related to a SE, a determination is made as to whether there are more SEs to be processed, INQUIRY 852. If there are more SEs, the next SE in the list is processed, STEP 840, until the list of SEs is exhausted.

Subsequently, a determination is made as to whether any notifications were sent, INQUIRY 854. If any notifications were sent as a result of the above processing, processing terminates indicating that notifications are pending, STEP 856. Processing then is to be restarted at some later time to verify that the notified SE technical owner(s) have made the appropriate changes and eliminated relationships of their SE(s) to the target SE pending deletion.

However, if no notifications were sent as a result of the above processing, INQUIRY 854, there are no SEs related to the target SE, and processing continues at STEP 810 (FIG. 8*a*), where the target SE is actually deleted.

In the embodiment for detecting a SE described herein, an open-ended workflow is provided. That is, there is enforcement of change of the SE(s) dependent on the SE pending deletion, and no notification is issued to the developer performing the deletion to indicate that all dependencies on the SE being deleted have been eliminated. However, in other embodiments, other types of workflow may be used, without departing from the spirit of the present invention.

One example in which the deletion processing is employed is as follows:

Developer A wants to delete SE 1. SE 1 is to be phased out in favor of SE 1*a* or SE 1*b*. Developer B is responsible for maintenance of SE 2, dependent on SE 1.

Developer A attempts to delete SE 1. This results in determination of dependency of SE 2 on SE 1, and a notification to Developer B, indicating that SE 1 deletion is pending (replacement being SE 1*a* or SE 1*b*). Developer B can determine which of the replacement SEs (1*a* or 1*b*) better suits the needs of SE 2 and alter SE 2 accordingly. When SE 2 alterations are completed, Developer A, upon performing another attempt to delete SE 1, will no longer be deterred by the dependency of SE 1 on SE 2.

Creating New SE Versions

One embodiment of the logic associated with creating a new version of a previously developed SE is described with reference to FIG. 9. In one example, this logic is implemented within SE manager.

Figure 9:
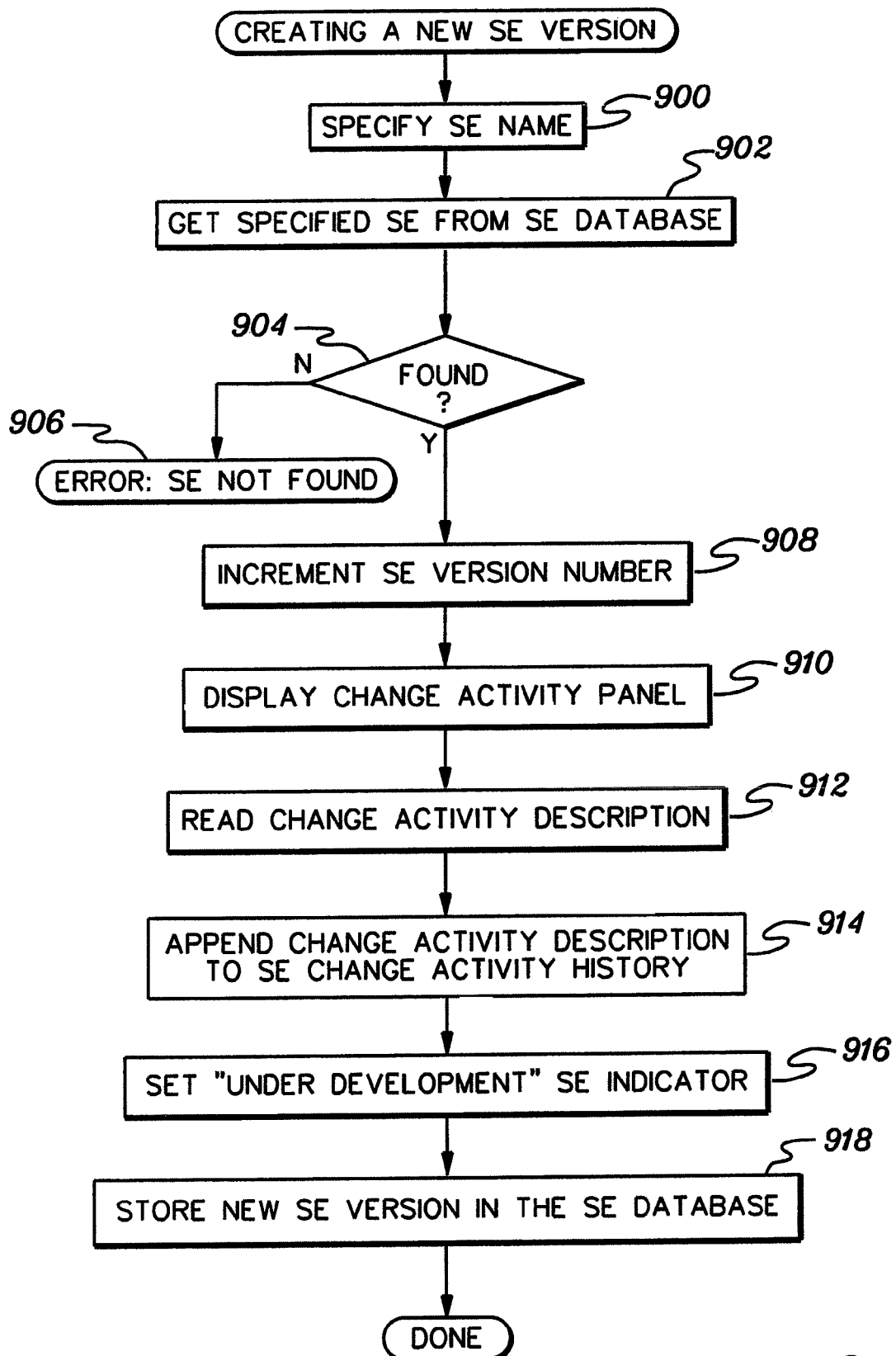
FIG. 9 depicts one embodiment of the logic associated with creating a new version of a service element, in accordance with an aspect of the present invention.

Referring to FIG. 9, initially, a developer indicates creation of a new SE version by selecting "create new version" on a user interface of the SE system, and specifying a SE name, STEP 900. An attempt is made to retrieve the specified SE from the SE database into a working version of the SE, STEP 902. If the SE is not retrieved successfully, INQUIRY 904, processing terminates indicating an error, STEP 906. However, if the SE is successfully retrieved, then the SE version number is incremented, STEP 908, and a change activity panel is displayed, STEP 910. The developer specifies a change activity description, which is read in, STEP 912, and appended to a SE change activity history stored in, for instance, the service element, STEP 914. The modified SE is marked "under development", STEP 916, and the new version of the SE is stored in the SE database, STEP 918.

After creating the new version, the developer may use SE editing functions to perform desired modifications of the new version of the SE.

Further, it is expected that as a part of the SE lifecycle processing, the user will indicate a migration path from the previous version of the SE to the new one.

SE Cross-Reference

Figure 10:
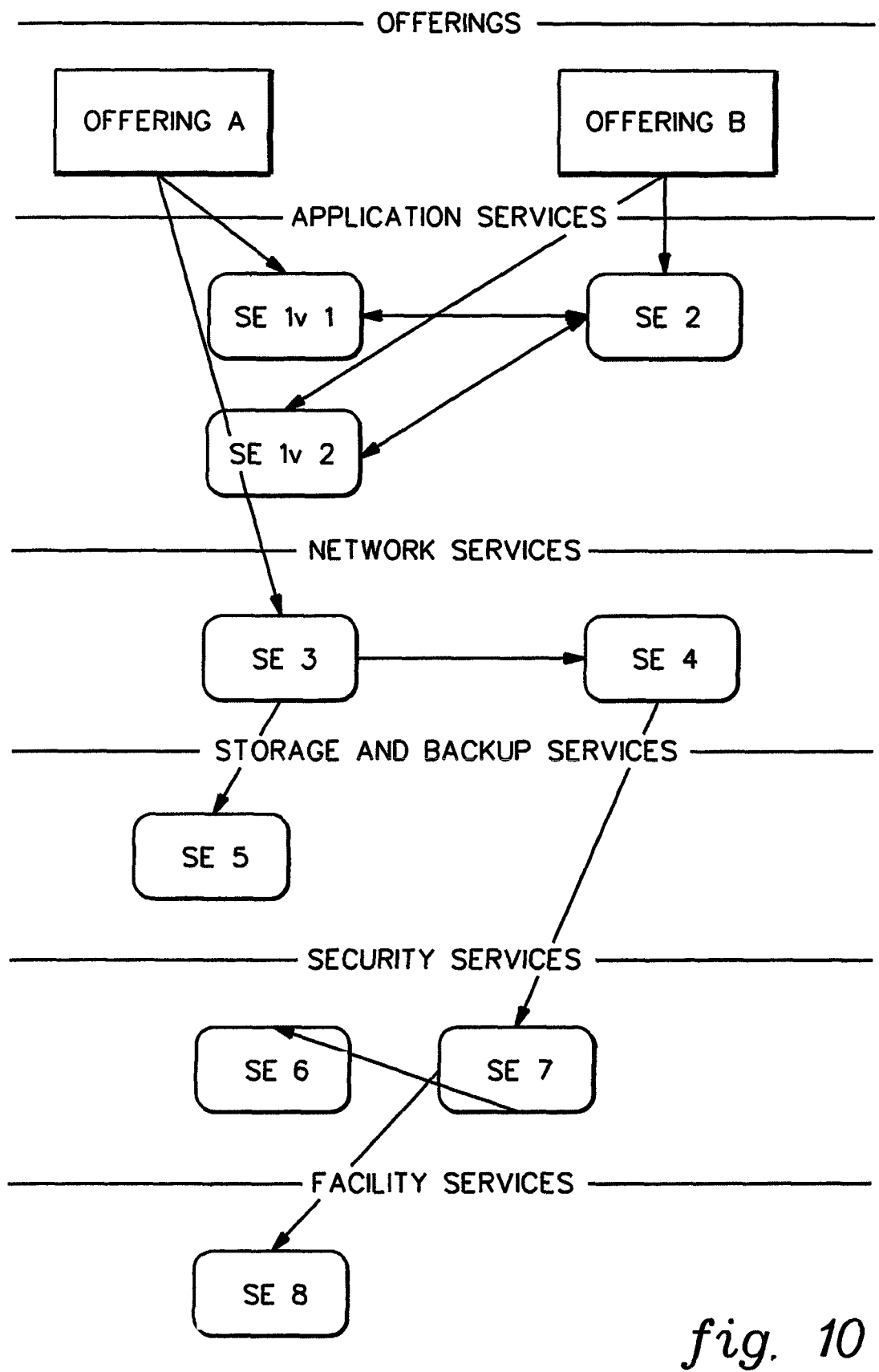
FIG. 10 depicts one example of a cross-reference between multiple service elements, in accordance with an aspect of the present invention.

As described herein, there may be various relationships among the SEs, including the different versions of SEs. Further, an environment may include different offerings. In order to observe the relationships among SEs and how they relate to different offerings, a SE cross-reference report function is employed. One example of a sample cross-reference includes (see FIG. 10):

Two offerings, Offering A and Offering B;
Two application services SEs, SE 1 version 1, SE 1 version 2, and SE2;
Two network services SEs, SE 3 and SE 4;
One storage and backup services SE, SE 5;
Two security services SEs, SE 6 and SE 7;
One facility services SE, SE 8.

The cross-reference illustrates two types of relationships between SEs: single-headed arrows represent unidirectional relationships; and double-headed arrows represent bi-directional relationships. So, Offering A includes SE 1 version 1 and SE 3; SE 3 in turn includes SE 4 and SE 5; SE 4 in turn includes SE 7; SE 7 includes SE 6 and SE 8. Similarly, both versions 1 and 2 of SE 1 are mutually dependent with SE 2.

Similarly, Offering B includes SE1 version 2 and SE2; and SE2 has a bi-directional relationship with both SE1 Version 1 and SE1 Version 2.

One embodiment of the logic associated with generating a cross-reference is described with reference to FIG. 11. In one example, the logic of FIG. 11 is implemented within the SE manager.

Figure 11:
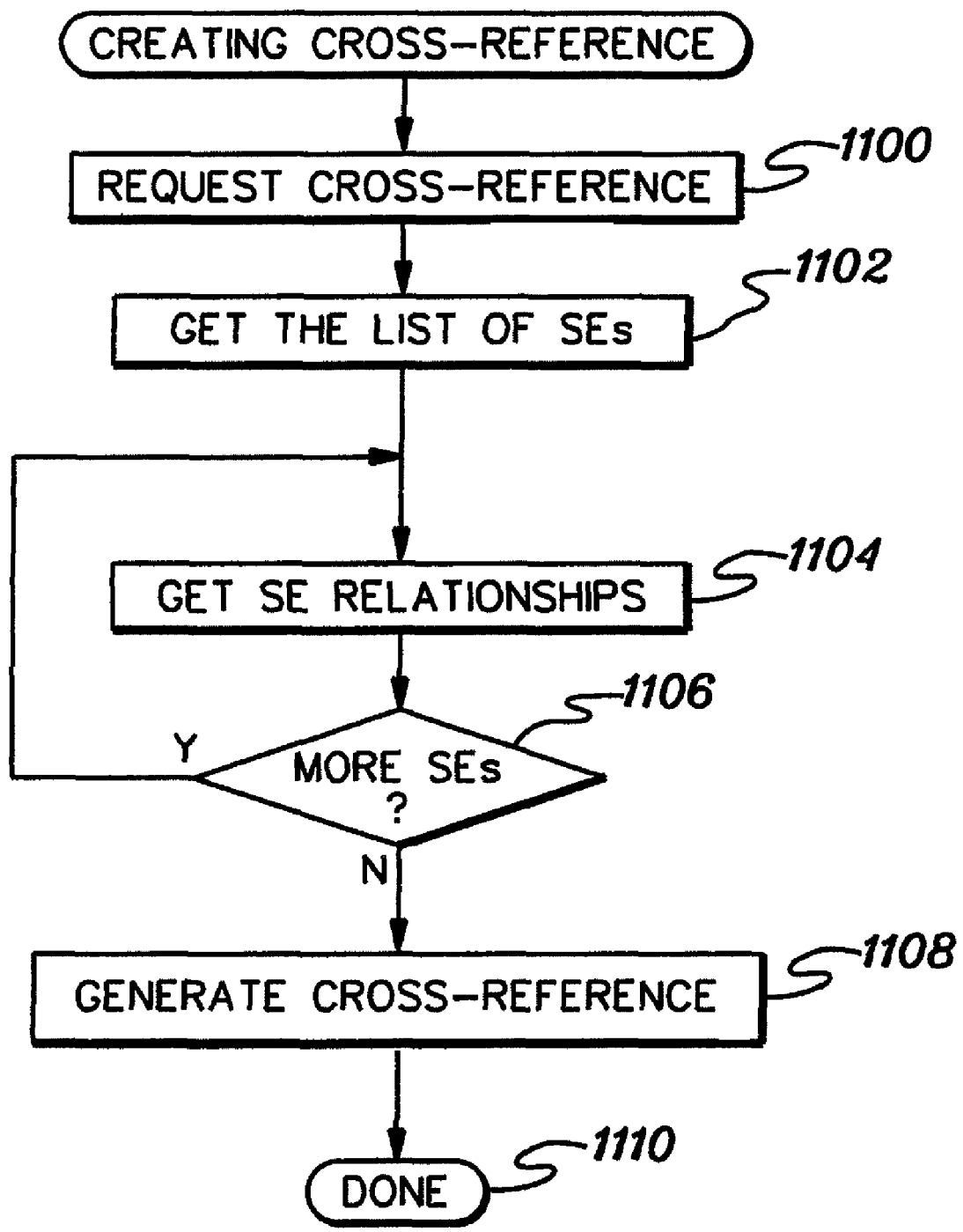
FIG. 11 depicts one embodiment of the logic associated with creating a cross-reference, in accordance with an aspect of the present invention.

Referring to FIG. 11, initially, a user requests generation of a SE cross-reference using a user interface of the SE system, STEP 1100. A list of SEs is then obtained from the SE database, STEP 1102, and a SE in the list is selected. The SE relationships for the selected SE are determined, as described above, and appended to a SE relationships collector (e.g., a list in memory), STEP 1104.

Thereafter, a determination is made as to whether there are more SEs to be processed, INQUIRY 1106. If there are more SEs to be processed, the next SE is processed, STEP 1104. When all the SEs are processed, a cross-reference report is generated, STEP 1108, and processing is complete, STEP 1110.

Although generation of a full cross-reference is shown (i.e., the information included is based on all available SEs), one skilled in the art will appreciate that diverse partial cross-references (based on one or more possible sets of criteria) may be generated.

Another type of cross-reference that may be of interest is a SE component usage report showing which SE uses which component(s). The principle of generating this report is no different from what is described, with the exception that the component data feed is the source of information about components. In addition, depending on the report usage, it may be advantageous to show two different views: SE use of components and component use by SE.

SE Reports

A variety of reports may be generated from information stored in the SE and offering databases. Reports can be produced based on SE categories, SE status, SE change history, or any other fields within the SE.

Finding a SE

A SE search function is normally a simple database search by SE name. If multiple versions of a SE exist, and if version has not been specified as the search argument, the search returns all versions. The search may also be performed for SEs under development (or, on the contrary, they may be deliberately excluded by the search arguments). With the exception of an explicit override of search arguments, the search does not return deleted SEs. In other embodiments, the default search may return only the latest production (not "under development") version.

Modifying SE Content

Described above are processes for creating, developing, deleting and creating new versions of service elements. In a further aspect of the present invention, the content of a service element may be modified. In one embodiment, the modification logic can be implemented in one or more units of the SDT, including the SE manager, design builder, and/or cost case builder.

In the following sections relating to modifying the SE content, (e.g., modifying SE composition, establishing or dissolving relationships, updating SE design and SE cost case, and updating SE development and deployment plans), the word "delete" when applied to an item in a SE does not cause a destruction of the item until all references to it are eliminated (similar to Java language references). "Delete" in this context refers to removal of an item from the corresponding data structure. Thus, the issue of a dangling reference (or pointer) is avoided.

Modifying SE Composition

Figure 12:
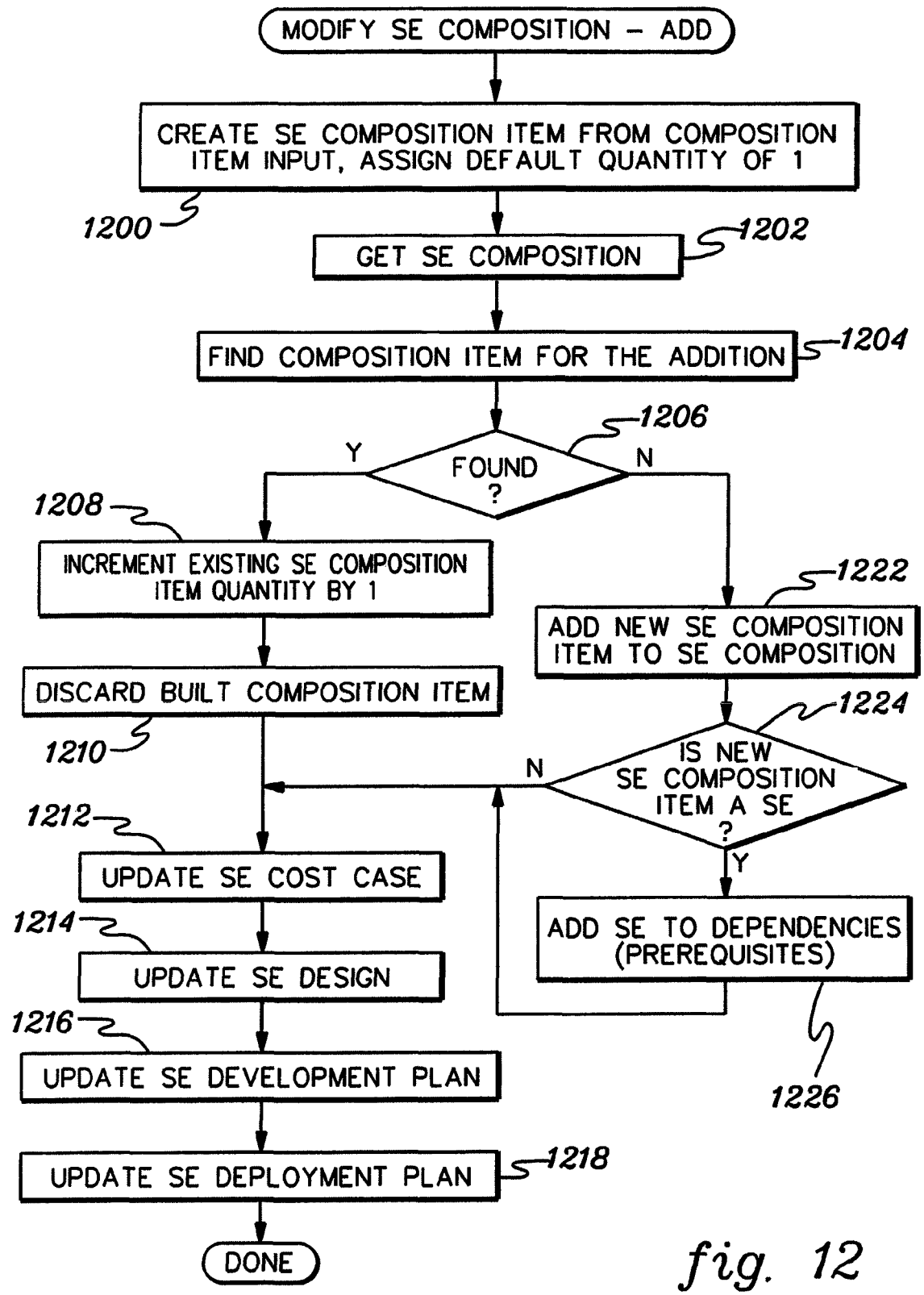
FIG. 12 depicts one embodiment of the logic associated with modifying a service element by adding a composition item to the service element, in accordance with an aspect of the present invention.

In one aspect of the present invention, the composition of a SE can be modified in various ways. One embodiment of the logic associated with modifying the composition of a SE by adding an item to the SE composition is described with reference to FIG. 12. Initially, a SE composition item is created (e.g., allocated) from a composition item input (i.e., a specification of what is to be added), and assigned a default quantity of 1, STEP 1200. Then, the SE composition is obtained from the SE, STEP 1202, and an attempt is made to find the newly created composition item in the SE composition, STEP 1204. If the composition item is found in the SE composition, INQUIRY 1206, then this is not an addition of a new SE composition item, but an increase in quantity of a previously created SE composition item. Thus, the quantity of the located SE composition item is incremented by a predefined amount, such as 1, STEP 1208, and the newly built SE composition item is discarded, STEP 1210. The process then updates the SE cost case, STEP 1212, the SE design, STEP 1214, the SE development plan, STEP 1216, and the SE deployment plan of the SE, STEP 1218, to account for the addition to the SE composition.

Returning to INQUIRY 1206, if the composition item is not found in the SE composition, the newly built SE composition item is added to the SE composition, STEP 1222. Then, a determination is made as to whether the new composition item represents a SE, INQUIRY 1224. If the new composition item represents a SE, then this SE is added to the list of SE dependencies (prerequisite), STEP 1226. Thereafter, or if the new SE composition item is not a SE, processing continues with STEP 1212.

Figure 13:
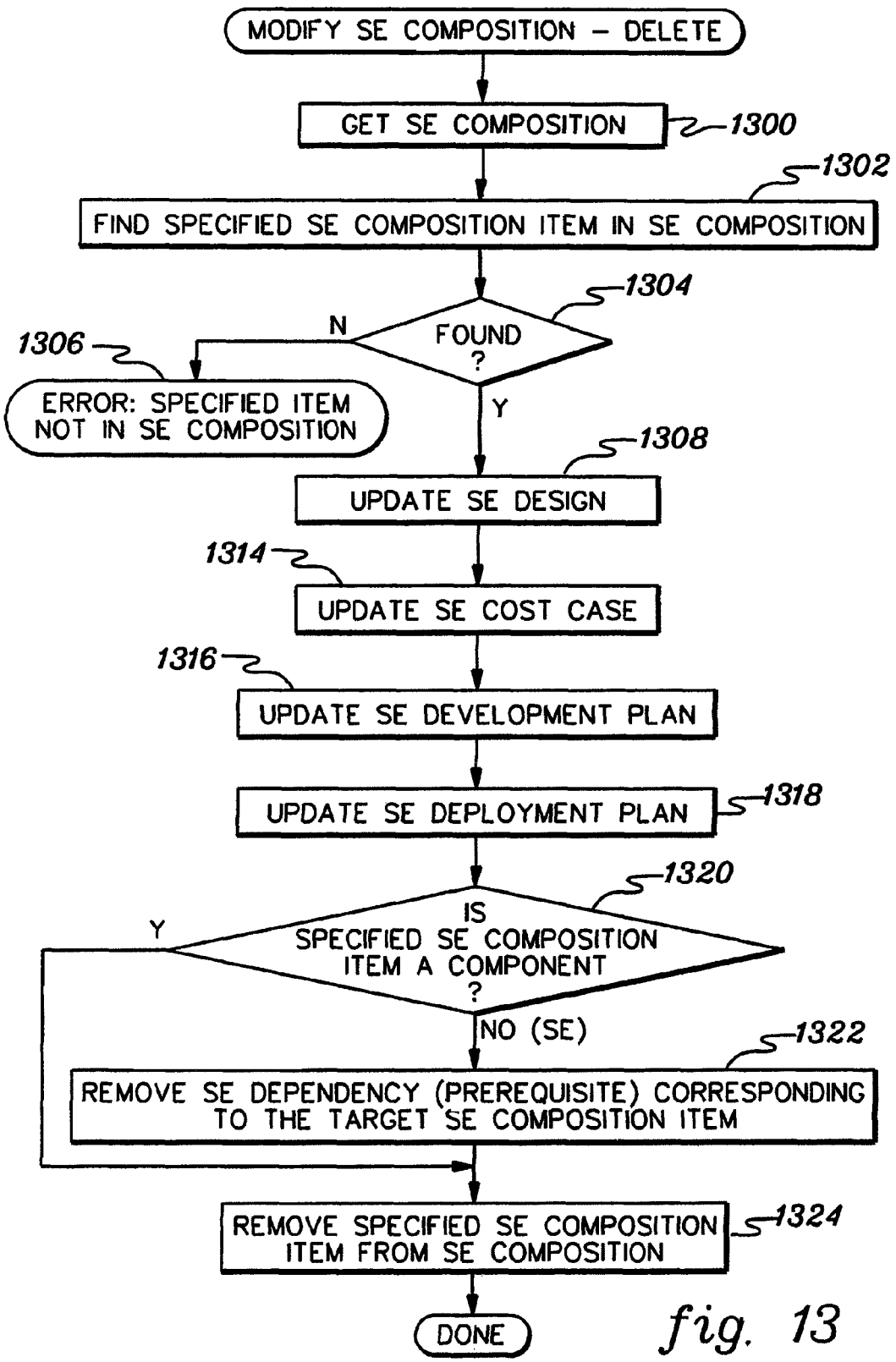
FIG. 13 depicts one embodiment of the logic associated with modifying a service element by deleting a composition item of the service element, in accordance with an aspect of the present invention.

Another modification to the SE composition includes deleting a composition item. One embodiment of the logic associated with deleting a SE composition item is described with reference to FIG. 13. Initially, the SE composition is obtained from the selected SE, STEP 1300. Then, the target SE composition item is attempted to be located in the SE composition, STEP 1302. If the target SE composition item is not found in the SE composition, INQUIRY 1304, processing terminates with an error, STEP 1306. Otherwise, the process attempts to update the SE design (e.g., invokes the design-add item process described herein), STEP 1308. The process of updating the SE design will terminate with an error if the target SE composition item represents a SE involved in a relationship with another SE as a part of the SE design. Therefore, if the SE design update process completes successfully, it is safe to proceed with the rest of the updates. Thus, processing continues with the other updates, including updating the SE cost case, STEP 1314, the SE development plan, STEP 1316, and the SE deployment plan, STEP 1318.

Subsequently, a determination is made as to whether the specified SE composition item is a component, INQUIRY 1320. If the target SE composition item does not represent a component, but represents a SE, then this SE is removed from the SE dependencies list (prerequisite), STEP 1322. Thereafter, or if the SE composition item is a component, then the process completes by removing the target SE composition item from the SE composition, STEP 1324.

Figure 14:
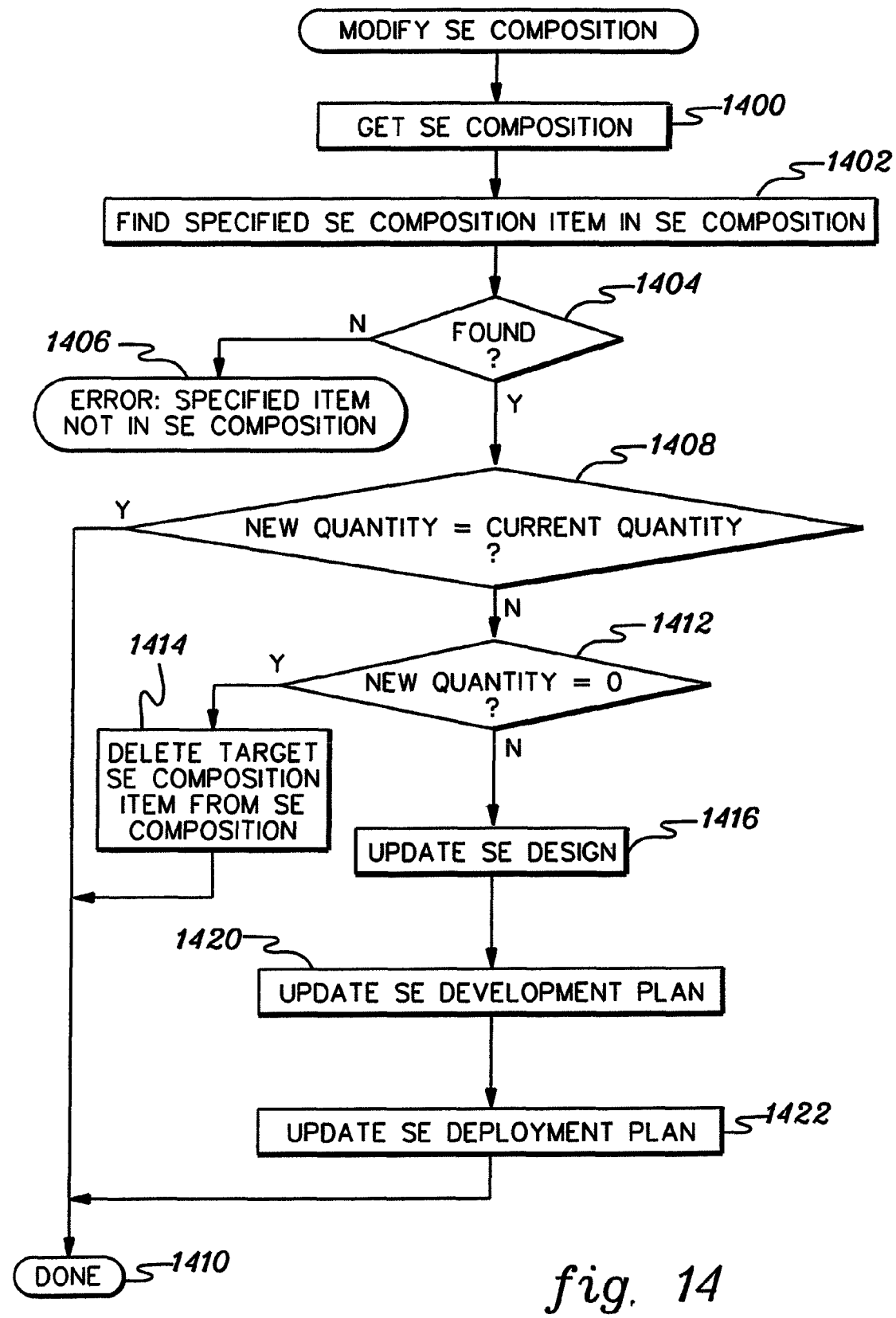
FIG. 14 depicts one embodiment of the logic associated with modifying a service element by updating a quantity of a composition item of the service element, in accordance with an aspect of the present invention.

Another modification to the SE composition includes changing a quantity of the composition. One embodiment of the logic associated with changing a quantity of a SE composition item is described with reference to FIG. 14. Initially, a SE composition is obtained from the SE, STEP 1400, and the target SE composition item is attempted to be located in the SE composition, STEP 1402. If the target SE composition item is not found in the SE composition, INQUIRY 1404, processing terminates with an error, STEP 1406. Otherwise, the new quantity is examined.

If the new quantity is no different from the current quantity, INQUIRY 1408, processing completes, STEP 1410. However, if the new quantity is unequal to the current quantity, then a further determination is made as to whether the new quantity is equal to zero, INQUIRY 1412.

If the new quantity is zero, processing invokes a SE composition item deletion process (described above with reference to FIG. 13), STEP 1414. Otherwise, the process attempts to update the SE design, STEP 1416. The process of updating the SE design will terminate with an error, if the target SE composition item represents a SE involved in a relationship with another SE as a part of the SE design and the new quantity is lower than the current quantity. Therefore, if the SE design update process completes successfully, it is safe to proceed with the remaining updates, including updating the SE development plan, STEP 1420, and the SE deployment plan, STEP 1422.

Establishing or Dissolving Integration Relationship Between Two Service Elements The verification of integration relationships is described above as an aspect of successfully developing a service element. However, further details on establishing and dissolving an integration relationship are described below.

Figure 15:
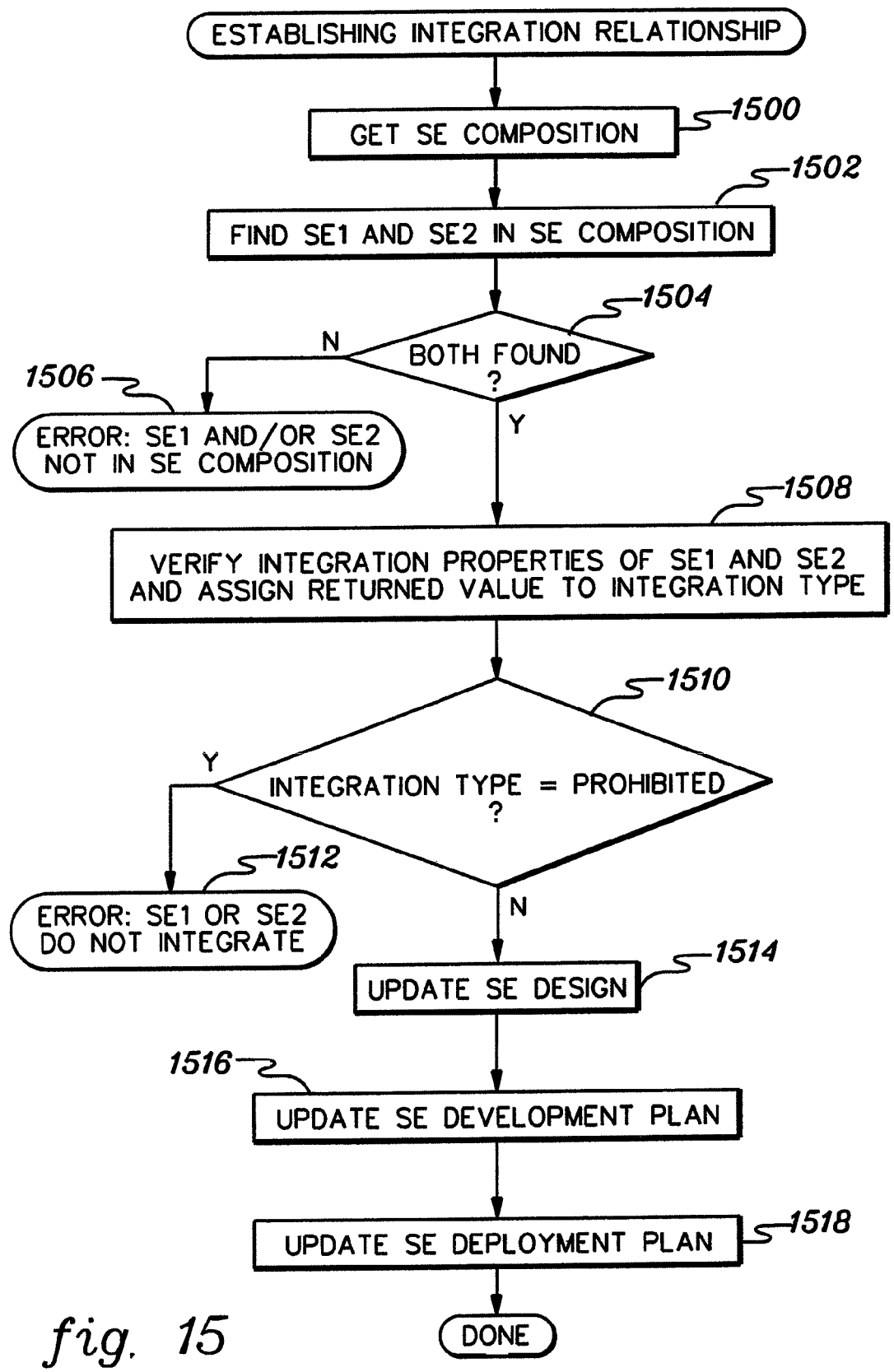
FIG. 15 depicts one embodiment of the logic associated with establishing an integration relationship between multiple service elements, in accordance with an aspect of the present invention.

One embodiment of the logic associated with establishing an integration relationship between two service elements (SE1 and SE2, included in the composition of SE) is described with reference to FIG. 15. Initially, a SE composition is obtained, STEP 1500, and an attempt to locate SE1 and SE2 items in the SE composition is performed, STEP 1502. If either or both of the specified items are not found in the SE composition, INQUIRY 1504, processing terminates with an error, STEP 1506. Otherwise, integration properties of SE1 and SE2 are verified, as described above with reference to FIGS. 7a-7b, STEP 1508.

Subsequently, a determination is made as to whether the integration type is prohibited, INQUIRY 1510. If SE1 and SE2 integration is prohibited, then processing terminates with an error, STEP 1512. Otherwise, the SE design is updated, STEP 1514, followed by updates of the SE development plan, STEP 1516, and the SE deployment plan, STEP 1518.

Figure 16:
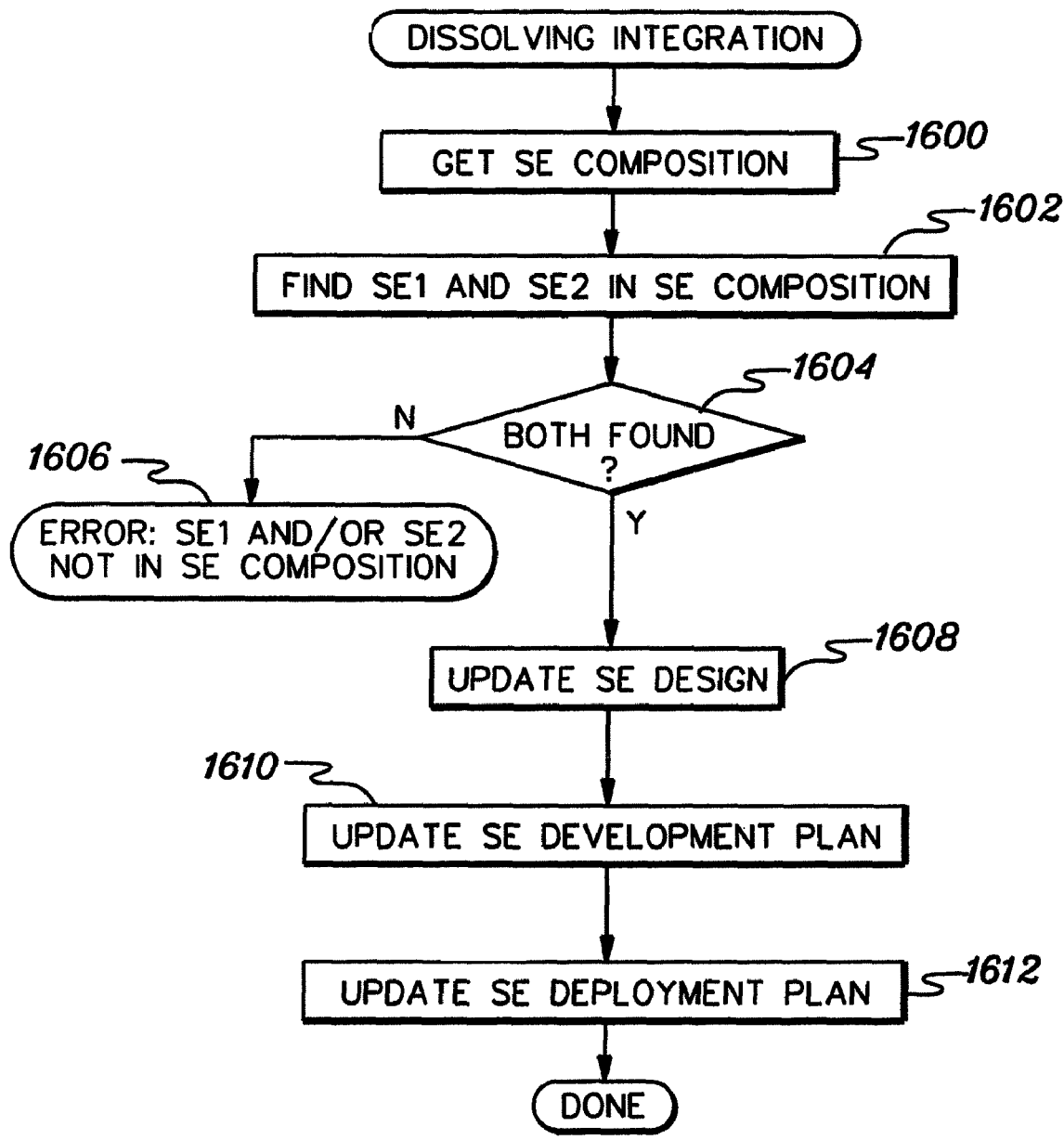
FIG. 16 depicts one embodiment of the logic associated with dissolving integration between multiple service elements, in accordance with an aspect of the present invention.

One embodiment of the logic associated with dissolving an integration relationship between two SEs (SE1 and SE2, included in the composition of SE) is described with reference to FIG. 16. Initially, a SE composition is obtained, STEP 1600, and an attempt to locate SE1 and SE2 items in the SE composition is performed, STEP 1602. If either or both of the specified items are not found in the SE composition, INQUIRY 1604, processing terminates with an error, STEP 1606. Otherwise, the SE design is updated, STEP 1608, followed by updates of the SE development plan, STEP 1610, and the SE deployment plan, STEP 1612.

Updating SE Design

Figure 17:
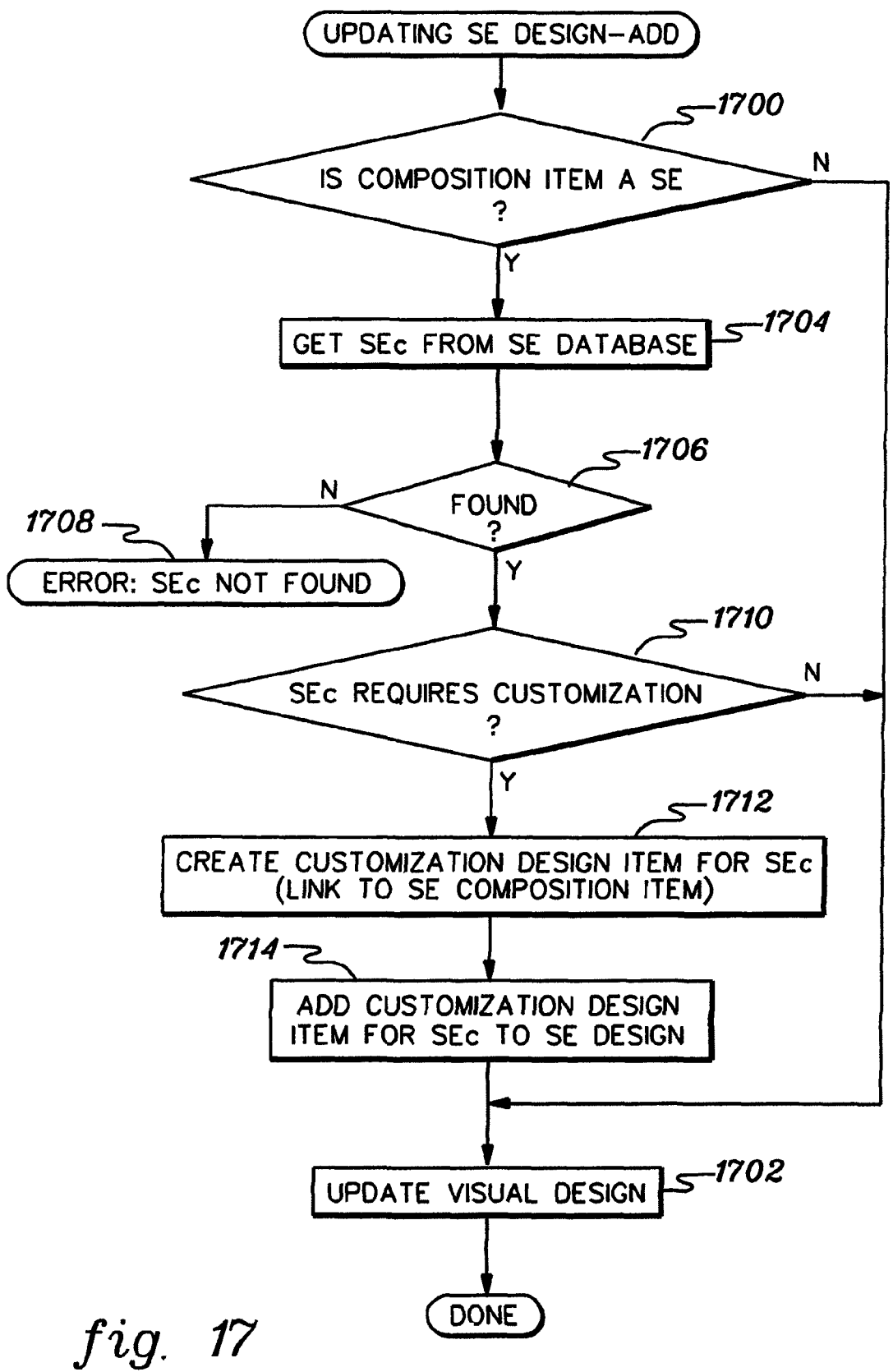
FIG. 17 depicts one embodiment of the logic associated with updating a design of a service element as a result of adding a composition item to the service element, in accordance with an aspect of the present invention.

In accordance with one or more aspects of the present invention, the design of a service element can also be modified in various ways. One embodiment of the logic associated with updating a SE design, as a result of adding a SE composition item, is described with reference to FIG. 17. In one example, this logic is implemented in design builder.

Initially, a determination is made as to whether the composition item is a SE, INQUIRY 1700. If the composition item does not represent a SE (i.e., it represents a component), the visual design is updated, as described below, STEP 1702. Otherwise, an attempt is made to retrieve the SE represented by the composition item (SEc) from the SE database, STEP 1704. If the SEc is not found in the SE database, INQUIRY 1706, then processing terminates with an error, STEP 1708. However, if the SEc is found, then the SEc is examined to determine whether it requires customization, INQUIRY 1710.

If the SEc requires customization, as classified, then the customization design item is created and linked to the SE composition item referencing the SEc, STEP 1712. The newly created customization design item is then added to the SE design, STEP 1714. The visual design is also updated before processing completes, STEP 1702.

Figure 18:
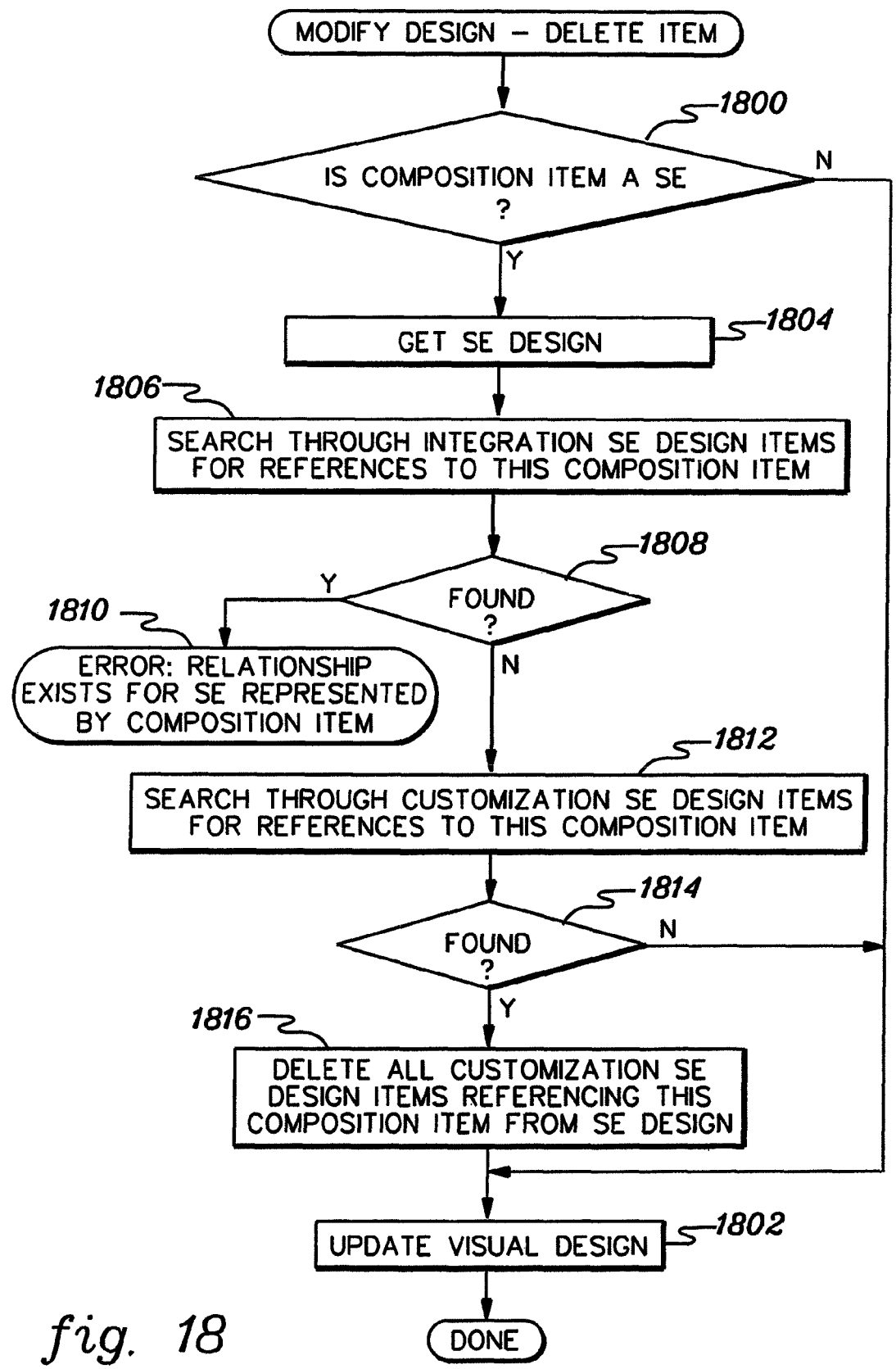
FIG. 18 depicts one embodiment of the logic associated with modifying a design of a service element due to deleting a composition item from the service element, in accordance with an aspect of the present invention.

The SE design can also be modified due to deletion of a SE composition item. One embodiment of the logic associated with updating the design by deleting a SE composition item is described with reference to FIG. 18. Initially, a determination is made as to whether the composition item is a SE, INQUIRY 1800. If the composition item does not represent a SE (i.e., it represents a component), the visual design is updated, STEP 1802.

Otherwise, the SE design is retrieved, STEP 1804, and a search is performed in the SE design for any integration SE design items that refer to this composition item (i.e., ascertain whether the SE represented by the target SE composition item is involved in an integration relationship with another SE as a part of the design), STEP 1806. If an integration SE design item is found referring to this composition item, INQUIRY 1808, processing terminates with an error, STEP 1810. Otherwise, a search is performed for any customization SE design items that refer to this composition item, STEP 1812. If any customization SE design items are found to reference the target composition item, INQUIRY 1814, the design items are deleted from the SE design, STEP 1816. Thereafter, or if no customization SE design items are found, processing continues with updating the visual design, STEP 1802.

Figure 19A:
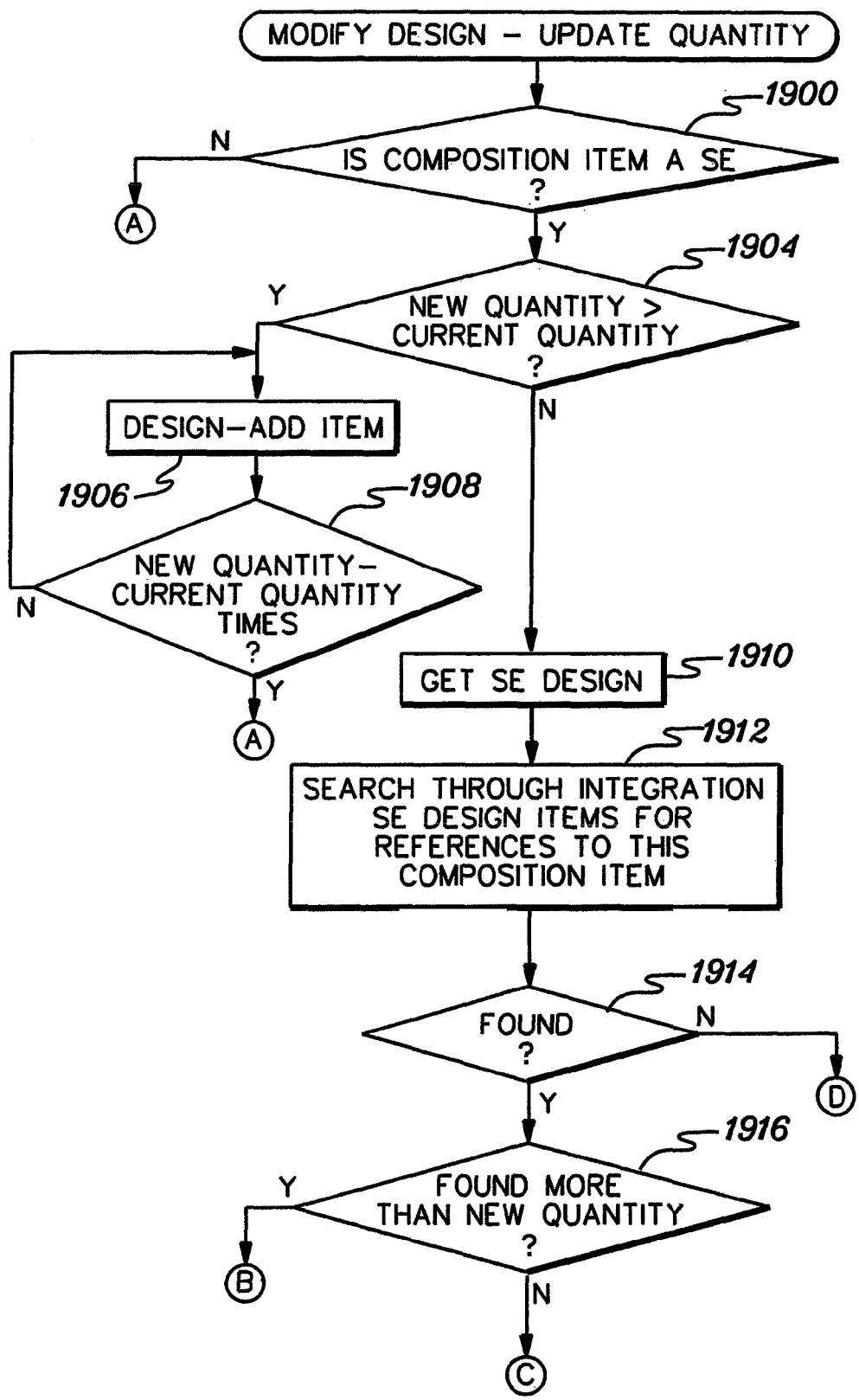
FIGS. 19a-19c depict one embodiment of the logic associated with modifying a design of a service element due to updating a quantity of a composition item of the service element, in accordance with an aspect of the present invention.

In a further embodiment, a SE design is modified due to a change of a SE composition quantity. One embodiment of the logic associated with updating the SE design by changing a SE composition item quantity is described with reference to FIGS. 19a-19c. Initially, a determination is made as to whether the composition item is a SE, INQUIRY 1900 (FIG. 19a). If the composition item does not represent a SE (i.e., it represents a component), then the visual design is updated, STEP 1902.

Otherwise, if the new quantity is greater than the current quantity, INQUIRY 1904, the design-add item logic is invoked (see FIG. 17), STEP 1906. Thereafter, a check is made as to whether the add process is to be repeated, INQUIRY 1908. For instance, the process repeats the "design—add item" process a number of times equal to the difference between the new and the current quantity. Thus, if the process has not been repeated the appropriate number of times, processing continues with STEP 1908. Otherwise, the visual design is updated, prior to completion, STEP 1902.

Returning to INQUIRY 1904, if the new quantity is less than the current quantity (should they be equal, this process is not invoked, as no design change is perceived to be necessary), the SE design is retrieved, STEP 1910. A search is performed through the integration SE design items to find those integration items that reference this composition item, STEP 1912. Each found integration SE design item is stored in a list of integration SE design items referencing this composition item.

Figure 19B:
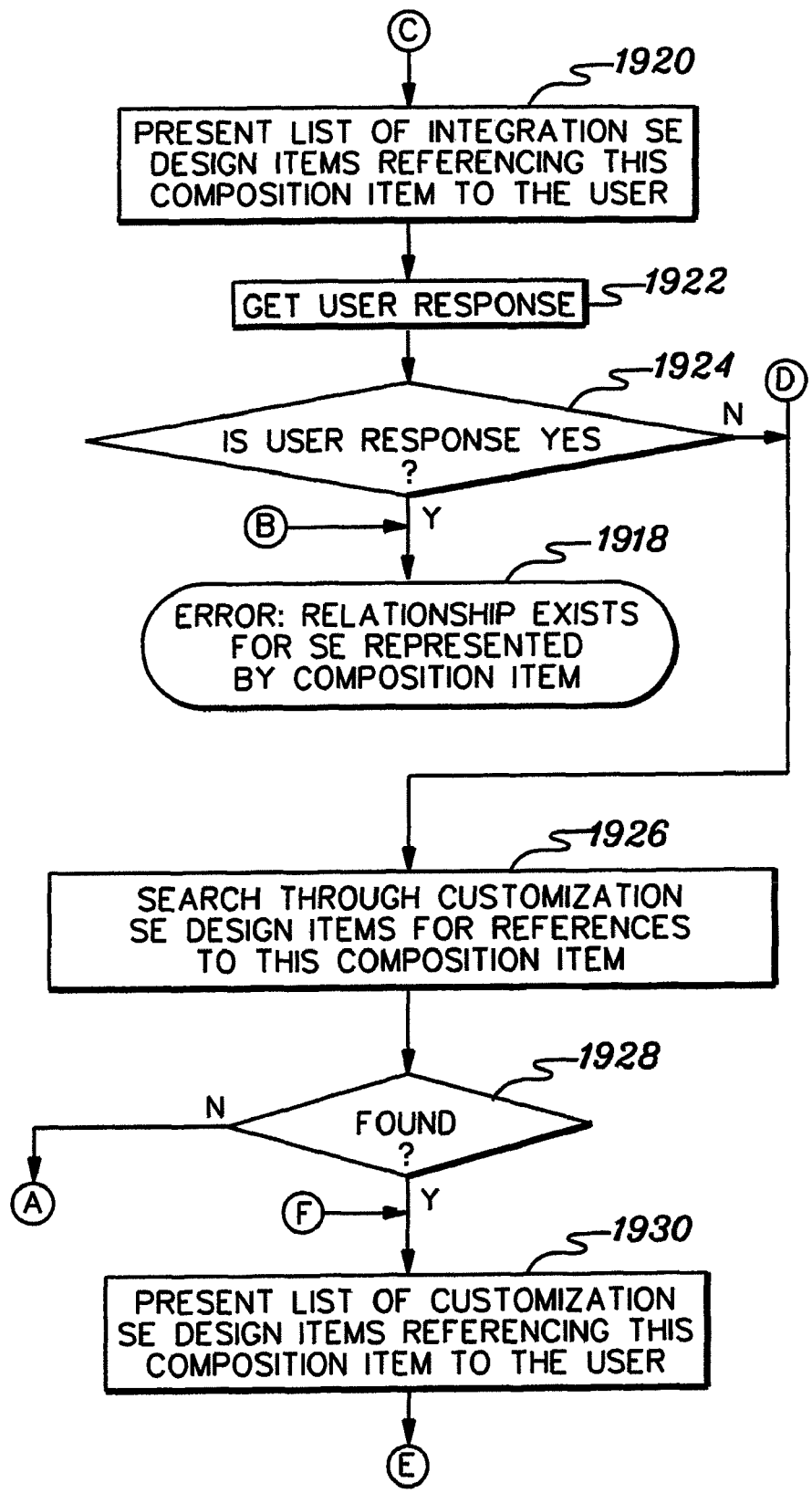

If any integration SE design items have been found, INQUIRY 1914, and if the number of integration SE design items in the list exceeds the new quantity, INQUIRY 1916, processing is terminated with an error, STEP 1918. Otherwise, the list of integration SE design items referencing this composition item is presented to the user with a question of whether any of the presented SE design items are impacted by the quantity change, STEP 1920 (FIG. 19b). The user responds YES or NO and the process obtains the user response, STEP 1922. If the user response is YES, INQUIRY 1924, processing is terminated with an error, STEP 1918.

Figure 19C:
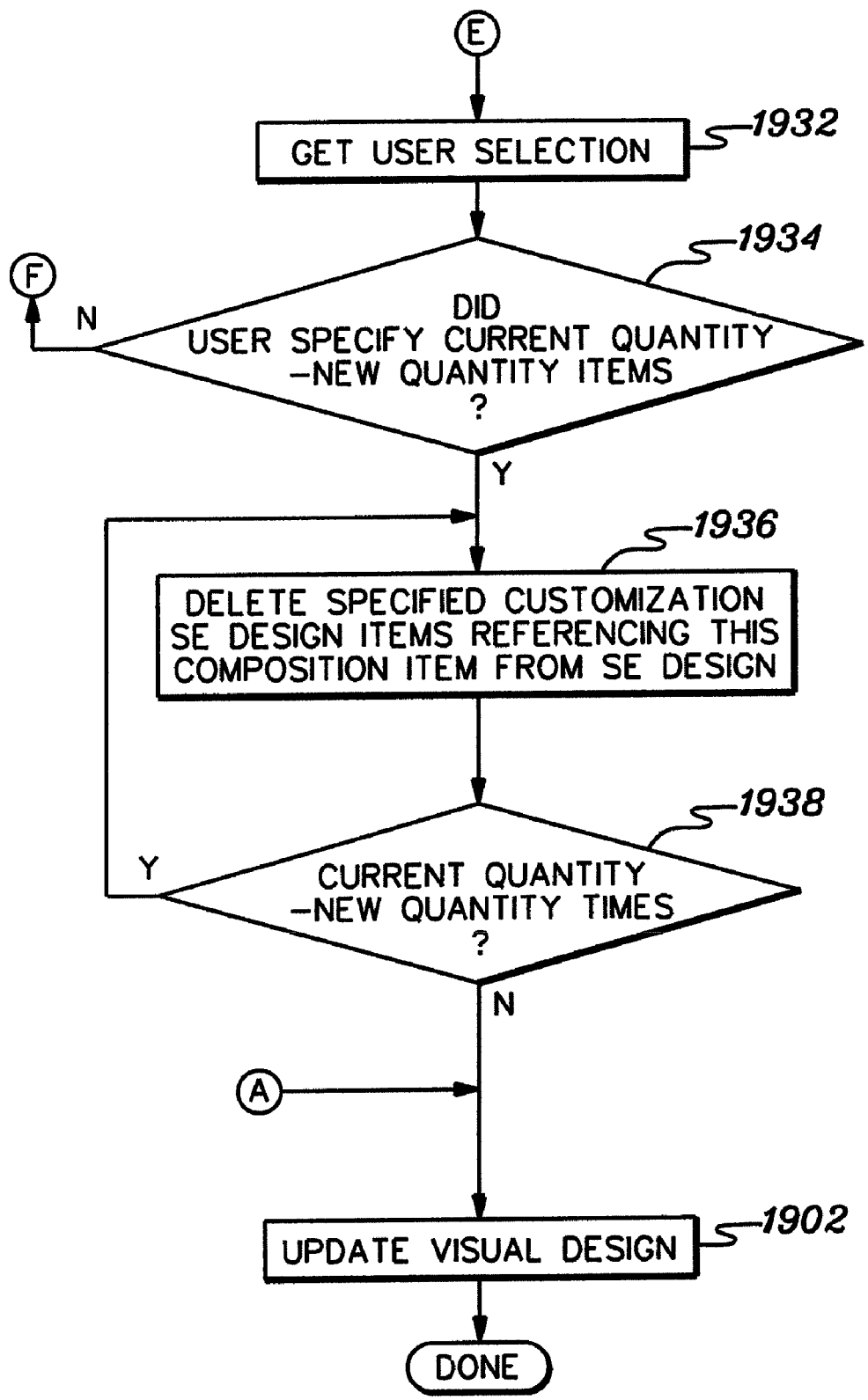

Otherwise, or if design items for references to this composition item were not found, a search is performed for customization SE design items that reference this composition item, and a list of such customization SE design items is built, STEP 1926. If any customization SE design items are found, INQUIRY 1928, the built list of customization SE design items referencing this composition item is presented to the user with a request to specify the items to delete as a result of quantity reduction, STEP 1930. The user selects (the number of selected customization SE design items is the difference between the current and the new quantity) the design items to delete, and the process obtains the user selection, STEP 1932 (FIG. 19c). If the user selected a number of customization SE design items different from the one required, INQUIRY 1934, the user is re-prompted and processing continues with STEP 1930. Otherwise, the specified customization SE design items are deleted from the SE design, STEP 1936. In one example, the deletion is performed in a loop that repeats the number of times equal to the difference between the current and the new quantity, INQUIRY 1938. Processing then continues with updating the visual design, STEP 1902.

The SE design may also be updated as a result of establishing an integration relationship between two SEs (SE1 and SE2) represented in the SE composition. For example, the process ascertains the type of integration supported by SE1 and SE2 ("prohibited" is at this point precluded, since the invoking process has already performed this check), and creates an integration SE design item referencing the composition items for SE1 and SE2. The process then adds the newly created integration SE design item to the SE design. Subsequently, the visual design is updated.

Further, the SE design can be updated as a result of dissolving an integration relationship between two SEs (SE1 and SE2) represented in the SE composition. For example, the process finds the appropriate integration SE design item in the SE design and deletes this design item from the SE design.

Updating SE Cost Case

The SE cost case is modifiable in one or more ways and for various reasons. For example, when an item is deleted from the SE composition, a SE cost case item is also deleted. For example, the process finds the SE cost case item corresponding to the SE composition item being deleted and deletes that SE cost case item from the SE cost case.

In one embodiment, the process of deleting a SE cost case item is invoked for embodiments that cache SE cost case items in the SE data structure. Embodiments that generate cost data dynamically on demand do not need to implement this process.

In a further example, a SE cost case item is created, as a result of adding an item to the SE composition. Creating a SE cost case item is described further below.

Updating SE Development Plan

The SE development plan is also modifiable in one or more ways and for various reasons. For example, the process of deleting SE development plan tasks is invoked as a result of deletion of an item from the SE composition or as a result of a decrease of an item quantity in the SE composition (assuming this item represents a SE; or as a result of dissolution of an integration relationship between two SEs included in the SE composition, this integration relationship represented by an integration SE design item (also being deleted).

Figure 20:
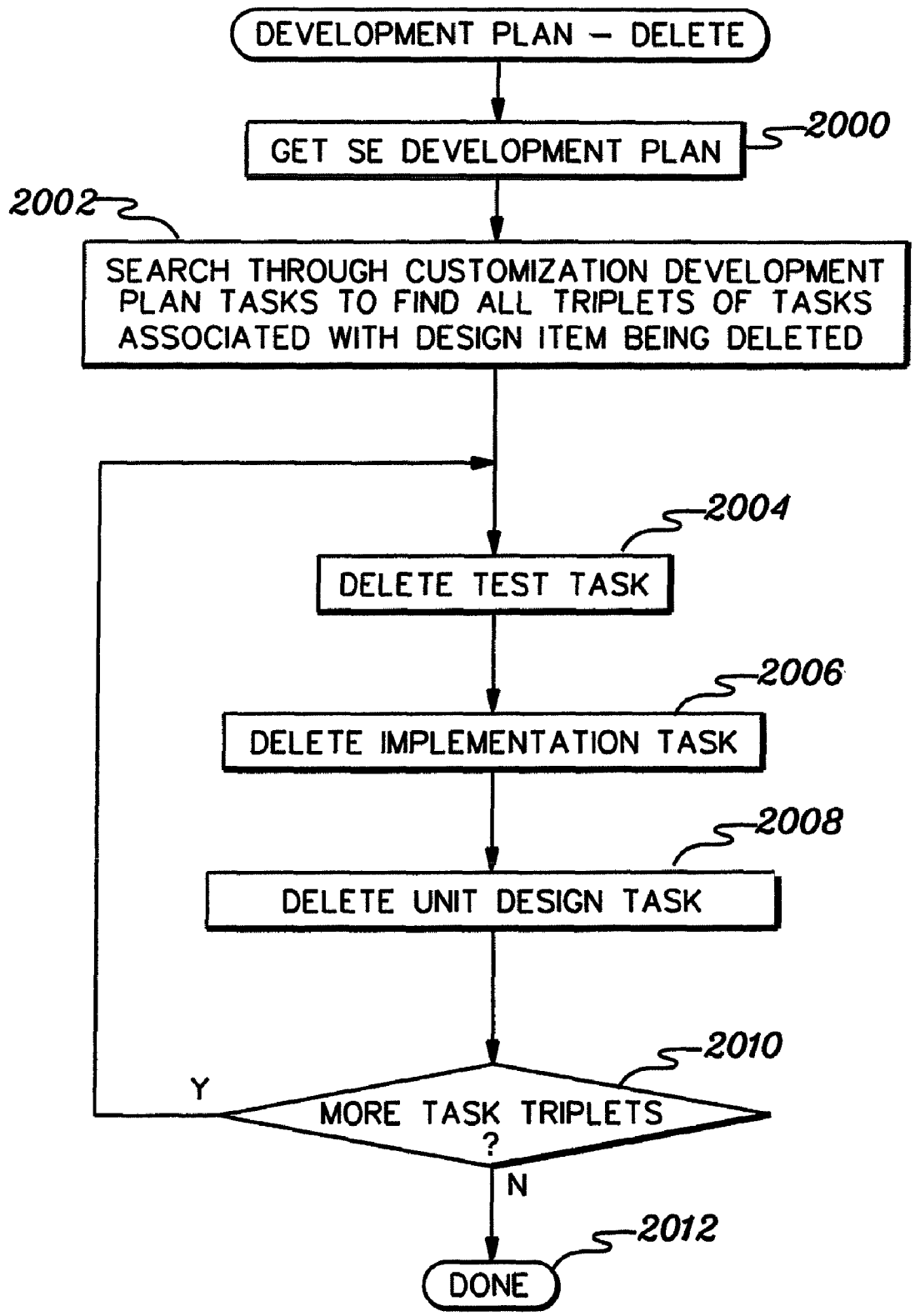
FIG. 20 depicts one embodiment of the logic associated with deleting tasks of a development plan, in accordance with an aspect of the present invention.

One embodiment of the logic associated with deleting SE development plan tasks is described with reference to FIG. 20. Initially, the SE development plan is retrieved from the SE, STEP 2000. Then, a search is performed through the SE development plan tasks to find all triplets (unit design, unit implementation, test) of tasks associated with the design item being deleted, and a list of such task triplets is produced, STEP 2002. A triplet in the list is then selected, and the test task is deleted, STEP 2004. Additionally, the implementation task and unit design task are deleted, STEPS 2006, 2008. Thereafter, a determination is made as to whether there are more triplets on the list to be processed, INQUIRY 2010. If so, processing continues with STEP 2004. Otherwise, processing is complete, STEP 2012.

In a further embodiment, SE development plan tasks are added as a result of adding an item (including increase in its quantity) to the SE composition (assuming this item represents a SE); or as a result of establishment of an integration relationship between two SEs included in SE composition, this integration relationship represented by an integration SE design item. Adding SE development plan tasks is described further below.

Updating SE Deployment Plan

Figure 21:
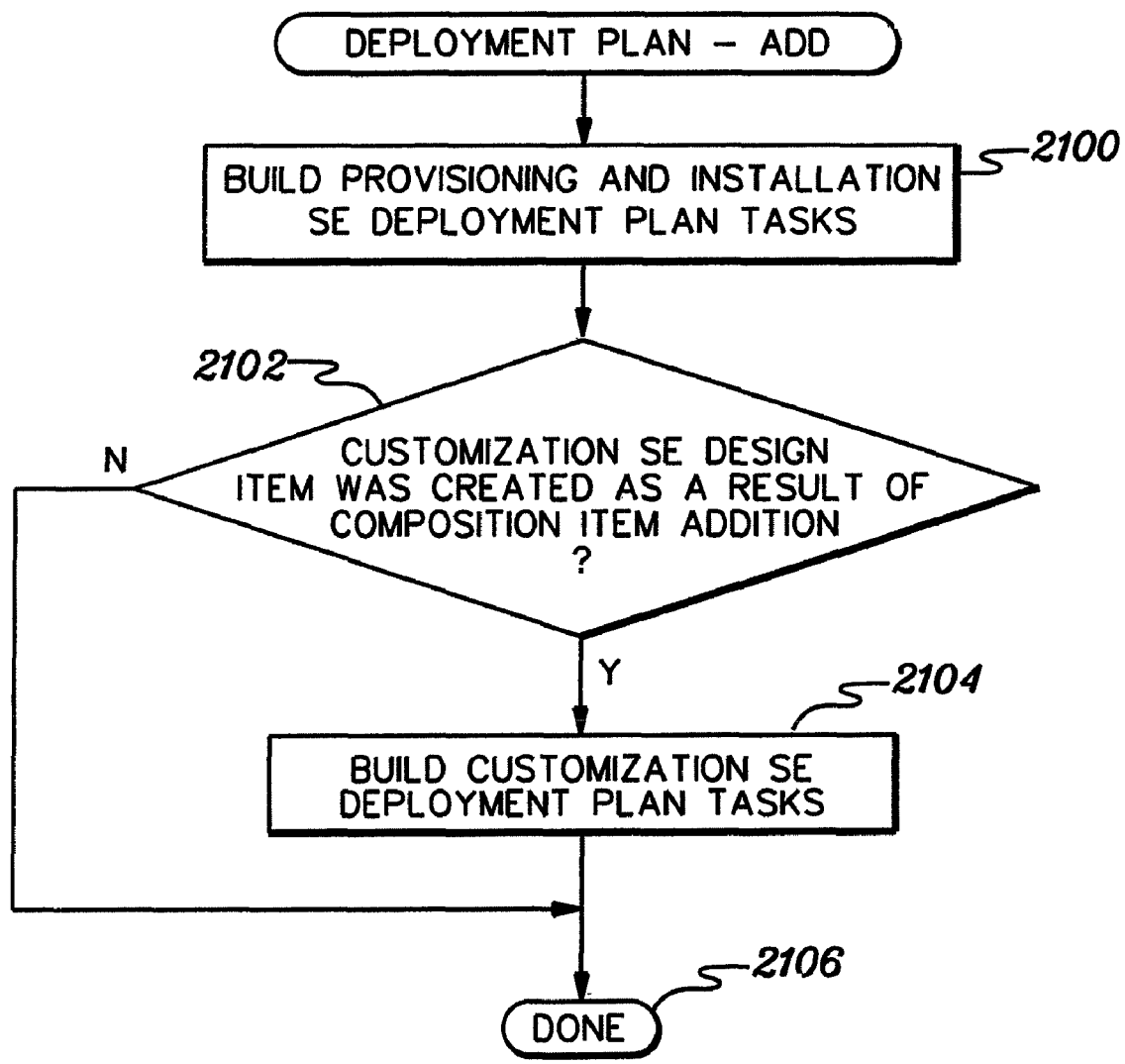
FIG. 21 depicts one embodiment of the logic associated with adding to a deployment plan for a service element, in accordance with an aspect of the present invention.

In one embodiment, in response to adding an item to a SE composition, a SE deployment plan is built. One embodiment of the building of SE deployment plan tasks as a result of adding an item to the SE composition is described with reference to FIG. 21. Initially, one or more provisioning and installation SE deployment plan tasks are built for the added SE composition item, STEP 2100. Thereafter, a determination is made as to whether a customization SE design item was created as a result of adding the SE composition item, INQUIRY 2102. If the customization SE design item was created as a result of adding the SE composition item, then customization SE deployment plan tasks are built, STEP 2104. Otherwise, processing is complete, STEP 2106.

Figure 22:
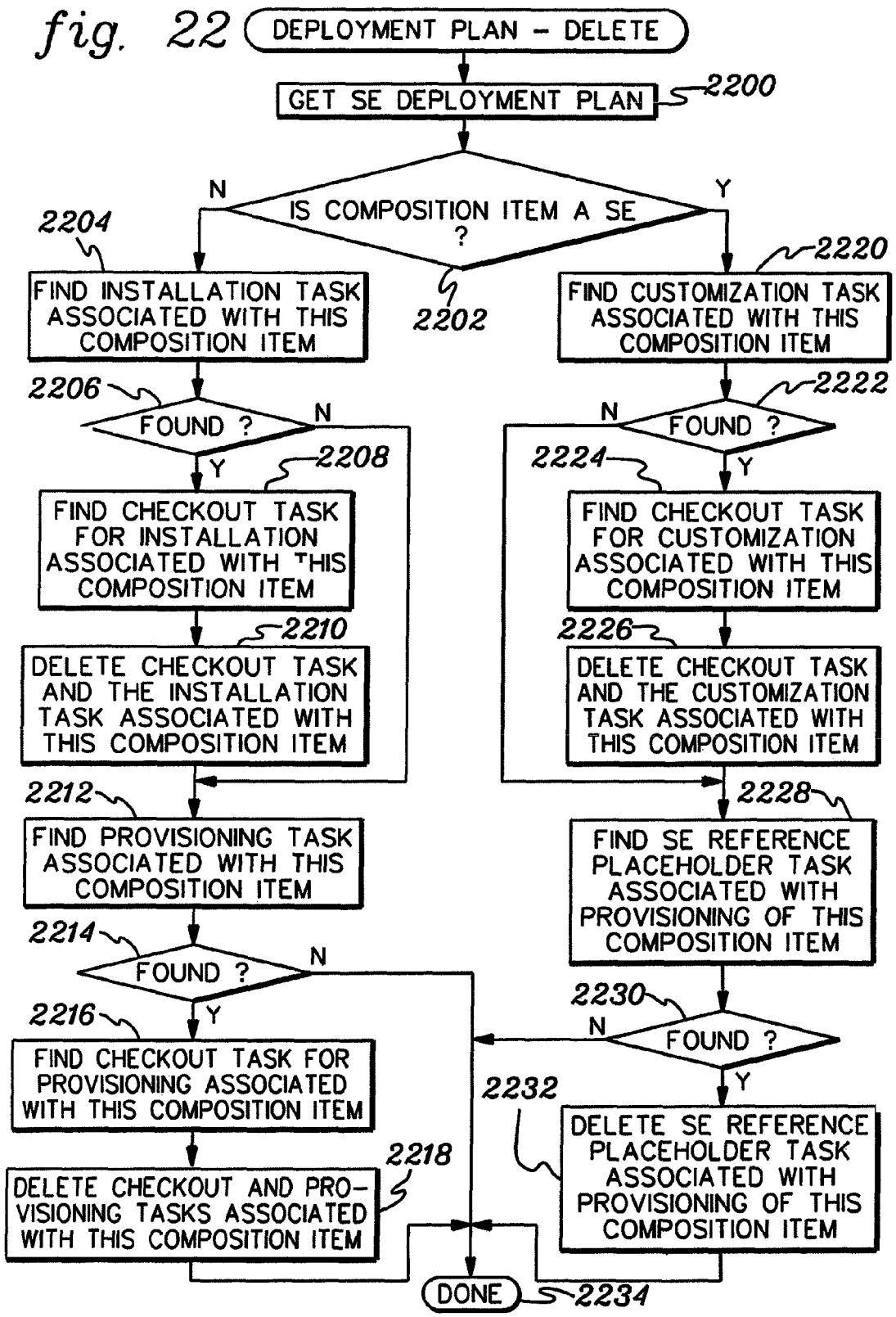
FIG. 22 depicts one embodiment of the logic associated with deleting a deployment plan task due to deleting a service element item, in accordance with an aspect of the present invention.

In a further embodiment, one or more deployment plan tasks are deleted, in response to deleting an item from the SE composition. One embodiment of the logic associated with deleting one or more SE deployment plan tasks as a result of deleting an item from the SE composition is described with reference to FIG. 22. Initially, a SE deployment plan is retrieved from the SE, STEP 2200. Thereafter, a determination is made as to whether the composition item represents a component, INQUIRY 2202. If the composition item represents a component, then an attempt is made to find an installation task associated with this composition item in the SE deployment plan, STEP 2204. If the installation task is found, INQUIRY 2206, then the associated checkout SE deployment plan task is located, STEP 2208. The checkout task and the installation task associated with this composition item are deleted, STEP 2210.

Thereafter, or if an installation task was not found, an attempt is made to find a provisioning task associated with this composition item in the SE deployment plan, STEP 2212. If the provisioning task is not found, INQUIRY 2214, then processing is complete. However, if the provisioning task is found, then the associated checkout task is located in the SE deployment plan, STEP 2216, and the checkout task and the provisioning task associated with this composition item are deleted, STEP 2218.

Returning to INQUIRY 2202, if the composition item represents a SE, then an attempt is made to find a customization task associated with this composition item in the SE deployment plan, STEP 2220. If the customization task is found, INQUIRY 2222, then the associated checkout SE deployment plan task is located, STEP 2224. Thereafter, the checkout task and the customization task associated with this composition item are deleted, STEP 2226.

Subsequently, or if a customization task was not found, the process attempts to find a SE reference placeholder task (described herein) associated with provisioning of this composition item, STEP 2228. If the placeholder was found, INQUIRY 2230, it is deleted from the SE deployment plan, STEP 2232. Otherwise, processing is complete, STEP 2234.

In this embodiment, SE placeholders, although present as visual elements in a visual design representation, have no effect on the rest of the SE data structure (i.e., they are seen on the screen, but have no corresponding composition, design (customization or integration), cost case, or development or deployment plan items). One skilled in the art will appreciate that other treatment of SE placeholders are possible—e.g., defining a generic placeholder SE (that integrates with anything in a "manual" fashion and requires customization) and adding it to the SE database would result in a placeholder SE being treated just like a real SE, with all the associated data structures built as a result of the placeholder SE involvement.

In addition to the above, deployment plan changes are performed, as a result of a composition item quantity update. For example, the process finds the appropriate tasks and updates imbedded quantities for provisioning, customization, SE placeholder, and the checkout SE deployment plan tasks.

Further, SE deployment plan tasks are built, as a result of establishment of an integration relationship between two SEs represented by composition items in the SE composition. This is described further below.

Figure 23:
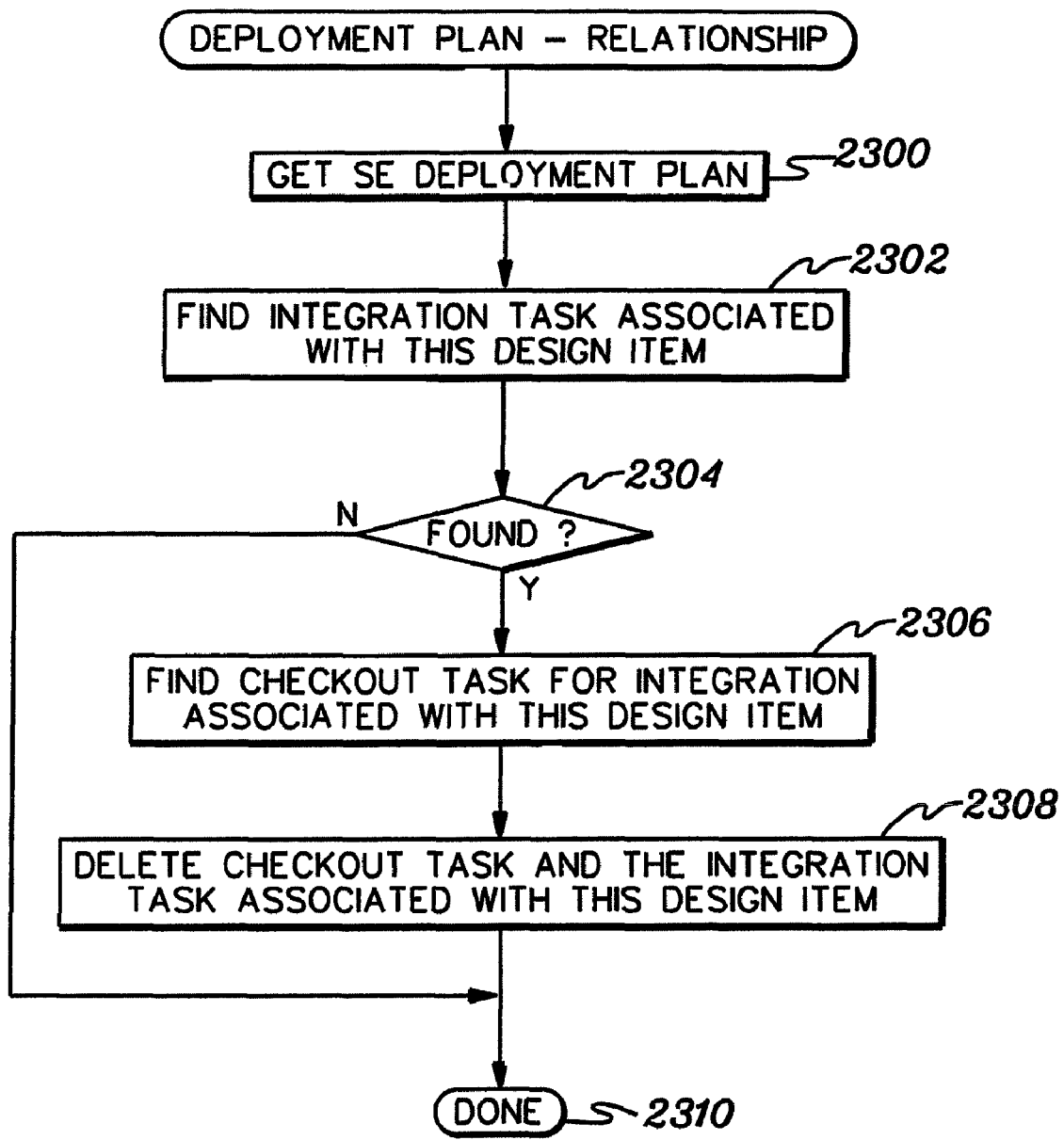
FIG. 23 depicts one embodiment of the logic associated with deleting deployment plan tasks due to dissolution of an integration relationship, in accordance with an aspect of the present invention.

SE deployment plan tasks are deleted, as a result of dissolution of an integration relationship (represented by a design item). One embodiment of the logic associated with deleting one or more SE deployment plan tasks is described with reference to FIG. 23.

Initially, a SE deployment plan is retrieved from the SE, STEP 2300. Then, an attempt is made to find an integration task associated with the design item in the SE deployment plan, STEP 2302. If the integration task is found, INQUIRY 2304, then the associated checkout SE deployment plan task is located, INQUIRY 2306. Thereafter, the checkout task and the integration task associated with this composition item are deleted, STEP 2308. If the integration task is not found, processing completes, STEP 2310.

Design Builder

Design builder is a graphical tool in the framework of the Service Development Tool. Design builder helps a developer produce a graphical view of the configuration and associated textual descriptions out of available SEs. Design builder is invoked, for instance, by a user wishing to change a created service element. The builder includes, for instance, a set of stencils (or palettes), dynamically configurable (i.e., pulling data from the SE databases), based on available SEs; and a drawing screen.

A user performs a design by dragging SEs from the stencils (e.g., of the SE database), and providing associated textual description/comments, and interconnecting the SE representations via network links. The work results, including elements, links, description, as well as a diagram, are stored in the technical design database.

In addition to the standard SE labels, selected SEs are assigned additional characteristics, e.g., shared (one per N customers) versus dedicated (one per customer), that are reflected in the resulting configuration and the subsequent generated cost case.

Figure 24:
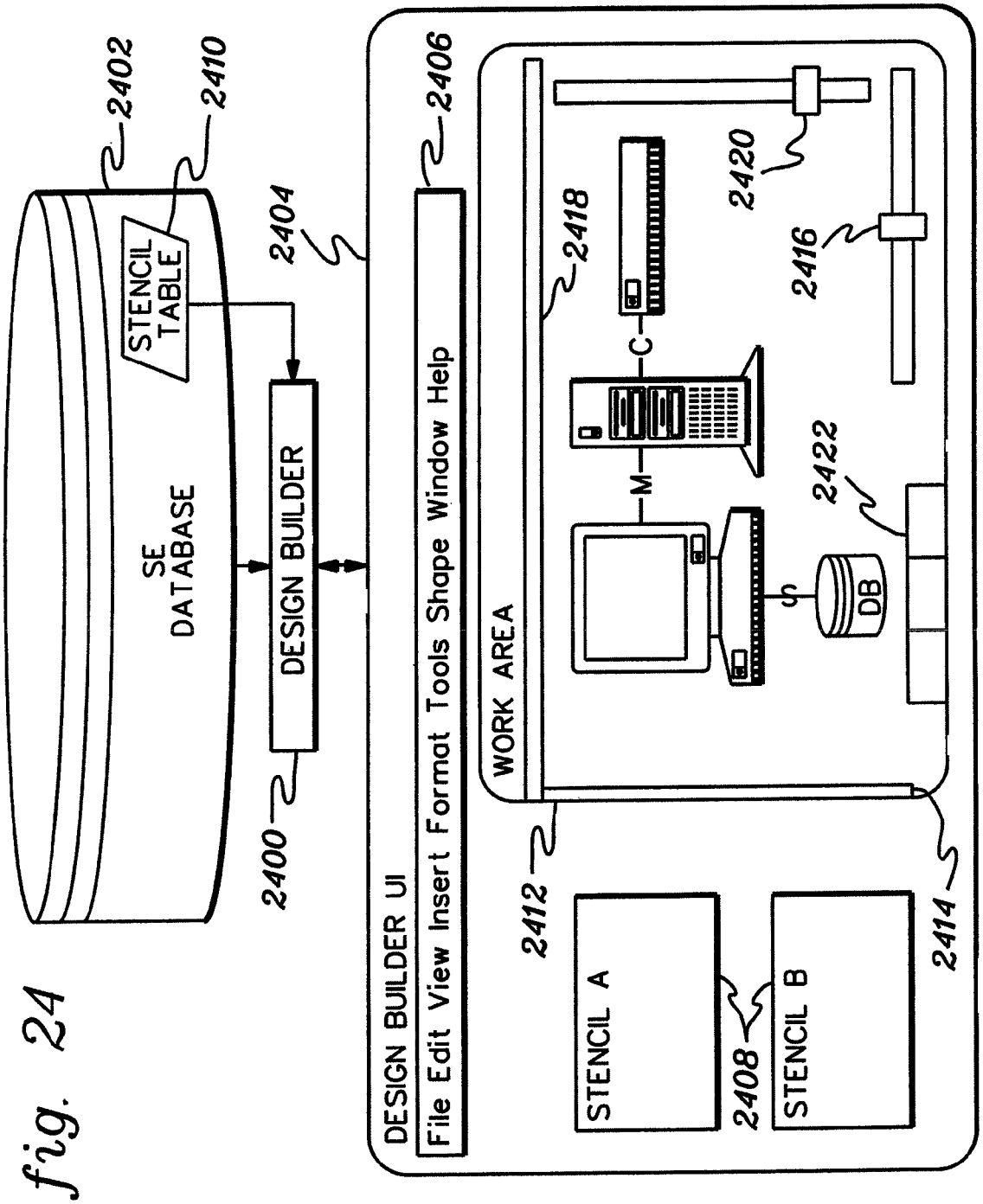
FIG. 24 depicts one example of an overview of a design builder of the Service Development Tool of FIG. 1, in accordance with an aspect of the present invention.

One embodiment of an overview of a design builder is described with reference to FIG. 24. A design builder 2400 (e.g., a program) has access to SE database 2402, where it stores and retrieves design information. A user (e.g., a designer) interfaces with design builder 2400 via a design builder user interface 2404.

In one example, design builder user interface 2404 includes, a top horizontal command bar 2406; one or more stencils 2408 (usually representative of the SE nomenclature) stored in a stencil table 2410 of SE database 2402; and a work area 2412, surrounded by horizontal and vertical rulers, 2414, 2416, horizontal and vertical scroll bars 2418, 2420, and one or more sheet tabs 2422.

Adding an Item to a Stencil

Design builder permits the addition of items to stencils. The addition of items to stencils can be performed for existing items (i.e., SEs or components) or as placeholders (i.e., an item does not yet exist, but is needed to complete the design).

Figure 25A:
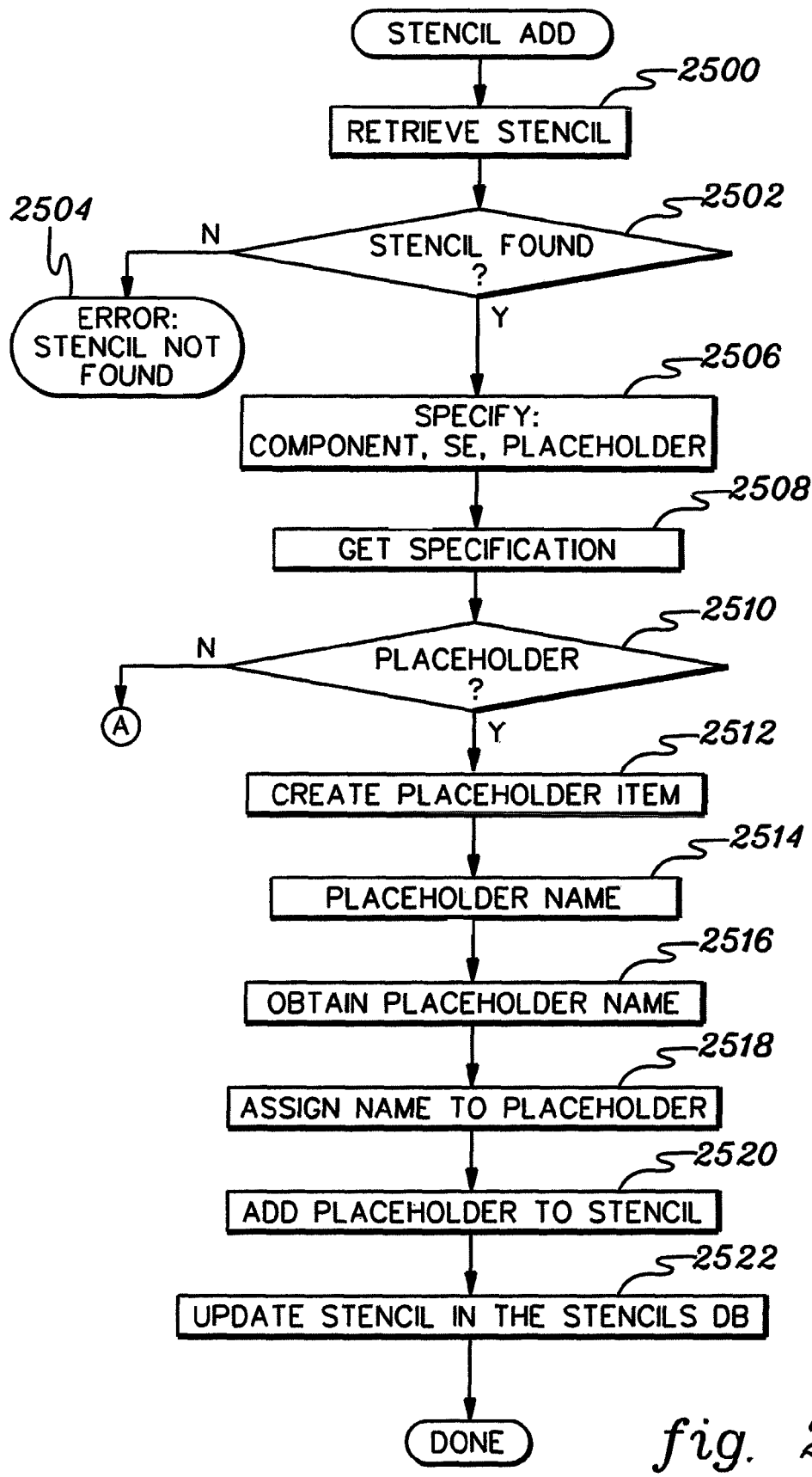
FIGS. 25a-25c depict one embodiment of the logic associated with adding to a stencil used in managing a service element, in accordance with an aspect of the present invention.

One embodiment of the logic associated with adding an item to a stencil is described with reference to FIGS. 25*a*-25*c*. Initially, the designer invokes a stencil item addition panel of the design builder user interface, and indicates the desire to add an item to a specified stencil. An attempt is then made to retrieve the stencil from the stencil table of the SE database, STEP 2500. If the stencil is not found, INQUIRY 2502, processing terminates with an error, STEP 2504. If the stencil is found, the designer is presented with a choice of "placeholder, component, or SE" displayed on an item specification panel, STEP 2506. The designer specifies the choice, which is received by the program, STEP 2508.

If the item is a placeholder (i.e., it does not relate to an existing component or SE, but rather is intended to depict something to be created later), INQUIRY 2510, a placeholder item is created, STEP 2512. The designer is presented with a placeholder name specification request on a name entry panel, STEP 2514, and the designer enters the placeholder name, which is obtained by the program, STEP 2516, and assigned to the placeholder item, STEP 2518. The placeholder item is then added to the stencil being modified, STEP 2520, and the modified stencil is stored in the stencil table of the SE database, STEP 2522.

Figure 25B:
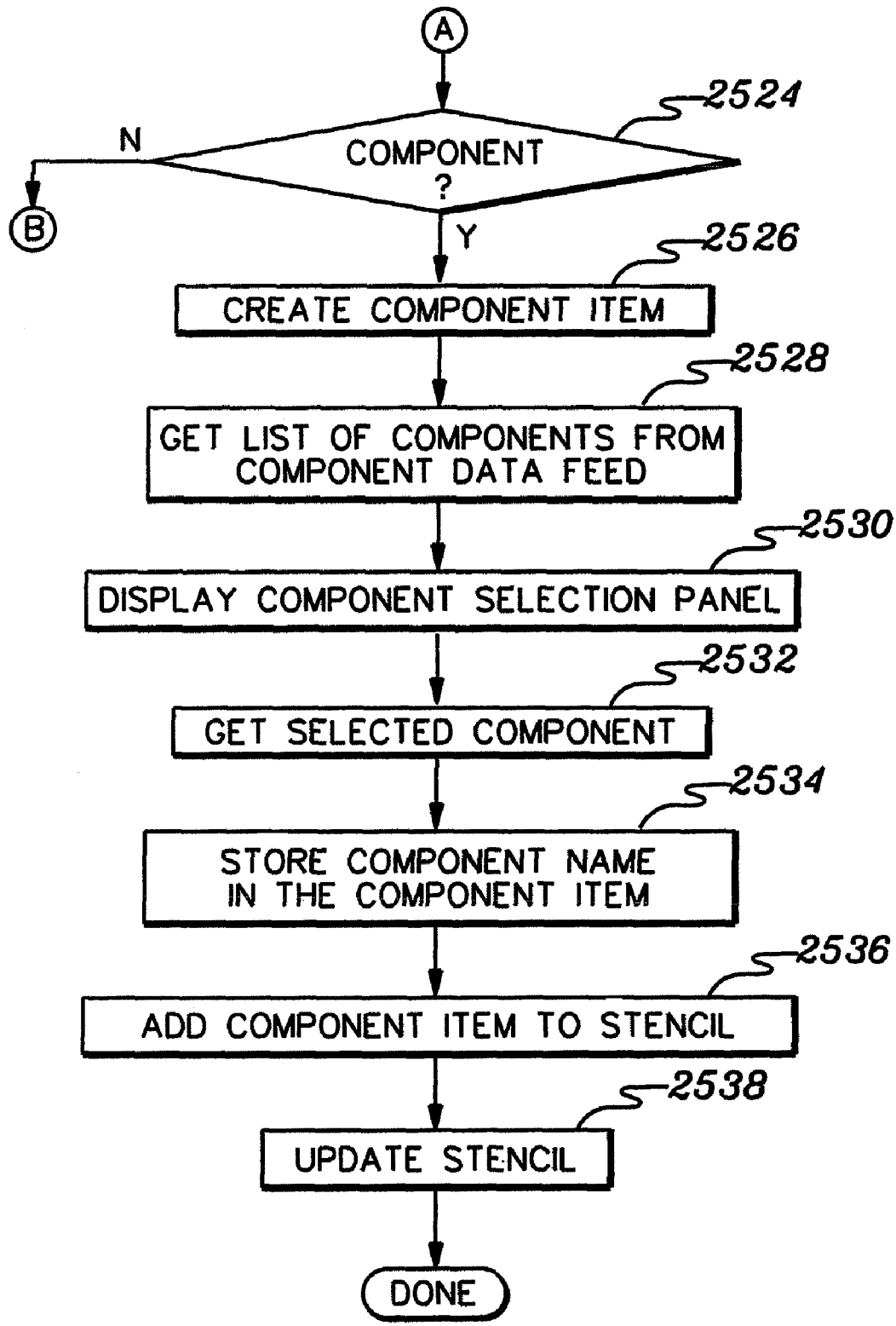
Figure 25C:
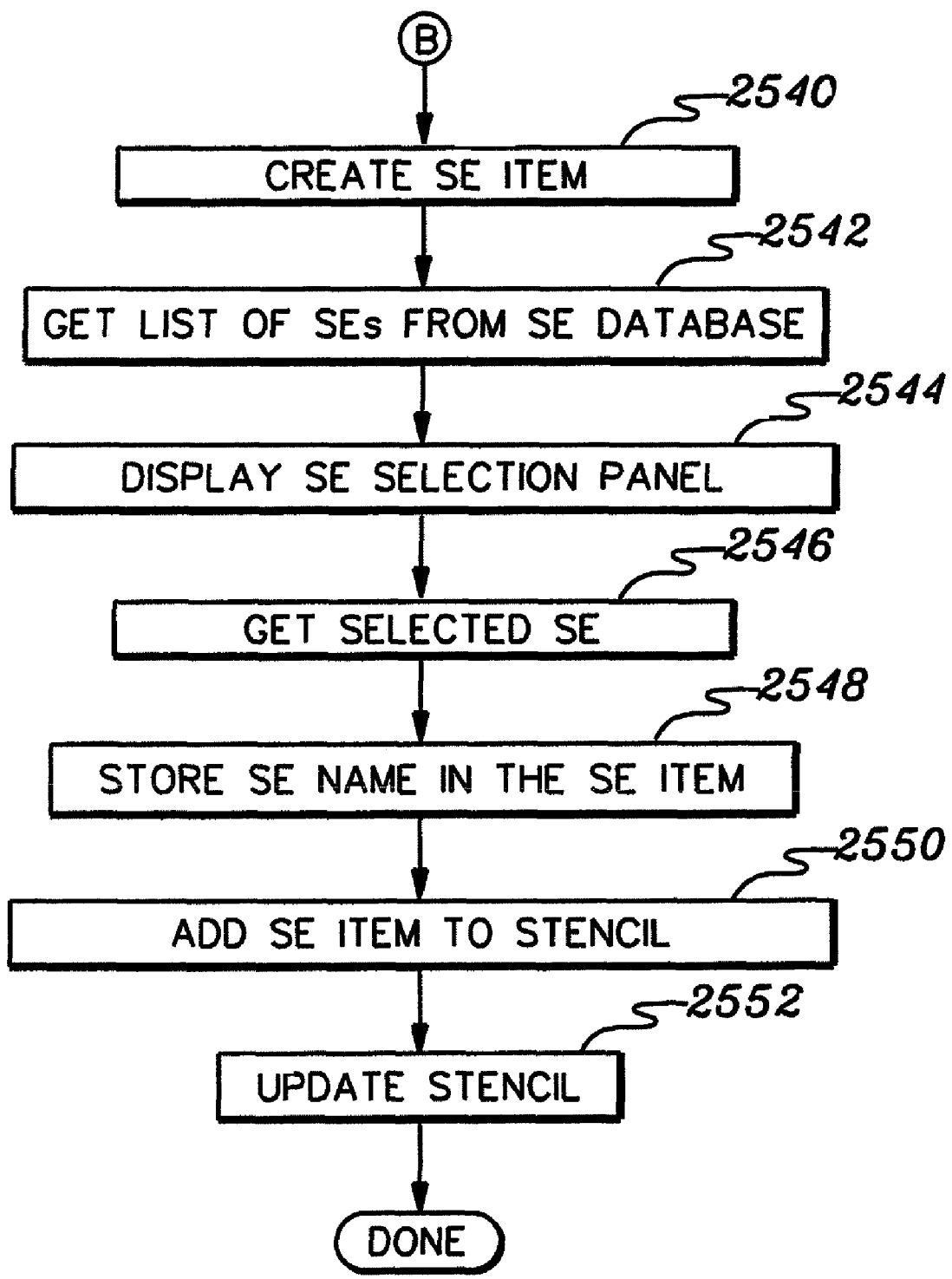

Returning to INQUIRY 2510, if the item is not for a placeholder, then a determination is made as to whether the item is for a component, INQUIRY 2524 (FIG. 25*b*). If the item is for a component, a component item is created, STEP 2526. Then, the list of available components is retrieved from the component data feed, STEP 2528.

Thereafter, a component selection panel is built from the list of available components and presented to the designer, STEP 2530. The designer selects a desired component from the presented list, and the selected component name is passed to the program, STEP 2532. The selected component name is then assigned to the component item, STEP 2534, and the component item is added to the stencil being modified, STEP 2536. The modified stencil is stored in the stencil table of the SE database, STEP 2538.

Returning to INQUIRY 2524, if the item is not for a component, the item is for a SE. Thus, a SE item is created, STEP 2540 (FIG. 25*c*). The list of available SEs is retrieved from the SE database, STEP 2542, and a SE selection panel is built from the list of available SEs and presented to the designer, STEP 2544. The designer selects the desired SE from the presented list, and the SE name is passed to the program, STEP 2546. The selected SE name is assigned to the SE item, STEP 2548, and the SE item is added to the stencil being modified, STEP 2530. The modified stencil is then stored in the stencil table of the SE database, STEP 2552.

In addition to adding items to stencils, design builder allows items to be deleted. The removal of an item includes removing the item, and storing the updated stencil in the stencil table of the SE database.

Customization Level Representation

A permitted level of customization is included in a SE visual representation. SEs that support no customization (standard) are not marked; SEs that support parametric customization are so marked (e.g., by using a distinct color, texture, etc. for their stencil icons, or by imbedding the letter "p" in a corner of their stencil icons); SEs that support programmable customization are also marked accordingly (e.g., by using a distinct color, texture, etc., or by imbedding the letter "P" in their icon).

SE Integration

Connecting two SEs on the screen with a line is equivalent to establishing an integration relationship between the SEs. As described above, there can be various levels of integration between any two SEs. Whenever an integration relationship is established between two SEs in a design, the level of integration associated with the relationship is noted and represented on the integration line (e.g., by using a distinct line color or style, or by labeling the line—e.g., no label for "compatible", "S" for "standard", "M" for "manual").

Prior to establishing an integration relationship, the verification of SE integration properties is performed, and integration is designed, only if permitted by the SE integration properties and at the level defined by those properties. In one example, if one of the two SEs is a placeholder, or if no integration characteristics are specified for the two SEs, the default assumption of "manual" is made.

Figure 26:
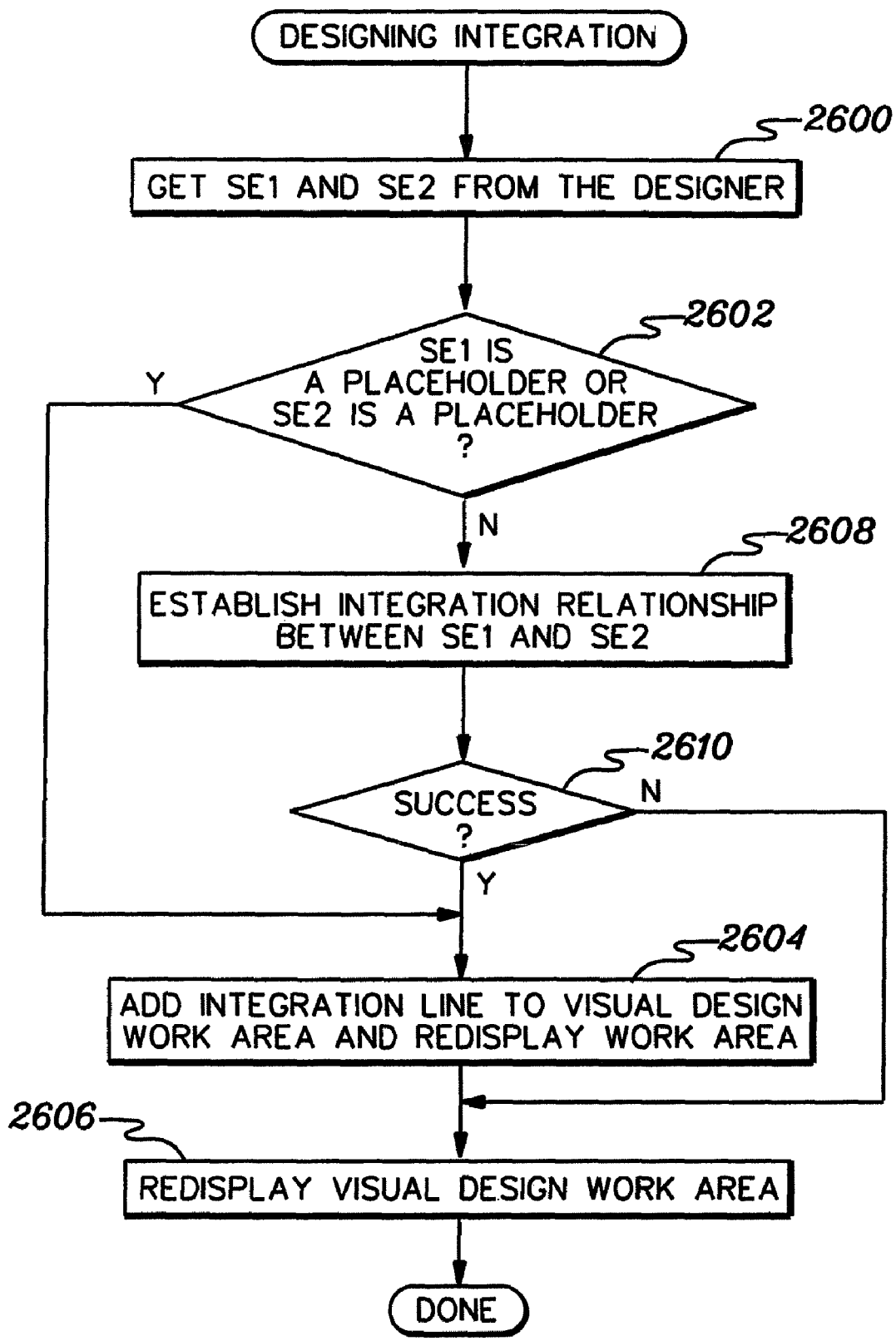
FIG. 26 depicts one embodiment of the logic associated with establishing an integration relationship, in accordance with an aspect of the present invention.

One embodiment of the logic associated with establishing an integration relationship is described with reference to FIG. 26. Initially, a designer connects two objects, SE1 and SE2, on the visual design builder workspace, and the process obtains SE1 and SE2, STEP 2600. If SE1 or SE2 is a placeholder, INQUIRY 2602, then the integration line the designer has drawn is added to the visual design builder work area, STEP 2604, and the visual design builder work area is redisplayed with a refreshed view now containing the integration line, STEP 2606.

However, if neither SE1 nor SE2 are placeholders, INQUIRY 2602, the process establishes an integration relationship between SE1 and SE2, as described above with reference to FIGS. 7a-7b, STEP 2608. If the integration relationship between SE1 and SE2 is not established successfully, INQUIRY 2610, the process redisplays the visual design builder work area with a refreshed view not containing the integration line, STEP 2606. Otherwise, the integration line the designer has drawn is added to the visual design builder work area, STEP 2604, and the visual design builder work area is redisplayed with a refreshed view now containing the integration line, STEP 2606.

Instantiating a Placeholder

Replacing a placeholder with a SE is equivalent to adding the SE to the design, and then, if successful, following up by recreating any integration relationships in which the placeholder being replaced by this SE was involved.

If any of these steps fail (i.e., the SE cannot be added to the design or an integration relationship cannot be established), the designer is presented with the appropriate error message(s) and the replacement of the placeholder with the SE does not complete.

Generating Graphical Design from SE

SE development may start from some other aspects of development than from the visual design graphical builder (e.g., cost case edit). In such a case, it may be advantageous to automatically generate an initial visual representation of a SE as a starting point for visual design work. In other cases, a visual design may already be present, and may need to be refreshed, if changes to the SE took place.

Figure 27:
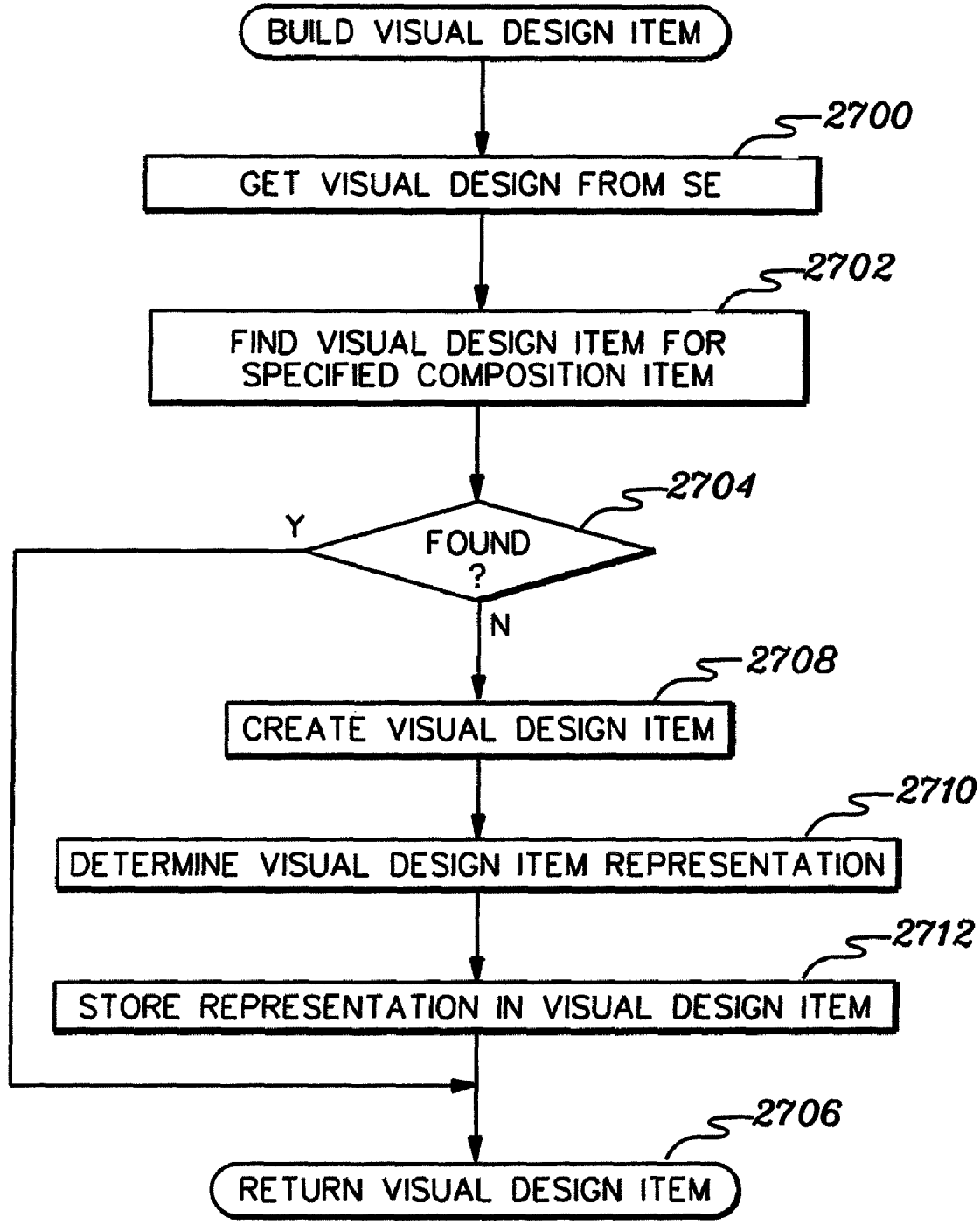
FIG. 27 depicts one embodiment of the logic associated with building a visual design item, in accordance with an aspect of the present invention.

FIG. 27 depicts one embodiment of the process of building a visual design item of a visual design. Initially, the visual design is obtained from the SE, STEP 2700, and an attempt is made to retrieve the visual design item for the specified SE composition item, STEP 2702. If the corresponding visual design item is found, INQUIRY 2704, the process completes by returning the visual design item, STEP 2706. Otherwise, a visual design item is created, STEP 2708, its representation is determined, as described below, STEP 2710, and the representation is stored in the visual design item, STEP 2712. The process completes by returning the generated visual design item, STEP 2706.

Figure 28:
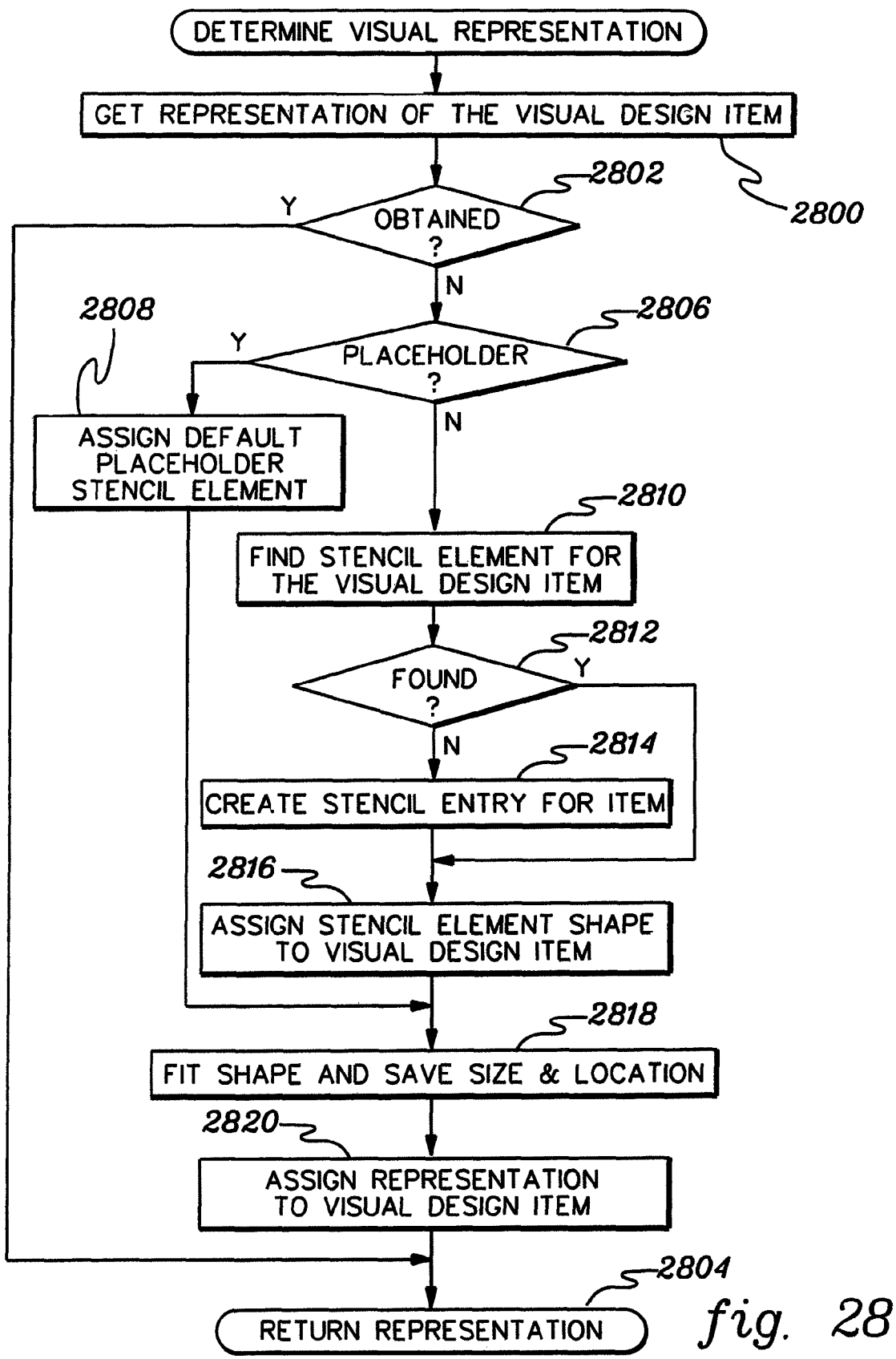
FIG. 28 depicts one embodiment of the logic associated with determining a visual representation, in accordance with an aspect of the present invention.

One embodiment of the logic associated with determining a visual representation for a visual design item is described with reference to FIG. 28. A visual representation is defined by, for instance, stencil shape, its size, and/or location on the design screen. The process attempts to obtain the visual representation of the visual design item from the SE, STEP 2800. If the representation is obtained, INQUIRY 2802, processing completes by returning the visual representation, STEP 2804. Otherwise, the visual representation for this visual design item is to be created.

If the visual design item is a placeholder, INQUIRY 2806, the default stencil element is assigned to the visual design item, STEP 2808. Otherwise, an attempt to find a stencil element for the entity represented by this visual design item is performed in the stencil table of the SE database, STEP 2810. If a stencil element is not found, INQUIRY 2812, a stencil add process is initiated, STEP 2814. Then, the found or newly created stencil element is assigned to the visual design item (thus, determining its shape), STEP 2816.

Next, the shape, size and location are determined by a fitting process, which fits the shape in the available space, not occupied by other shapes, and adjusts the shape's size as appropriate to make it possible. The resulting size and location are stored in the representation, STEP 2818. The representation is then stored in the visual design item, STEP 2820, and returned as the process terminates, STEP 2804.

In one example, a design is rendered by placing the visual design items, except for those marked "hidden", according to their size visual representations (stencil item shape, location, and size) on the image of the visual design graphical builder work area.

Editing Graphical SE Design

Figure 29:
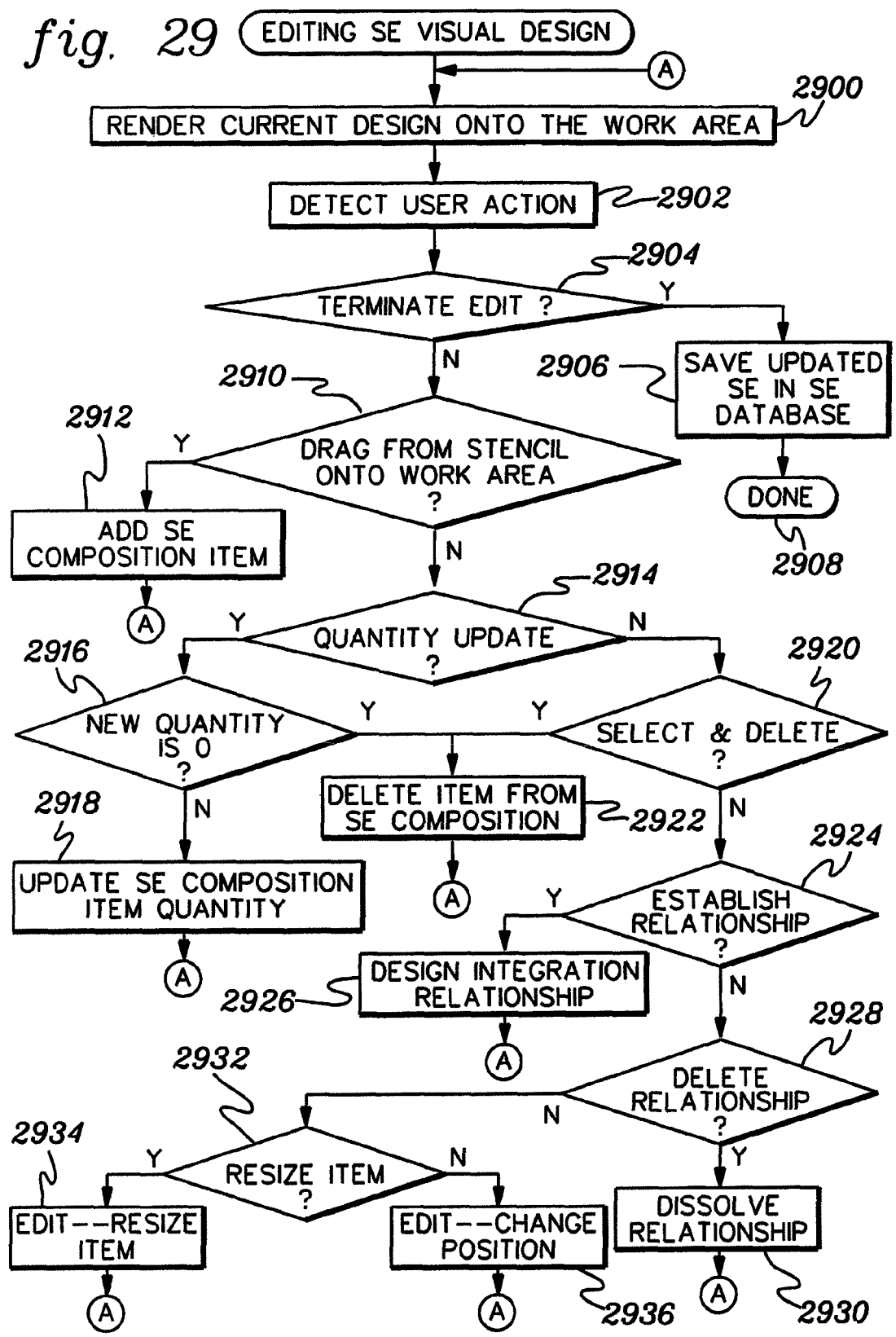
FIG. 29 depicts one embodiment of the logic associated with editing a visual design of a service element, in accordance with an aspect of the present invention.

One embodiment of the logic associated with editing a SE visual design is described with reference to FIG. 29. Initially, the current visual design is rendered onto the work area, STEP 2900. Then, a developer can perform one of the following operations on the graphical design:

Drag an item from a stencil onto the design screen;
Select an item on the design screen and delete it;
Select an item on the design screen and update its quantity;
Establish a relationship between two items on the design screen (subject to the described rules);
Delete a relationship between two items on the design screen;
Select an item on the design screen and drag it to a different position on the design screen;
Select an item on the design screen and resize it; and
Terminate edit.

The process senses the action the developer has performed, STEP 2902, and processing continues therefrom.

If the action is a terminate editing session action, INQUIRY 2904, then the updated SE is stored in the SE database, STEP 2906, prior to process completion, STEP 2908. However, if the action is not terminate, then a determination is made as to whether the action is a drag action, INQUIRY 2910. If the developer drags an item from a stencil onto the work area, then the action is a drag action. Thus, the process of adding an item to SE composition is performed, as described with reference to FIG. 12, STEP 2912. The screen position of the item drop location is stored and remembered for future use. One exception to this is a placeholder stencil item, for which the screen position and size are remembered (i.e., a design item is created), but no corresponding SE composition entry is created. When the action specified by the developer is performed, the process repeats until the developer requests termination, STEP 2900.

If the action is not a drag action, then a further determination is made as to whether it is a quantity update action, INQUIRY 2914. Should the developer select an item in the work area and update its quantity, the action is a quantity update action. Thus, a check is made as to the value of the new quantity, INQUIRY 2916. If the new quantity is not 0, the SE composition item quantity update process is performed, as described with reference to FIG. 14, STEP 2918. This results in an update of the corresponding SE composition item's quantity in the SE. However, if the quantity is updated to 0, then this is equivalent to deleting the selected item from the screen and the SE composition. Thus, if the developer specified the quantity of 0 or the developer deleted the selected item using an explicit deletion operation (e.g., the DELETE keyboard key), INQUIRY 2920, the process of deletion of a SE composition item is performed, as described with reference to FIG. 13, STEP 2922. Note that deleting an item involved in a relationship with another item is not permitted. An item may be deleted, in one example, only after the relationships it is involved in are dissolved.

If the developer wants to establish a relationship between two items on the design screen (by connecting them with a line), INQUIRY 2924, the process of establishing an integration relationship between two items is performed, as described with reference to FIG. 26, STEP 2926. If successful, the integration relationship is established between the two items.

Similarly, if the developer wants to delete a previously established relationship between two items, INQUIRY 2928, the relationship dissolution process is invoked, STEP 2930.

If the developer selects an item on the screen and resizes it, INQUIRY 2932, the process of resizing an item is invoked, which amounts to the new item size being stored in the item's visual design representation, STEP 2934.

Otherwise, the remaining action the developer can perform is to change a position of an item in the work area. Thus, the process of changing position is invoked, which results in the stored location of the visual item representation being updated, STEP 2936.

Abstracting Graphical SE Design

A graphical design representation exists for convenience of the SE developers and users. Because it is likely that a sufficiently complex SE (e.g., an offering) will include a large number of entries in its composition (and each entry may in turn be a SE, generating a chain of dependencies), graphical design visual builder includes mechanisms for design abstraction, intended for simplification of the visual representation. Three mechanisms are provided, in one embodiment:

The ability to hide specified design elements;
The ability to exclude design elements based on criteria; and
The ability to restrict representation levels.

In the first case (hiding specified design elements), the developer simply selects the specified design elements on the screen and assigns them the "hidden" attribute, which causes these elements to become invisible (i.e., not shown on the visual design display).

In the second case (excluding design elements based on criteria), the developer is presented with a menu, allowing the developer to specify types of design elements to assign the "hidden" attribute. The criteria are related to the types of SEs or components comprising a SE. For example, a developer may hide all components. Similarly, a developer may hide all SEs in the network services category.

In the third case, representation levels to be shown may be specified, based on a SE inclusion chain. For example, SE 1 includes SE 2 and SE 3; SE 2 includes SE 2A and SE 2B; and SE 3 includes SE 3A and SE 3B. Thus, representation level 0 causes SE 1 to be displayed; representation level 1 causes SE 1 to be shown as a composition of SE 2 and SE 3, but not the further decomposition of SE 2 and SE 3; and representation level 3 shows SE1, SE2, SE3, SE2*a*, SE2*b*, SE3*a*, SE3*b*.

Working in Conjunction with Cost Case Builder

In one embodiment, a common use of the visual builder is in conjunction (concurrently) with the cost case builder for the same SE. Changes to the cost case are reflected in the visual design and changes to the visual design are reflected in the cost case by virtue of the fact that any functions that modify SE content ensure that both the design and the cost case (as well as development and deployment plans) are modified, e.g., simultaneously.

Cost Case Builder

Figure 30:
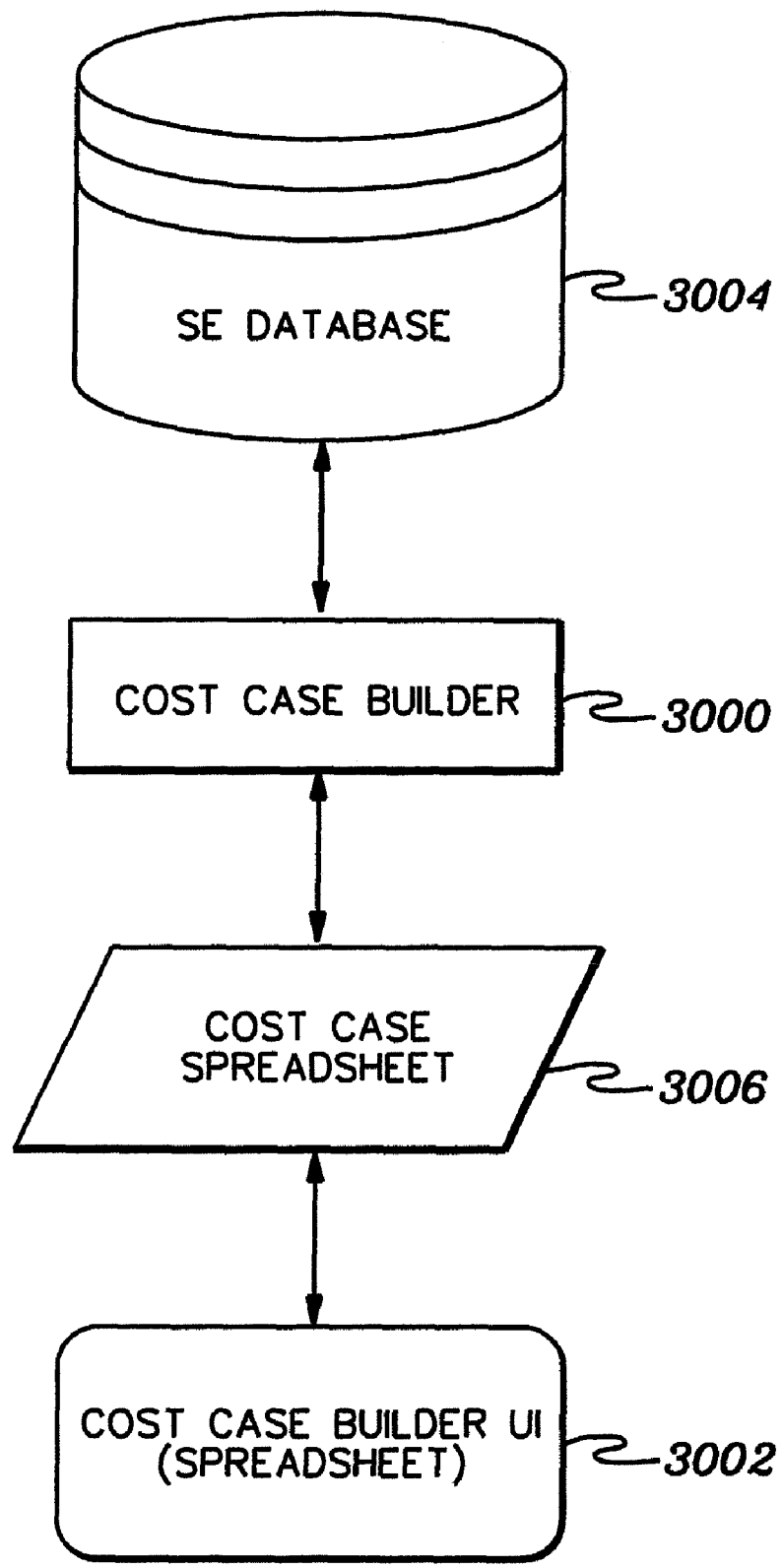
FIG. 30 depicts one example of an overview of a cost case builder of the Service Development Tool of FIG. 1, in accordance with an aspect of the present invention.

A cost case is an enumeration of SE composition items, along with their quantities, and associated one-time charge costs (OTC) and recurring costs (RC). A cost case is represented visually, in one example, as a spreadsheet. One example of an overview of a cost case builder is described with reference to FIG. 30. A cost case builder 3000 is a tool, with a spreadsheet-like user interface (UI) 3002, used for creation of service elements or offering cost cases. Cost case builder 3000 takes input from a SE database 3004, as well as manual user input of timeline and volume projections. Data extracted from the SE database and manual input are translated into a cost case spreadsheet 3006, which is presented to the user through the UI.

Various differences exist between the cost case builder and a spreadsheet, such as, for instance:

1. Linkage to databases containing the information (in other words, the visible spreadsheet interface is constructed of data brought in from a variety of sources, while cost information in the SE database originates from one or more cost data feeds for components); and
2. Its bi-directional nature. Changes introduced into the spreadsheet presentation result in the adjustment of quantities of the corresponding elements within the solution configuration database.

Consider an example. A developer designs an offering configuration with two dedicated firewalls per customer and a load balancing function. When a cost case is produced, a developer may consider replacing the two dedicated firewalls by a single dedicated firewall per customer. The developer adjusts the quantity of the firewall configuration element directly in the presented cost case spreadsheet by replacing "2" with "1" in the right cell; and the cost case builder reflects the change by updating the corresponding quantity in the associated configuration database. If the developer saves the status of the solution at this point, and then, restarts work from the design builder, the configuration reflects a single firewall per customer.

Building a Cost Case from a Design

Figure 31:
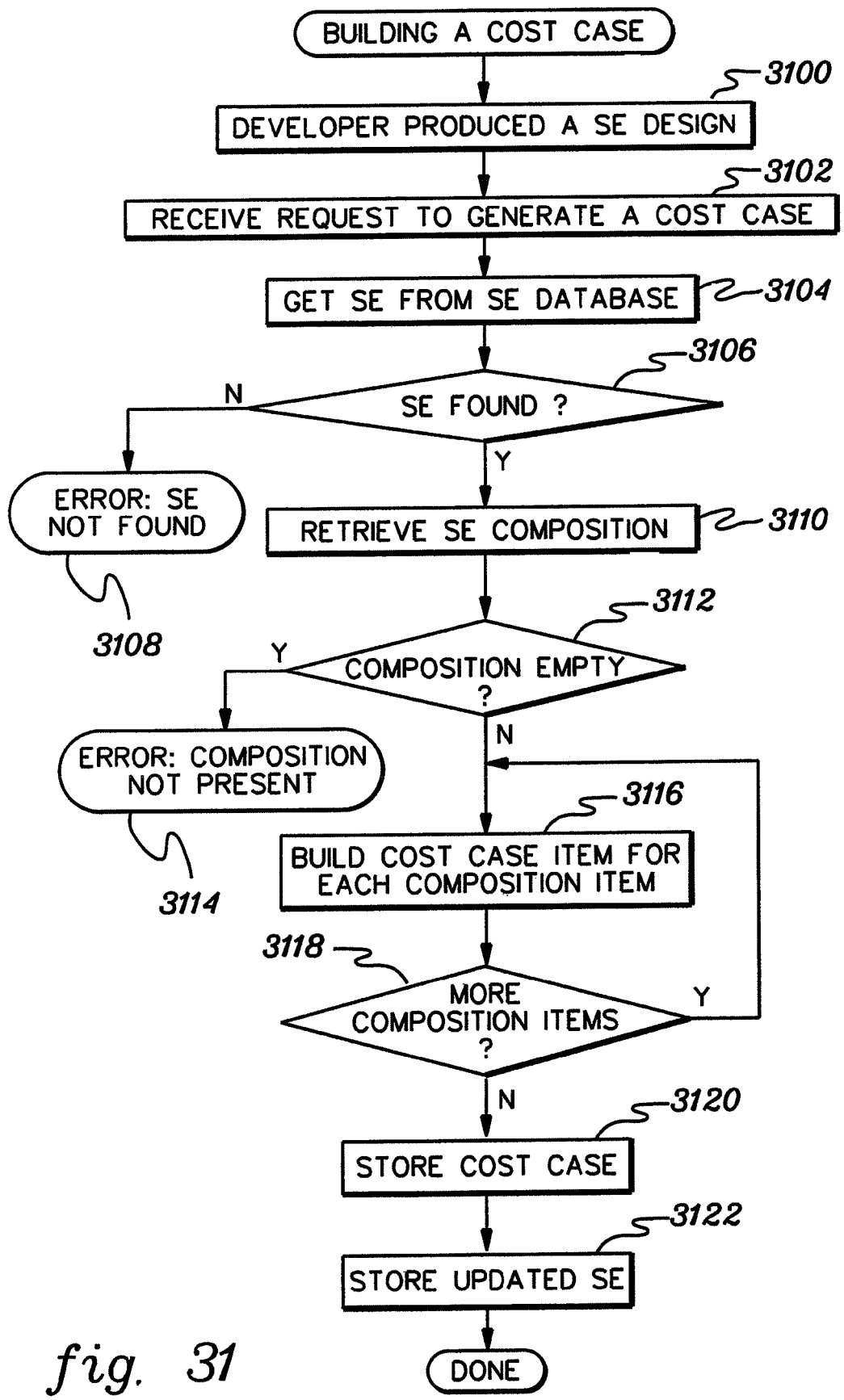
FIG. 31 depicts one embodiment of the logic associated with building a cost case, in accordance with an aspect of the present invention.

One embodiment of the logic associated with building a SE cost case from a SE design is described with reference to FIG. 31. Initially, the developer produces a SE design, STEP 3100. For example, the developer uses the cost case build panel to initiate generation of the cost case. The process receives a request to generate the SE cost case, STEP 3102, and an attempt is made to retrieve the specified SE from the SE database, STEP 3104. If the specified SE is not found, INQUIRY 3106, processing terminates with an error, STEP 3108. Otherwise, the SE composition is retrieved, STEP 3110.

If no composition is present within the SE, INQUIRY 3112, processing terminates with an error, STEP 3114. However, if the composition is not empty, a composition item is selected. For the selected item in the SE composition, a corresponding cost case item is built, as described below, and stored in the list of cost case items, STEP 3116. Thereafter, a determination is made as to whether there are more items to be processed, INQUIRY 3118. If so, processing continues with STEP 3116. However, when the composition items are processed, the cost case is stored in the SE, STEP 3120, and the SE is updated in the SE database, STEP 3122.

Although the above process shows manual initiation of generation of a SE cost case from a SE design, in another embodiment, automatic real-time generation of a cost case from a design being built is employed. In such an embodiment, the same logic is used, except for the absence of manual initiation.

Figure 32A:
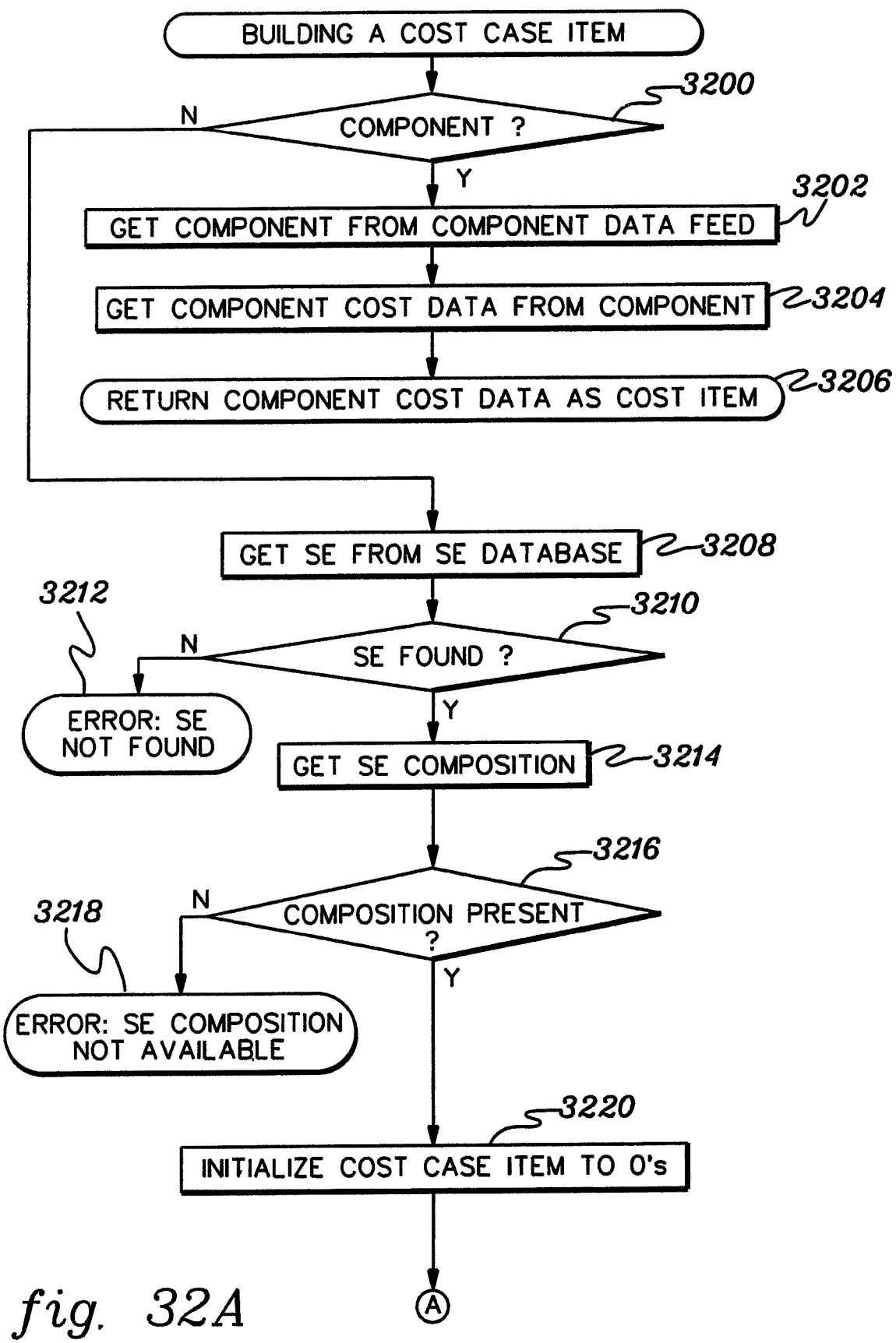
FIGS. 32a-32b depict one embodiment of the logic associated with building a cost case item of a cost case, in accordance with an aspect of the present invention.

One embodiment of the logic associated with building a cost case item is described with reference to FIGS. 32*a*-32*b*. Initially, a determination is made as to whether the composition from which the cost case item is to be built is a composition, INQUIRY 3200. If the composition item is a component, then component information is retrieved from the component data feed, STEP 3202. Additionally, component cost data is retrieved from the component, STEP 3204, and returned as the resulting cost item, STEP 3206.

Returning to INQUIRY 3200, if the composition item from which the cost case item is to be built is a SE, then an attempt is made to retrieve the SE from the SE database, STEP 3208. If the specified SE is not found in the SE database, INQUIRY 3210, processing terminates with an error, STEP 3212. Otherwise, the SE composition is retrieved from the SE, STEP 3214.

Thereafter, a determination is made as to whether the SE composition is empty, INQUIRY 3216. If no composition is present, processing terminates with an error, STEP 3218. Otherwise, a cost case item to be built is initialized to 0's, STEP 3220. For instance, its one time charge (OTC) and recurring cost (RC) values are both set to 0.

Figure 32B:
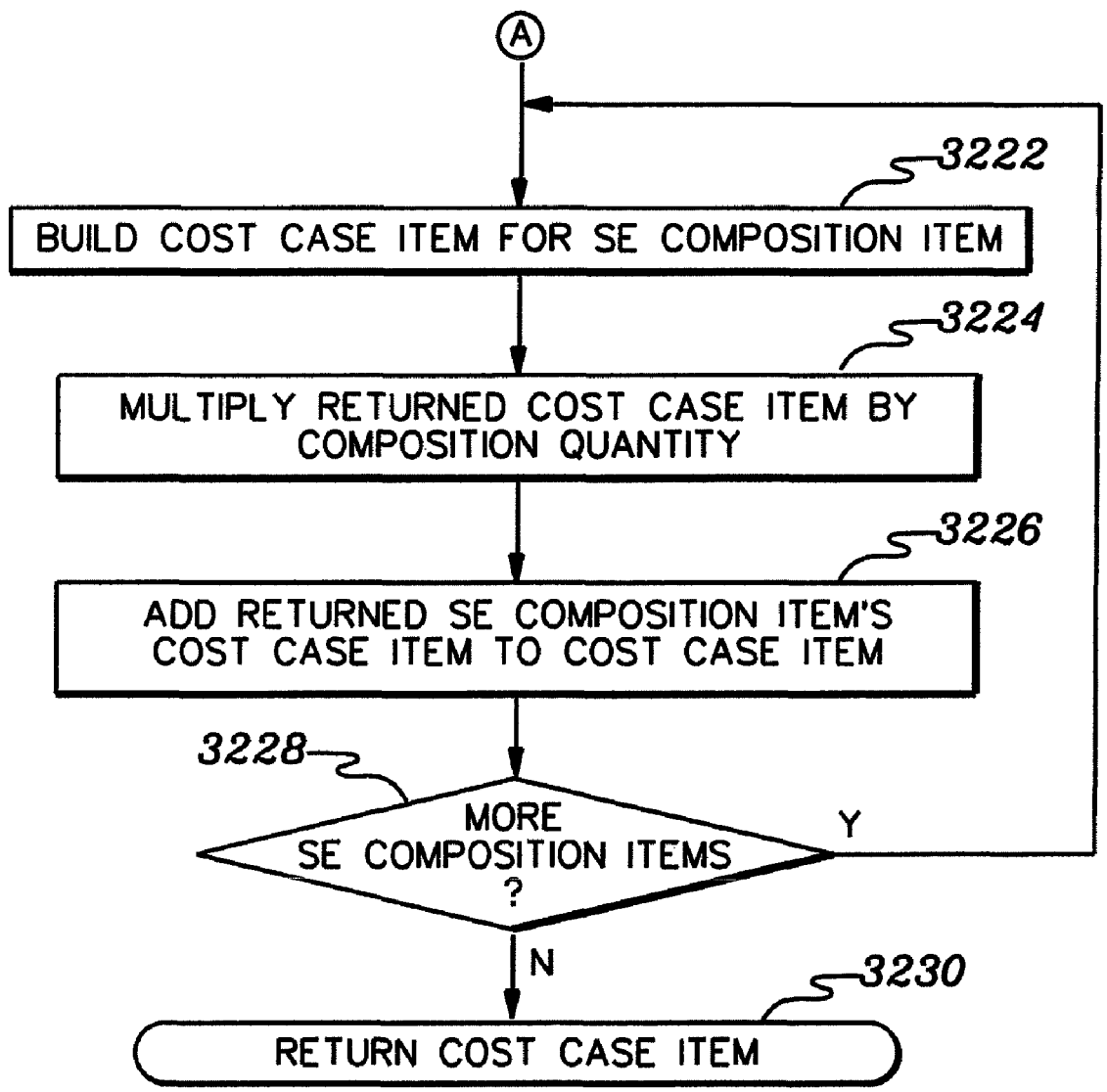

Thereafter, a cost case item for the SE composition item is built (this is a recursive invocation of the process being described), STEP 3222 (FIG. 32*b*). Further, the resulting cost case item is multiplied by the corresponding SE composition item quantity, STEP 3224, and the built cost case item, corresponding to the current SE composition entry, is added to the cost case item this process is building, STEP 3226. When all the SE composition items are processed, the built cost case item is returned, STEP 3230.

Figure 33:
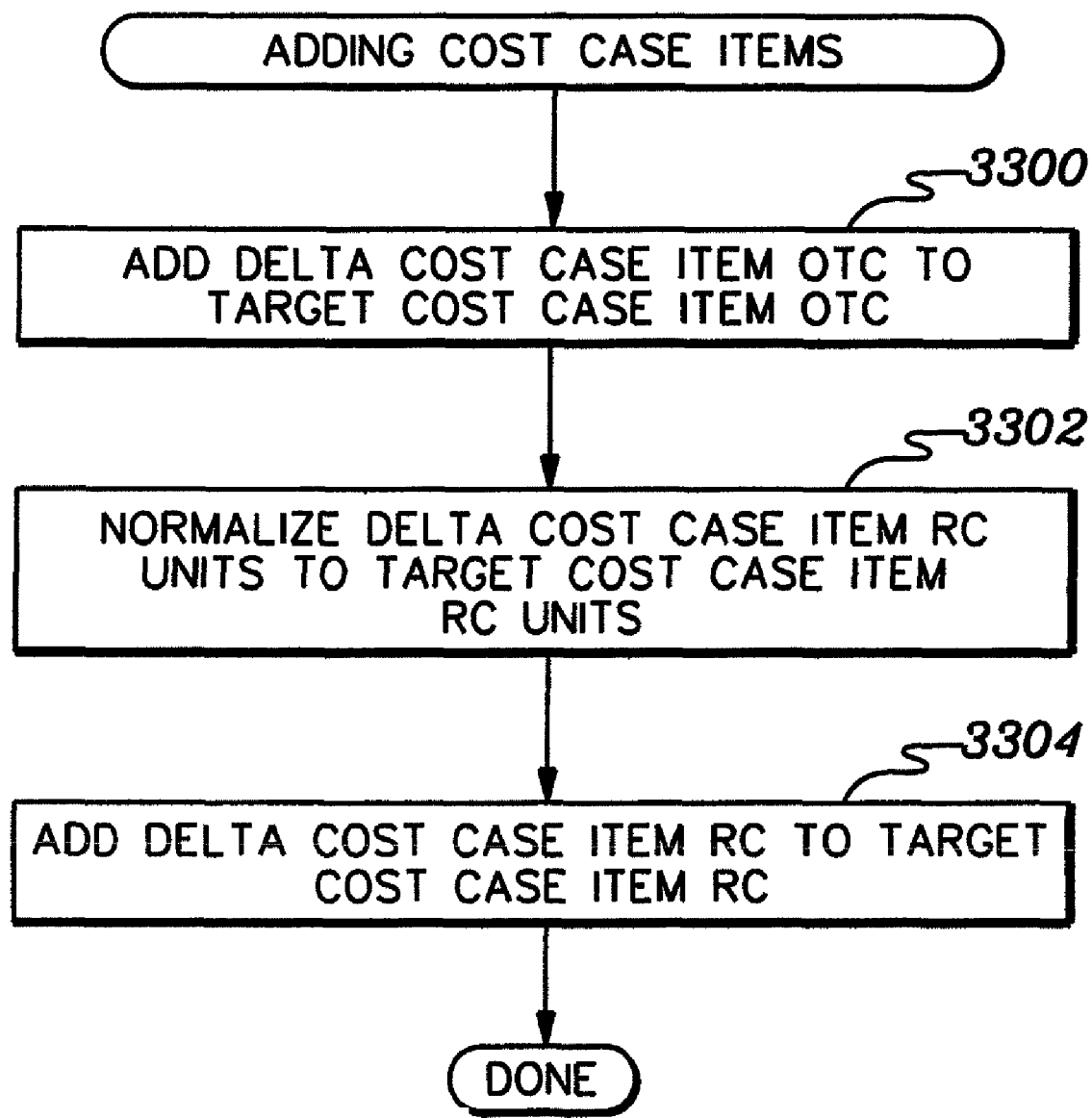
FIG. 33 depicts one embodiment of the logic associated with adding cost case items to a cost case, in accordance with an aspect of the present invention.

In addition to creating a cost case, cost case items can be added. One embodiment of the logic associated with adding a delta cost case item (e.g., additions, changes) to a target cost case item is described with reference to FIG. 33. Initially, the delta cost case item OTC is added to the target cost case item OTC, STEP 3300. Moreover, the delta cost case item RC units are normalized to the units of the target cost case item RC, STEP 3302, and the delta cost case item RC is added to the target cost case item RC, STEP 3304. This concludes processing.

In one embodiment, a target cost case item is to be multiplied by a multiplier. Thus, the target cost case item OTC is multiplied by a multiplier, and then the target cost case item RC is multiplied by the multiplier.

Editing a Cost Case

A cost case is represented visually in a spreadsheet format, and subsequent manual adjustments by the developer are permitted. However, in one embodiment, only addition and deletion of cost case items, or update of their quantities are permitted. A developer is not permitted to manually adjust a cost value for any particular item (these values are computed).

Figure 34:
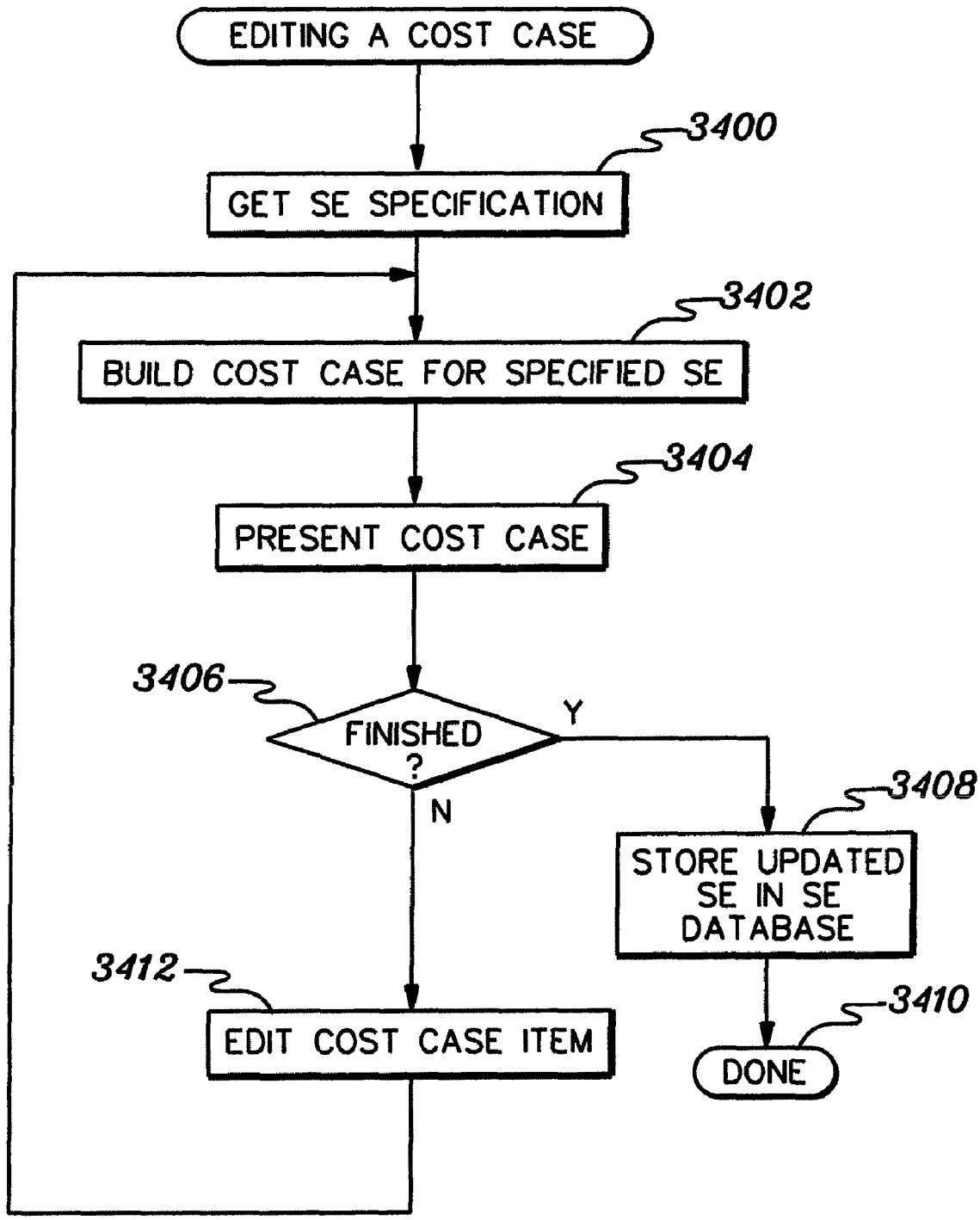
FIG. 34 depicts one embodiment of the logic associated with editing a cost case, in accordance with an aspect of the present invention.

One embodiment of the logic associated with editing a cost case is described with reference to FIG. 34. The developer initiates the cost case edit process from a menu, and specifies the name of the SE for which the cost case edit is being performed. The process obtains the SE name, STEP 3400, and generates a cost case for the specified SE, as described with reference to FIG. 31, STEP 3402. The produced cost case is then presented on the cost case edit screen, where the developer can perform permitted operations on cost case entries, STEP 3404. If the developer indicates completion, INQUIRY 3406, the updated SE is replaced in the SE database, STEP 3408, and processing completes, STEP 3410. Otherwise, the specified change is performed on the selected cost case item, STEP 3412, and the process repeats from rebuilding the cost case and permitting the developer to perform the next operation, STEP 3402.

Figure 35:
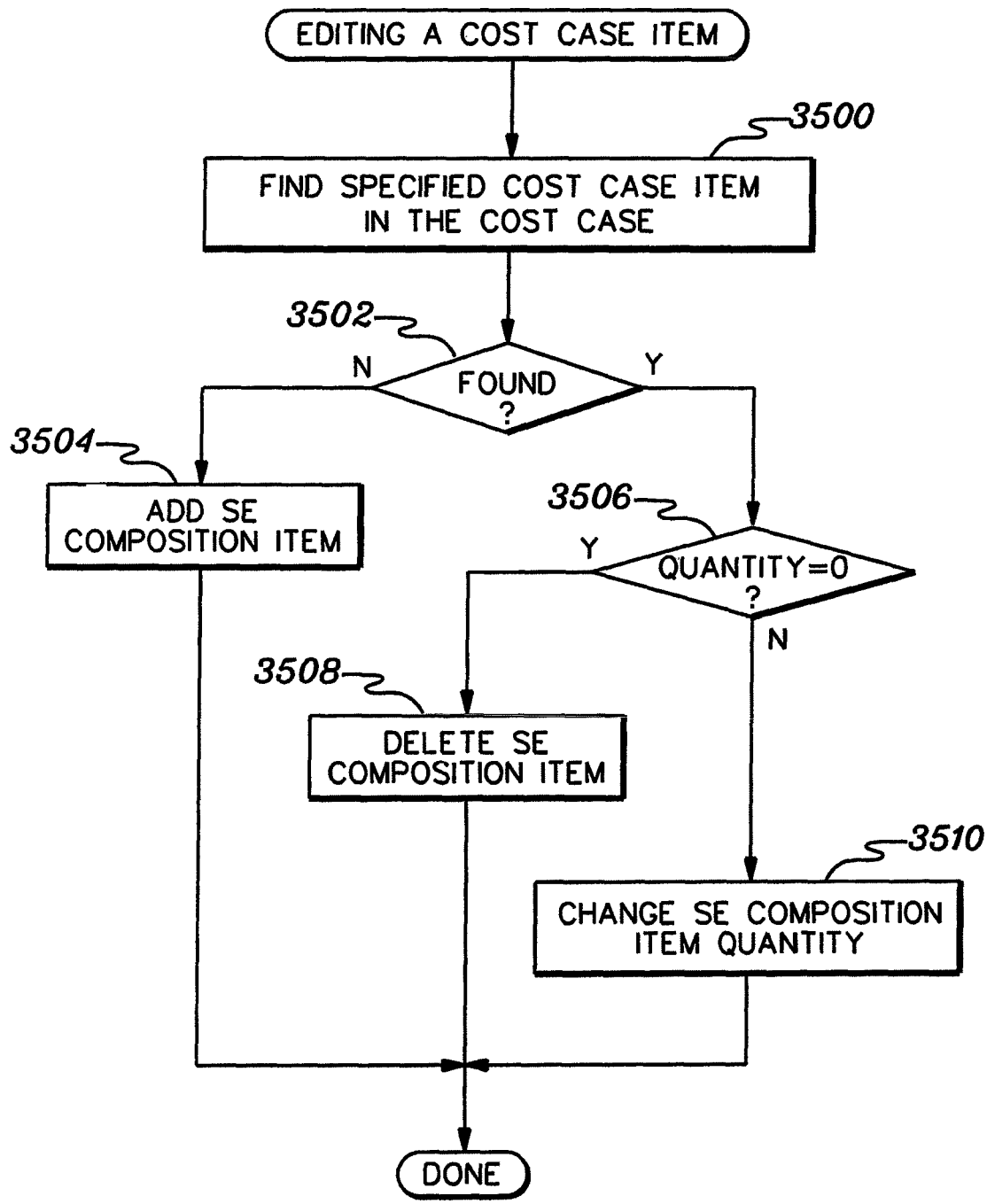
FIG. 35 depicts one embodiment of the logic associated with editing a cost case item, in accordance with an aspect of the present invention.

One embodiment of the logic associated with editing a cost case item is described with reference to FIG. 35. As input, the process receives the specification of the cost case item being edited, and if this is an update to an existing item, the desired new quantity (0 indicates a request for deletion). An attempt is made to find the specified item in the cost case, STEP 3500. If the specified item is not found, INQUIRY 3502, this is a new SE composition item to add, so the process of adding a SE composition item is performed, as described with reference to FIG. 12, STEP 3504. If, however, the specified item is found, then this is a SE composition item quantity update (see FIG. 14). Thus, a determination is made as to whether the new quantity is equal to zero, INQUIRY 3506. Should the quantity be non-zero, then the SE composition item quantity is changed, STEP 3510. However, if the new quantity value is zero, then this is a deletion of a SE composition item (FIG. 13), and the corresponding process is performed, STEP 3508.

Export from Cost Case

The cost case builder permits export from a cost case into a set of specified file formats. The export amounts to representing the items of data, presented on the screen (both simple and computed by the cost case builder), as text fields in the comma-separated text file, with optional subsequent translation into a particular spreadsheet format, e.g., Microsoft Excel or Lotus 1-2-3.

Import Into Cost Case

The cost case builder also permits import from a comma-separated text file into a cost case. Two options are available for import, as examples:

A. Complete to cost case—All fields of a cost case are present in the import file; only cost case item names and their quantities are imported—the rest of the information (OTC and RC values) are ignored and recalculated; and B. Partial to cost case—Only fields permitted for user modification are present in the import file; these fields (names and quantities of cost case items) are imported—and the rest of the information (OTC and RC values) are calculated.

Plan Builder

In one embodiment, two plans are associated with each SE—an overall project plan (including a development plan) and a deployment plan.

The overall project plan includes the full scope of activities, starting from the project inception and ending with SE availability for deployment. It includes the development plan as one of its steps. A plan builder (e.g., development plan builder) assists with the development and offering management in creating and managing development project(s).

Development Plan

A development plan is represented as a series of process phases (e.g., SE design, development, integration test, system test) (see FIG. 2*e*). One of the phases, the development phase is broken down into sub-phases, such as, for instance, unit design (where unit is customization, integration, or instantiation of a placeholder into a real entity), implementation, and test. Each phase is represented as a collection of tasks, and each task includes, for instance, its identifier, task owner, reference to a work item (integration, customization, instantiation of a placeholder), dependencies (on other tasks within this project plan or on completion of a project plan for another SE, included or co-requisite with this SE), projected time to complete the task, projected task execution start date, required skills and resources, and task execution status (not started, in progress, completed).

Building a SE Development Plan

Figure 36A:
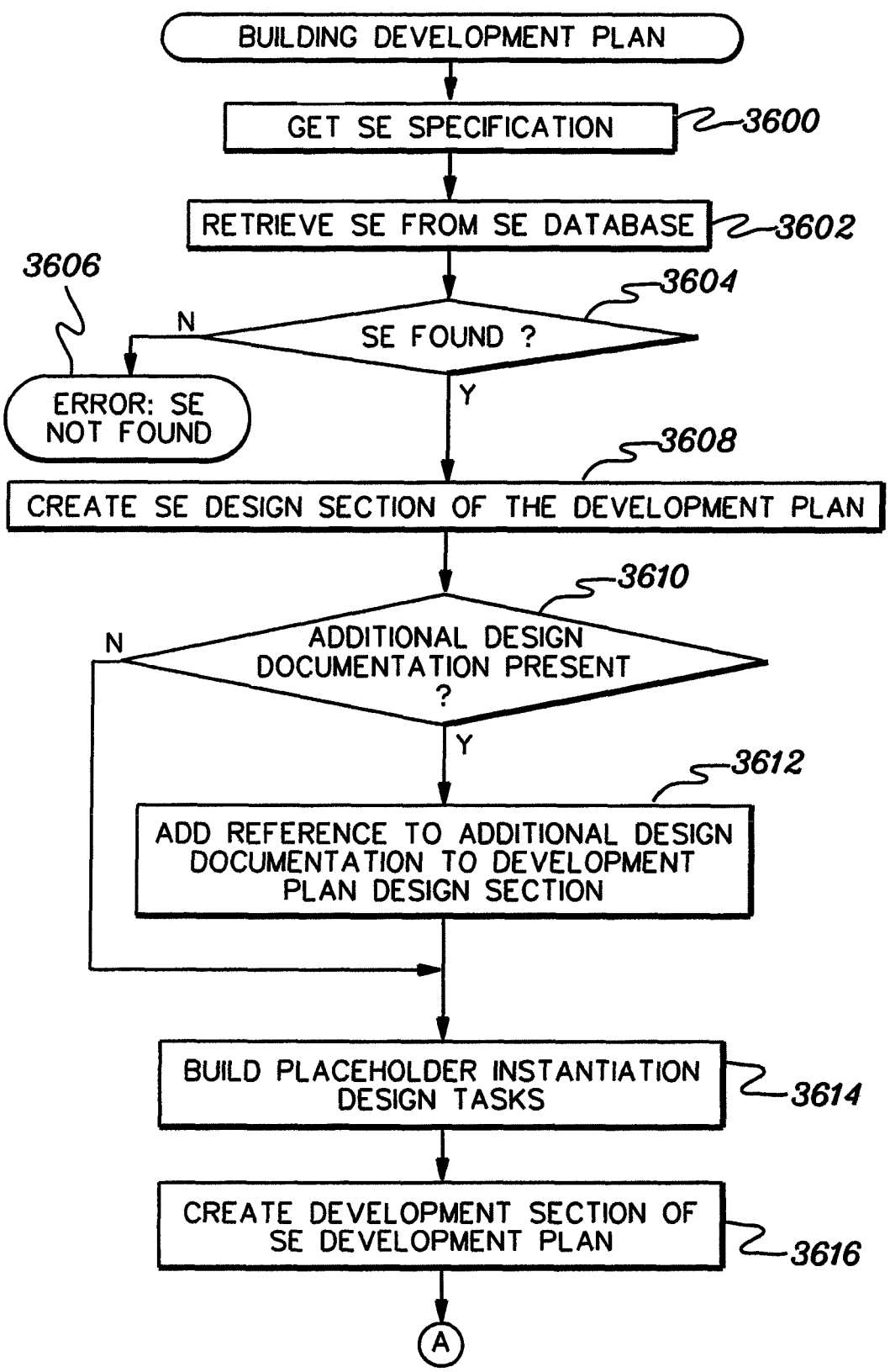
FIGS. 36a-36b depict one embodiment of the logic associated with building a development plan, in accordance with an aspect of the present invention.

One embodiment of the logic associated with building a SE development plan is described with reference to FIGS. 36*a*-

36b. Initially, the user specifies the SE for which the development plan is to be built on the development plan panel, and the process receives the SE specification, STEP 3600. An attempt is made to retrieve the specified SE from the SE database, STEP 3602. If the specified SE is not found in the SE database, INQUIRY 3604, processing terminates with an error, STEP 3606. Otherwise, the SE design section of the SE development plan is created (see FIG. 2e), STEP 3608 (FIG. 36a). If additional design documentation (i.e., any documents in addition to the SE design contained in the SE) is present, INQUIRY 3610, a reference to that documentation is added to the SE design section of the development plan, STEP 3612.

Figure 36B:
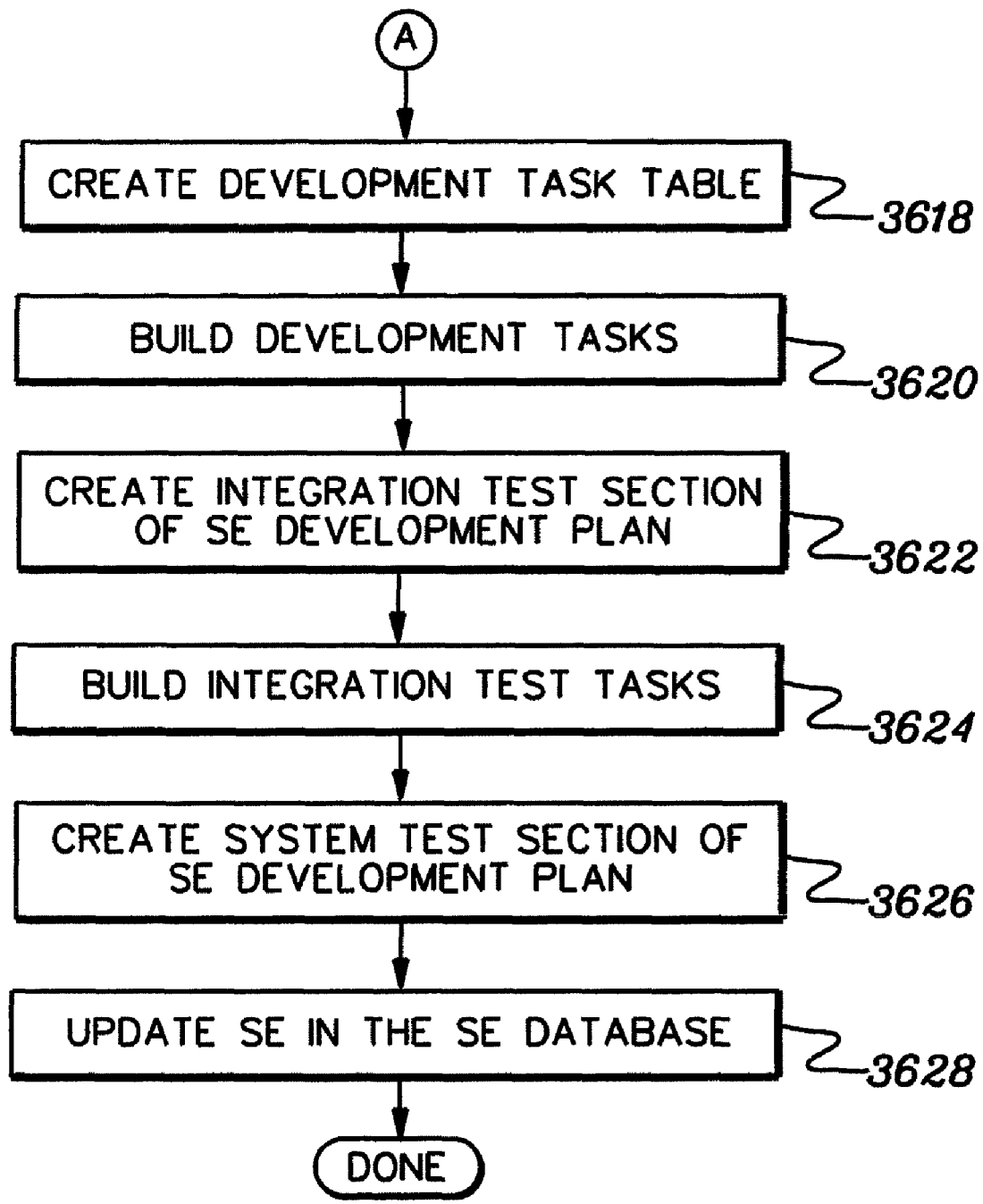

Thereafter, or if additional design documentation is not present, then the process of creating placeholder instantiation design tasks is performed, as described below, STEP 3614. Additionally, the development section of the SE development plan is created, STEP 3616, followed by creation of a development task table (unit design, implement, test versus customization, integration (see FIG. 2f)), STEP 3618 (FIG. 36b), and the building of the development tasks, STEP 3620. The integration test section of the SE development plan is then created, STEP 3622, followed by creation of integration test tasks, STEP 3624. Then, the system test section of the SE development plan is created, STEP 3626, and the SE is updated in the SE database 3628.

Figure 37:
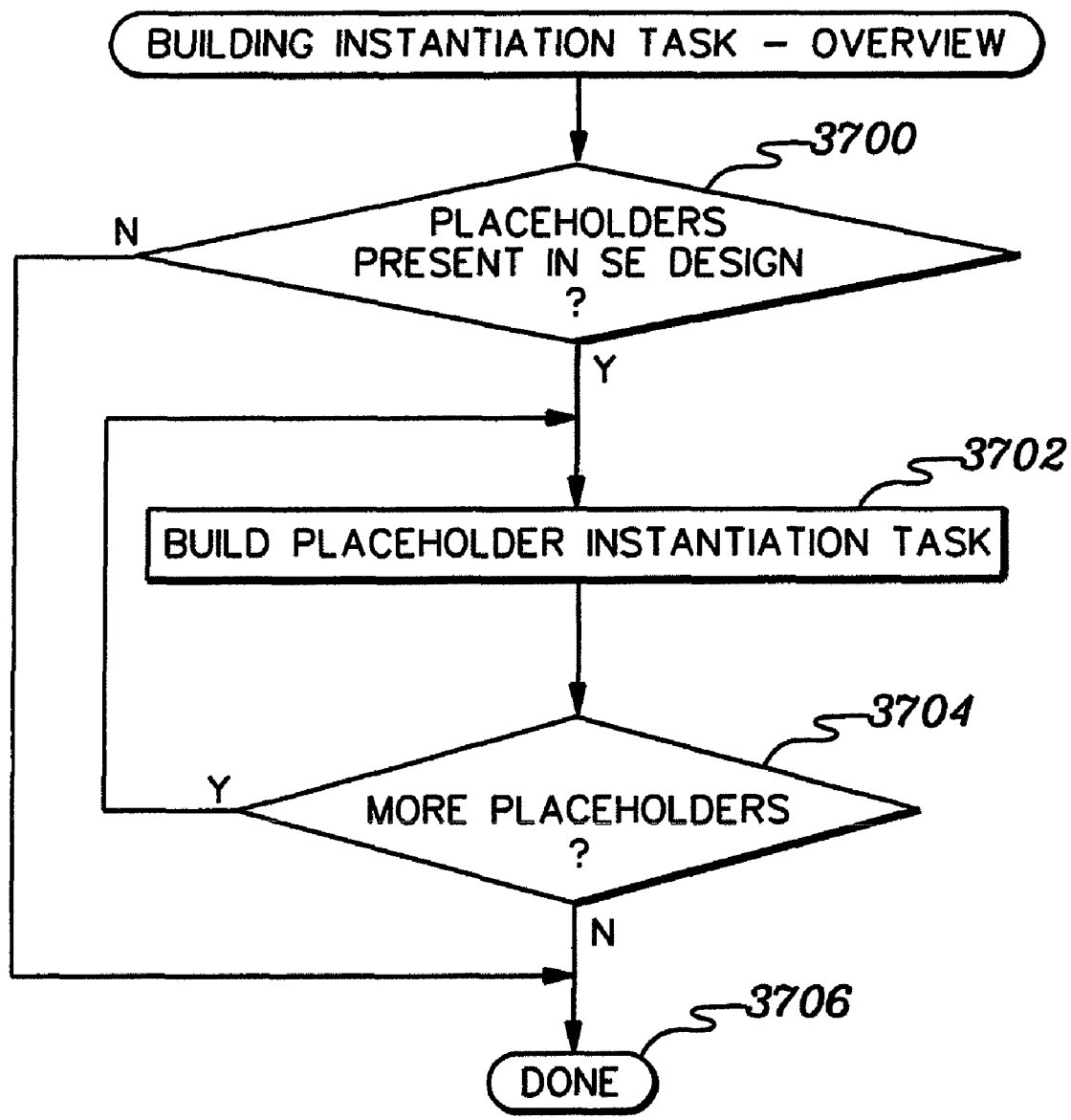
FIG. 37 depicts one embodiment of the logic associated with determining whether design tasks of instantiating placeholders are to be built, in accordance with an aspect of the present invention.

One embodiment of the logic associated with an overview of building design tasks of instantiating placeholders is described with reference to FIG. 37. Initially, a determination is made as to whether any placeholders are present in the SE design, INQUIRY 3700. If one or more placeholders are present in the SE design, then a placeholder is selected, and a placeholder instantiation design task is built for the placeholder, as described below, STEP 3702. Thereafter, a determination is made as to whether there are more placeholders, INQUIRY 3704. If so, processing continues with STEP 3702. Otherwise, when all placeholders are processed, processing completes.

Figure 38:
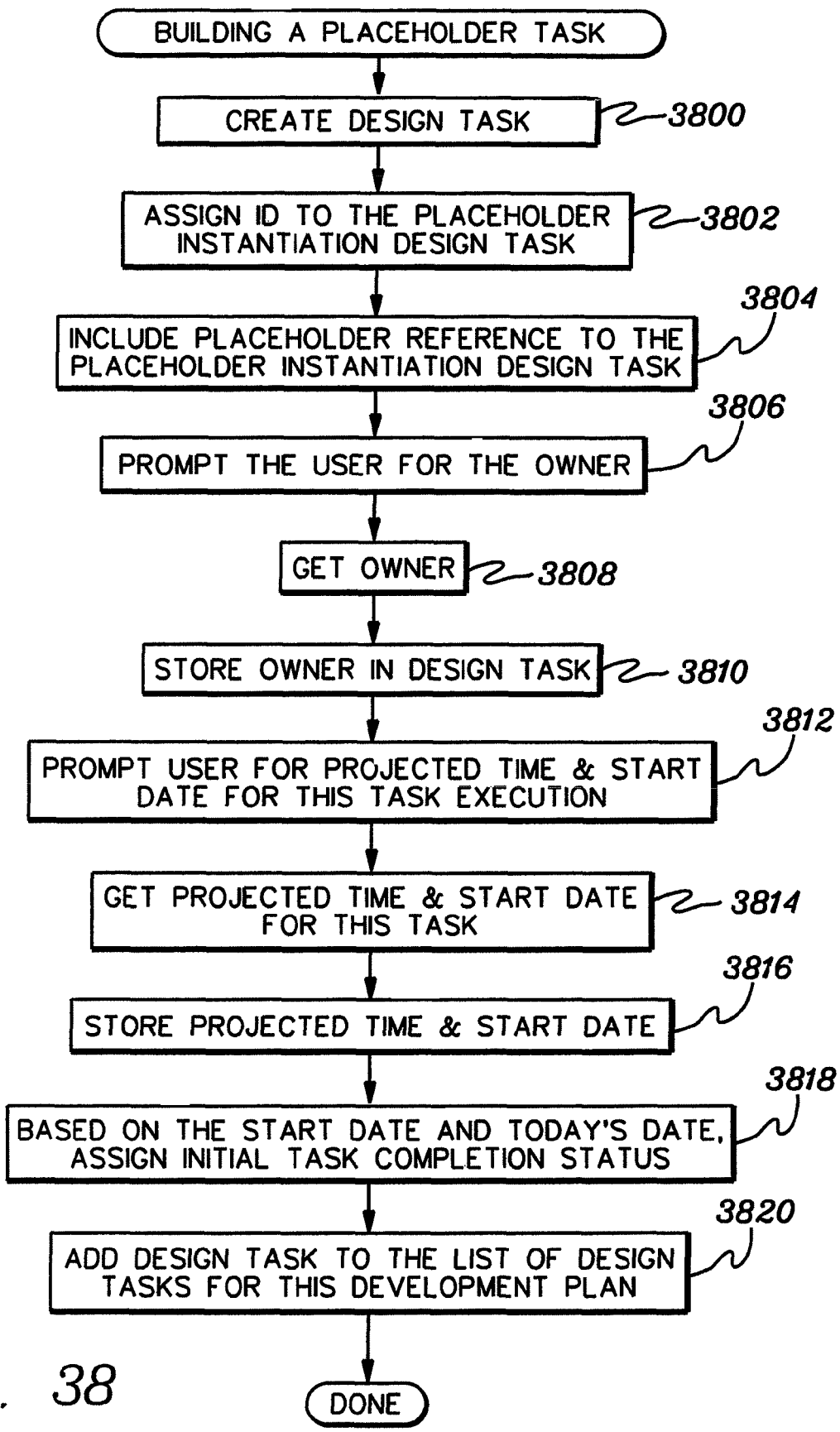
FIG. 38 depicts one embodiment of the logic associated with building placeholder instantiation design tasks, in accordance with an aspect of the present invention.

One embodiment of the logic associated with building a placeholder instantiation design task is described with reference to FIG. 38. Initially, a design task of an instantiating placeholder is created (see FIG. 2e), STEP 3800. Then, an identifier is assigned to the design task, STEP 3802, and a reference to the placeholder is stored in the design task, STEP 3804.

Thereafter, the user is prompted for the owner of the design task, STEP 3806, and the user responds to the design task owner prompt by entering the owner responsible for completion of the design task. The process obtains the entered owner, STEP 3808, and stores the value in the design task, STEP 3810.

The user is then prompted for the projected time and start date for this task, STEP 3812. The user responds to the projected time and start date prompt by entering the requested information, which the process obtains, STEP 3814, and stores in the design task, STEP 3816. Based on the value of the start date, the projected elapsed time, and the current date, the process determines the status of the design task and assigns the determined status to the design task, STEP 3818. The built design task of an instantiating placeholder is then added to the list of design tasks for this SE development plan, STEP 3820.

Figure 39A:
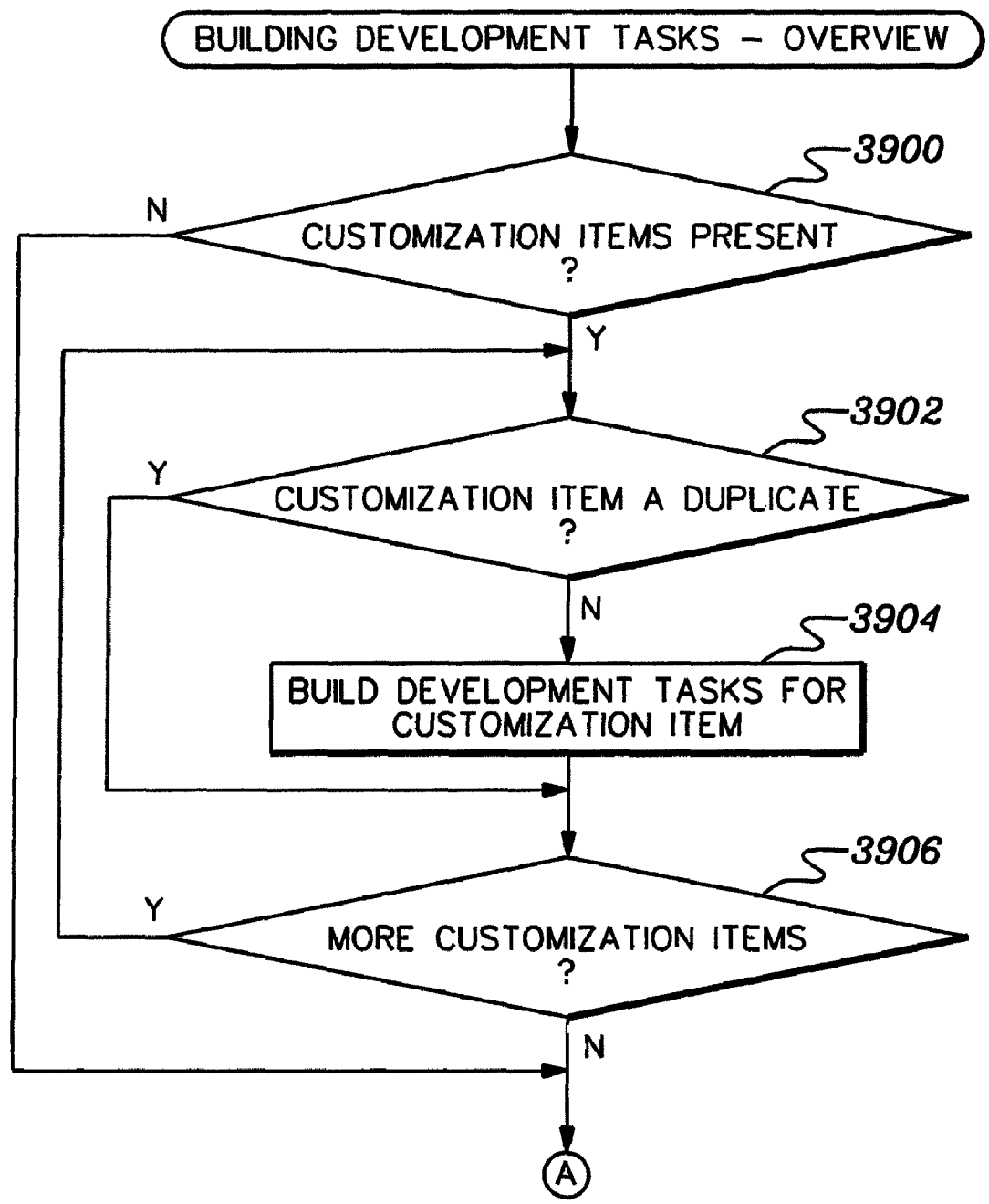
FIGS. 39a-39b depict one embodiment of the logic associated with determining when to build development tasks, in accordance with an aspect of the present invention.

One embodiment of the logic associated with determining when to build development tasks is described with reference to FIGS. 39a-39b. Initially, a determination is made as to whether any customization items are present in the SE design, INQUIRY 3900. If any customization items are present, then a customization item is selected, and a further determination is made as to whether the selected customization item is a duplicate, INQUIRY 3902. This uniqueness check is made, since a design may include multiple identical items for customization or integration, but during development, all of the identical items would translate into a single series of development activities. If the selected item is not a duplicate, then a development task is built for the selected customization item, STEP 3904. Subsequently, or if the item is a duplicate, a determination is made as to whether there are more customization items to be processed, INQUIRY 3906. If so, processing continues with STEP 3902. Otherwise, processing continues, as described herein.

Figure 39B:
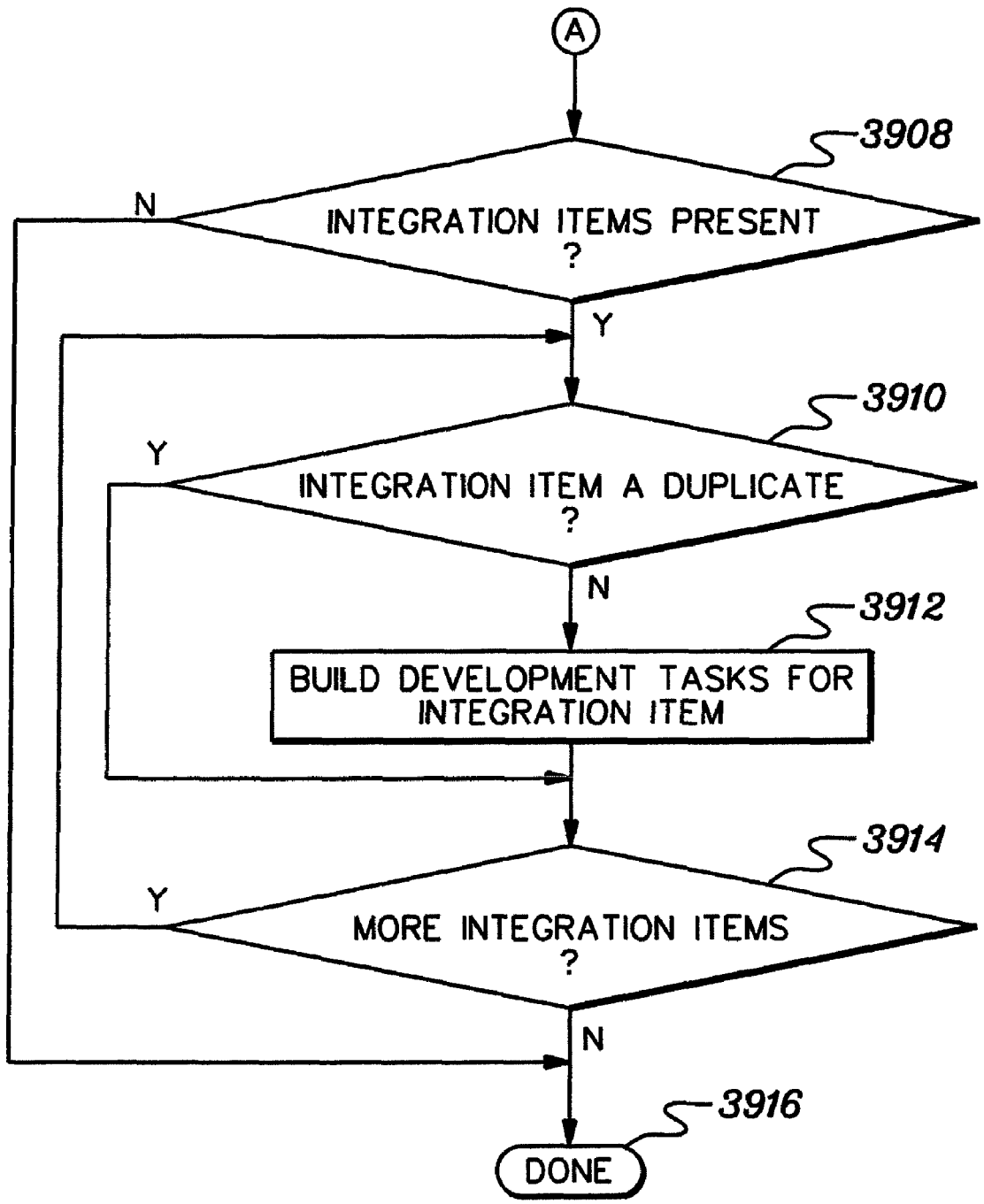

When all the customization items in the SE design are processed, a determination is made as to whether there are integration items present in the SE design, INQUIRY 3908 (FIG. 39b). If any integration items are present, an integration item is selected, and a further determination is made as to whether the selected item is a duplicate, INQUIRY 3910. If the selected item is not a duplicate, then a development task is built for the selected integration item, STEP 3912. Next, or if the item is a duplicate, a check is made to see if there are more items to be processed, INQUIRY 3914. If so, processing continues with INQUIRY 3910. Otherwise, processing is complete, STEP 3916.

One embodiment of the logic associated with an overview of building development tasks for a design item (customization or integration) is described with reference to FIGS. 40a-40d. In one embodiment, three development plan tasks are built for each design item: a unit design task, STEP 4000; a unit implementation task, STEP 4002; and a test task, STEP 4004. This is described in further detail below.

Subsequent to building the tasks, a dependency on the unit design task is added to the unit implementation task, STEP 4006, and a dependency on the unit implementation task is added to the test task, STEP 4008.

Figure 40A:
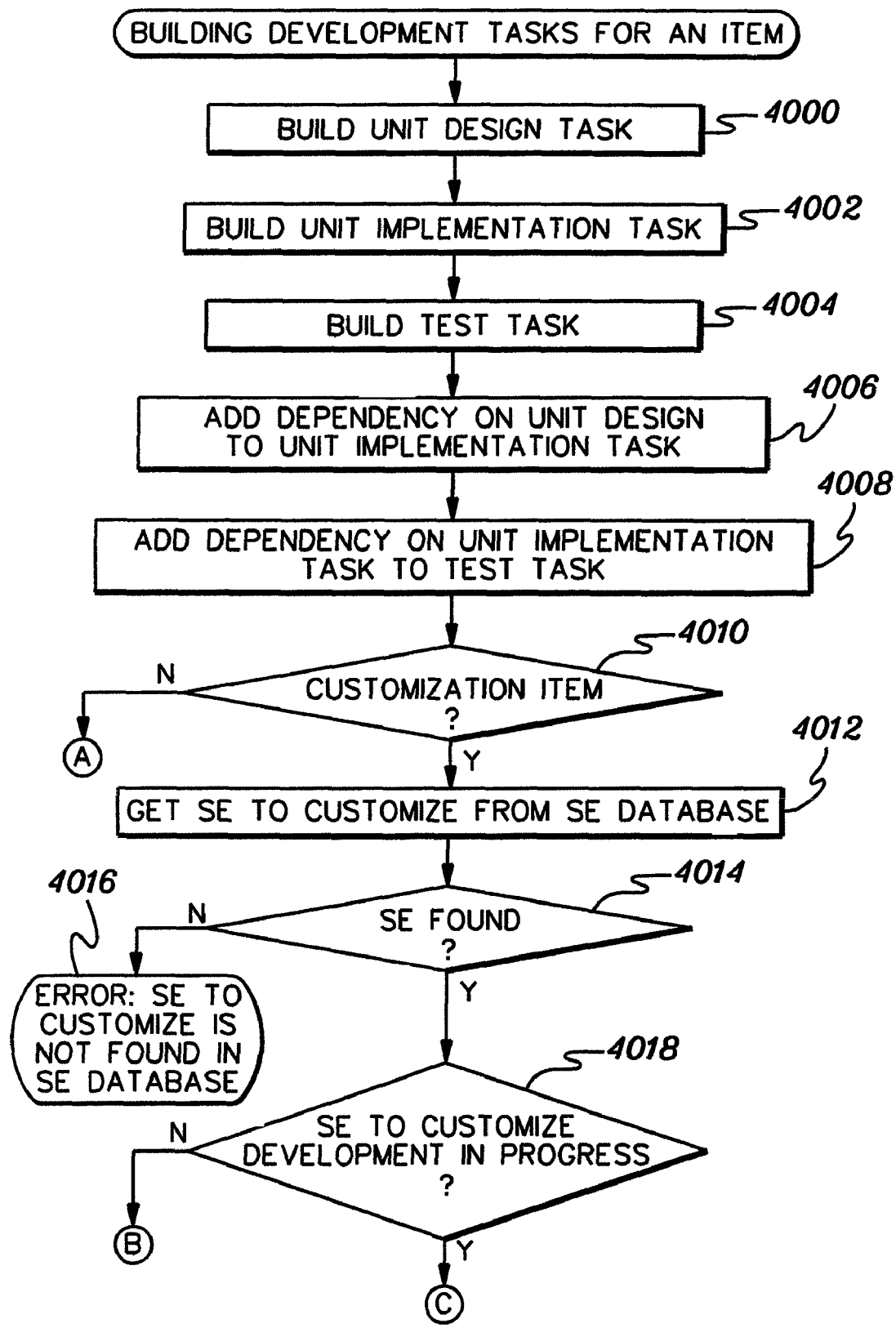
FIGS. 40a-40d depict one embodiment of the logic associated with an overview of building development tasks for an item, in accordance with an aspect of the present invention.
Figure 40B:
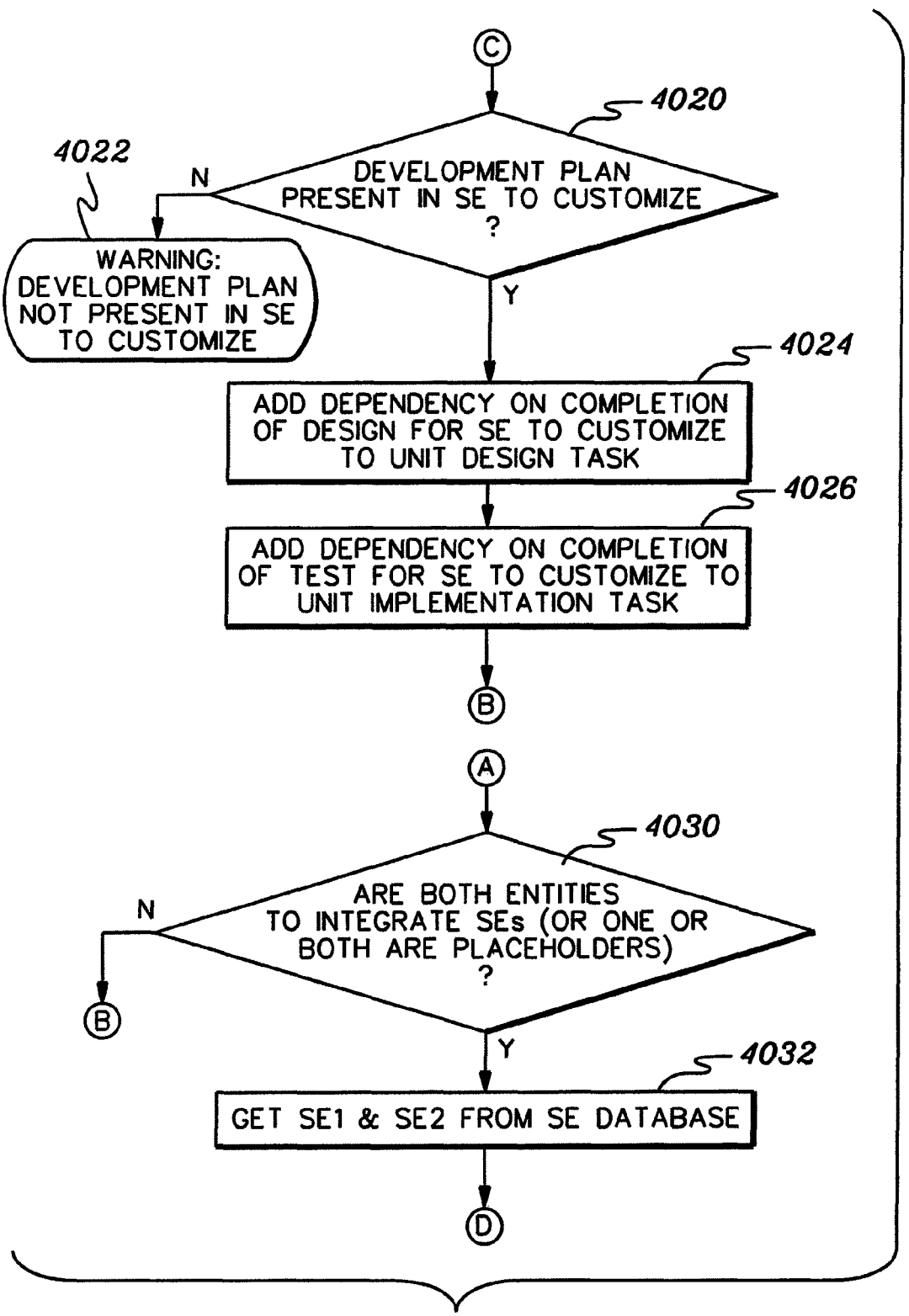
Figure 40C:
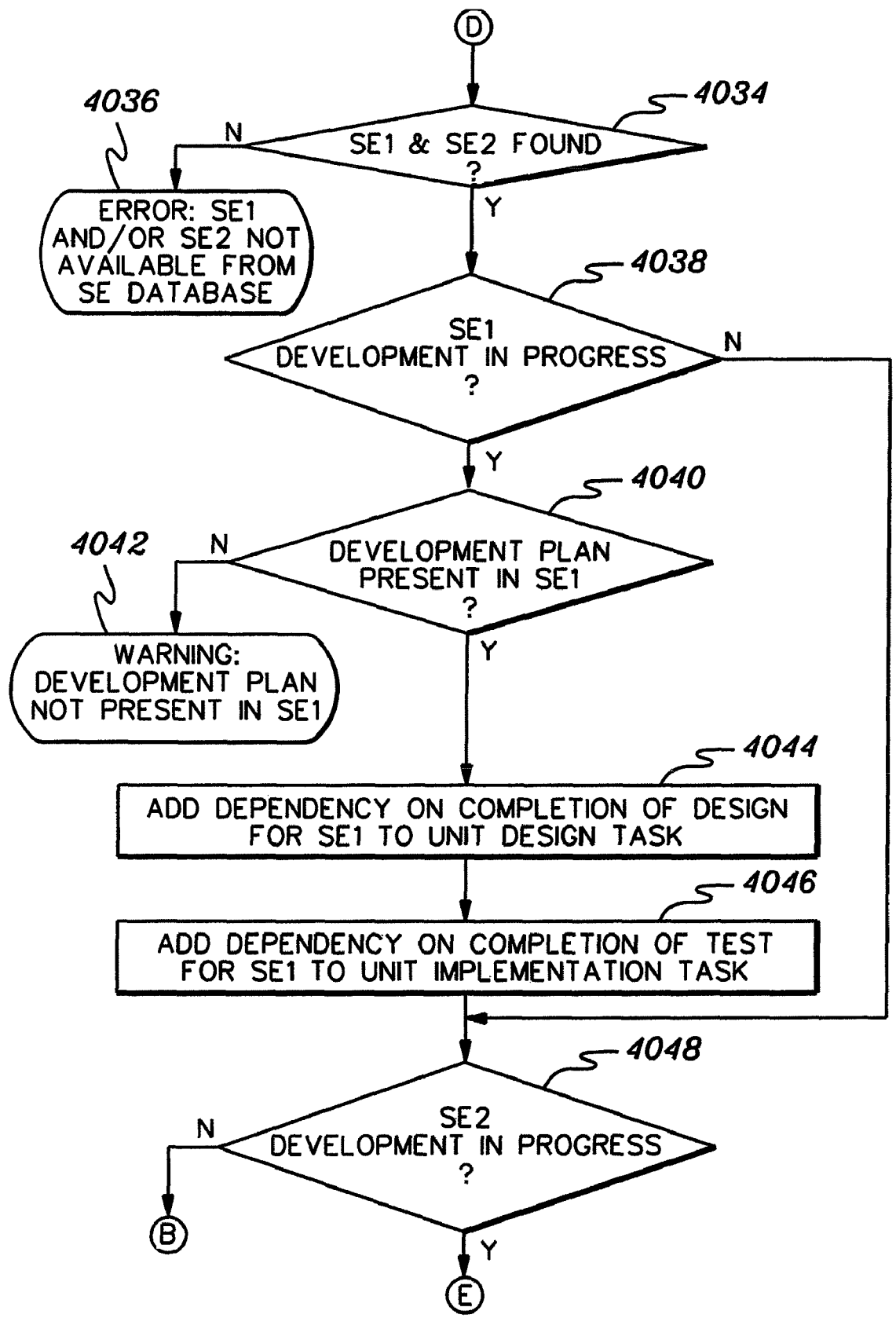

Thereafter, a check is made of the design item, INQUIRY 4010. If the design item is a customization item, then an attempt is made to retrieve the item from the SE database, STEP 4012. If the SE to customize is not found in the SE database, INQUIRY 4014, processing terminates with an error, STEP 4016. Otherwise, if the SE to customize has a "development in progress" indicator set, INQUIRY 4018, a check is performed for the presence of a development plan in the SE to customize, INQUIRY 4020 (FIG. 40b).

Should the development plan not be present in the SE to customize, processing completes with a warning message, STEP 4022. Otherwise, a dependency on completion of design of the SE to customize is added to the unit design task, STEP 4024, and a dependency on completion of development and test of the SE to customize is added to the unit implementation task, STEP 4026. Thereafter, or if the "development in progress" indicator is not set, INQUIRY 4018, processing completes, STEP 4028.

Returning to INQUIRY 4010, if the design item is not a customization item, then it is an integration item. Thus, a check is made to ascertain whether both entities to integrate are SEs (assume one SE is SE1 and the other is SE2), INQUIRY 4030. If either of the entities is not a SE, but instead a placeholder, processing completes and the plan is updated when the placeholders are instantiated, STEP 4028. Otherwise, the entities are both SEs (SE1 and SE2), and an attempt is made to retrieve SE1 and SE2 from the SE database, STEP 4032.

If either SE1 or SE2 is not found in the SE database, INQUIRY 4034 (FIG. 40c), processing terminates with an error, STEP 4036. Otherwise, if SE1 has a "development in progress" indicator set, INQUIRY 4038, a check is performed for the presence of a development plan in the SE1, INQUIRY 4040. If the development plan is not present in SE1, processing completes with a warning message, STEP 4042. Otherwise, a dependency on completion of design of SE1 is added to the unit design task, STEP 4044, and a dependency on completion of development and test of SE1 is added to the unit implementation task, STEP 4046.

Thereafter, or if the "development in progress indicator" is not set, INQUIRY 4038, a determination is made as to whether SE2 has a "development in progress" indicator set, INQUIRY 4048. If not, processing is complete, STEP 4028.

Figure 40D:
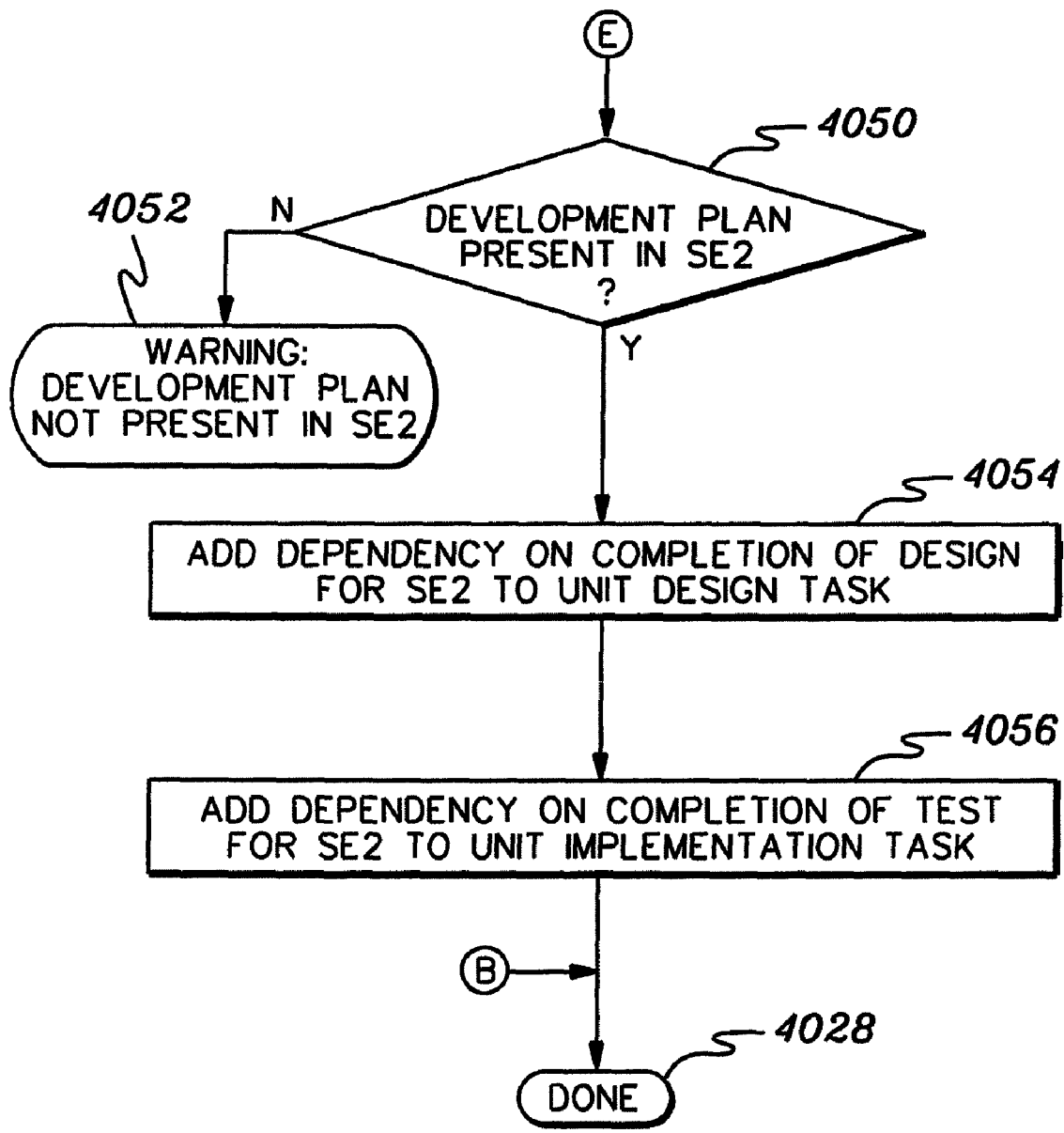

However, if the indicator is set for SE2, a check is performed for the presence of a development plan in SE2, INQUIRY 4050 (FIG. 40*d*). If the development plan is not present in SE2, processing completes with a warning message, STEP 4052. Otherwise, a dependency on completion of design of SE2 is added to the unit design task, STEP 4054, and a dependency on completion of development and test of SE2 is added to the unit implementation task, STEP 4056. This concludes processing, STEP 4028.

Figure 41A:
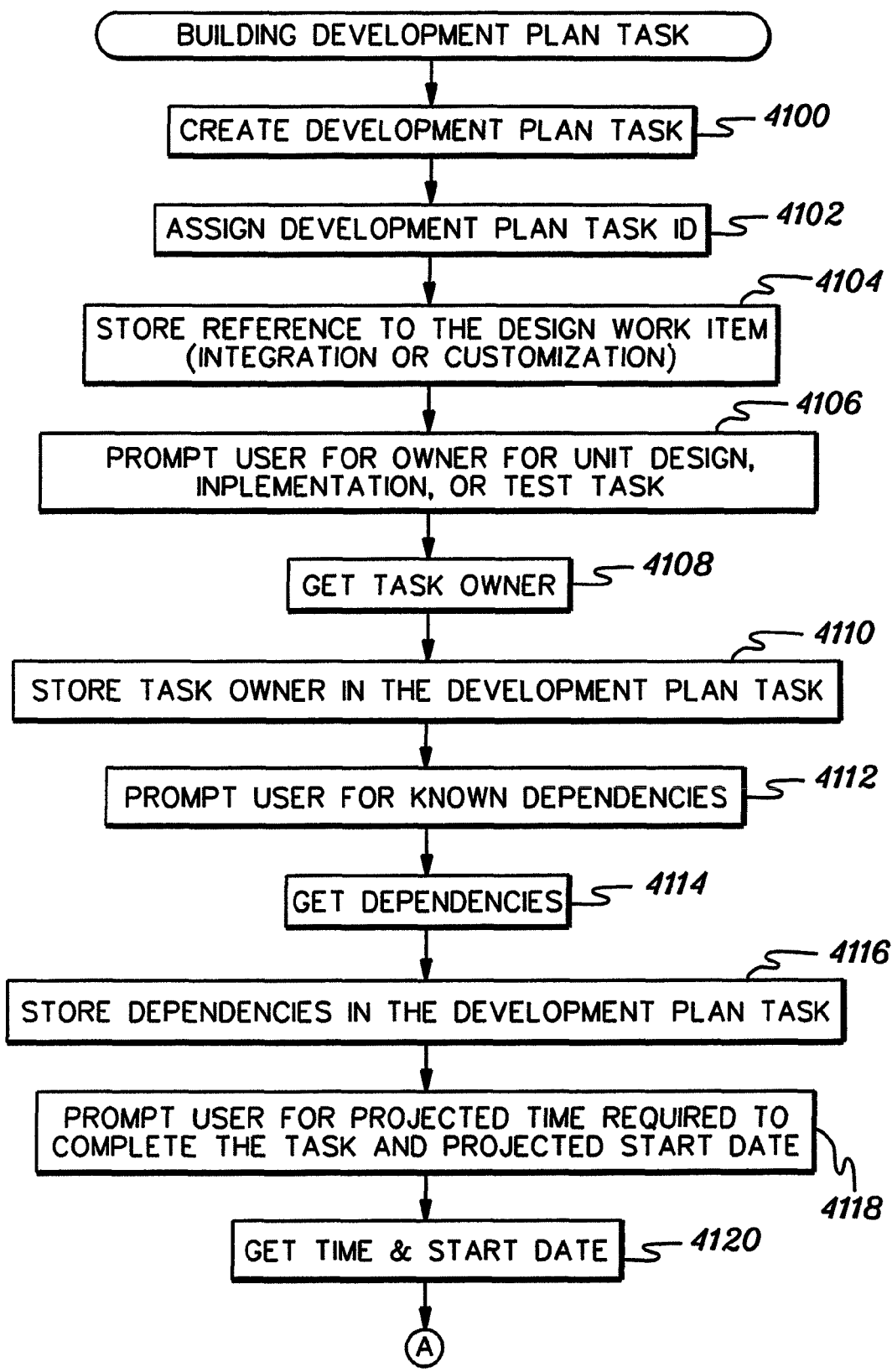
FIGS. 41a-41b depict one embodiment of the logic associated with building a development task, in accordance with an aspect of the present invention.
Figure 41B:
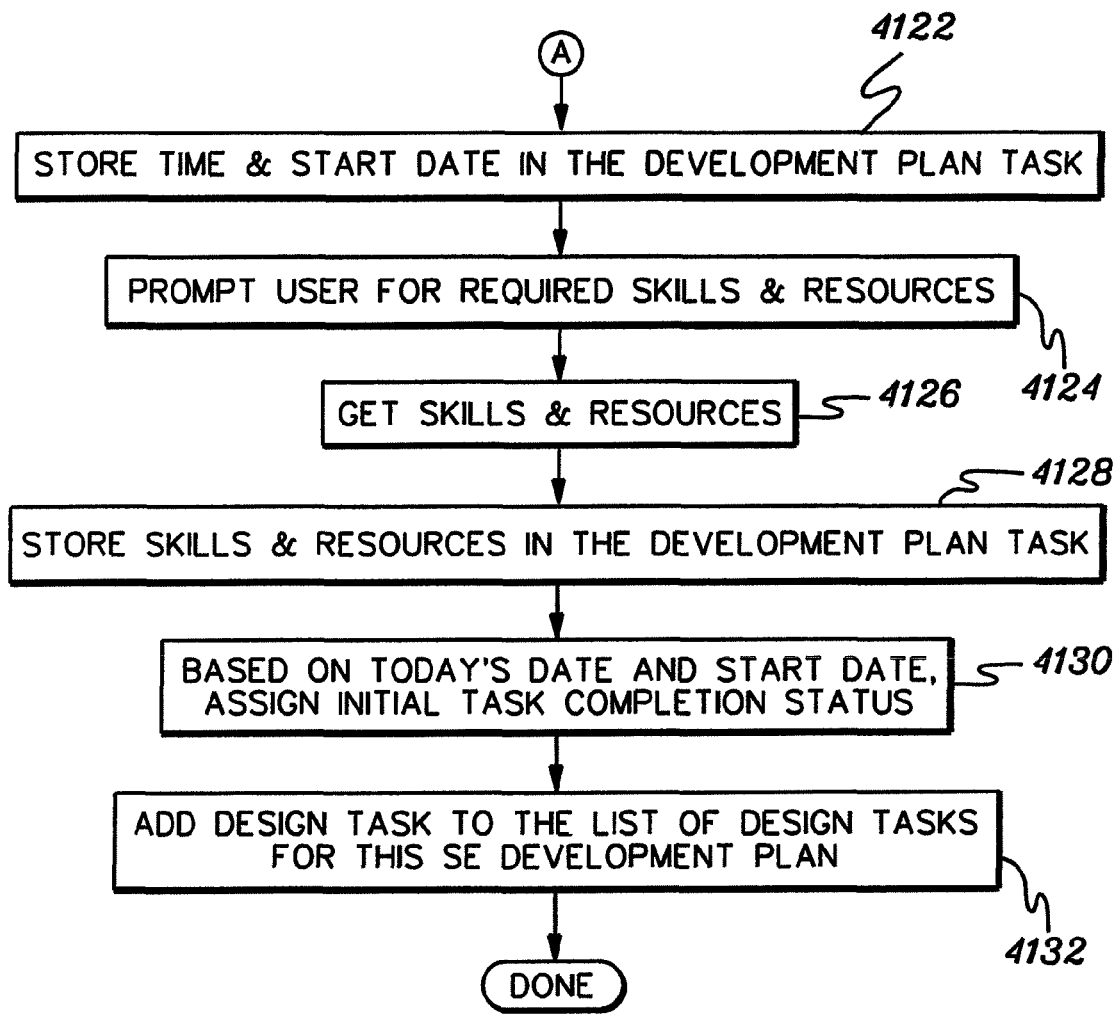

One embodiment of the logic associated with building one of the development plan tasks of FIGS. 40*a*-40*d* is described with reference to FIGS. 41*a*-41*b*. Initially, a development plan task is created, STEP 4100. Then, an identifier is assigned to the plan task, STEP 4102, and a reference to the design item is stored in the development plan task, STEP 4104.

Subsequently, the user is prompted for the owner of this development plan task (with an indication of whether the owner is sought for unit design, unit implementation, or test), STEP 4106. The user responds to the development plan task owner specification prompt by entering the owner responsible for completion of this particular task, and the process obtains the entered owner, STEP 4108, and stores the value in the development plan task, STEP 4110.

The user is then prompted for any known dependencies for this development plan task, STEP 4112. The user responds to the known dependencies prompt by entering any known dependencies for this task, which the process obtains, STEP 4114, and stores in the development plan task, STEP 4116.

The user is then prompted for the projected time and start date for this development plan task, STEP 4118. The user responds to the projected time and start date prompt by entering the requested information, which the process obtains, STEP 4120, and stores in the design task, STEP 4122 (FIG. 41*b*).

Finally, the user is prompted for skills and resources required to perform this development plan task, STEP 4124. The user responds to the required skills and resources prompt by entering the requested information, which the process obtains, STEP 4126, and stores in the development plan task, STEP 4128. Based on the value of the start date, the projected elapsed time, and the current date, the process determines the status of this development plan task, and assigns the determined status to the development plan task, STEP 4130. The built development plan task is then added to the development plan for this SE, STEP 4132.

In addition to the above, integration and customization test plan tasks are built. In one embodiment, in order to test customization or integration, the customization or integration activity to test is to be actually performed. Therefore, the customization and integration test plan includes testing tasks, as well as unit design and implementation tasks.

Figure 42A:
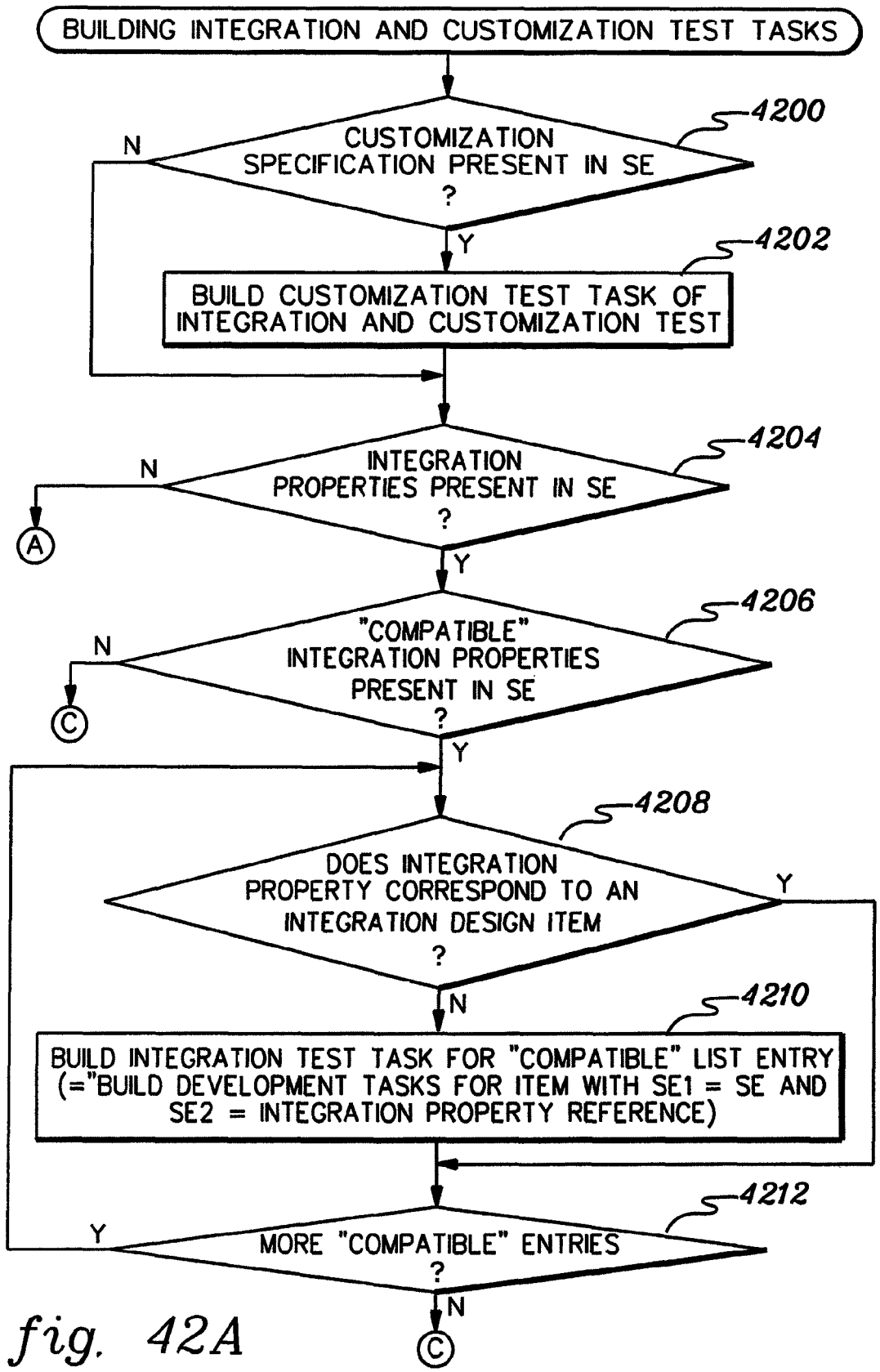
FIGS. 42a-42b depict one embodiment of the logic associated with building integration and customization test tasks, in accordance with an aspect of the present invention.
Figure 42B:
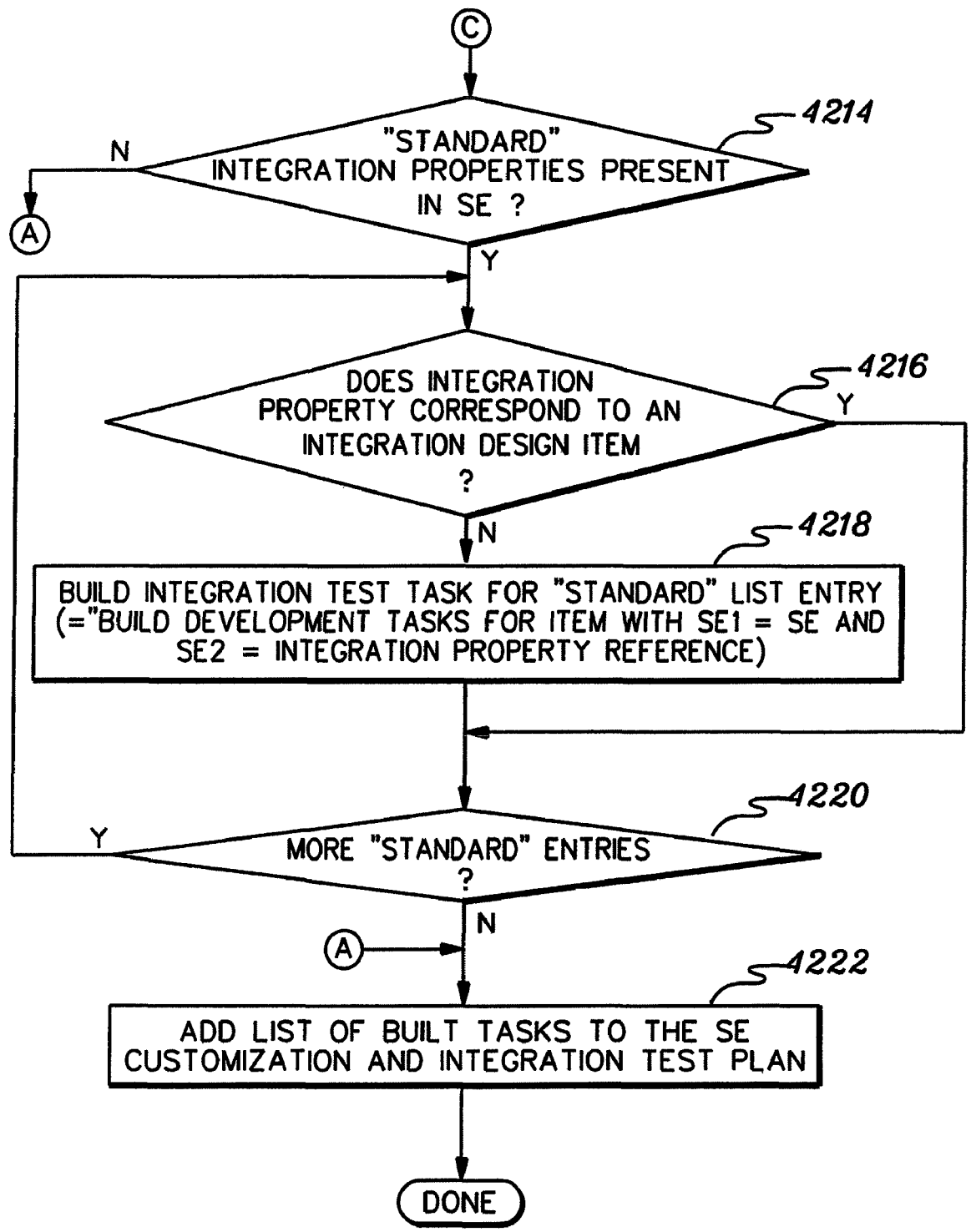

One embodiment of the logic associated with building integration and customization test plan tasks is described with reference to FIGS. 42*a*-42*b*. Initially, a determination is made as to whether a customization specification is present in the SE, INQUIRY 4200. If the SE includes a customization specification, a customization test task for this SE is created, STEP 4202 (i.e., build development tasks for item with SE to customize). Thereafter, or if the customization specification is not present in the SE, a further determination is made as to whether the SE includes integration properties, INQUIRY 4204.

If the SE includes integration properties, then a further determination is made as to whether the integration properties include any "compatible" entries, INQUIRY 4206. Should the integration properties include one or more compatible entries, a compatible entry is selected, and a determination is made as to whether the integration property of the selected entry corresponds to an integration item in the SE design, INQUIRY 4208. If not (i.e., the integration test tasks would not be a duplicate of a set of development tasks already built for an integration design item), then the process builds integration test tasks for the entry, STEP 4210 (i.e., build development tasks for item with SE1=SE, and SE2=integration property reference).

Next, or if the integration property corresponds to an integration design item, a check is made as to whether more entries exist, INQUIRY 4212. If so, processing continues with INQUIRY 4208. Otherwise, or if there are no compatible integration properties present in the SE, a determination is made as to whether there are any standard integration properties present in the SE, INQUIRY 4214 (FIG. 42*b*). If the SE integration properties include one or more "standard" entries, and if the integration property does not correspond to an integration item in the SE design, INQUIRY 4216, the process builds integration test tasks for each entry in the "standard" list of integration properties, STEP 4218, (i.e., build development tasks for item with SE1=SE2, and SE2=integration property reference), until the list of "standard" entries is exhausted, INQUIRY 4220. Upon completion of creation of integration and customization plan tasks, the built collection of plan tasks is added to the integration and customization section of the SE test plan, STEP 4222.

Returning to INQUIRIES 4204 and 4214, if there are no integration properties present in the SE or no standard integration properties present, processing continues with STEP 4222.

Figure 43:
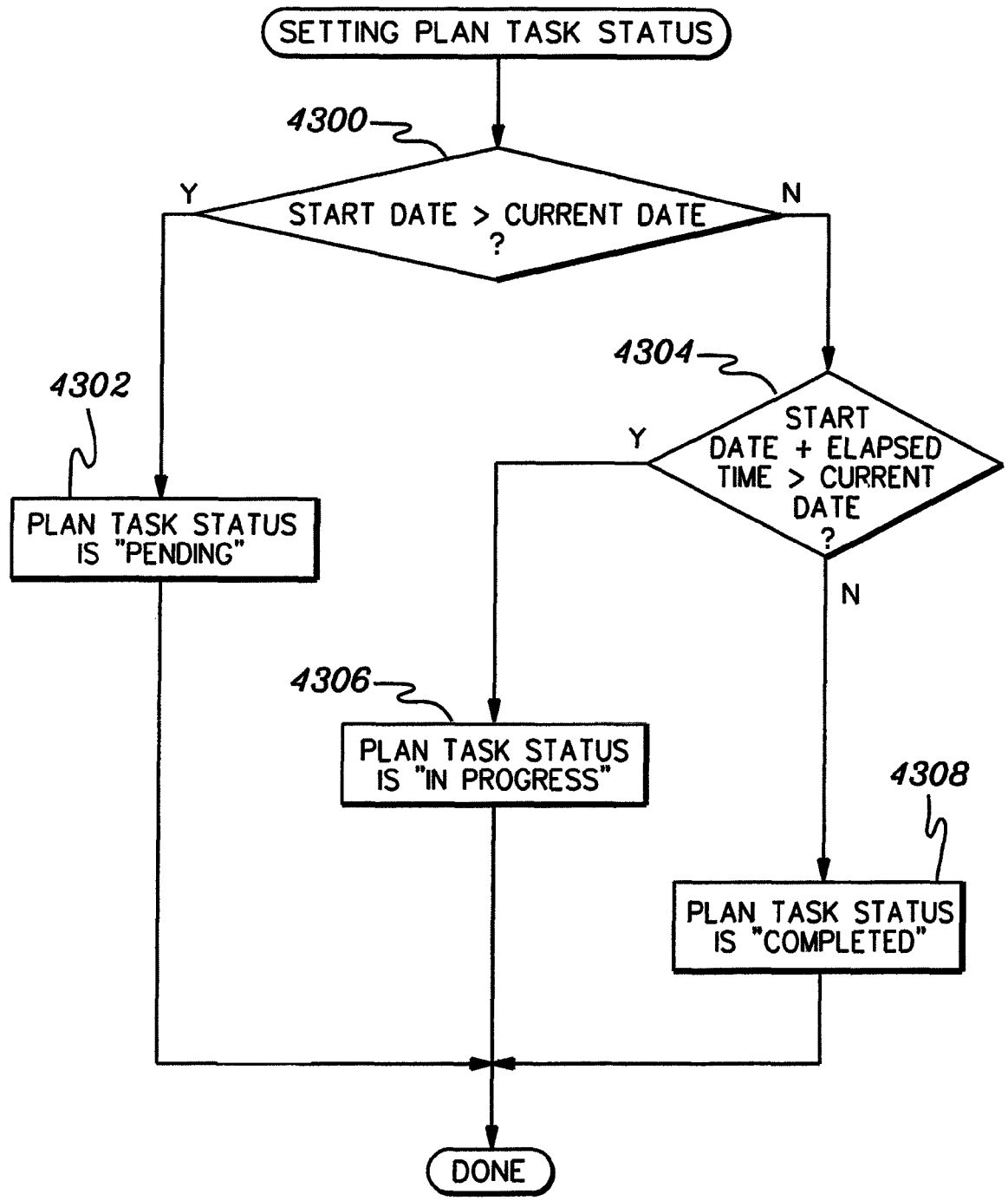
FIG. 43 depicts one embodiment of the logic associated with setting plan task status, in accordance with an aspect of the present invention.

The status of a plan task can be determined using a number of parameters. One embodiment of the logic associated with determining the status of a plan task based on the projected start date for the task, the projected task duration, and the current date is described with reference to FIG. 43. Initially, a determination is made as to whether the start date is greater than the current date, INQUIRY 4300. If the start date is later than the current date, the plan task status is "pending", STEP 4302. However, if the start date is less than or equal to the current date, then a further check is made as to whether the date obtained by applying the projected task duration is greater than the current date, INQUIRY 4304. If so, the plan task status is "in progress", STEP 4306. Otherwise, the plan task status is "completed", STEP 4308.

Building Consolidated Development Plan for Multiple SEs

In the cases when multiple SEs are being developed contemporaneously, it is possible that multiple dependent or independent development efforts would include identical customization or integration activities (intersects). Should an intersect be detected, a decision is made as to which one of the two or more development efforts progressing contemporaneously should retain the task, and which should exclude the task. This decision is based, for instance, on the projected completion date for the task. For example, the development effort with the earliest completion date retains the task with a reference to other development efforts dependent on this task's completion. Further, other development efforts include a dependency on completion of the task by the development effort retaining the task.

Figure 44:
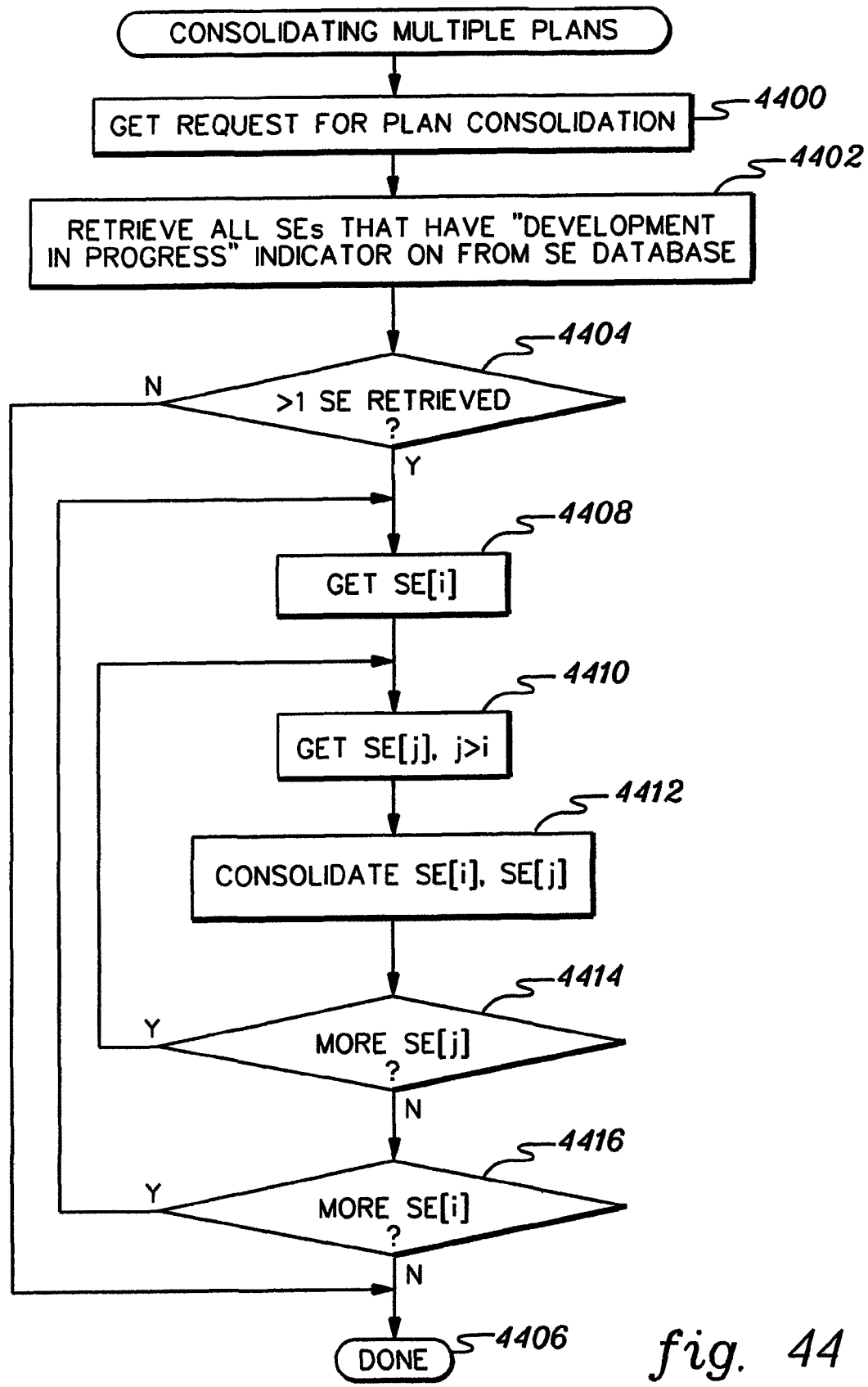
FIG. 44 depicts one embodiment of the logic associated with an overview of consolidating multiple plans, in accordance with an aspect of the present invention.

One embodiment of the logic associated with consolidating multiple SE development plans is described with reference to FIG. 44. Initially, the user enters a request to consolidate SE development plans from a SE development plan panel, and the process obtains the request for plan consolidation, STEP 4400. Then, the process retrieves the SEs that have a "development in progress" indicator set from the SE database, STEP 4402. If the number of SEs retrieved is 0 or 1, INQUIRY 4404, then there is nothing to consolidate and processing completes, STEP 4406. Otherwise, a nested loop is performed, with SE[i] being taken sequentially from the list of all retrieved SEs (1 ... N), STEPS 4408, 4416, and SE[j] being taken sequentially from the same list, but subset (i+1, N), STEPS 4410, 4414. That is, the iteration for j's repeats for each next i (i.e., all possible SE pairs are processed). Each pair of SEs (SE[i] and SE[j]) undergo the process of SE development plan consolidation, STEP 4412.

Figure 45A:
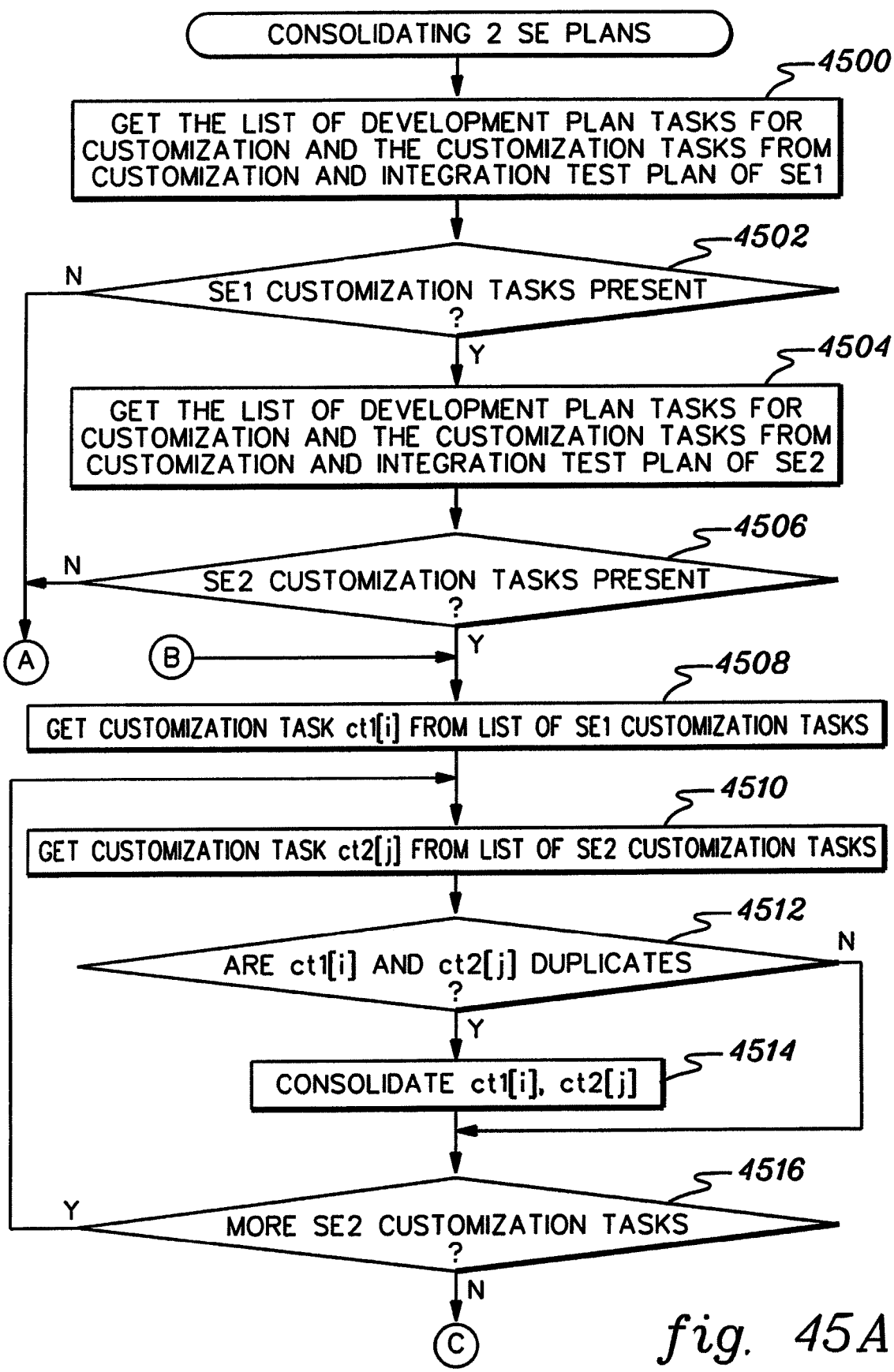
FIGS. 45a-45c depict one embodiment of the logic associated with consolidating two service element plans, in accordance with an aspect of the present invention.
Figure 45B:
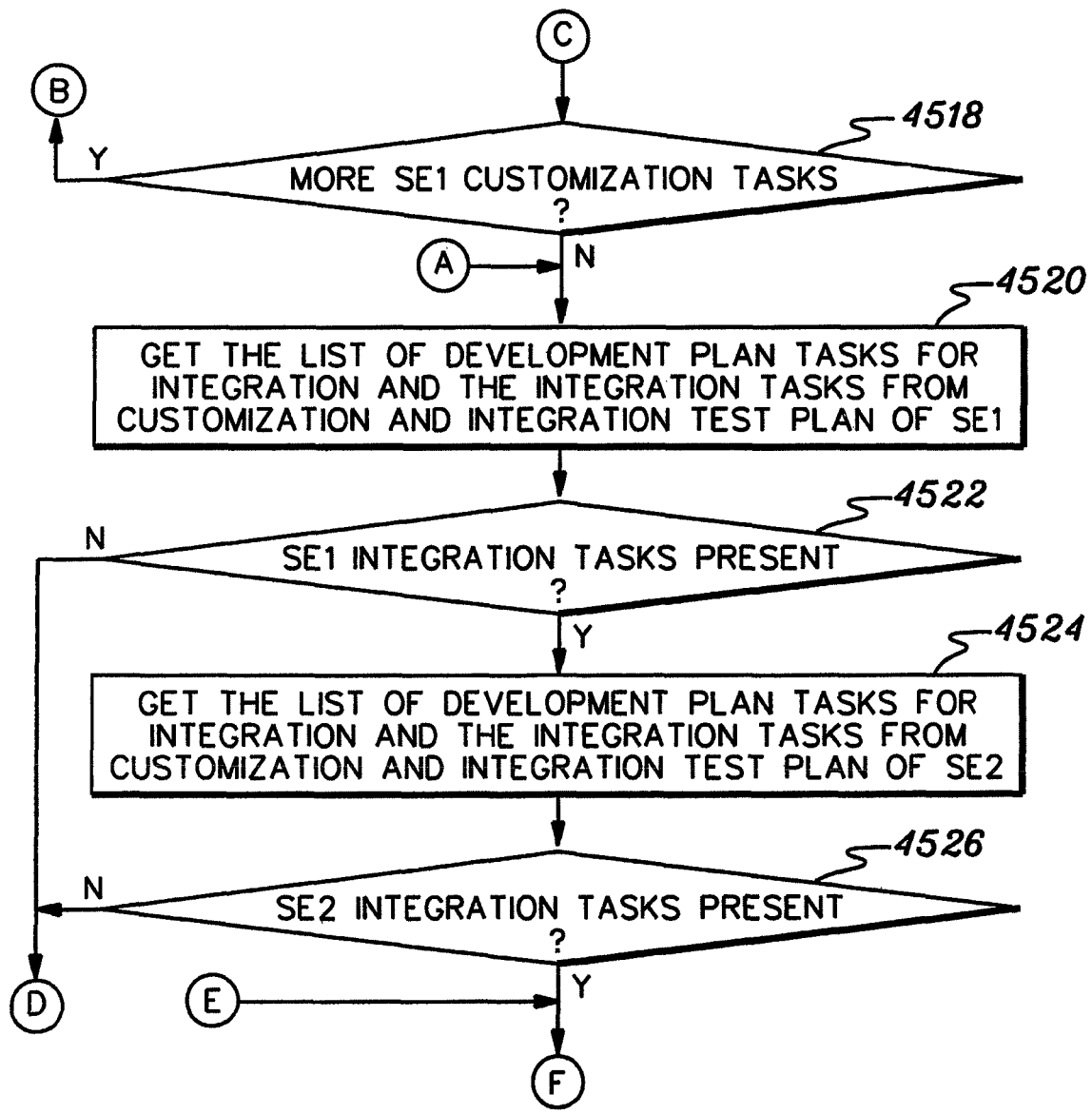
Figure 45C:
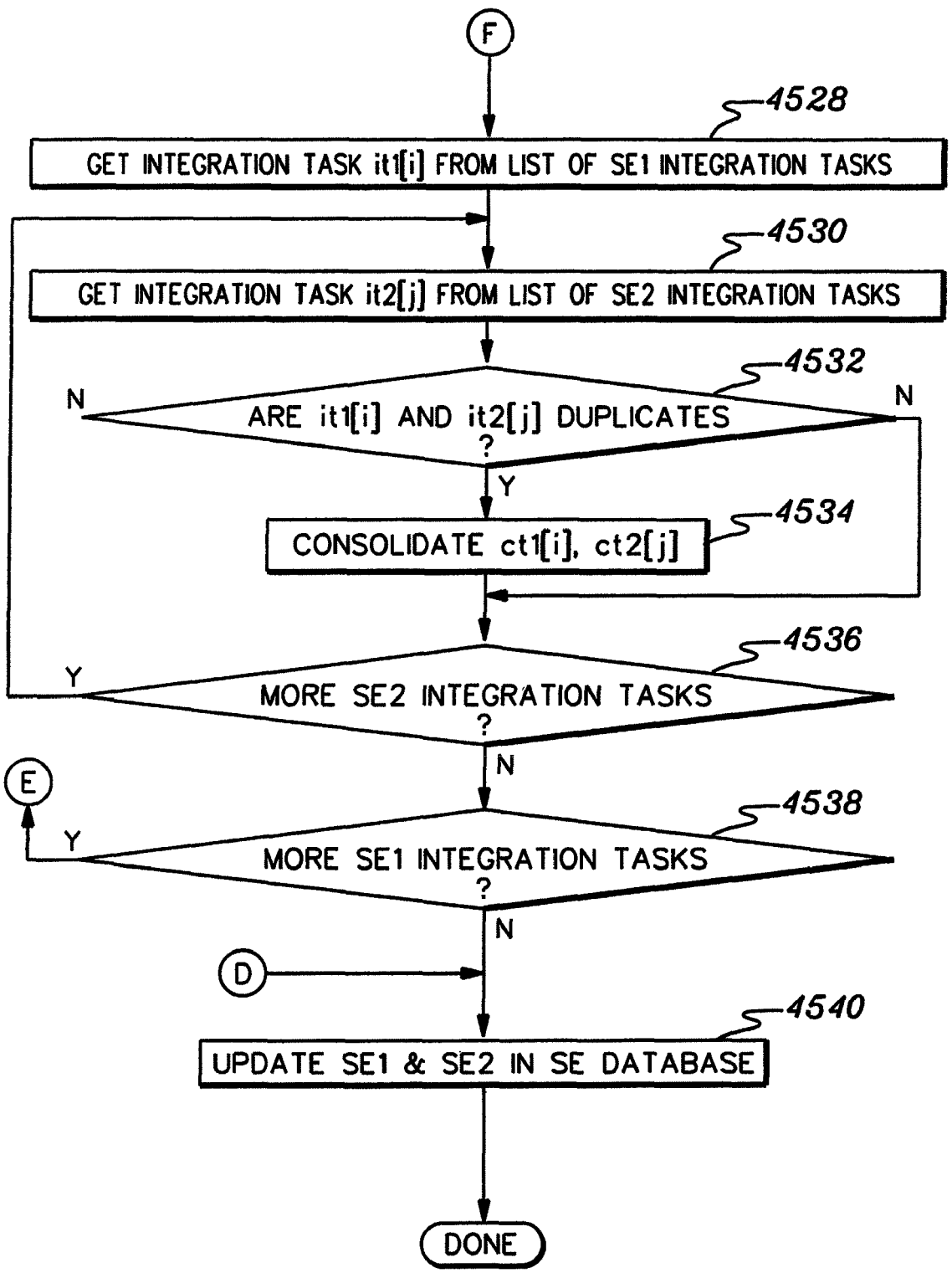

One embodiment of the logic associated with consolidating development plans for two SEs (SE1 and SE2) is described with reference to FIGS. 45a-45c. Initially, the process obtains the list of development plan tasks for customization, and if available, the customization tasks from the SE1 integration and customization test plan, STEP 4500. If customization tasks for the SE1 development plan are present (i.e., the list contains one or more tasks), INQUIRY 4502, the process obtains the list of development plan tasks for customization, and if available, the customization tasks from the SE2 integration and customization test plan, STEP 4504.

If customization tasks for the SE2 development plan are present, INQUIRY 4506, a nested loop is performed, with ct1[i] being taken sequentially from the list of retrieved SE1 plan customization tasks (1 ... N), STEP 4508, and ct2[j] being taken sequentially from the list of retrieved SE2 customization tasks (1 ... N), STEP 4510. The iteration for the j's repeats for each next i (i.e., all SE1 customization plan tasks are matched against all SE2 customization plan tasks)—and for each pair of ct1[i] and ct2[j], if these customization tasks are duplicate, consolidation of the pair of these customization tasks is performed.

For example, a customization task ct1[i] is obtained from the list of SE1 customization tasks, STEP 4508. Additionally, a customization task ct2[j] is obtained from the list of SE2 customization tasks, STEP 4510. Thereafter, a determination is made as to whether ct1[i] and ct2[j] are duplicates, INQUIRY 4512. If they are duplicates, then ct1[i] and ct2[j] are consolidated (e.g., discard one and place all linkages to it in the one that remains), STEP 4514. Thereafter, or if they are not duplicates, a determination is made as to whether there are more SE2 customization tasks, INQUIRY 4516. If so, then processing continues with STEP 4510. Otherwise, a determination is made as to whether there are more SE1 customization tasks, INQUIRY 4518 (FIG. 45b). If so, processing continues with STEP 4508. Otherwise, or if there are no SE1 customization tasks or SE2 customization tasks, processing continues with the integration tasks of the SE1 and SE2 plans.

As one example, a similar process is performed for the integration tasks of SE1 and SE2 plans. The process obtains the list of development plan tasks for integration, and if available, the integration tasks from the SE1 integration and customization test plan, STEP 4520. If integration tasks for the SE1 development plan are present (i.e., the list contains one or more tasks), INQUIRY 4522, then the process obtains the list of development plan tasks for integration, and if available, the integration tasks from the SE2 integration and customization test plan, STEP 4524.

If integration tasks for the SE2 development plan are present, INQUIRY 4526, a nested loop is performed, with it1[i] being taken sequentially from the list of all retrieved SE1 plan integration tasks (1 ... N), STEP 4528 (FIG. 45c), and it2[j] being taken sequentially from the list of all retrieved SE2 customization tasks (1 ... N). The iteration for the j's, STEP 4536, repeating for each next i, STEP 4538, (i.e., all SE1 integration plan tasks are matched against all SE2 integration plan tasks)—and for each pair of it1[i] it2[j], if these integration tasks are duplicate, STEP 4532, consolidation of the pair of these integration tasks is performed, STEP 4534.

Thereafter, or if there are no SE1 integration or SE2 integration tasks present, the process completes by updating SE1 and SE2 in the SE database, STEP 4540.

Handling a Deletion

Figure 46A:
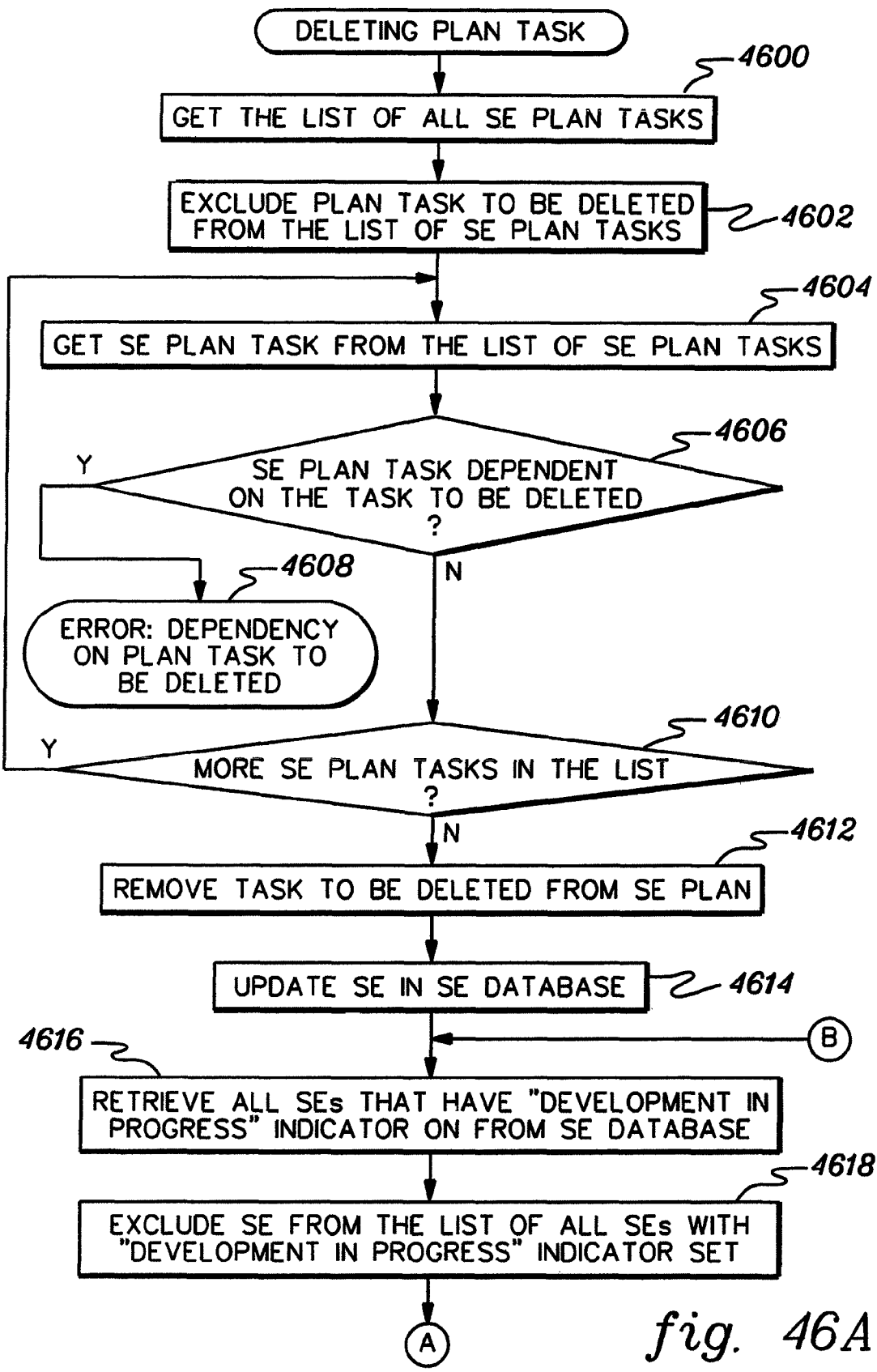
FIGS. 46a-46c depict one embodiment of the logic associated with deleting plan tasks, in accordance with an aspect of the present invention.
Figure 46B:
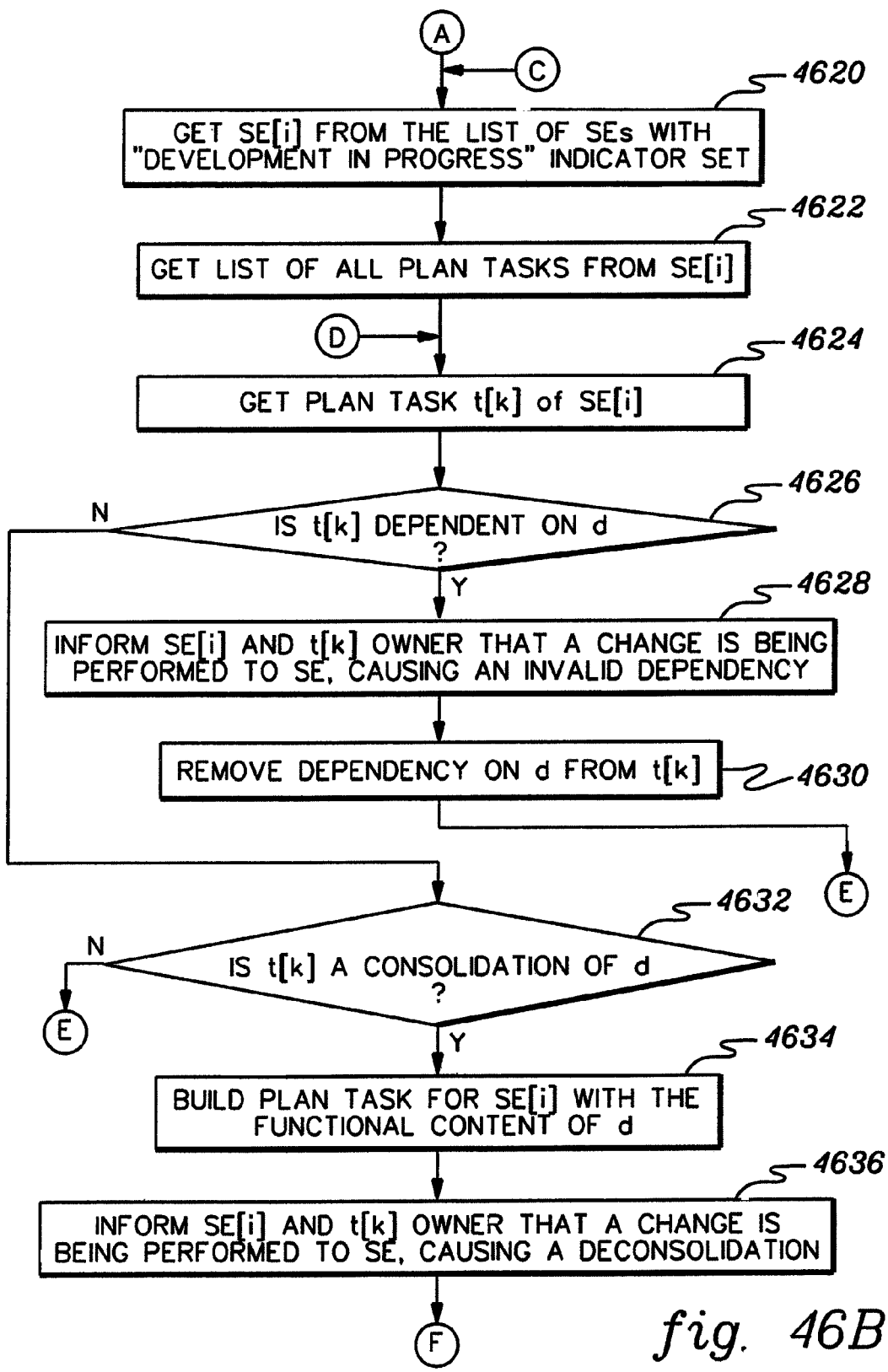
Figure 46C:
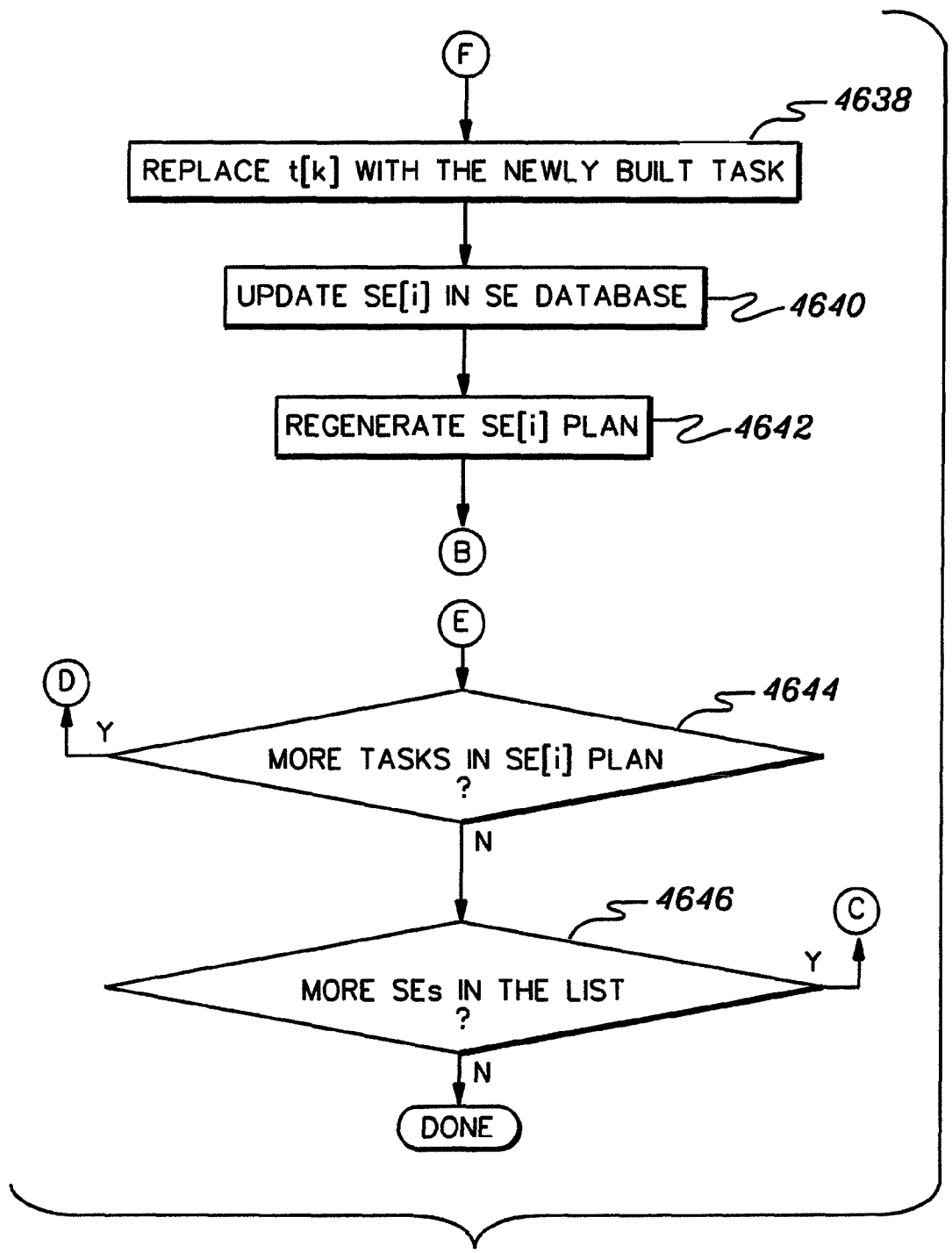

If a plan task is to be deleted, e.g., as a result of a design change in a SE, dependencies on this task are eliminated first. One embodiment of the logic associated with detecting and eliminating these dependencies is described with reference to FIGS. 46a-46c.

In this example, assume plan task (d) is to be deleted from the development plan of SE. The process starts by retrieving the list of SE plan tasks, STEP 4600, and then excluding from the list plan task d that is to be deleted, STEP 4602. Then, a plan task is selected from the list of plan tasks of SE except for d, STEP 4604.

If the current plan task has a dependency on d, INQUIRY 4606, processing terminates with an error, STEP 4608, as prior to deleting plan task d, any dependencies on it should have been eliminated (i.e., the user has not altered SE design appropriately to make deletion of plan task d possible). Otherwise, a determination is made as to whether there are more plan tasks in the list, INQUIRY 4610. If so, the next plan task from the list of plan tasks of SE except for d is considered, STEP 4604. This continues until the plan tasks are processed.

Thereafter, plan task d is deleted from the SE development plan, STEP 4612, and the SE is updated in the SE database, STEP 4614.

At this point, any internal (relative to SE) dependencies on plan task d have been eliminated and plan task d has been removed from the SE development plan. However, it is possible that other SEs under development still retain dependencies on plan task d, either direct or as a result of SE development plan consolidation. Thus, the remainder of the process handles any remaining external dependencies.

Initially, the process creates a list of the SEs with a "development in progress" indicator set, by retrieving these SEs from the SE database, STEP 4616. The process then excludes from the built list of SEs the SE from which the plan task d was deleted, STEP 4618.

Thereafter, the process iterates through the SEs in the list. The process obtains SE[i] from the list of SEs under development, STEP 4620 (FIG. 46b), and retrieves the list of SE[i] development plan tasks, STEP 4622. The process then iterates (nested within iteration through SEs under development) through SE development plan tasks for SE[i].

For example, development plan task t[k] is retrieved from the list of development plan tasks for SE[i], STEP 4624. If SE development plan task t[k] is dependent on the previously deleted SE development plan task d, INQUIRY 4626, a message is sent to the SE[i] owner and the SE[i] task t[k] owner that a change has been performed to the SE that previously contained development plan task d, STEP 4628. (It is expected, in one embodiment, that upon receipt of this message, the SE[i] owner and the SE[i] development plan task t[k] owner will collaborate in changing the design of SE[i] appropriately.) Further, the dependency on development plan task d is removed from development plan task t[k], STEP 4630.

Returning to INQUIRY 4626, if SE[i] development plan task t[k] is not dependent on deleted SE development plan task d, a check is performed to determine if SE[i] development plan task t[k] is a consolidation of deleted SE development plan task d, INQUIRY 4632. If not, processing continues with INQUIRY 4644, described below. However, if it is a consolidation of deleted task d, then the process rebuilds the SE[i] development plan task t[k] to be a full non-consolidated (i.e., separated) task with the functional content of the deleted SE development plan task d, STEP 4634. The process then sends a message to the SE[i] and development plan task t[k] owners informing them about the SE[i] development plan task t[k] deconsolidation from SE development plan task d, STEP 4636. SE[i] development plan task t[k] is then replaced in the SE[i] development plan with the newly built development task, which is functionally equivalent to the deleted SE development plan task d, STEP 4638 (FIG. 46c), and SE[i] is updated in the SE database, STEP 4640.

In one embodiment, the replacement of t[k] should not necessarily remain a full-fledged development plan task, and another task may be used to consolidate it. The process therefore rebuilds the SE[i] development plan, STEP 4642, which action, if SE[i] development plan task t[k] was not the last consolidation of the previously deleted SE development plan task d, would be a NOOP, but if it were, would result in selection of the right primary development task for consolidation from among the set of SE development plan tasks identical to the previously deleted SE development plan task d. Therefore, subsequent to this step, processing breaks out of the nested SE and development plan task processing loops and starts the external dependency remediation process from STEP 4620.

Otherwise, processing continues in the nested loops until the development plan tasks, STEP 4644, for all SEs under development are processed, STEP 4646.

Import and Export of SE Development Plan Data

The SE development plan builder permits import and export of SE development plan data from and to the format compatible with the industry standard project planning tools, e.g., Microsoft Project.

Building Development Budget

Given a development labor cost table and the component data feed, a development budget can be built by consolidating labor and resources costs. In one embodiment, an assumption is made that the design labor costs are the same, while development labor costs are diverse, being based on specified skills.

The process of determining a development budget is known in the art and implemented in software products, e.g., Microsoft Project.

Deployment Plan

Figure 2G:
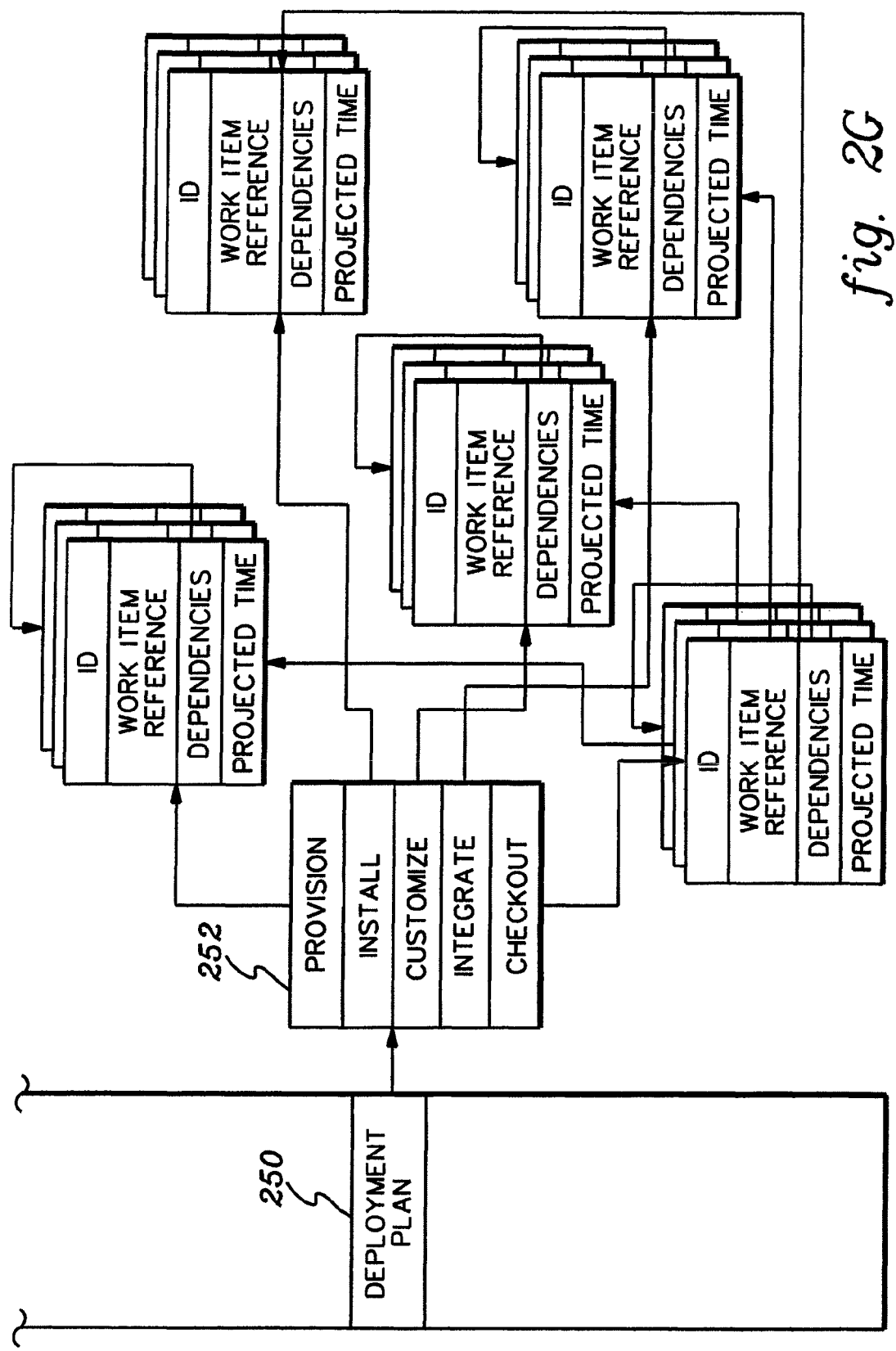

A SE deployment plan is a series of tasks involving provisioning, installation, if appropriate, customization, integration, and subsequent checkout of successful deployment for each step (see FIG. 2g). Depending on the nature of a SE for which deployment is being planned, these steps may have a different nature—e.g., provisioning may include ordering and receiving a machine or part, subscribing to an on-line service, allocating space in a data center, staffing and/or training the appropriate skills, etc. Similarly, checkout, in this context, may include ensuring that the received machine or part is indeed what was requested, on-line service subscription is in place and functioning, allocated data center space is indeed available, required personnel is on-board and possess the required skills, etc. Installation may include actual physical installation of software and/or hardware, or activation of particular level 1 help desk scripts. Customization and integration tasks are usually pertinent to hardware- and/or software-specific SEs or components.

Building a SE Deployment Plan

Figure 47A:
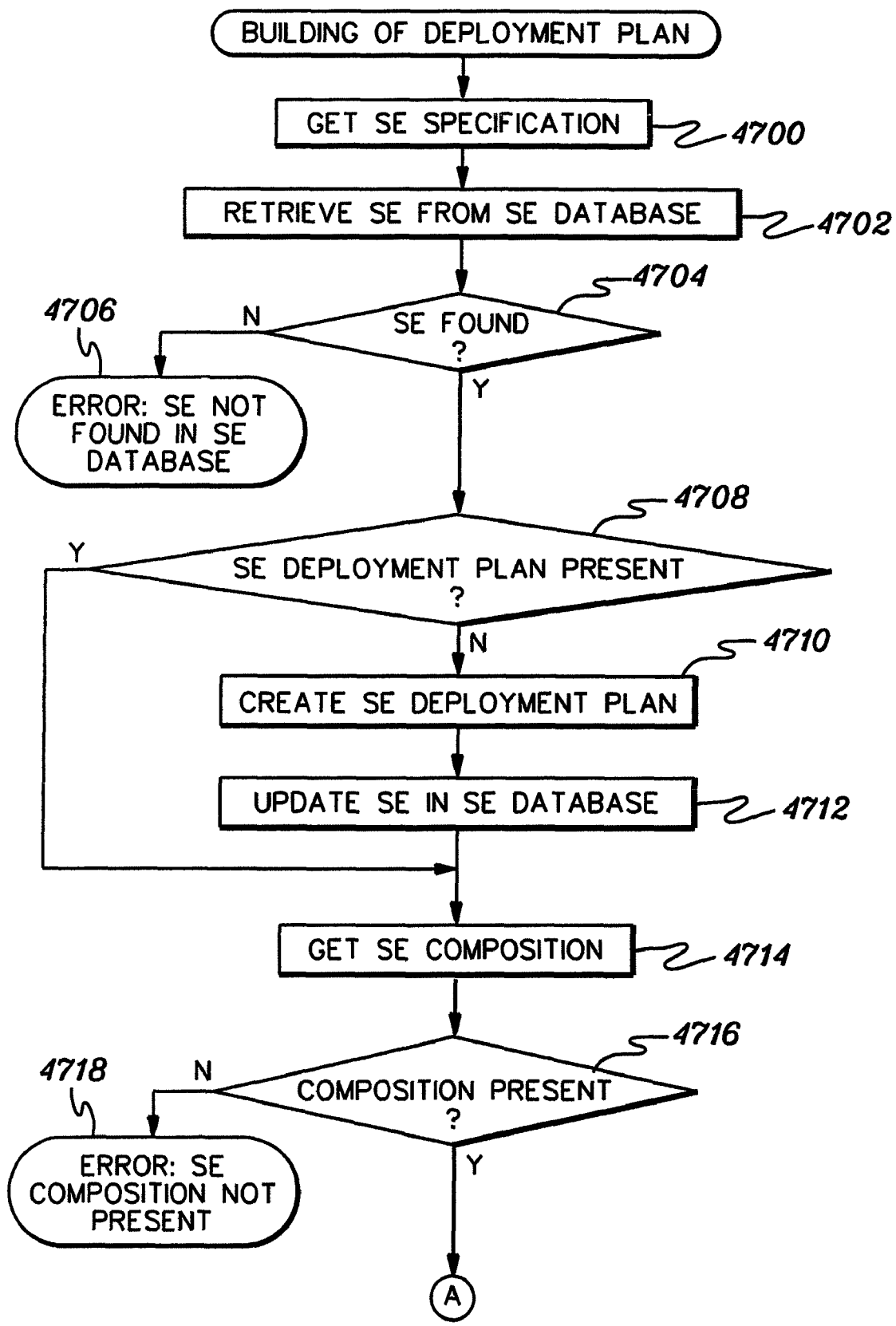
FIGS. 47a-47c depict one embodiment of the logic associated with building a deployment plan, in accordance with an aspect of the present invention.
Figure 47B:
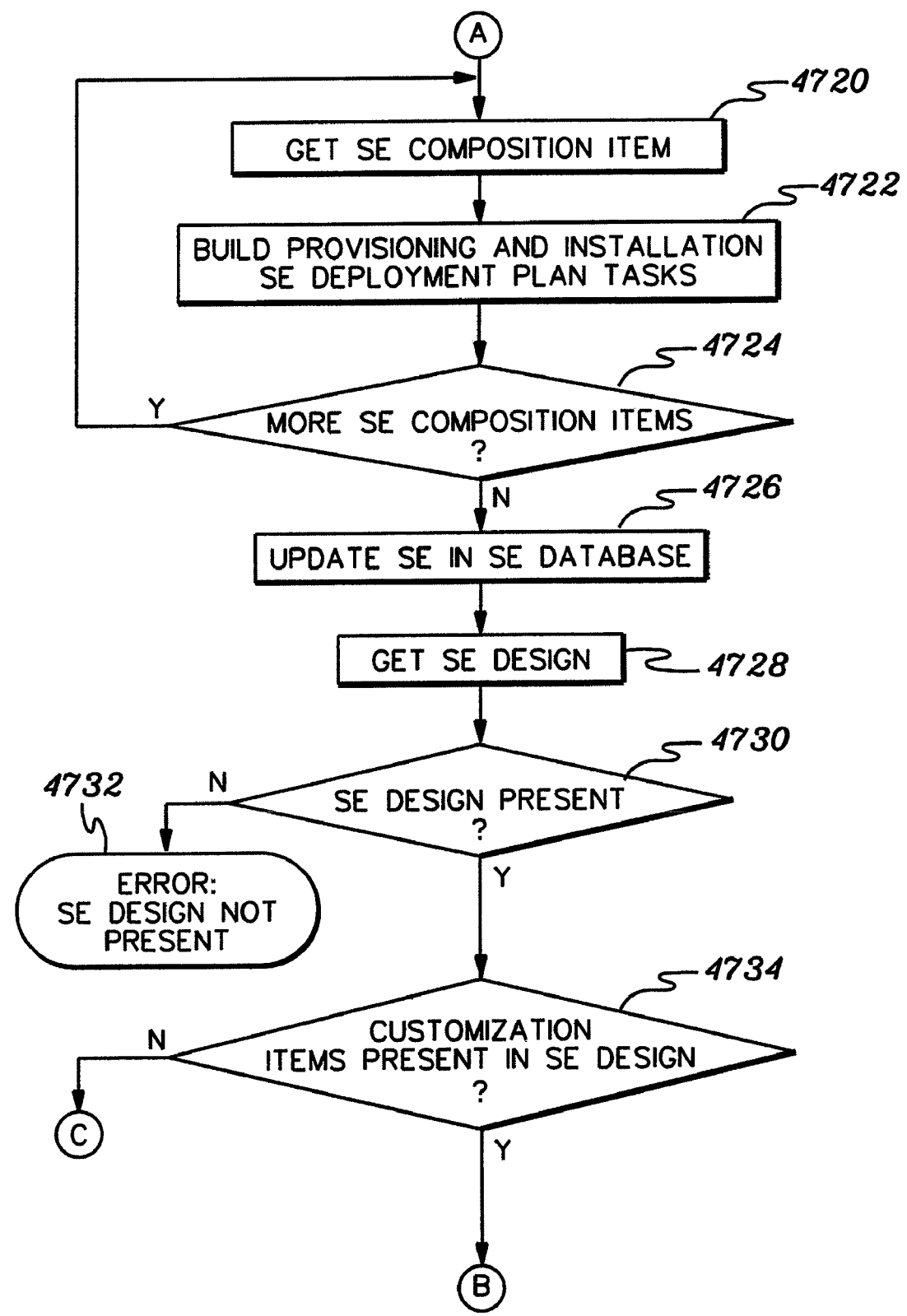
Figure 47C:
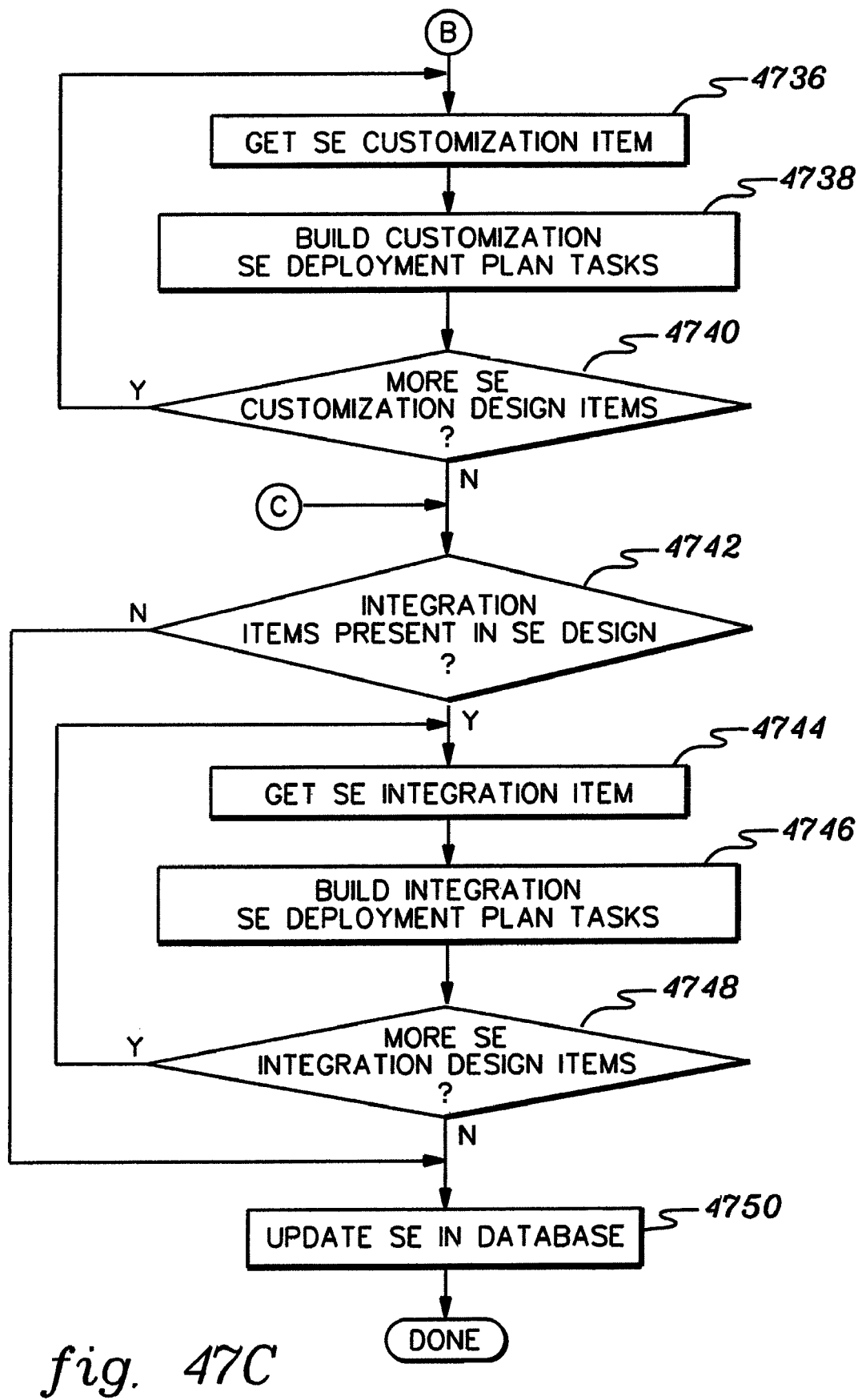

One embodiment of the logic associated with building a SE deployment plan is described with reference to FIGS. 47a-47c. A user initiates the process of building the plan by entering the specification of the SE for which a deployment plan is to be built on a SE deployment plan panel. The process obtains the SE specification from the user, STEP 4700, and attempts to retrieve the specified SE from the SE database, STEP 4702. If the specified SE is not found in the SE database, INQUIRY 4704, processing terminates with an error, STEP 4706. Otherwise, a determination is made as to whether the SE has a deployment plan present, INQUIRY 4708. If there is no deployment plan present, then the process creates the SE deployment plan data structure (see FIG. 2g), STEP 4710 (FIG. 47a), and updates the SE in the SE database, STEP 4712.

Thereafter, or if there was a deployment plan present, INQUIRY 4708, the process attempts to retrieve the SE composition, STEP 4714. If a SE composition is not present, INQUIRY 4716, processing terminates with an error, STEP 4718. Otherwise, the process obtains a SE composition item, STEP 4720 (FIG. 47b), and builds provisioning and installation SE deployment plan tasks for this SE composition item, as described below, STEP 4722. Next, a determination is made as to whether there are more SE composition items, INQUIRY 4724. If more SE composition items are present in the SE composition, processing repeats, STEP 4720. Otherwise, the process has built the provisioning and installation tasks for the SE deployment plan, and the SE is updated in the SE database, STEP 4726.

The process then attempts to retrieve the SE design, STEP 4728. If the SE design is not present, INQUIRY 4730, processing terminates with an error, STEP 4732. Otherwise, a determination is made as to whether customization design items are present in the SE design, INQUIRY 4734. If so, the process obtains a SE design customization item, STEP 4736 (FIG. 47c), and builds customization SE deployment plan tasks for this SE design customization item, STEP 4738. If more customization items are present in SE design, INQUIRY 4740, processing repeats, STEP 4736.

When all customization design items are processed, or if no customization items are present in the SE design, a check is made as to whether integration design items are present in the SE design, STEP 4742. If so, the process obtains a SE design integration item, STEP 4744, and builds integration SE deployment plan tasks for this SE design integration item, STEP 4746. If more integration items are present in the SE design, INQUIRY 4748, processing repeats, STEP 4744. Otherwise, or if no integration items are present, the process completes by updating the SE in the SE database, STEP 4750.

Figure 48:
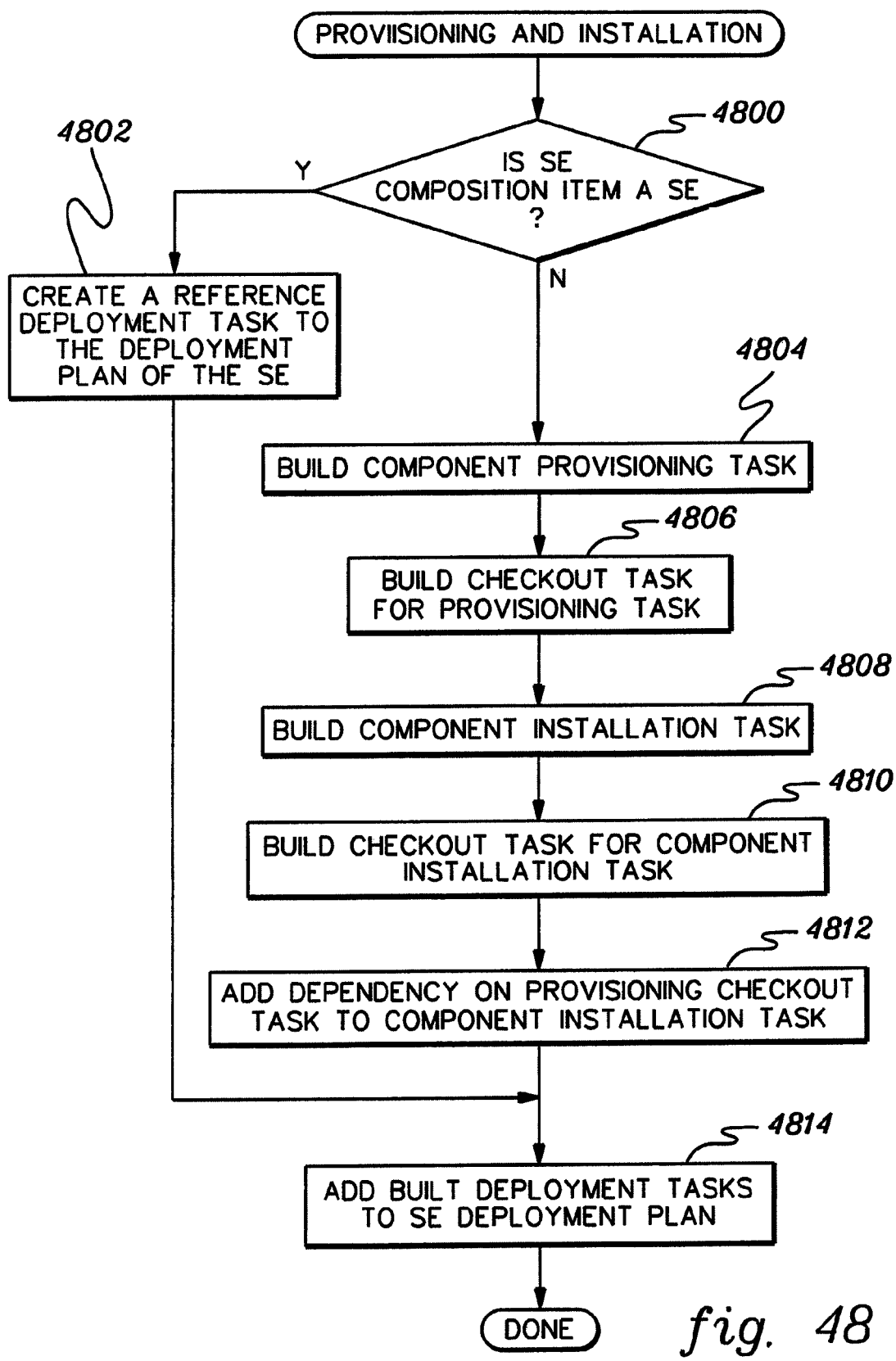
FIG. 48 depicts one embodiment of the logic associated with an overview of building provisioning and installation tasks, in accordance with an aspect of the present invention.

One embodiment of the logic associated with an overview of building provisioning and installation deployment tasks for a SE composition item is described with reference to FIG. 48. Initially, a determination is made as to whether the SE composition item is a SE, INQUIRY 4800. If the SE composition item is a SE, a single reference deployment task is created indicating that deployment of the SE referenced by the composition item is to be performed, STEP 4802.

Otherwise, the SE composition item is a component, and thus, the process builds a component provisioning SE deployment plan task, as described below, STEP 4804. Thereafter, a checkout task for the provisioning task is built, which includes a checkout task dependency on the completion of the previously built component provisioning task, STEP 4806. The process then builds a component installation task, as described below, STEP 4808, followed by a checkout task for the component installation task, which includes a checkout task dependency on the completion of the previously built component installation task, STEP 4810. A dependency on completion of the checkout for component provisioning task is then added to the component installation task, STEP 4812.

Subsequent to performing STEP 4812, or STEP 4802, if the SE composition item is a SE, any SE deployment plan tasks built by the process are added to the SE, STEP 4814.

Figure 49:
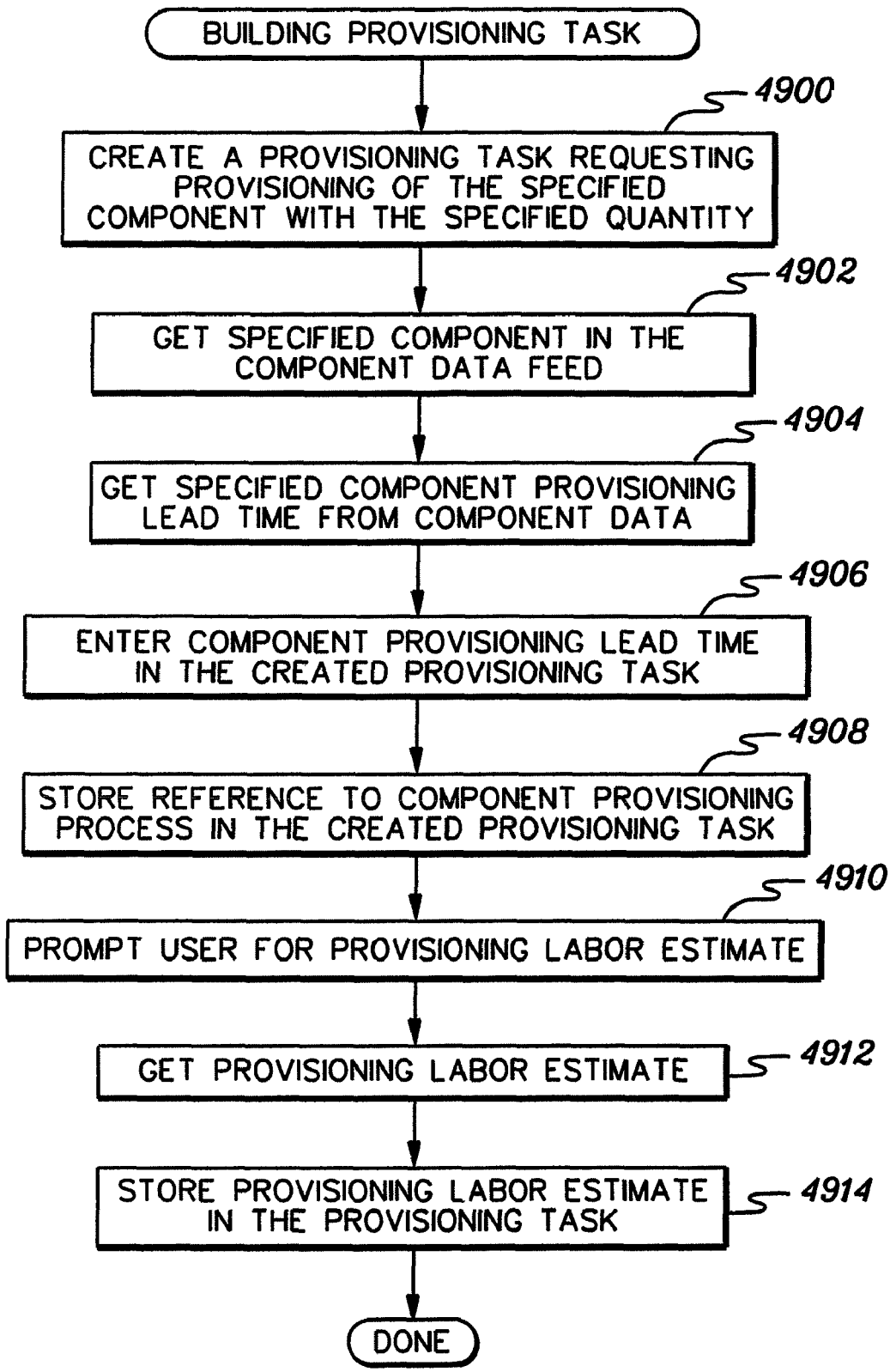
FIG. 49 depicts one embodiment of the logic associated with building a provisioning task, in accordance with an aspect of the present invention.

One embodiment of the logic associated with building a component provisioning SE deployment plan task is described with reference to FIG. 49. Initially, the process creates a SE deployment plan task for component provisioning, and enters the specified component and component quantity obtained from the SE composition, STEP 4900. Thereafter, the specified component is retrieved from the component data feed, STEP 4902. Additionally, the component provisioning lead-time (time from component order to order fulfillment and delivery of the component) is obtained from component data, STEP 4904, and entered into the built SE deployment plan task, STEP 4906.

Since components may be provisioned from multiple suppliers using different order processes, a reference to the component provisioning process (supplier identification and method of provisioning) is stored in the built SE deployment plan task, STEP 4908. The user is then prompted for a provisioning labor estimate (e.g., labor required to perform the activities for the specified component provisioning process), STEP 4910. When presented with the provisioning labor estimate prompt, the user responds by entering the estimated amount of labor required to provision the component, and the process obtains the entered information, STEP 4912. The process then stores the estimate in the built SE deployment plan task, STEP 4914. One skilled in the art will recognize that the user prompt used in this embodiment may be replaced by a table lookup of standard labor estimates associated with multiple standard provisioning processes.

Figure 50A:
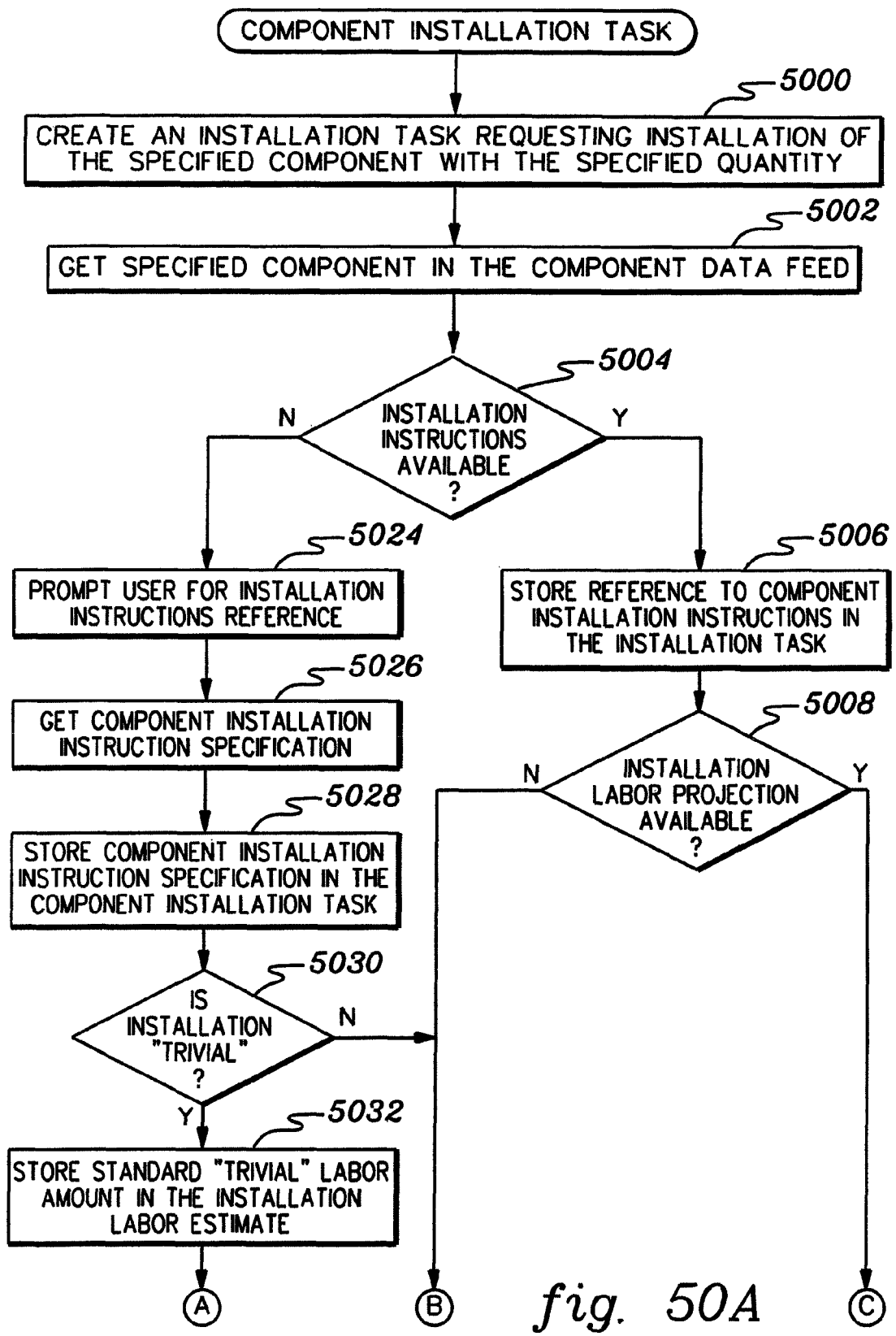
FIGS. 50a-50b depict one embodiment of the logic associated with building a component installation task, in accordance with an aspect of the present invention.
Figure 50B:
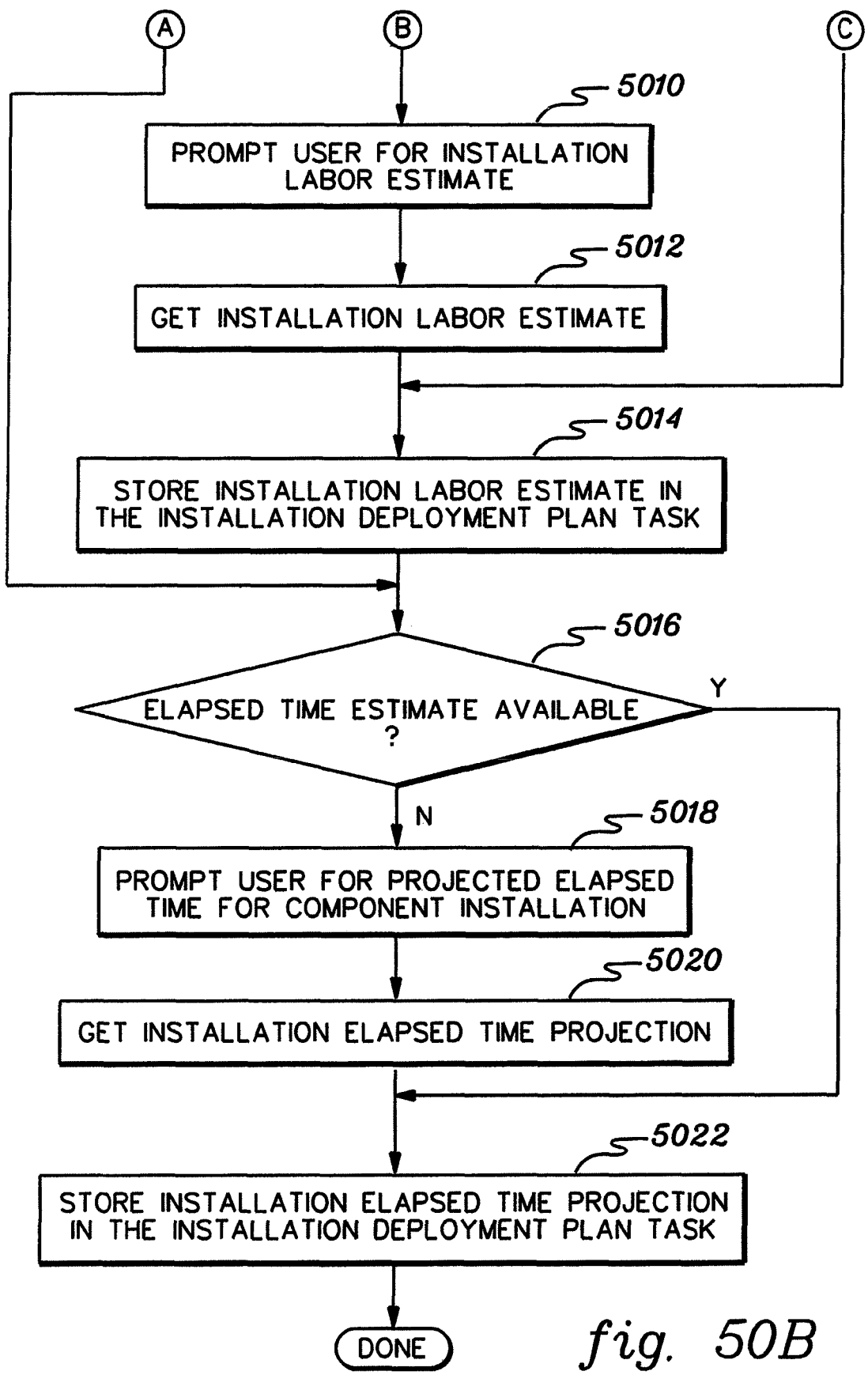

One embodiment of the logic associated with building a component installation SE deployment plan task is described with reference to FIGS. 50*a*-50*b*. The process starts by creating a SE deployment plan task for component installation and entering the specified component and component quantity obtained from the SE composition, STEP 5000. Thereafter, the specified component information is retrieved from the component data feed, STEP 5002. If installation instructions are available in the retrieved component information, INQUIRY 5004, then a reference to component installation instructions is stored in the component installation SE deployment plan task, STEP 5006.

Further, a determination is made as to whether the installation labor projection was previously retrieved from the component data feed, INQUIRY 5008. If not, the user is prompted for the installation labor projection, STEP 5010 (FIG. 50*b*). The user responds to the installation labor estimate prompt by entering an estimate for component installation labor, which the process obtains, STEP 5012. The component installation labor estimate entered by the user or available from the component data feed is then stored in the component installation SE deployment plan task, STEP 5014.

Subsequently, a determination is made as to the availability of the elapsed time estimates, INQUIRY 5016. If a component installation elapsed time projection is not available from the component data feed, then the user is prompted for the component installation elapsed time projection, STEP 5018. The user responds to the component installation elapsed time projection prompt by entering an estimated elapsed time for component installation, which the process obtains, STEP 5020. The component installation elapsed time projection entered by the user or available from the component data feed is then stored in the component installation SE deployment plan task, STEP 5022.

Returning to INQUIRY 5004, if installation instructions are unavailable, then the user is prompted for a component installation instructions reference, STEP 5024. The user responds to this prompt by entering a reference to component installation instructions; or by entering "unavailable" indicating that instructions have not yet been produced and will become available later; or by entering "trivial" indicating that the instructions will not be produced since the installation process is trivial—e.g., connect power cable to the single available power connection on a device. The process receives the component installation instructions response, STEP 5026, and stores this information in the component installation SE deployment plan task, STEP 5028.

If installation instructions are specified as "trivial", INQUIRY 5030, the process stores a standard "trivial" labor amount in the installation labor estimate of the component installation SE deployment plan task, STEP 5032. Processing then continues with INQUIRY 5016. Otherwise, processing continues with STEP 5010.

Figure 51:
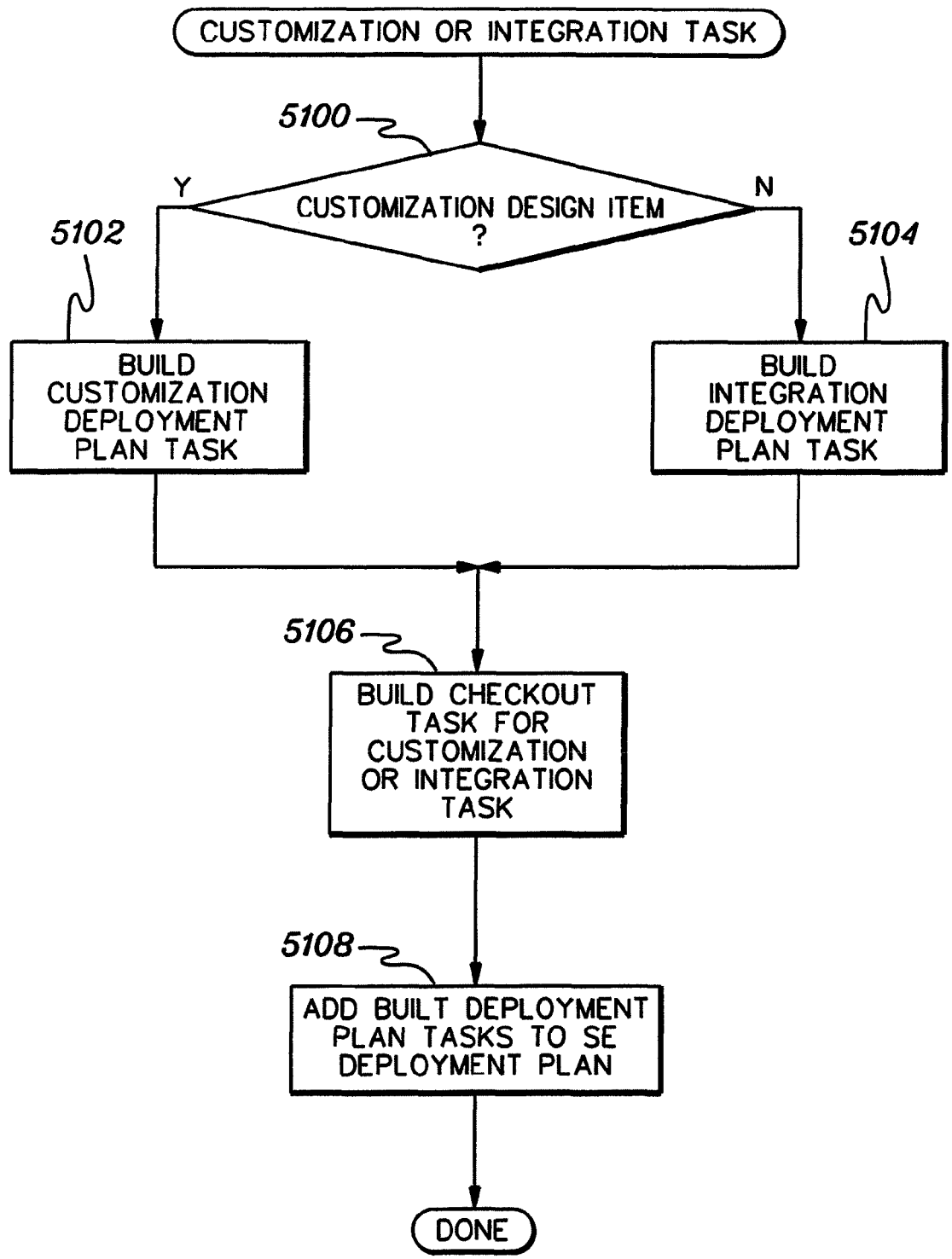
FIG. 51 depicts one embodiment of the logic associated with an overview of building customization or integration tasks, in accordance with an aspect of the present invention.

One embodiment of the logic associated with creating integration or customization SE deployment plan tasks is described with reference to FIG. 51. Initially, a check is made of the design item, INQUIRY 5100. If the SE design item for which the tasks are to be built is a customization design item, a customization SE deployment plan task is built, as described below, STEP 5102. Otherwise, an integration SE deployment plan task is built, as described below, STEP 5104. The corresponding checkout SE deployment plan task is then built for the previously built customization or integration SE deployment plan task, as described below, STEP 5106, and the previously built deployment plan tasks are added to the SE deployment plan, STEP 5108.

Figure 52:
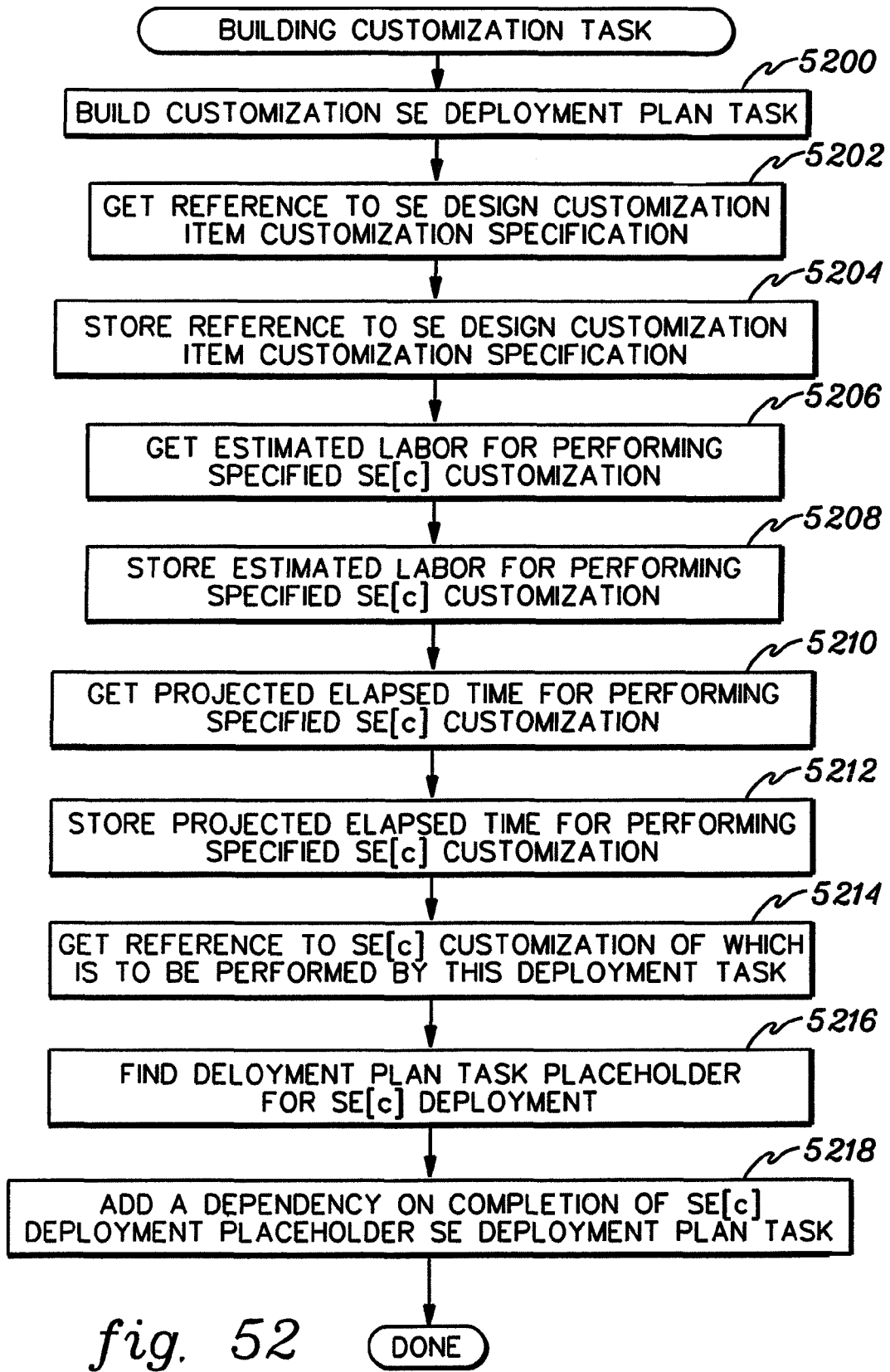
FIG. 52 depicts one embodiment of the logic associated with building a customization task, in accordance with an aspect of the present invention.

One embodiment of the logic associated with creating a customization SE deployment plan task is described with reference to FIG. 52. Initially, the process creates the customization SE deployment plan task, STEP 5200. The process then obtains a reference to the SE design customization item specification section, STEP 5202, and stores it in the created SE deployment plan task, STEP 5204.

Next, the process obtains estimated labor to perform customization of the target SE (SE[c]) from the SE design customization item, STEP 5206, and stores the obtained value in the customization SE deployment plan task, STEP 5208. Similarly, the process obtains estimated elapsed time for SE[c] customization from the SE design customization item, STEP 5210, and stores the obtained value in the customization SE deployment plan task, STEP 5212.

The process then obtains a reference to SE[c] from the SE design customization item, STEP 5214, and searches the SE deployment plan for the corresponding SE[c] deployment placeholder SE deployment plan task, STEP 5216, in order to add a dependency on the completion of the SE[c] deployment SE deployment plan task to this SE deployment plan task, STEP 5218.

Figure 53:
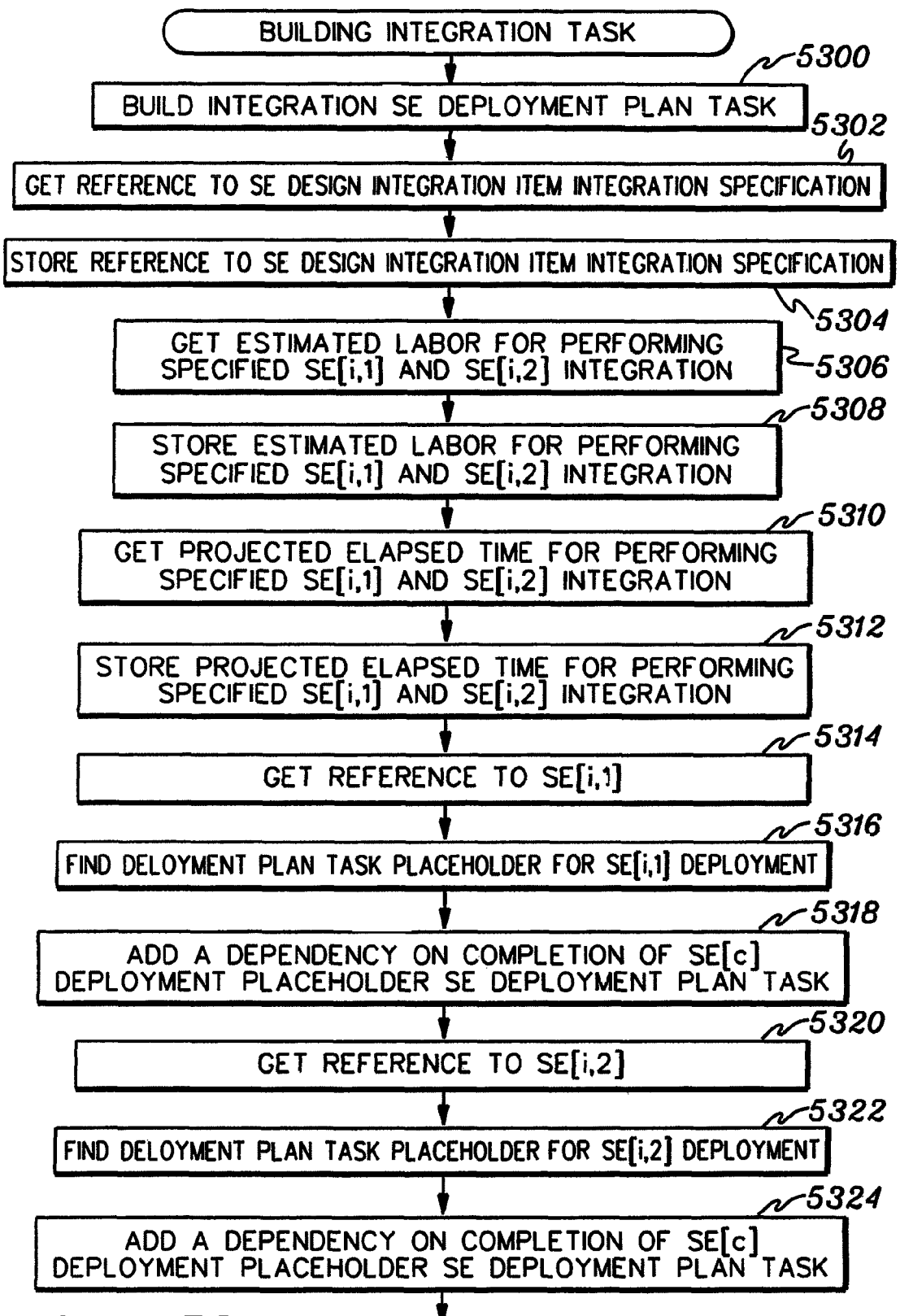
FIG. 53 depicts one embodiment of the logic associated with building an integration task, in accordance with an aspect of the present invention.

One embodiment of the logic associated with creating an integration SE deployment plan task is described with reference to FIG. 53. Initially, the process creates the integration SE deployment plan task, STEP 5300. Then, the process obtains a reference to the SE design integration item specification section, STEP 5302, and stores it in the created SE deployment plan task, STEP 5304.

Additionally, the process obtains estimated labor to perform integration of the target SEs (SE[i,1] and SE[i,2]) from the SE design integration item, STEP 5306, and stores the obtained value in the integration SE deployment plan task, STEP 5308. Similarly, the process obtains estimated elapsed time for SE[i,1] and SE[i,2] integration from the SE design integration item, STEP 5310, and stores the obtained value in the integration SE deployment plan task, STEP 5312.

The process then obtains a reference to SE[i,1] from the SE design integration item, STEP 5314, and searches the SE deployment plan for the corresponding SE[i,1] deployment placeholder SE deployment plan task, STEP 5316, in order to add a dependency on the SE[i,1] deployment SE deployment plan task to this SE deployment plan task, STEP 5318. Similarly, the process then obtains a reference to SE[i,2] from the SE design integration item, STEP 5320, and searches the SE deployment plan for the corresponding SE[i,2] deployment placeholder SE deployment plan task, STEP 5322, in order to add a dependency on the SE[i,2] deployment SE deployment plan task to this SE deployment plan task, STEP 5324.

Figure 54:
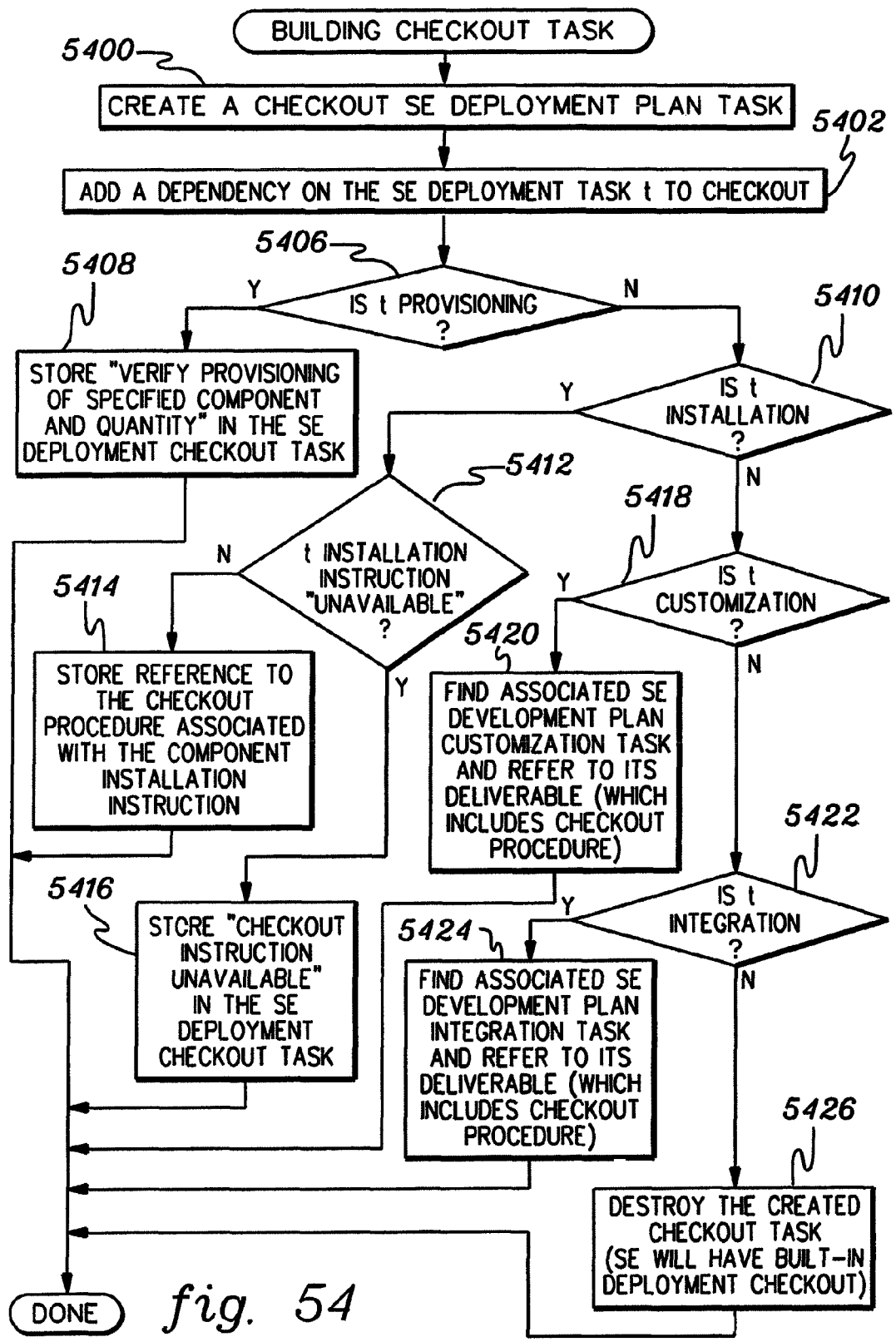
FIG. 54 depicts one embodiment of the logic associated with building a checkout task, in accordance with an aspect of the present invention.

One embodiment of the logic associated with creating a checkout SE development plan task is described with reference to FIG. 54. A checkout SE deployment plan task is created, STEP 5400, and a dependency on the SE deployment task t for which the checkout task is being built is added to the checkout plan task, STEP 5402.

Thereafter, a check is made of t, INQUIRY 5406. If t is a SE deployment plan task for component provisioning, the checkout amounts to verification of the received component type and quantity against the original specification, STEP 5408. Otherwise, if t is a SE deployment plan task for component installation, INQUIRY 5410, then if the component installation instruction is available in t (by definition, it would include a checkout procedure for the installation), INQUIRY 5412, a reference is stored in the checkout task to the checkout procedure associated with the component installation instruction, STEP 5414. Otherwise, "checkout instruction unavailable" (it will be created later by development) is stored in the SE deployment checkout task, STEP 5416.

Returning to INQUIRY 5410, if t is not an installation, then if t is a SE deployment plan task for customization, INQUIRY 5418, the SE development plan is searched for the associated customization development task to refer to its deliverable(s), which include a customization checkout procedure, STEP 5420. The resulting checkout procedure reference is stored in the checkout task. Otherwise, if t is a SE deployment plan task for integration, INQUIRY 5422, then the SE development plan is searched for the associated integration development task to refer to its deliverable(s), of which include an integration checkout procedure, STEP 5424. The resulting checkout procedure reference is stored in the checkout task.

If t is none of the above, it is a placeholder created as a reference to imbed deployment of another SE into this plan, and it requires no checkout procedure (the other SE's deployment plan would include that). Therefore, the previously created checkout SE development plan is destroyed prior to completing the process, STEP 5426.

Editing a SE Deployment Plan

In one embodiment, a SE deployment plan may be edited. For example, manual editing may be used in order to refine/complete the SE deployment plan. The manual edit function is a structured edit tool, which permits adjustments to the selected values of SE deployment plan entries.

Building a Consolidated SE Deployment Plan

Economies may be gained by consolidating identical (or nearly identical) deployment tasks for multiple SEs into a single optimized series of deployment activities. The process starts at the top SE and brings in the series of deployment tasks from any SEs included in the top SE into the SE deployment plan. This activity is performed recursively on all the SEs included in the top SE, prior to actually consolidating the top SE deployment plan. Once all the tasks for all SEs are put in a single list of deployment tasks, duplicate tasks are found and combined together, making sure dependencies on consolidated tasks are preserved. For example, if there is a series of deployment tasks for provisioning and installation of N components C in the top SE and a similar series of deployment tasks for provisioning and installation of M components C in an included SE, the series is combined, resulting in a single consolidated series of provisioning and installation of N+M components C, with any other tasks having a dependency on either original series changed to have a dependency on the new series.

In one embodiment, this consolidation is not performed. Although economies may be gained, consolidation of SE deployment plans may be disadvantageous, since deployment personnel is likely to become oblivious to the SE structure of a collection of SEs as a result of this, potentially resulting in loss of quality.

Deconsolidating SE Deployment Plans

A previously built consolidated SE deployment plan may be refreshed to reflect a change, which causes deconsolidation of the appropriate items.

Producing a Deployment Document

A deployment plan document may be generated on request from a user in a printable format.

Determining Projected Elapsed Time for SE Deployment

Projected elapsed time for SE deployment may be determined by following the chain of dependencies for a collection of SEs, starting from the top SE, and adding elapsed time of deployment tasks. Since multiple chains are possible, each chain is followed, and the maximum time is selected as the resulting projected elapsed time value for SE deployment.

Building a SE Deployment Budget

In one embodiment, a SE deployment budget is built. In building the budget, certain assumptions are made. For instance, an assumption is made that all deployment labor costs are the same. The process of determining a deployment budget is known in the art, and implemented in various software products, such as, for example, Microsoft Project, Microsoft Excel, or Lotus 1-2-3.

Templates

Templates are standard "skeletons" of service offerings or SEs of particular types. A template is similar to a SE in its structure, except for being only partially completed and devoid of quantities of included content. For example, a template could include "level 1 support", but not make a projection of "14 hrs/week of level 1 support".

A template can be used as a starting point and as a set of guidelines for designing a particular type of SE or offering.

Templates make it possible to create enforceable design standards. In one example, there are two uses of templates:
  A. Reference use—The template is used as a starting/reference point for a design. Deviations, additions, or deletions of components and relationships in the SE being designed are permitted; and
  B. Standardization use—The template is used as a standard for a particular type of SE or service offering. A designer may add additional composition items (components or SEs) as a part of the design activity, but is not permitted to remove any items present in the template.

The Service Development Tool system administrator establishes the use of templates (reference or standardization).

Templates are created and developed using the mechanisms for creating and developing SEs, described above. Templates are stored in the SE database (e.g., in a separate table intended for templates). Further, templates may be manipulated (e.g., modified, deleted, etc.) using the techniques described above. A template data structure is that of a SE, with the "template" indicator set. A developer develops an offering or SE by filling in the appropriate quantities into a copy of a template, which becomes the SE, and in some cases, adding additional composition not included in the standard template (assuming augmentation is permitted).

Development Optimization

The Service Development Tool of the present invention includes search functions that permit a user developing a SE to search for similar design items. If a user, in the course of SE design, discovers that SE1 is included in the SE composition and desires certain customization, the user can perform a search through the other SEs (either in production or in development status) to see if any other SE (e.g., SEn) already includes identical or similar customization. If identical customization is found, a natural action would be to package SE1 with the specified customization into a new SE (SE1a) which requires no customization and include SE1a in both SE and SEn as a ready component. Similarly, if SE includes integration of SE1 and SE2, a search can be performed for identical or similar integration, and possibly, a new SE, including a particular type of integration of SE1 and SE2 may be packaged and reused.

Lifecycle Support

Lifecycle changes to a SE may be developer-initiated (based on external factors) or SDT-initiated, based on the updates of the components or SEs. It is the expectation that the components and/or SEs of an SE are going to change. For example, certain components are going to become unavailable and will be replaced by other components with similar characteristics; new components will become available; component costs will change due to changes in technology and/or labor rates; suppliers will change due to contract expirations, new terms and conditions are negotiated, etc. A change in a single component causes changes in the SEs that include that component in their composition, which in turn, causes changes in SEs that include the changed SEs in their composition, etc.

Creation of a new version of a SE does not necessarily cause immediate changes in SEs dependent on the one being changed. This is because the new version does not necessarily eliminate the previous version(s). However, in one example, the number of concurrently existing versions of a single SE is restricted, e.g., by establishing a phase-out date for versions other than the last N, and forcing any SEs dependent on the old versions of a SE to migrate to the newer or newest SE version.

Given two types of effects a lifecycle change may have on SEs maintained, the SDT provides two lifecycle functions, as examples:
  A. Lifecycle Update—Update of impacted SEs as a result of SE or component change; and
  B. Notification of a Potential Lifecycle Update—Notification to SE owners about new versions of SEs to which they may elect to migrate owned SEs at their convenience (and before the specified phase-out dates).

The following triggers of a lifecycle change are considered:
  1. SE change:
     a. Lifecycle (non-functional maintenance) change in a SE;
     b. SE version phase-out; and
     c. Functional change in a SE.
  2. Component change:
     a. Component cost change;
     b. Component source or provisioning process change; and
     c. Component replacement.

In one embodiment, a restriction is imposed on altered components and SEs of not introducing incompatibilities. That is, in one example, it is safe to assume that the new version of a SE or a replaced component satisfies existing technical dependencies.

Figure 55:
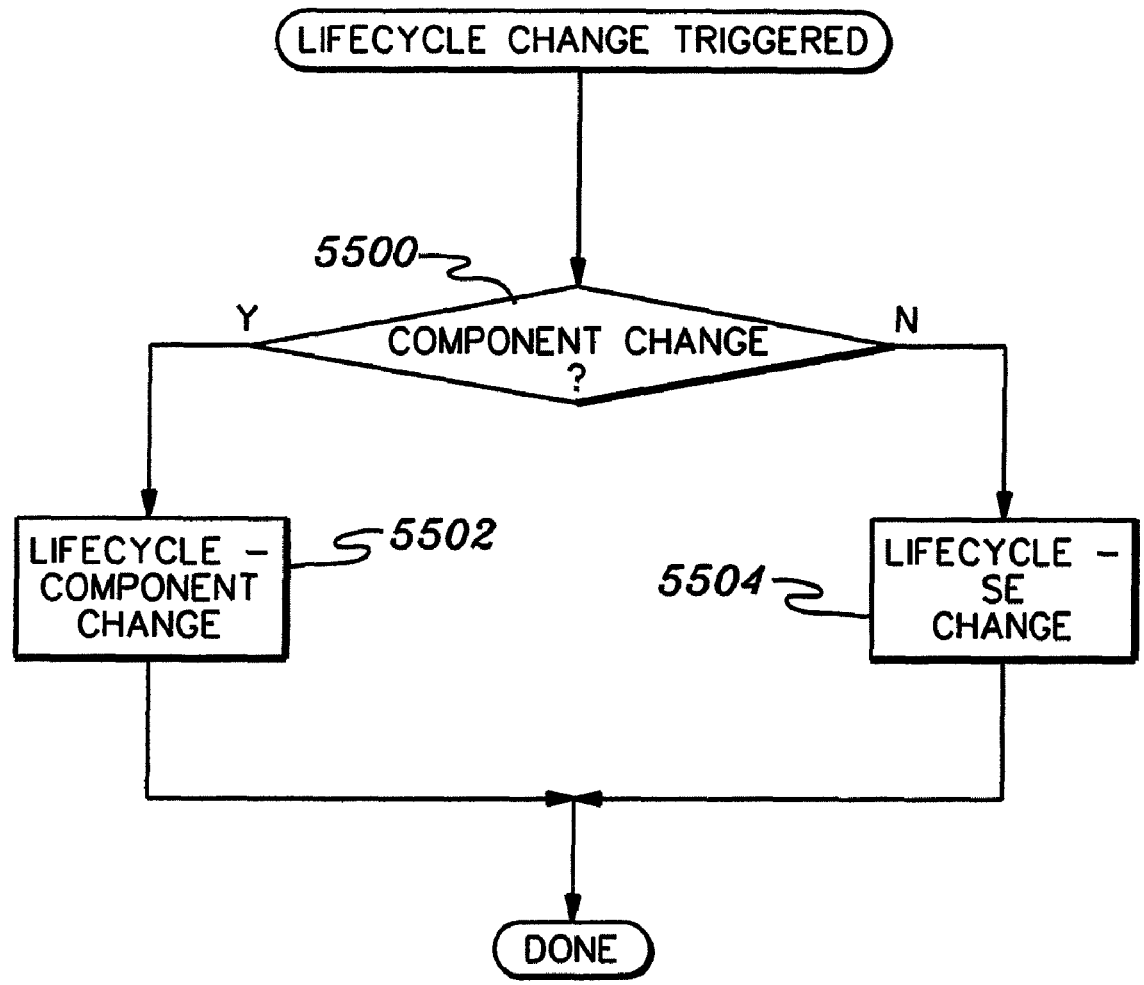
FIG. 55 depicts one example of an overview of lifecycle support, in accordance with an aspect of the present invention.

One embodiment of a high-level process of initiating lifecycle change processing is described with reference to FIG. 55. When a lifecycle change is triggered (e.g., manually or by the tool itself (e.g., lifecycle support unit), as a result of detecting a change, a change request is considered, INQUIRY 5500. If the change request is a component change, then lifecycle component change processing is performed, as described below, as described below, STEP 5502. Otherwise, lifecycle SE change processing is performed, as described below, STEP 5504. As one example, the processing is performed by the lifecycle support unit of the Service Development Tool.

Figure 56:
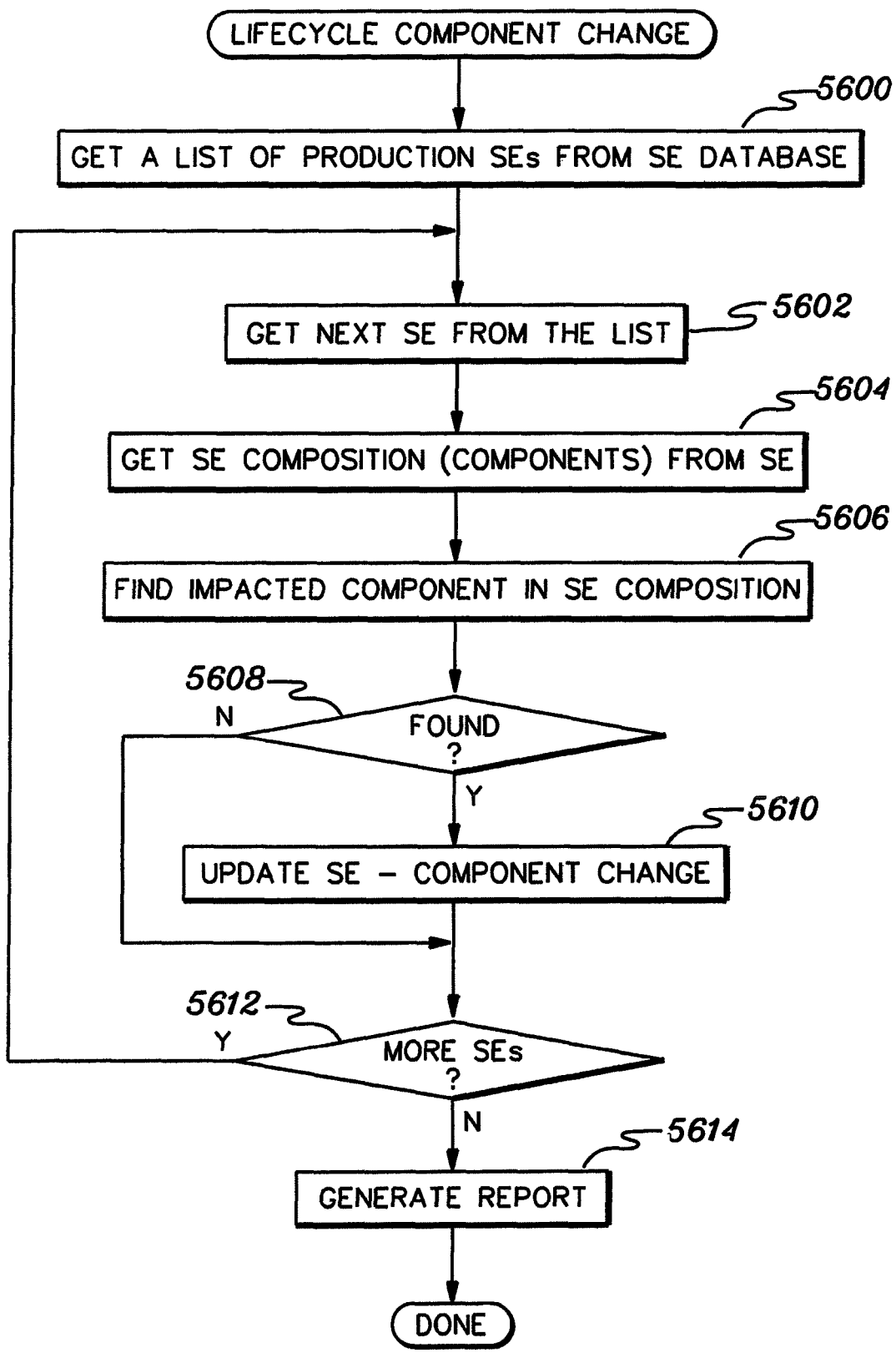
FIG. 56 depicts one embodiment of the logic associated with a lifecycle component change, in accordance with an aspect of the present invention.

One embodiment of the logic associated with a lifecycle component change is described with reference to FIG. 56. Initially, a list of the production SEs is retrieved from the SE database, STEP 5600, and a SE is selected from the list, STEP 5602. The SE composition is retrieved from the SE, STEP 5604, and an attempt is made to find an impacted component in the SE composition, STEP 5606. If an impacted component is represented in the SE composition, INQUIRY 5608, then the process of SE update for component change is initiated for each impacted component and the component change request is propagated to that process, STEP 5610 (see FIG. 57). Thereafter, or if an impacted component is not found, a determination is made as to whether there are more SEs, INQUIRY 5612. If so, processing continues with STEP 5602. Upon completion of traversal of the SE list, a summary report is generated, STEP 5614.

Figure 57A:
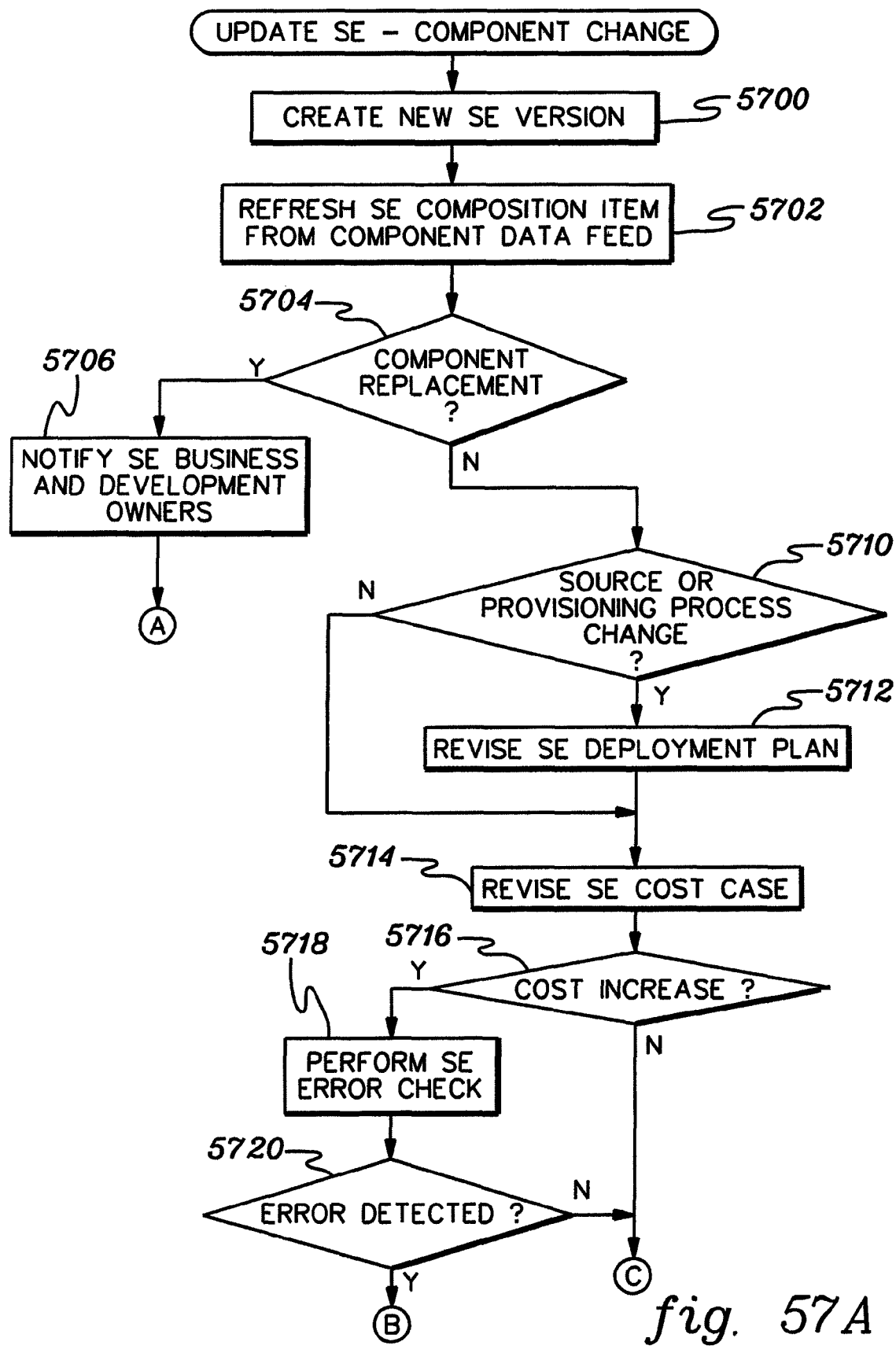
FIGS. 57a-57b depict one embodiment of the logic associated with updating a service element for a component change, in accordance with an aspect of the present invention.

One embodiment of the logic associated with a SE update for component change is described with reference to FIGS. 57a-57b. Initially, a new SE version is created, STEP 5700, and then the impacted SE composition item is refreshed from the component data feed, STEP 5702. Thereafter, a determination is made as to whether this is a component change request for component replacement, INQUIRY 5704. If this is a component change request for component replacement by virtue of refreshing the SE composition item, SE design, or cost case, or revising the development and deployment plans, development and test for this change are to be performed. Thus, the SE business and development owners are notified with the notification that indicates that the SE is now in development due to component replacement, STEP 5706. Additionally, the SE is updated in the SE database (the new version of SE now has the "development in progress" indicator set until the appropriate development and test activities complete), STEP 5708.

Returning to INQUIRY 5704, if the component itself has not changed (i.e., no direct technical impact to SE design is expected), a determination is made as to whether the change is initiated as a result of a component source or component provisioning process change, INQUIRY 5710. If so, the SE deployment plan is revised to account for the changes, STEP 5712. Thereafter, or if it is not a change resulting from a component source or provisioning process change, but a component cost change, the SE cost case is revised, STEP 5714.

Should the cost case revision result in a SE cost increase, INQUIRY 5716, then SE error checking is performed (which indicates an error, if the SE business case is no longer valid), as described below, STEP 5718. If an error is detected, INQUIRY 5720, the SE business owner is notified with a notification indicating that the SE update due to component cost increase results in an invalid business case, STEP 5722, and the SE is updated in SE database, STEP 5708. (Additionally, similar logic applies if component procurement time is changed.)

Figure 57B:
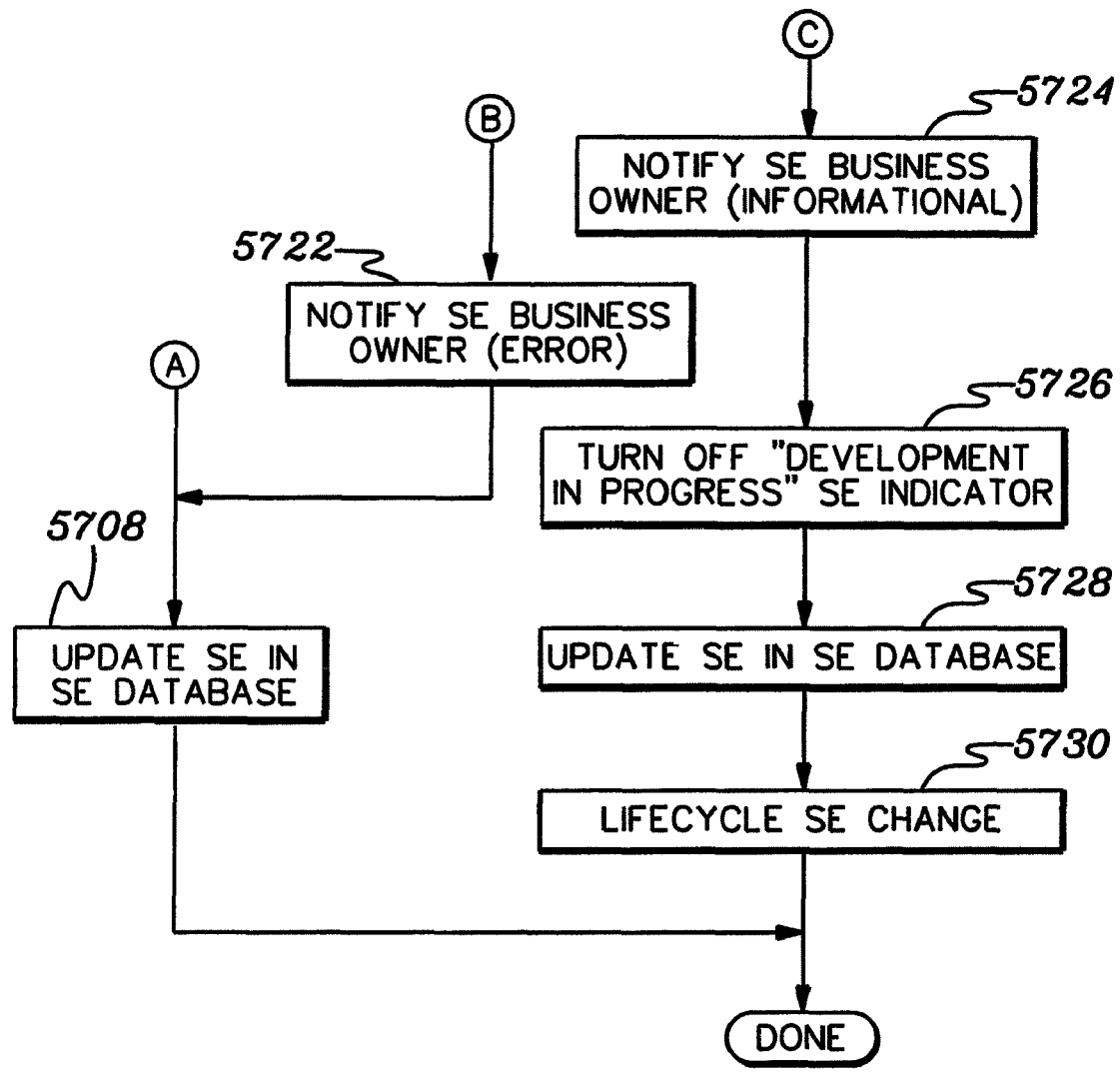

Returning to INQUIRY 5716, if the SE cost case revision does not result in a SE cost increase, an informational notification is issued to the SE business owner, indicating that a benign lifecycle change took place (at which point the SE business owner may determine whether the SE cost has decreased as a result of this lifecycle change, and whether this cost decrease should be accompanied by a SE price decrease), STEP 5724 (FIG. 57*b*). The SE "development in progress" indicator is turned off, STEP 5726, the SE is updated in SE database, STEP 5728, and a lifecycle SE change process is initiated to make sure that the change in this SE is reflected in any SEs that depend on this SE, STEP 5730.

Figure 58:
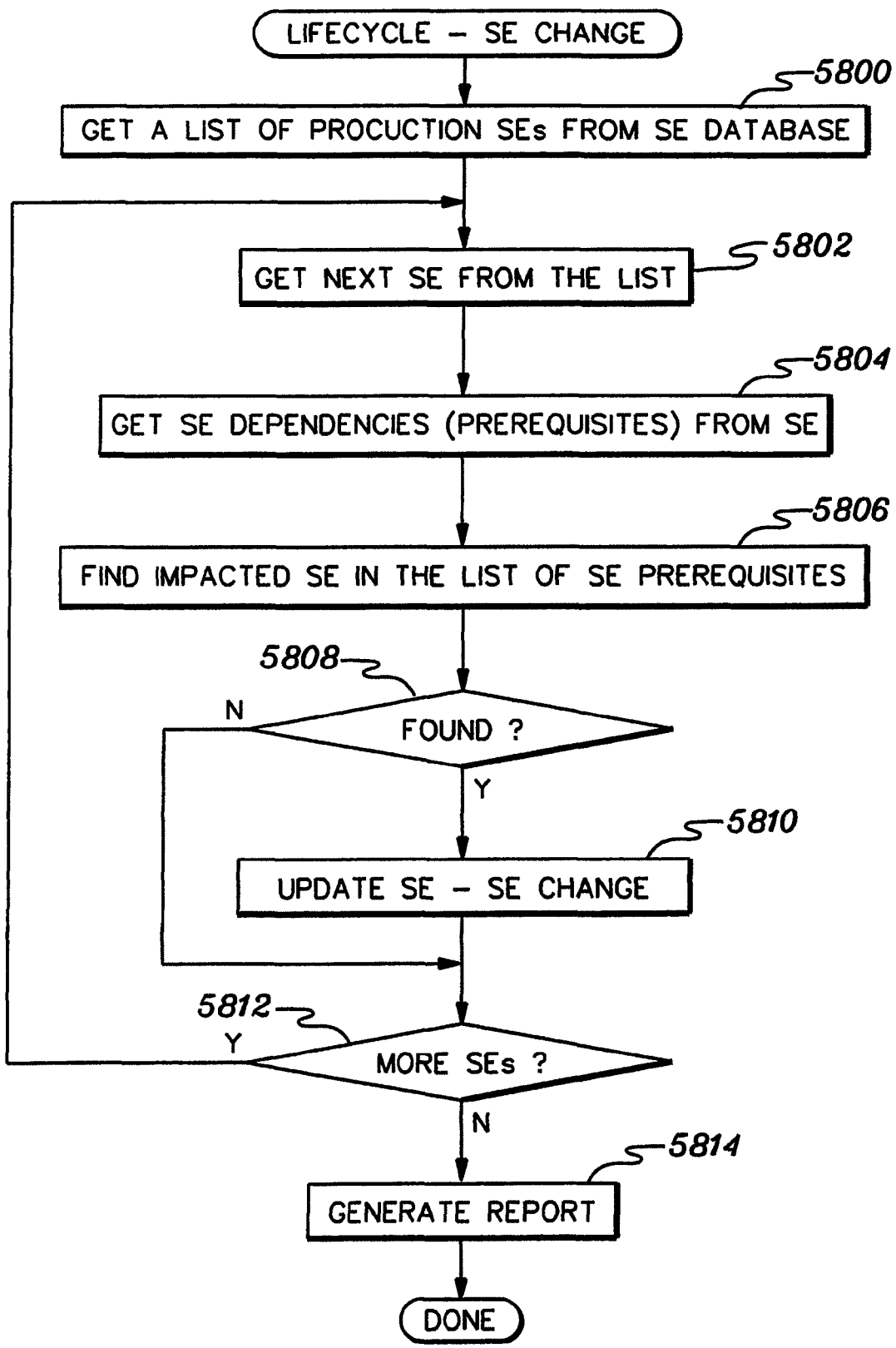
FIG. 58 depicts one embodiment of the logic associated with the lifecycle service element change, in accordance with an aspect of the present invention.

One embodiment of the logic associated with a lifecycle SE change is described with reference to FIG. 58. Initially, a list of production SEs is obtained from the SE database, STEP 5800, and a SE is selected from the list, STEP 5802. Thereafter, one or more SE dependencies (prerequisites) is obtained from the SE, STEP 5804. Then, an attempt is made to find one or more impacted SEs in the list of SE prerequisites, STEP 5806. If an impacted SE is found, INQUIRY 5808, the process of SE update for SE change is initiated for each impacted SE and the SE change request is propagated to that process, STEP 5810 (see FIG. 59). Thereafter, or if an impacted SE is not found, a determination is made as to whether there are more SEs, INQUIRY 5812. If so, processing continues with STEP 5802. Upon completion of traversal of the SE list, a summary report is generated, STEP 5814.

Figure 59:
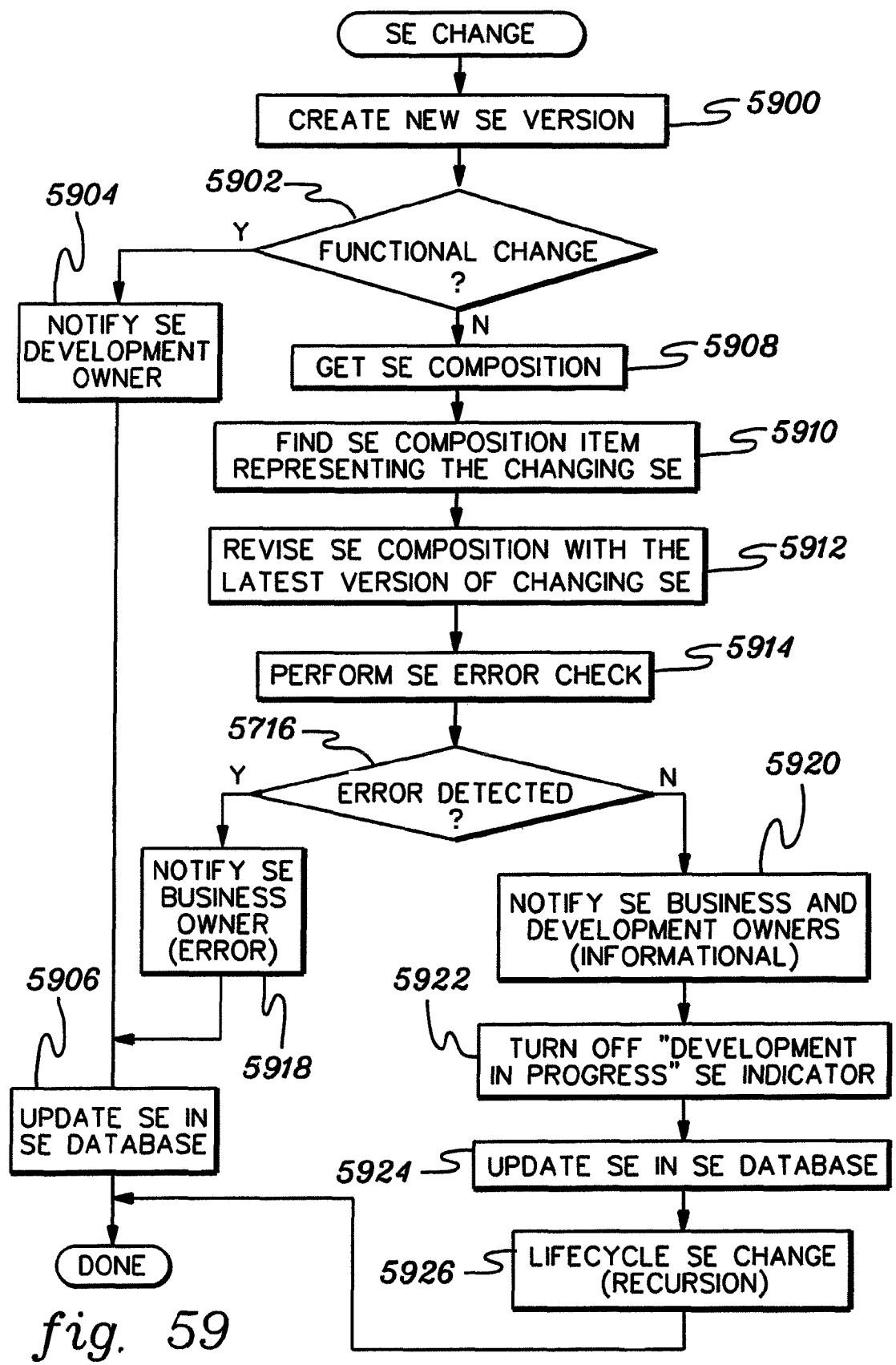
FIG. 59 depicts one embodiment of the logic associated with updating a service element for a service element change, in accordance with an aspect of the present invention.

One embodiment of the logic associated with the SE update for SE change is described with reference to FIG. 59. Initially, the process creates a new version of the SE, STEP 5900. Then, a determination is made as to the type of change, INQUIRY 5902. If the SE change request represents a functional change, then notification is sent to the SE development owner indicating a functional change in a prerequisite SE, STEP 5904. Despite the fact that compatibility is maintained, additional functions may be introduced as a result of the functional change in the prerequisite SE of which the target SE might be able to take advantage. The technical owner of the SE is expected to review the change in the prerequisite SE and ascertain whether any changes to the target SE are required. The new version of the target SE is stored in the SE database, STEP 5906.

Returning to INQUIRY 5902, if the SE change request represents a non-functional change (i.e., lifecycle revision or a phase-out of the old version of the prerequisite SE), the process retrieves the SE composition, STEP 5908, finds the SE composition item representing the changing SE, STEP 5910, and performs a revision of the target SE composition item (which results in updates to SE design, cost case, development and deployment plans), STEP 5912.

Further, the process performs a SE error check to ensure that the modified SE is still in a sound state, STEP 5914. If an error is detected by the SE error check, INQUIRY 5916, then the SE business owner is notified of an error in the lifecycle update due to a non-functional prerequisite SE change, STEP 5918, and the updated SE is stored in the SE database, STEP 5906. However, if no errors are detected by the SE error check, then the SE business and development owners are notified that the SE lifecycle update was successfully performed, STEP 5920, the target SE "development in progress" indicator is turned off, STEP 5922, the target SE is updated in the SE database, STEP 5924, and the process of lifecycle SE change is invoked recursively to ensure that all chains of prerequisites are completely exhausted, STEP 5926.

Error Checking

As described herein, error checking is performed during different phases of SE management. In accordance with an aspect of the present invention, both technical and business aspects of a service element are verified. Further details regarding error checking are described with reference to FIGS. 60-62.

Figure 60:
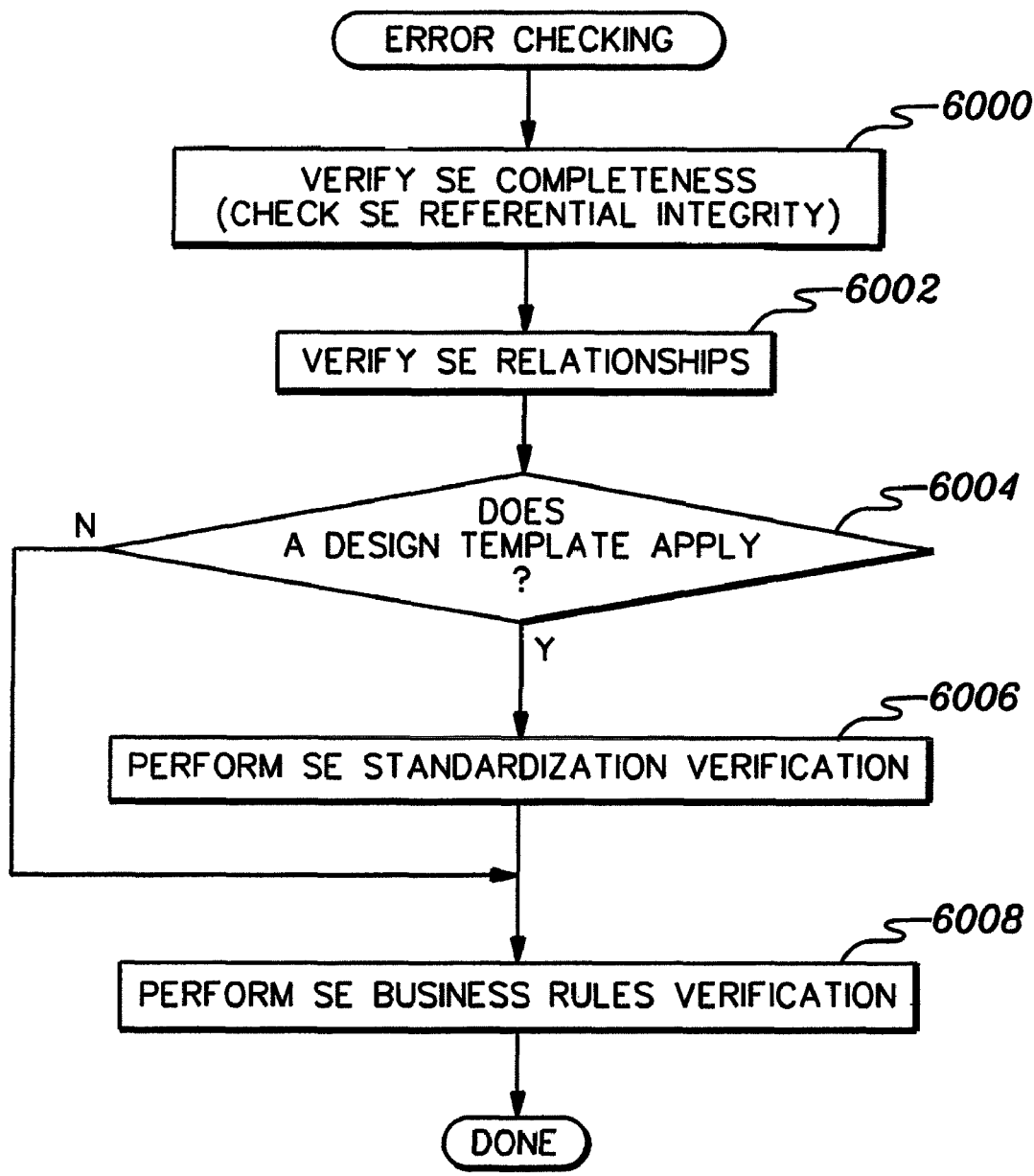
FIG. 60 depicts one embodiment of an overview of error checking, in accordance with an aspect of the present invention.

Referring to FIG. 60, an overview of error checking is described. Initially, SE completeness is verified (e.g., verification of referential integrity is performed), STEP 6000. Thereafter, verification of SE relationships is performed, as described above, STEP 6002. Next, a determination is made as to whether the SE design is based on a design template, INQUIRY 6004. If the SE was designed using a design template, then SE standardization verification is performed, as described below, STEP 6006. Thereafter, or if a design template was not used, then SE business rules verification is performed, as described below, STEP 6008.

Figure 61A:
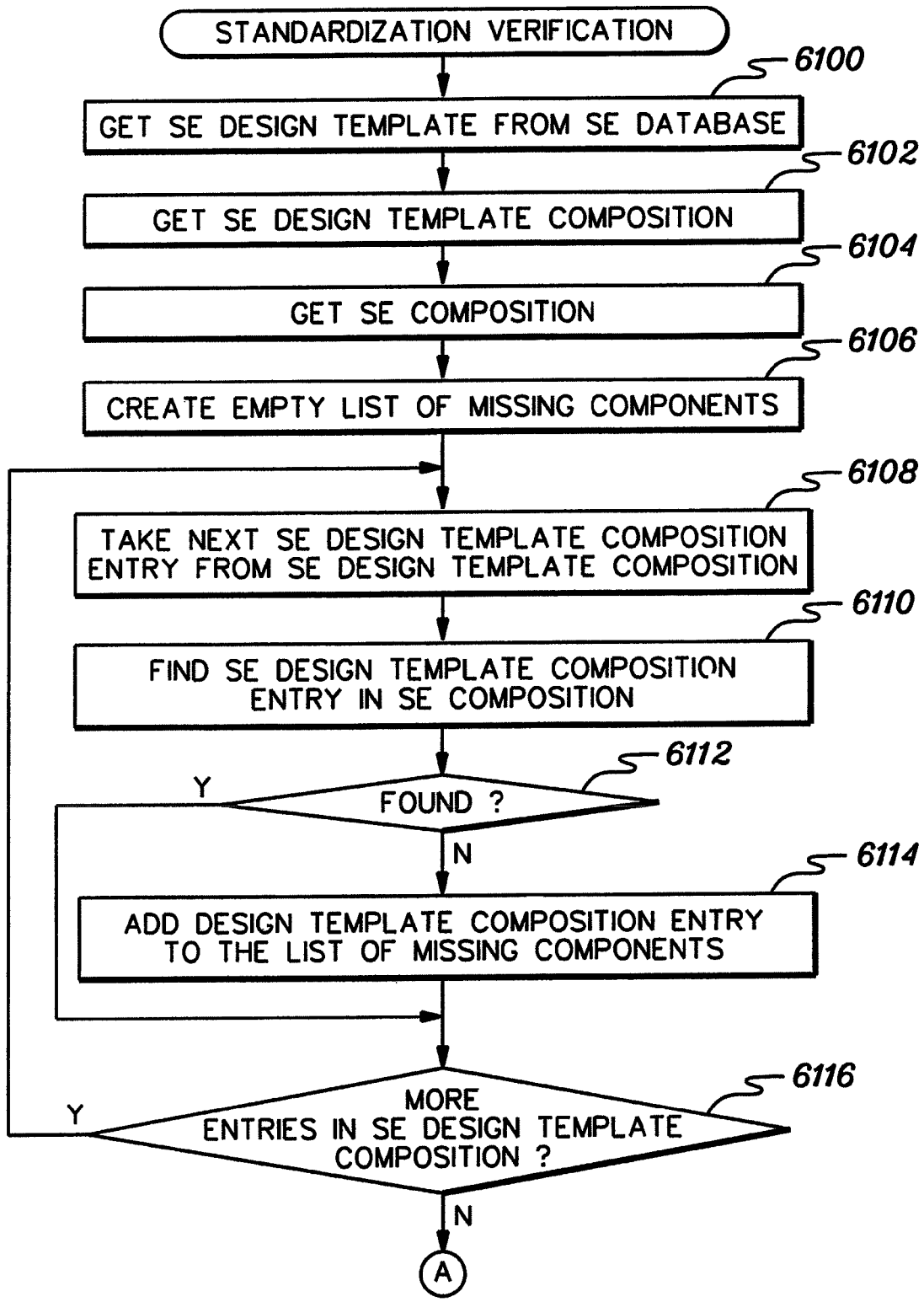
FIGS. 61a-61b depict one embodiment of the logic associated with performing standardization verification, in accordance with an aspect of the present invention.
Figure 61B:
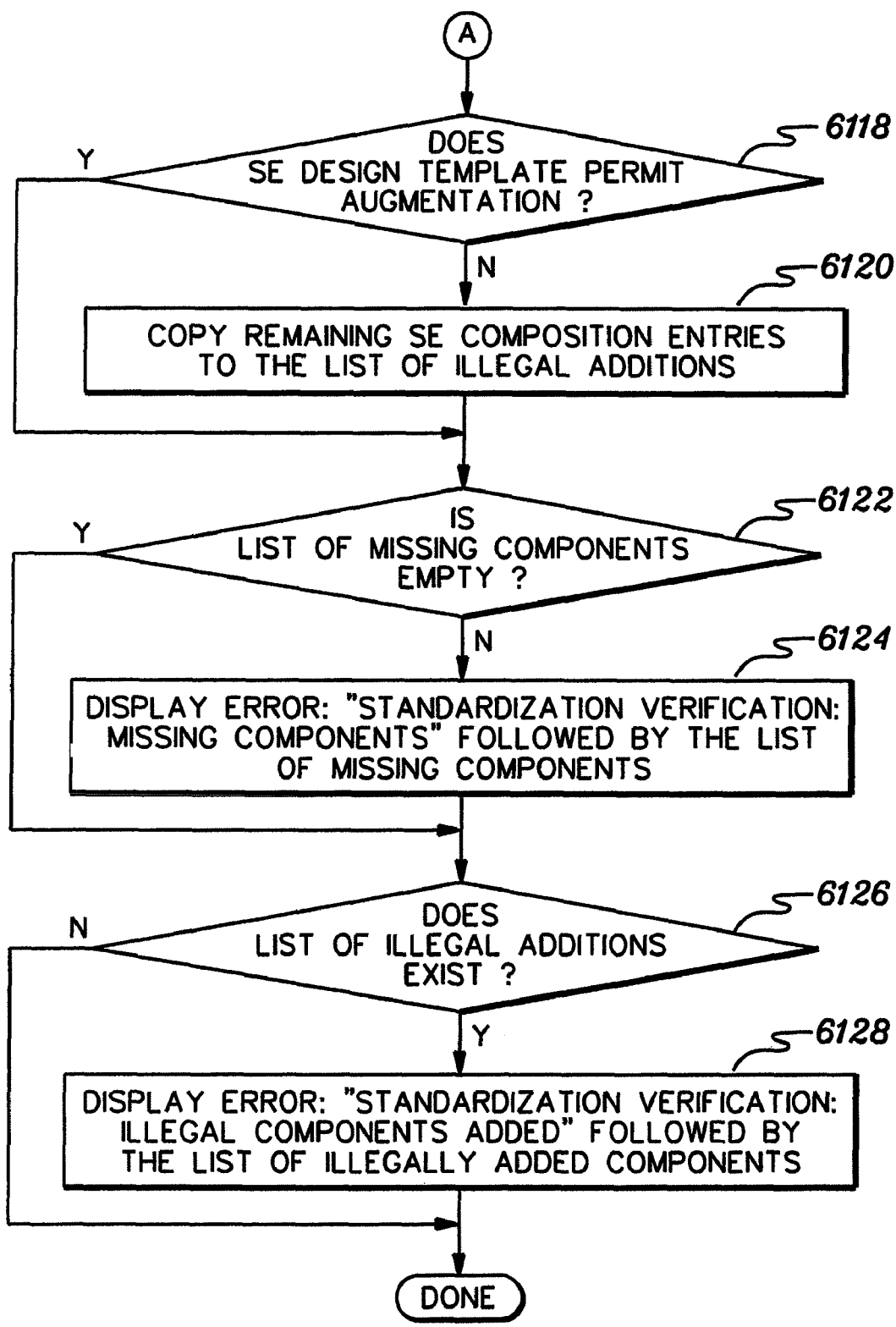

One embodiment of the logic associated with performing SE standardization verification is described with reference to FIGS. 61*a*-61*b*. Initially, the SE design template used to design this SE is retrieved from the SE database, STEP 6100. Then, the SE design template composition is extracted from the SE design template, STEP 6102. Further, the SE composition is extracted from the SE, STEP 6104.

Thereafter, an empty list of missing components is created, STEP 6106. Further, a SE design template composition entry is selected from the SE design template composition, STEP 6108, and an attempt is made to find this SE design template composition entry in the SE composition, STEP 6110. If the SE design template composition entry is not found in the SE composition, INQUIRY 6112, then it is added to the list of missing components, STEP 6114. Thereafter, or if it is found, a determination is made as to whether there are more entries in the SE design template composition, INQUIRY 6116. If there are more entries, then processing continues with STEP 6108. Otherwise, processing continues with a determination of whether the SE design template permits augmentation, INQUIRY 6118 (FIG. 61*b*).

If the SE design template does not permit augmentation, then any SE composition entries that remain that were not found as a result of previous searches (i.e., they do not correspond to any SE design template composition entries) are copied to a list of illegal additions, STEP 6120. Thereafter, or if the SE design template does permit augmentation, then a further determination is made as to whether the list of missing components is empty, INQUIRY 6122. If the previously built list of missing components is not empty, an error message is displayed to indicate missing components discovered by the standardization verification, STEP 6124.

Subsequently, or if the list of missing components is empty, then a further determination is made as to whether the list of illegal additions exists, INQUIRY 6126. If the list of illegal additions does exist, then an error message is displayed to indicate illegal additions of components to an SE design based on a SE design template that does not permit augmentation, STEP 6128. Thereafter, or if the list does not exist, then processing is complete.

Figure 62:
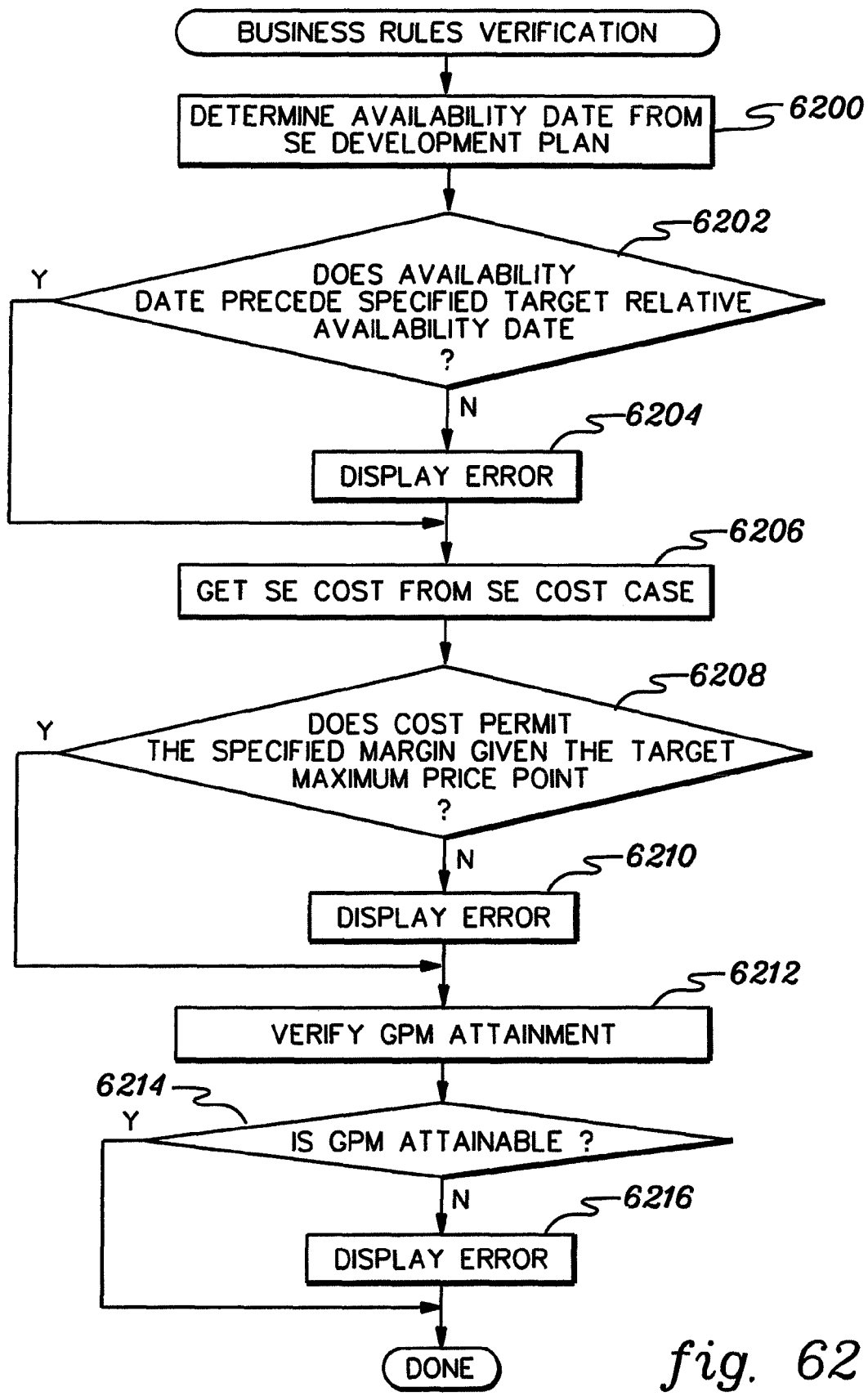
FIG. 62 depicts one embodiment of the logic associated with performing business rules verification, in accordance with an aspect of the present invention.

One embodiment of the logic associated with the business rules verification is described with reference to FIG. 62. The business rules check is a process of applying a set of constraints on cost, profitability, timing, etc. pertinent to the business case of a service element. Input to the business rules is performed at initiation of SE development activities and includes, for instance: projected sales volumes, sales time period, required minimum profit margin, target maximum price, and/or target relative availability date.

Initially, the process determines the SE projected availability date from the SE development plan (e.g., the last development plan task completion date), STEP 6200. If the determined SE projected availability date is after the specified target relative availability date, INQUIRY 6202, an error is noted indicating that the target availability date is not attainable, STEP 6204. Thereafter, or if the availability date precedes the specified target relative availability date, then the SE cost is obtained from the SE cost case, STEP 6206.

If the determined SE cost does not permit the specified profit margin given the specified target maximum price, INQUIRY 6208, an error is noted indicating that the specified target price is not attainable given the specified target margin, STEP 6210.

Thereafter, or if the cost does permit the specified margin given the target maximum price point, the process continues with verification of the gross profit margin (GPM) attainment, STEP 6212. In one example, the process of verification of the GPM is as follows:

GPM is calculated as:

$$GPM=(TR-TC)/TR$$

While:

$$TC=DEV+(x*(MAINT+DPLMT))$$

$$DEV=AHS+DEVPLN$$

$$MAINT=(DEV*0.2)/12$$

where:
- x: projected contract or customer retention period (months);
- GPM: Gross Profit Margin;
- TR: Total Revenue over x months;
- TC: Total Cost over x months;
- DEV: Development cost—one time cost;
- MAINT: Monthly maintenance cost; assumed to equal 20% of development cost per year;
- DEVPLN: Development investment (derived from SE development plan);
- DPLMT: Monthly deployment cost (derived from SE deployment plan);
- AHS: Application hosting feasibility study (if applicable).

If the GPM is not attainable, INQUIRY 6214, an error is noted indicating that the target GPM is not attainable, STEP 6216. Thereafter, or if the GPM is attainable, the process is complete.

Errors can be remedied by either changing the SE design or development plan to optimize the content, or by changing the specification of business rules, as examples.

SE Localization

Some SEs may be designed as local to a particular geography, while others may be designed for multiple geographies. Certain components used in the creation of SEs and deemed optimal in the geography where the SE was originally developed may not be available in other geographies. Certain components may be available in all geographies, but vary in costs, availability, and provisioning mechanisms between geographies. Adaptation of a SE designed for one geography to another geography is called localization.

Two methods of SE localization are described below, and both are based on the notion of finding the most appropriate match for each of the components included in a SE composition that is locally available.

SE Localization Using Translation

The technique of SE localization using translation assumes that for each component used in composing a SE in one geography, at the time of component use (or at the time of making that component available for use in this geography), its equivalents in all other geographies are known. A component translation table can therefore be built, such that the process of SE localization would amount to a sequential pass through the SE composition and a replacement of one set of components by another using the built translation table.

SE Localization by Finding Closest Component Matches

The technique of SE localization by finding closest component matches assumes that no preliminary determination of component replacement took place. A user creates a geography-specific version of a SE and attempts to complete its development, at which time a SE error check is performed. The error check consults the local component data feed and identifies any components not locally available. The user then performs a sequence of SE edit activities and replaces each unavailable component by the closest match available from the local component data feed.

Simultaneous Use of Both Methods

In one embodiment, both techniques can be used simultaneously, as some components may naturally lend themselves to one or another approach. For example, devices (e.g., computer processor models) naturally lend themselves to the translation technique, since at the time of computer processor model availability, it is known whether this model is globally available or what are the equivalent models available in each geography. On the other hand, parallel printer cables are readily available from multiple suppliers in any geography, and therefore, it may be simpler to find the closest match for the parallel printer cable component at the time a SE including a printer cable is being localized.

The decision to apply one or the other technique may also be based on the expected frequency of the need to localize a particular component. For example, an offering includes one or the other processor model, but very few include printers (which are usually more conveniently located on customer premises).

Functional Best Fit and Financial Adjustment

Because component costs may be different in different geographies, there is no guarantee that the localization, once performed, would result in an offering with a valid business case for the target geography. Should it be detected that the localized SE failed the SE error check due to a business case problem, the localization process is performed in two passes, as one example:

Pass 1—Functional Best Fit: In this phase, the choice of a component replacement is based on the closest relevant functional characteristic(s)—e.g., a 900 MHz CPU available in the source geography could be replaced with a 950 MHz CPU available in the target geography, rather than a 750 MHz CPU whose cost in the target geography may be similar to the cost of 900 MHz CPU in the source geography.

Pass 2 (performed repeatedly until SE error check is successfully passed)—Financial Adjustment: This phase replaces more expensive components chosen as a result of functional best fit component replacement selection by components whose functional characteristics may be slightly off, but whose cost is closer to the one of the original source geography component—e.g., the previously chosen 950 MHz CPU may now be replaced first with a 850 MHz CPU, and then, if this is insufficient, with a 750 MHz CPU.

Abstract SEs

In certain cases, it may be worthwhile to introduce the notion of abstract SEs. Abstract SEs are those that are not necessarily built of real components available in any geographies, but rather of generic entities, functionally equivalent to a component, but not necessarily provided by any source (called abstract components). For example, the notion of an hour of labor may apply to all geographies, but the actual costs and methods of provisioning may differ between different countries. Similarly, floor space, bandwidth, DASD space, processor power, processor memory, etc. may be represented abstractly and abstract SEs embodying these notions may be built.

Abstract SEs, while not ideally suited for any geography, could be instantiated into SEs suited to the needs of any geography/locale by applying the SE localization techniques.

Packaging And Distributing SEs

In a further aspect of the present invention, service elements may be packaged and distributed, in order to be implemented and/or delivered by another party. For example, either SE design, SE implementation or both, can be packaged on media (e.g., CD-ROM or floppy disk) or the Internet (e.g., a web site providing access to download the package or FTP site or e-mail distribution) and distributed.

Figure 63:
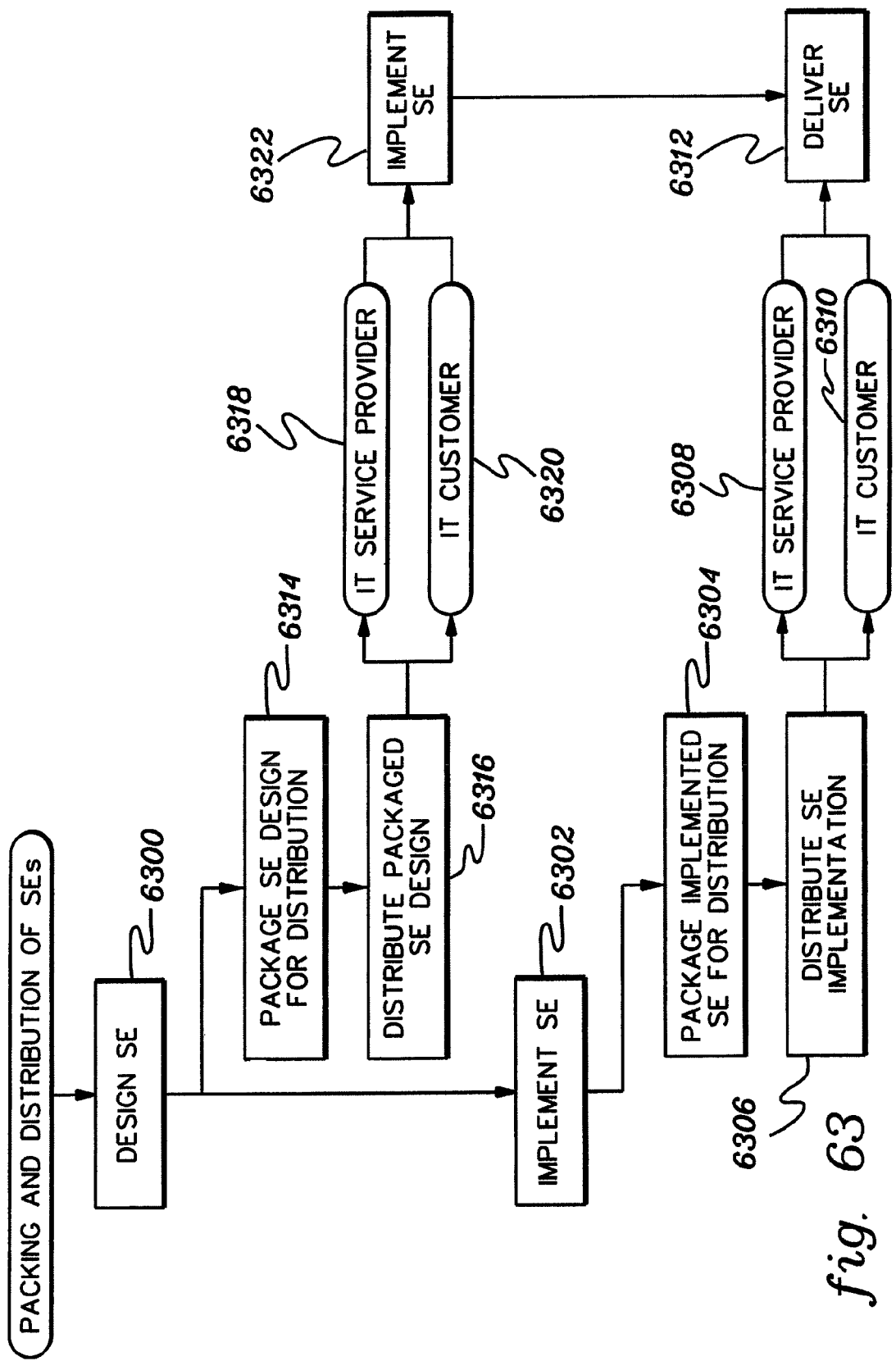
FIG. 63 depicts one embodiment of the logic associated with packaging and distributing service elements, in accordance with an aspect of the present invention.

One embodiment of the logic associated with packaging and distributing SE design and/or implementation is described with reference to FIG. 63. In one example, initially, a service element is designed, STEP 6300, and then, implemented, STEP 6302. The implemented SE is packaged for distribution, STEP 6304. This includes, for instance, copying information associated with the SE (e.g., the entire data structure of the SE) from the SE database to media or the Internet. The packaged SE implementation is then distributed to a customer, STEP 6306, such as, for instance, an IT (information technology) service provider 6308 or an IT customer 6310. It is then the customer that delivers the service, STEP 6312.

In a further embodiment, the SE design is not implemented at this time, but instead, packaged for distribution, STEP 6314. The packaging is performed similarly to that described above, in which design aspects of the data structure are copied. The packaged SE design is then distributed to a customer, STEP 6316, such as an IT service provider 6318 or an IT customer 6320. The customer receives the packaged SE design, implements the SE, STEP 6322, and delivers the service in the appropriate environment.

In a further example, the SE distribution is accomplished via an intermediary (e.g., a reseller or distributor), who then distributes the SE designs and/or implementation to the customer.

In a further embodiment, implementation (and not design) is packaged and distributed.

The above processing enables service elements to be purchased for delivery, instead of delivering the result of the service elements, i.e., the service.

Service Offerings

As described above, a service element that provides a complete function is also referred to as a service offering. There are various types of service offerings, including hosted service offerings, and application hosted service offerings.

A hosted service offering is a service offering based on a company's or customer's infrastructure, operated under the company's control. In one example, hosted service offerings are represented as a continuum of tier-based services offerings, ranging from infrastructure to a comprehensive set of application hosting services, and supporting a variety of billing models. For example, a hosted service offering includes a hosting infrastructure, such as physical hosting space (data center), security, Internet connectivity, disaster recovery functions, device provisioning and maintenance, etc. Upon the hosting infrastructure, custom hosting services may be built.

Hosting management includes local or remote management of devices, networks, and software. Upon the hosting management layer, managed services may be built.

An integration and data transformation layer includes electronic data interchange (EDI) functionality, functions that transform data among various formats, and integration protocols. Upon the integration and data transformation layer, EDI and data transformation services may be built.

The hosted applications layer draws upon functionality of all preceding layers and provides a set of application hosting services.

An application hosted service offering is, for instance, a hosted offering including at least one application. Application hosted offerings can be presented as a topological three-tier model classification, including a client tier, middle tier, and a back tier. These are conceptual (logical) tiers, which can be physically combined, depending on a variety of factors. Different combinations of these tiers yield a topological nomenclature of hosted application offerings.

As examples, the client can be static or factual (i.e., a program, packaged as a part of the application, permanently resident on the client computer(s)), dynamic (i.e., a program, packaged as a part of the application, not permanently resident on the client's computer—e.g., loaded from the middle tier at execution time; e.g., Java applet), or null (i.e., application is accessed via a browser without applets ("dumb" browser), terminal, or terminal emulator).

A summary of application hosted offerings nomenclature is presented in the table below:

| Offering | Classification | Description |
| --- | --- | --- |
| Model | Discrete | Customers use dedicated configuration |
| | Shared/ Subscription | Customers use dedicated or shared configuration, application support is included (e.g., ASP) |

-continued

| Offering | Classification | Description |
|---|---|---|
| | Usage | Customers use the function(s) provided by application(s) and are not aware of the hosting platform topology (e.g., utility or e-sourcing) |
| Client | Static | Factual client, client software installed on client computers |
| | Dynamic | Dynamically accessed client client/server, client software not installed on client computers web browser with applet |
| | Null | Null client terminal web browser (no applets) screen scraper or windows terminal (e.g., Citrix) used for static or dynamic client |
| Sharing | Dedicated | Hosting configuration is used by a single customer |
| | Shared | Hosting configuration is used by one or more customers concurrently |
| Topology | (1) Remote management | Hosting configuration on customer premises, company remotely manages the application |
| | (2) Data management | Company hosts back tier (usually, data management) |
| | (3) Partial hosting | Company hosts application, but client code is installed on customer computers |
| | (4) Complete hosting | Company hosts application completely, including client |

It has been proven empirically, based on statistical information on problems associated with hosted applications, that most applications are not designed for and have problems when placed in a hosted environment. Development of hosted service offerings has been a time-consuming and costly procedure with a number of human, technical, and financial resources involved in the development process. The work spans different areas, including business, technical, and others, split in phases with multiple checkpoints, and usually takes multiple months even for a trivial function. Multiple solution elements are produced during different phases of the process.

The problems associated with hosted applications were being discovered late in the development cycle, and as a result, entailed significant project delays and development cost increases. To alleviate this, Application Hosting Competency (AHC) was created, in accordance with an aspect of the present invention.

AHC has a function of assessing and enabling software packages, including applications, middleware, etc., for hosting in a specific hosting environment. The AHC process includes a set of manual tasks, tailored to specific delivery environments and offering models. The outputs of AHC are quantified cost, risk, and enablement features for applications.

Figure 64:
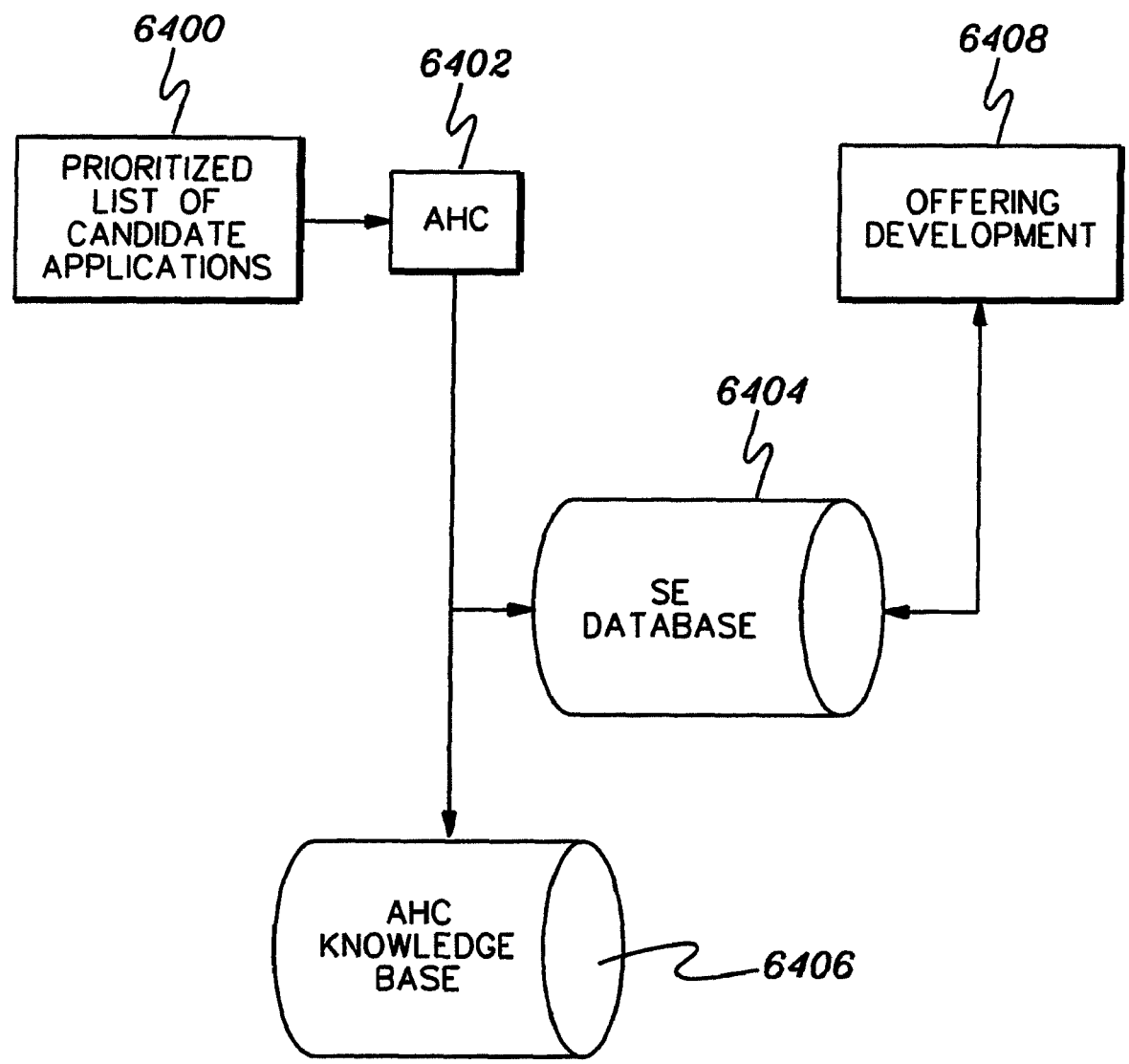
FIG. 64 depicts one embodiment of an overview of a development process, in accordance with an aspect of the present invention.

One embodiment of an overview of a development process that includes AHC is described with reference to FIG. 64. The input to the development process is a prioritized list of candidate applications 6400. This list is processed by the Application Hosting Competency (AHC) 6402 to ascertain feasibility of hosting each application and costs and risks associated therewith. In one example, this processing includes an information or knowledge gathering step that includes various phases, as well as the design and implementation of desired enablement elements. This processing includes, for instance, the following:

Determine preliminary candidates (e.g., possible vendors);
Preliminary independent software vendor (ISV) capabilities assessment (e.g., how long has application been offered, customer base);
Preliminary ISV application assessment (e.g., how does the application behave in the delivery environment—security, performance, etc.);
DCP (decision checkpoint, e.g., proceed or not);
Initial negotiations with ISV (e.g, informing ISV of evaluation and seeking commitment);
ISV capabilities assessment (probe further into capabilities, and development and support maturity);
Initial ISV application assessment (further assessment with ISV assistance);
DCP;
Detailed ISV application assessment (optional);
DCP;
Negotiate access to ISV application software for evaluation;
Hands-on ISV application assessment, document costs and risks;
Determine enablement activities;
DCP;
Negotiate terms & conditions with the ISV;
Work with ISV to pursue required application changes;
Design & implement required enablement elements using the techniques described herein;
Hands-on assessment of modified application with enablement elements;
DCP; and
Provide input to design and development.

The gathered knowledge is stored in a SE database 6404 in the form of a partial design of one or more SES. If hosting of an application is not feasible at present, or cost or risk of hosting this application are deemed to be too high, knowledge about this application is recorded in the AHC knowledge base 6406 for potential future use.

Moreover, an offering development process 6408 uses SDT to transform the partial SE designs into complete service elements.

This separation of the AHC, whose function is to discover the necessary pieces of information about applications to be hosted and produce a hosting capability, from "offering development", whose function is to convert the available information and hosting capabilities into a hosted offering, permits creation of a pipeline of activities that would process multiple applications intended for hosting, thus making it possible to convert the existing "artisan"-level process of hosted offering development into a "factory"-like, mass-production process. A condition for this mass-production is an automated development process, based on a conveyer-like tool, referred to herein as the Service Development Tool.

In further detail, AHC performs a study of the application and determines the initial topology and operational characteristics of the hosted application environment. Combined with initial assumptions made by offering management (such as, e.g., customer volumes, response time requirements, etc.), this provides initial concept-level input to development. At each iteration of the development cycle (concept, plan, development), the SDT is used by a different type of user (offering manager, development team), and a set of deliverables is produced by SDT, defining the appropriate level of offering. This information is given to the offering management, which can then use it to refine its assumptions about the offering, provide refined assumptions to development, which can subsequently produce the next iteration, eventually resulting in the final offering.

Figure 65A:
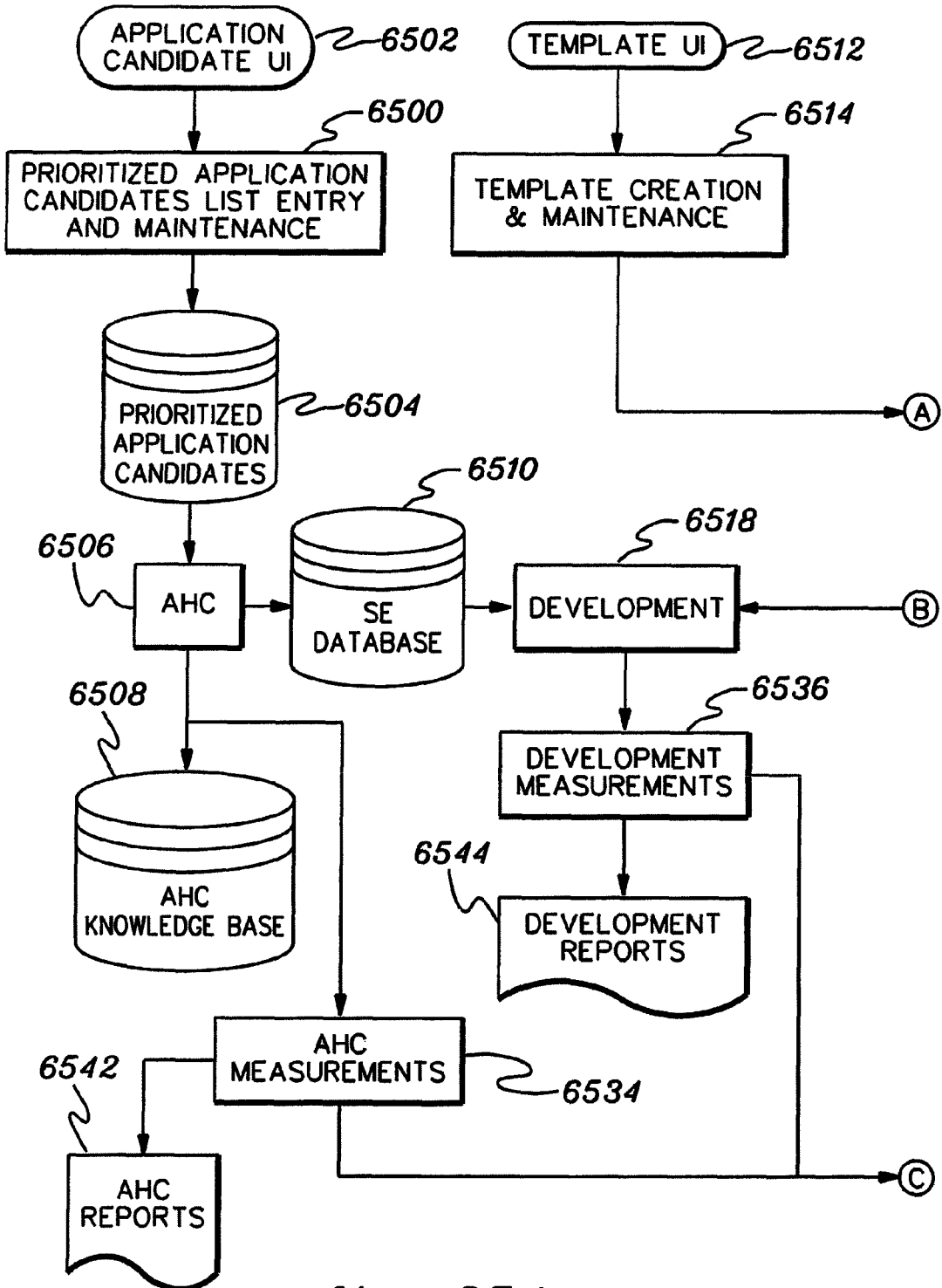
FIGS. 65a-65b depict one embodiment of the flow associated with a development process, in accordance with an aspect of the present invention.
Figure 65B:
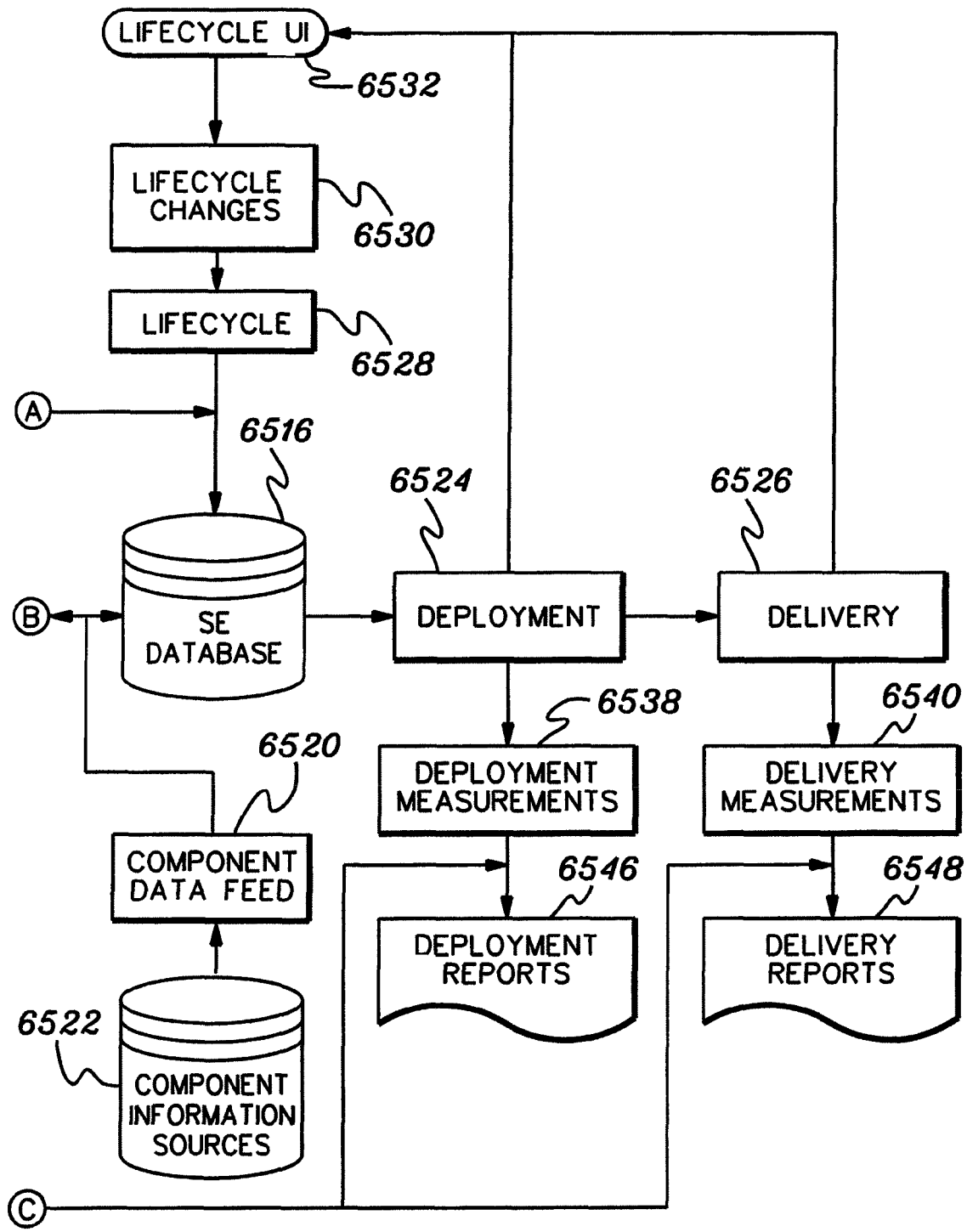

One example of the flow associated with a development process is described with reference to FIGS. 65a-65b. Prioritized application candidate list entry and maintenance 6500 is performed by offering management, using the application candidate user interface (UI) 6502; the prioritized list is stored in the prioritized application candidates repository 6504. AHC 6506 processes the prioritized application candidate list and stores information learned in this process in the AHC knowledge base 6508, and produces zero or more partial service elements, which are stored in a SE database 6510. Architecture uses offering template UI 6512 to create and maintain offering templates 6514, which are stored in the SE database 6516 (FIG. 65*b*). (The SE database is depicted twice for clarity.) Development 6518 uses hosting capabilities produced by AHC and templates produced by architecture to develop SEs (including offerings).

Component data feed 6520 provides a mechanism for dynamic determination of SE costs based on (multiple) component cost sources 6522. Offerings and SEs produced by development are deployed 6524 into production and delivered 6526 to customers. Lifecycle changes 6528 may be initiated externally 6530 (by offering management or development) or as a result of deployment or delivery activities, using lifecycle UI 6532. At each step of the process, appropriate measurements are collected 6534 (FIG. 65*a*), 6536, 6538 (FIG. 65*b*), 6540, and formatted into a variety of reports 6542, 6544, 6546, 6548.

Described in detail above is a tool and capabilities for facilitating management of service elements and/or service offerings. Management of a service element may include obtaining (e.g., receiving, creating, constructing, having, providing) the service element, and performing one or more actions associated with the service element.

Although various steps are described herein as being performed by different units within the SDT, it is not necessary for those particular units to perform the logic. Other units may perform the logic or it can just be considered that the SDT, without referring to particular units, performs the logic.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A system for providing service elements, said system comprising:
  a computer-implemented service element development tool for facilitating:
    defining by a service element designer one or more service elements of a service to be constructed, said one or more service elements representing an in-house or outsourced service and providing a design specification usable in constructing the service, each service element being represented by a data structure comprising a set of information to manage the service element, the data structure including a cost matrix setting forth a combined cost of time and materials for the service element, a list of functional prerequisites, a composition, a development plan, a deployment plan, integration properties and a customization specification for the service element, the functional prerequisites comprising a list of other service elements required for the service element to function, the composition comprising a list of components included in the service element and quantity of each component, the development plan comprising a functional specification, design, and test plan for the service element, the deployment plan comprising a specification for service element deployment, the integration properties defining a relationship between the service element and other service elements to be possibly integrated into the service element and being at least one of a compatible integration, a standard integration, a manual integration, or a prohibited integration, and the customization specification defining one or more service element customization characteristics for a particular customer, wherein compatible integration comprises a list of at least one other service element that the service element is compatible with, standard integration comprises a list of at least one other service element that the service element integrates with by parametric integration, manual integration comprises a list of at least one other service element that the service element integrates with by programmable integration, and prohibited integration comprises a list of at least one other service element with which the service element is mutually exclusive;
    selecting whether to package a service element design, a service element implementation, or both a service element design and a service element implementation, and if selecting to package the service element design, then copying the service element's data structure for packaging as the service element design, and if selecting to package the service element implementation, then implementing the service element prior to packaging, the implementing employing the service element's data structure, including referencing the cost matrix, functional prerequisites, composition, development plan, deployment plan, integration properties and customization specification for the service element;
    packaging by the service element designer at least a portion of the one or more service elements into a package usable in constructing the service, the package being at least one of a design package or an implementation package, and comprising at least a portion of the service element's data structure; and
    distributing by the service element designer the package to enable the service provider to subsequently construct and deliver the service to a customer using the at least a portion of the one or more service elements included in the package.

2. The system of claim 1, wherein said packaging facilitated by the computer-implemented service element development tool comprises:
  obtaining at least some data of the at least a portion of one or more service elements from a storage medium; and providing the at least some data on a medium for distribution.

3. The system of claim 2, wherein the medium comprises the internet.

4. An article of manufacture comprising:
at least one computer-usable medium having computer-readable program code logic to facilitate developing service elements, said computer-readable program code logic when executing within a computing environment facilitating performing the following:
   defining by a service element designer one or more service elements of a service to be constructed, said one or more service elements representing an in-house or outsourced service and providing a design specification usable in constructing the service, each service element being represented by a data structure comprising a set of information to manage the service element, the data structure including a cost matrix setting forth a combined cost of time and materials for the service element, a list of functional prerequisites, a composition, a development plan, a deployment plan, integration properties and a customization specification for the service element, the functional prerequisites comprising a list of other service elements required for the service element to function, the composition comprising a list of components included in the service element and quantity of each component, the development plan comprising a functional specification, design, and test plan for the service element, the deployment plan comprising a specification for service element deployment, the integration properties defining a relationship between the service element and other service elements to be possibly integrated into the service element and being at least one of a compatible integration, a standard integration, a manual integration, or a prohibited integration, and the customization specification defining one or more service element customization characteristics for a particular customer, wherein compatible integration comprises a list of at least one other service element that the service element is compatible with, standard integration comprises a list of at least one other service element that the service element integrates with by parametric integration, manual integration comprises a list of at least one other service element that the service element integrates with by programmable integration, and prohibited integration comprises a list of at least one other service element with which the service element is mutually exclusive;
   selecting whether to package a service element design, a service element implementation, or both a service element design and a service element implementation, and if selecting to package the service element design, then copying the service element's data structure for packaging as the service element design, and if selecting to package the service element implementation, then implementing the service element prior to packaging, the implementing employing the service element's data structure, including referencing the cost matrix, functional prerequisites, composition, development plan, deployment plan, integration properties and customization specification for the service element;
   packaging by the service element designer at least a portion of the one or more service elements into a package usable in constructing the service, the package being at least one of a design package or an implementation package, and comprising at least a portion of the service element's data structure; and
   distributing by the service element designer the package to enable the service provider to subsequently construct and deliver the service to a customer using the at least a portion of the one or more service elements included in the package.

5. The article of manufacture of claim 4, wherein said packaging comprises:
   obtaining at least some data of the at least a portion of one or more service elements from a storage medium; and
   providing the at least some data on a medium for distribution.

6. The article of manufacture of claim 4, wherein the medium comprises the internet.

* * * * *